(12) United States Patent
Duong et al.

(10) Patent No.: US 11,049,013 B1
(45) Date of Patent: Jun. 29, 2021

(54) ENCODING OF WEIGHT VALUES STORED ON NEURAL NETWORK INFERENCE CIRCUIT

(71) Applicant: Perceive Corporation, San Jose, CA (US)

(72) Inventors: Kenneth Duong, San Jose, CA (US); Jung Ko, San Jose, CA (US); Steven L. Teig, Menlo Park, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 2 days.

(21) Appl. No.: 16/457,756

(22) Filed: Jun. 28, 2019

Related U.S. Application Data

(63) Continuation-in-part of application No. 16/120,387, filed on Sep. 3, 2018, now Pat. No. 10,740,434.

(60) Provisional application No. 62/853,128, filed on May 27, 2019, provisional application No. 62/797,910, filed on Jan. 28, 2019, provisional application No. 62/792,123, filed on Jan. 14, 2019, provisional application No. 62/773,164, filed on Nov. 29, 2018, provisional application No. 62/773,162, filed on Nov. 29, 2018, provisional application No. 62/753,878, filed on Oct. 31, 2018, provisional application No. 62/742,802, filed on Oct. 8, 2018, provisional application No. 62/724,589, filed on Aug. 29, 2018, provisional application No. 62/660,914, filed on Apr. 20, 2018.

(51) Int. Cl.
| | |
|---|---|
| *G06N 3/08* | (2006.01) |
| *G06N 3/04* | (2006.01) |
| *G06N 3/063* | (2006.01) |
| *G06F 17/16* | (2006.01) |

(52) U.S. Cl.
CPC .............. *G06N 3/08* (2013.01); *G06F 17/16* (2013.01); *G06N 3/04* (2013.01); *G06N 3/063* (2013.01)

(58) Field of Classification Search
CPC . G06N 3/04; G06N 3/063; G06N 3/08; G06F 17/16
See application file for complete search history.

(56) References Cited

U.S. PATENT DOCUMENTS

| | | |
|---|---|---|
| 5,956,703 A | 9/1999 | Turner et al. |
| 9,904,874 B2 | 2/2018 | Shoaib et al. |
| (Continued) | | |

OTHER PUBLICATIONS

Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.

(Continued)

*Primary Examiner* — Michael D. Yaary
(74) *Attorney, Agent, or Firm* — Adeli LLP

(57) ABSTRACT

Some embodiments provide a neural network inference circuit for executing a neural network that includes multiple computation nodes at multiple layers. Each of a set of the computation nodes includes a dot product of input values and weight values. The neural network inference circuit includes (i) a first set of memory units allocated to storing input values during execution of the neural network and (ii) a second set of memory units storing encoded weight value data. The weight value data is encoded such that less than one bit of memory is used per weight value of the neural network.

20 Claims, 54 Drawing Sheets

(56) References Cited

U.S. PATENT DOCUMENTS

| | | |
|---|---|---|
| 2004/0078403 A1 | 4/2004 | Scheuermann et al. |
| 2017/0011288 A1 | 1/2017 | Brothers et al. |
| 2018/0018559 A1 | 1/2018 | Yakopcic et al. |
| 2018/0046900 A1 | 2/2018 | Daily et al. |
| 2018/0114569 A1* | 4/2018 | Strachan ............... G11C 7/1006 |
| 2018/0197068 A1* | 7/2018 | Narayanaswami .... G06N 3/063 |
| 2018/0246855 A1 | 8/2018 | Redfern et al. |
| 2018/0293691 A1 | 10/2018 | Nurvitadhi et al. |
| 2018/0307494 A1 | 10/2018 | Duld-Ahmed-Vall et al. |
| 2018/0307950 A1 | 10/2018 | Nealis et al. |
| 2018/0315158 A1 | 11/2018 | Nurvitadhi et al. |
| 2018/0373975 A1 | 12/2018 | Yu et al. |
| 2019/0012296 A1 | 1/2019 | Hsieh et al. |
| 2019/0114499 A1 | 4/2019 | Delaye et al. |
| 2019/0187983 A1 | 6/2019 | Ovsiannikov et al. |
| 2019/0205358 A1 | 7/2019 | Diril et al. |
| 2019/0236445 A1 | 8/2019 | Das et al. |
| 2020/0134461 A1* | 4/2020 | Chai ........................ G06N 3/04 |
| 2020/0380363 A1 | 12/2020 | Kwon et al. |

OTHER PUBLICATIONS

Ardakani, Arash, et al., "Sparsely-Connected Neural Networks: Towards Efficient VLSI Implementation of Deep Neural Networks," Proceedings of the 5th International Conference on Learning Representations (ICLR 2017), Apr. 24-26, 2017, 14 pages, ICLR, Toulon, France.

Bagherinezhad, Hessam, et al., "LCNN: Look-up Based Convolutional Neural Network," Proceedings of 2017 IEEE Conference on Computer Vision and Pattern Recognition (CVPR 2017), Jul. 21-26, 2017, 10 pages, IEEE, Honolulu, HI, USA.

Bang, Suyoung, et al., "A 288µW Programmable Deep-Learning Processor with 270KB On-Chip Weight Storage Using Non-Uniform Memory Hierarchy for Mobile Intelligence," Proceedings of 2017 IEEE International Solid-State Circuits Conference (ISSCC 2017), Feb. 5-7, 2017, 3 pages, IEEE, San Francisco, CA, USA.

Bong, Kyeongryeol, et al., "A 0.62mW Ultra-Low-Power Convolutional-Neural-Network Face-Recognition Processor and a CIS Integrated with Always-On Haar-Like Face Detector," Proceedings of 2017 IEEE International Solid-State Circuits Conference (ISSCC 2017), Feb. 5-7, 2017, 3 pages, IEEE, San Francisco, CA, USA.

Chen, Yu-Hsin, et al., "Eyeriss: A Spatial Architecture for Energy-Efficient Dataflow for Convolutional Neural Networks," Proceedings of 2016 ACM/IEEE 43rd Annual International Symposium on Computer Architecture (ISCA 2016), Jun. 18-22, 2016, 13 pages, IEEE, Seoul, South Korea.

Chen, Yu-Hsin, et al., "Using Dataflow to Optimize Energy Efficiency of Deep Neural Network Accelerators," IEEE Micro, Jun. 14, 2017, 10 pages, vol. 37, Issue 3, IEEE, New York, NY, USA.

Cho, Minsik, et al., "MEC: Memory-Efficient Convolution for Deep Neural Network," Jun. 21, 2017, 10 pages, arXiv:1706.06873v1, Computer Research Repository (CoRR)—Cornell University, Ithaca, NY, USA.

Courbariaux, Matthieu, et al., "Binarized Neural Networks: Training Neural Networks with Weights and Activations Constrained to +1 or −1," Mar. 17, 2016, 11 pages, arXiv:1602.02830v3, Computing Research Repository (CoRR)—Cornell University, Ithaca, NY, USA.

Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.

Duda, Jarek, "Asymmetric Numeral Systems: Entropy Coding Combining Speed of Huffman Coding with Compression Rate of Arithmetic Coding," Jan. 6, 2014, 24 pages, arXiv:1311.2540v2, Computer Research Repository (CoRR)—Cornell University, Ithaca, NY, USA.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Fu, Yao, et al., "Embedded Vision with INT8 Optimization on Xilinx Devices," WP490 (v1.0.1), Apr. 19, 2017, 15 pages, Xilinx, Inc., San Jose, CA, USA.

Gao, Mingyu, et al., "TETRIS: Scalable and Efficient Neural Network Acceleration with 3D Memory," Proceedings of the 22nd International Conference on Architectural Support for Programming Languages and Operating Systems (ASPLOS '17), Apr. 8-12, 2017, 14 pages, ACM, Xi'an, China.

Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.

Hanlon, Jamie, "Why is So Much Memory Needed for Deep Neural Networks?," Jan. 31, 2017, 6 pages, Graphcore, Bristol, United Kingdom, retrieved from https://www.graphcore.ai/posts/why-is-so-much-memory-needed-for-deep-neural-networks.

He, Zhezhi, et al., "Optimize Deep Convolutional Neural Network with Ternarized Weights and High Accuracy," Jul. 20, 2018, 8 pages, arXiv:1807.07948v1, Computing Research Repository (CoRR)—Cornell University, Ithaca, NY, USA.

Hegde, Kartik, et al., "UCNN: Exploiting Computational Reuse in Deep Neural Networks via Weight Repetition," Proceedings of the 45th Annual International Symposium on Computer Architecture (ISCA '18), Jun. 2-6, 2018, 14 pages, IEEE Press, Los Angeles, CA, USA.

Horowitz, Mark, "Computing's Energy Problem (and what can we do about it)," 2014 IEEE International Solid-State Circuits Conference (ISSCC 2014), Feb. 9-13, 2014, 5 pages, IEEE, San Francisco, CA, USA.

Huan, Yuxiang, et al., "A Low-Power Accelerator for Deep Neural Networks with Enlarged Near-Zero Sparsity," May 22, 2017, 5 pages, arXiv:1705.08009v1, Computer Research Repository (CoRR)—Cornell University, Ithaca, NY, USA.

Jain, Anil K., et al., "Artificial Neural Networks: A Tutorial," Computer, Mar. 1996, 14 pages, vol. 29, Issue 3, IEEE.

Jeon, Dongsuk, et al., "A 23-mW Face Recognition Processor with Mostly-Read 5T Memory in 40-nm CMOS," IEEE Journal on Solid-State Circuits, Jun. 2017, 15 pages, vol. 52, No. 6, IEEE, New York, NY, USA.

Jouppi, Norman, P., et al., "In-Datacenter Performance Analysis of a Tensor Processing Unit," Proceedings of the 44th Annual International Symposium on Computer Architecture (ISCA '17), Jun. 24-28, 2017, 17 pages, ACM, Toronto, ON, Canada.

Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.

Kumar, Ashish, et al., "Resource-efficient Machine Learning in 2 KB RAM for the Internet of Things," Proceedings of the 34th International Conference on Machine Learning, Aug. 6-11, 2017, 10 pages, vol. 70, PMLR, Sydney, Australia.

Leng, Cong, et al., "Extremely Low Bit Neural Network: Squeeze the Last Bit Out with ADMM," Proceedings of 32nd AAAI Conference on Artificial Intelligence (AAAI-18), Feb. 2-7, 2018,16 pages, Association for the Advancement of Artificial Intelligence, New Orleans, LA, USA.

Fengfu, et al., "Ternary Weight Networks," May 16, 2016, 9 pages, arXiv:1605.04711v1, Computing Research Repository (CoRR)—Cornell University, Ithaca, NY, USA.

Merolla, Paul, et al., "Deep Neural Networks are Robust to Weight Binarization and Other Non-linear Distortions," Jun. 7, 2016, 10 pages, arXiv:1606.01981v1, Computing Research Repository (CoRR)—Cornell University, Ithaca, NY, USA.

Moons, Bert, et al., "ENVISION: A 0.26-to-10TOPS/W Subword-Parallel Dynamic-Voltage-Accuracy-Frequency-Scalable Convolutional Neural Network Processor in 28nm FDSOI," Proceedings of 2017 IEEE International Solid-State Circuits Conference (ISSCC 2017), Feb. 5-7, 2017, 3 pages, IEEE, San Francisco, CA, USA.

(56) References Cited

OTHER PUBLICATIONS

Moshovos, Andreas, et al., "Exploiting Typical Values to Accelerate Deep Learning," Computer, May 24, 2018, 13 pages, vol. 51—Issue 5, IEEE Computer Society, Washington, D.C.

Non-Published Commonly Owned U.S. Appl. No. 16/457,757, filed Jun. 28, 2019, 180 pages, Perceive Corporation.

Park, Jongsoo, et al., "Faster CNNs with Direct Sparse Convolutions and Guided Pruning," Jul. 28, 2017, 12 pages, arXiv:1608.01409v5, Computer Research Repository (CoRR)—Cornell University, Ithaca, NY, USA.

Pedram, Ardavan, et al., "Dark Memory and Accelerator-Rich System Optimization in the Dark Silicon Era," Apr. 27, 2016, 8 pages, arXiv:1602.04183v3, Computer Research Repository (CoRR)—Cornell University, Ithaca, NY, USA.

Rastegari, Mohammad, et al., "XNOR-Net: ImageNet Classification Using Binary Convolutional Neural Networks," Proceedings of 2016 European Conference on Computer Vision (ECCV '16), Oct. 8-16, 2016, 17 pages, Lecture Notes in Computer Science, vol. 9908, Springer, Cham, Amsterdam, Netherlands.

Ren, Mengye, et al., "SBNet: Sparse Blocks Network for Fast Inference," Jan. 7, 2018, 10 pages, arXiv:1801.02108v1, Computer Research Repository (CoRR)—Cornell University, Ithaca, NY, USA.

Rutenbar, Rob A., et al., "Hardware Inference Accelerators for Machine Learning," 2016 IEEE International Test Conference (ITC), Nov. 15-17, 2016, 39 pages, IEEE, Fort Worth, TX, USA.

Sen, Sanchari, et al., "SPARCE: Sparsity aware General Purpose Core Extensions to Accelerate Deep Neural Networks," Nov. 29, 2017, 13 pages, arXiv:1711.06315v2, Computer Research Repository (CoRR)—Cornell University, Ithaca, NY, USA.

Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.

Shin, Dongjoo, et al., "DNPU: An 8.1TOPS/W Reconfigurable CNN-RNN Processor for General-Purpose Deep Neural Networks," Proceedings of 2017 IEEE International Solid-State Circuits Conference (ISSCC 2017), Feb. 5-7, 2017, 3 pages, IEEE, San Francisco, CA, USA.

Sim, Jaehyeong, et al., "A 1.42TOPS/W Deep Convolutional Neural Network Recognition Processor for Intelligent IoE Systems," Proceedings of 2016 IEEE International Solid-State Circuits Conference (ISSCC 2016), Jan. 31-Feb. 4, 2016, 3 pages, IEEE, San Francisco, CA, USA.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Wang Min, et al., "Factorized Convolutional Neural Networks," 2017 IEEE International Conference on Computer Vision Workshops (ICCVW '17), Oct. 22-29, 2017, 9 pages, IEEE, Venice, Italy.

Wen, Wei, et al., "Learning Structured Sparsity in Deep Neural Networks," Oct. 18, 2016, 10 pages, arXiv:1608.03665v4, Computer Research Repository (CoRR)—Cornell University, Ithaca, NY, USA.

Yang, Tien-Ju, et al., "Designing Energy-Efficient Convolutional Neural Networks using Energy-Aware Pruning," Apr. 18, 2017, 9 pages, arXiv:1611.05128v4, Computer Research Repository (CoRR)—Cornell University, Ithaca, NY, USA.

Yang, Xuan, et al., "DNN Dataflow Choice Is Overrated," Sep. 10, 2018, 13 pages, arXiv:1809.04070v1, Computer Research Repository (CoRR)—Cornell University, Ithaca, NY, USA.

Zhang, Shijin, et al., "Cambricon-X: An Accelerator for Sparse Neural Networks," 2016 49th Annual IEEE/ACM International Symposium on Microarchitecture (MICRO '16), Oct. 15-19, 2016, 12 pages, IEEE, Taipei, Taiwan.

Zhou, Shuchang, et al., "DoReFa-Net: Training Low Bitwidth Convolutional Neural Networks with Low Bitwidth Gradients," Jul. 17, 2016, 14 pages, arXiv:1606.06160v2, Computer Research Repository (CoRR)—Cornell University, Ithaca, NY, USA.

Zhu Chenzhuo, et al., "Trained Ternary Quantization," Dec. 4, 2016, 9 pages, arXiv:1612.01064v1, Computing Research Repository (CoRR)—Cornell University, Ithaca, NY, USA.

Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.

Boo, Yoonho, et al., "Structured Sparse Ternary Weight Coding of Deep Neural Networks for Efficient Hardware Implementations," 2017 IEEE Workshop on Signal Processing Systems (SiPS), Oct. 3-5, 2017, 6 pages, IEEE, Lorient, France.

* cited by examiner

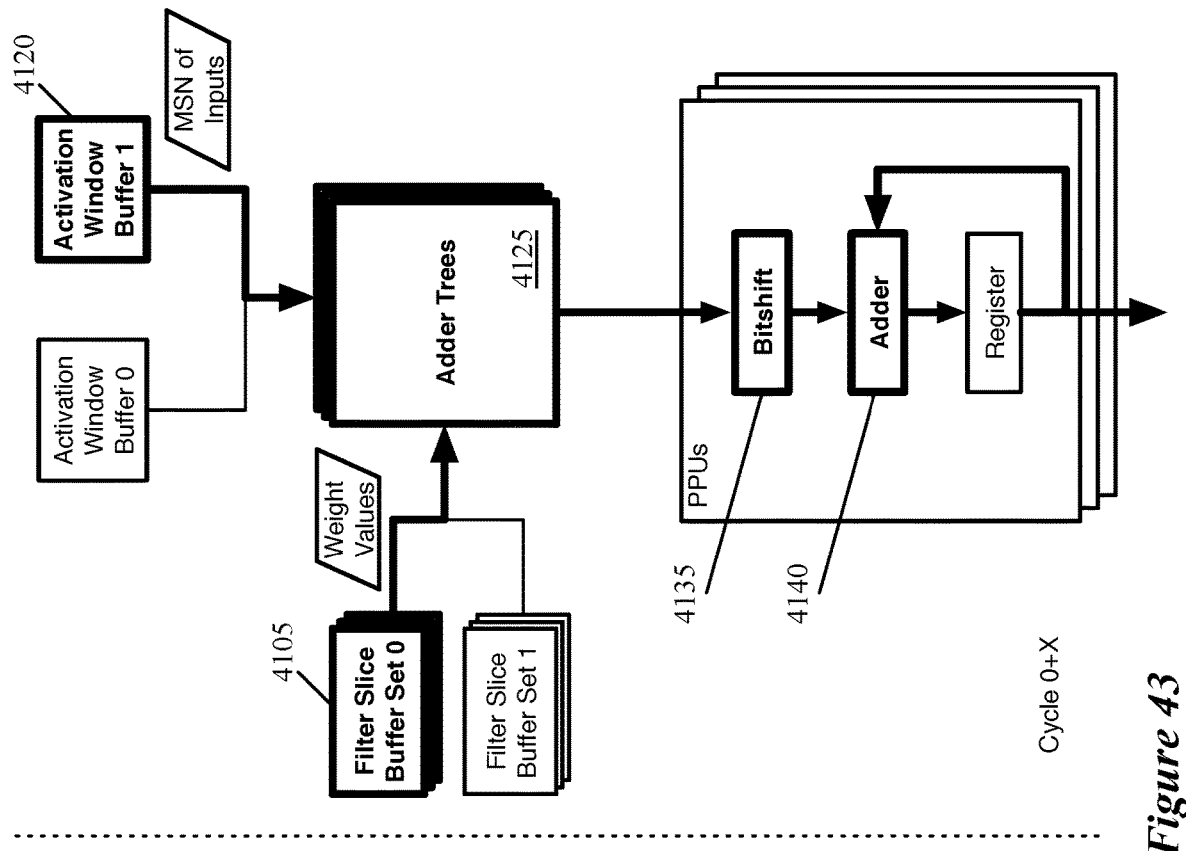
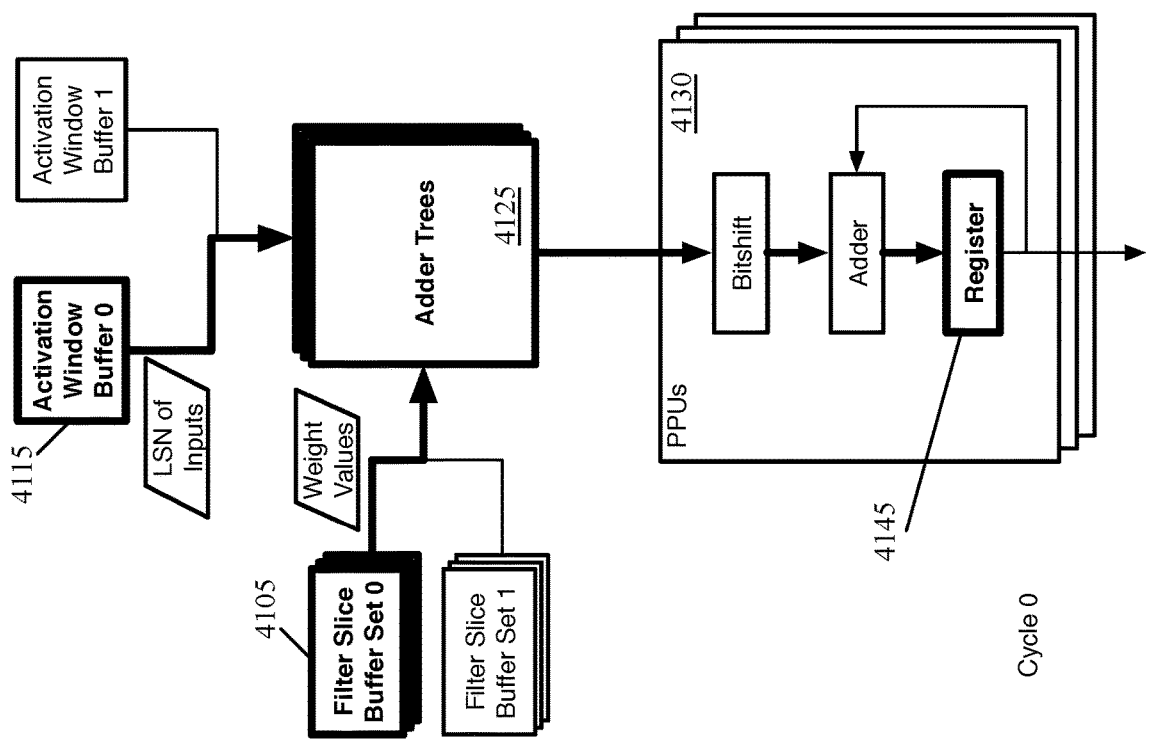
Figure 43

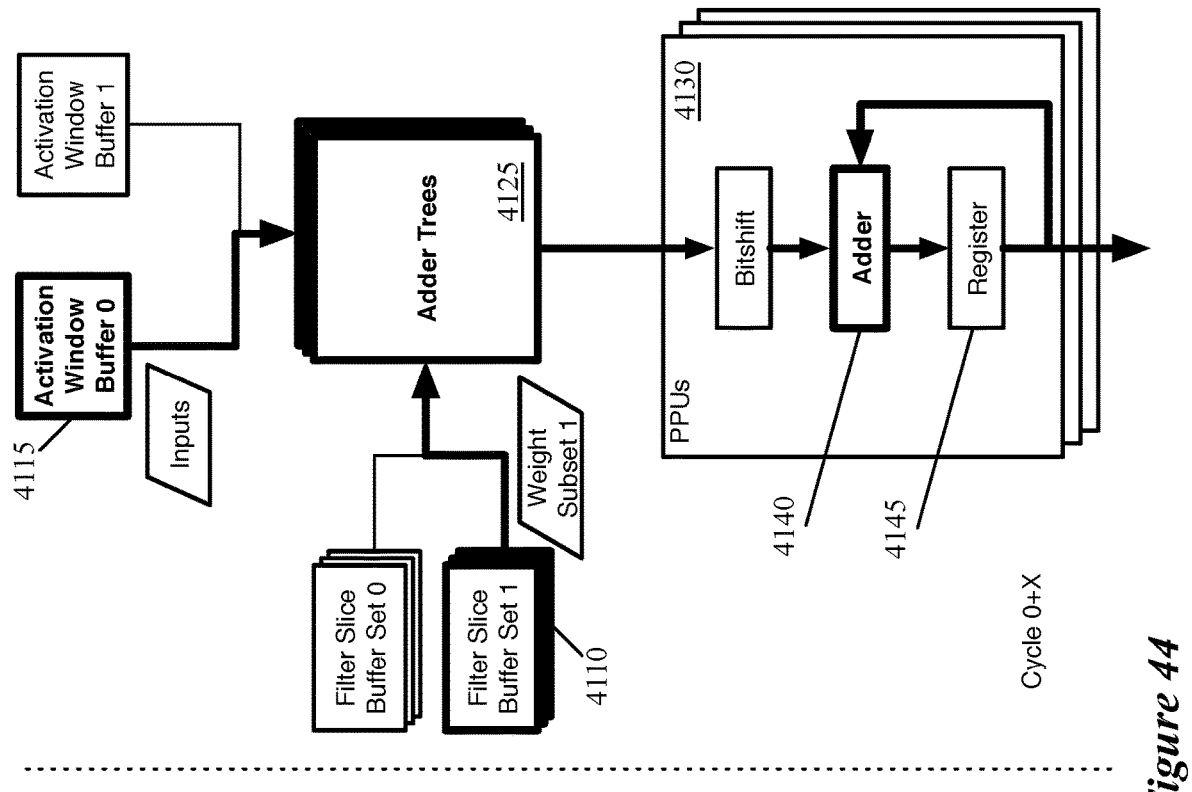
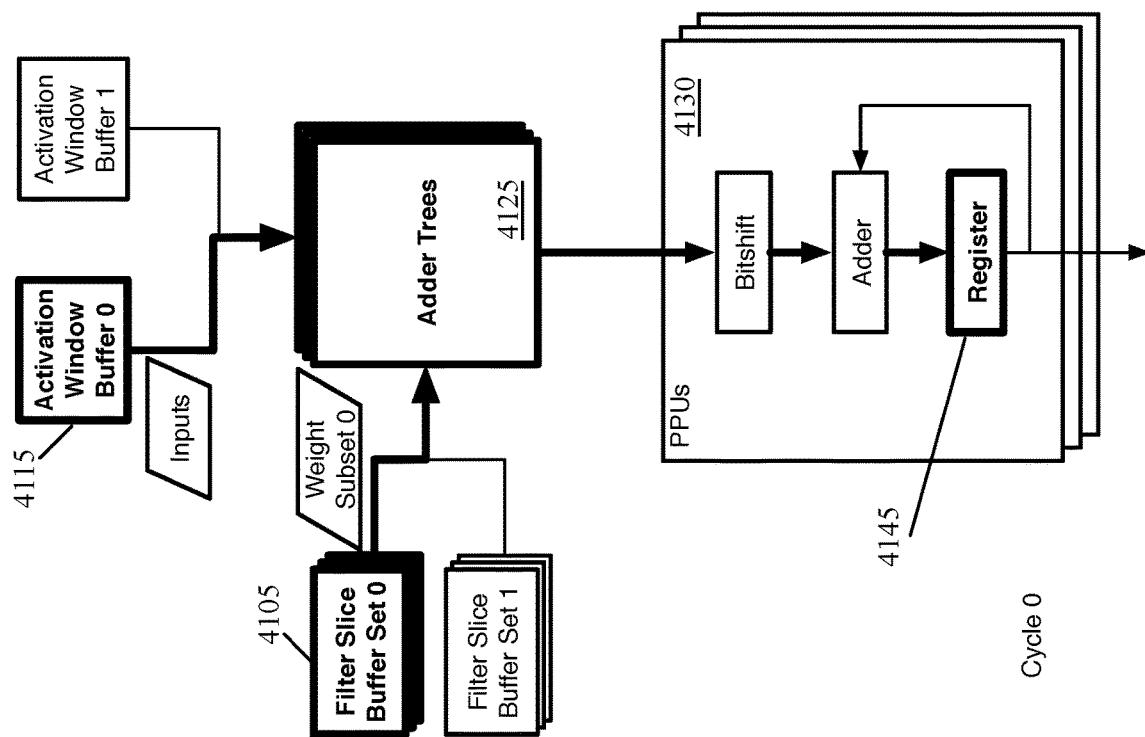
*Figure 44*

| PPU | dpb_a | dpb_b |
|---|---|---|
| 0 | dpb[0] | dpb[32] |
| 1 | dpb[1] | dpb[33] |
| 2 | dpb[2] | dpb[34] |
| 3 | dpb[3] | dpb[35] |
| 4 | dpb[4] | dpb[36] |
| 5 | dpb[5] | dpb[37] |
| 6 | dpb[6] | dpb[38] |
| 7 | dpb[7] | dpb[39] |
| 8 | dpb[8] | dpb[40] |
| 9 | dpb[9] | dpb[41] |
| 10 | dpb[10] | dpb[42] |
| 11 | dpb[11] | dpb[43] |
| 12 | dpb[12] | dpb[44] |
| 13 | dpb[13] | dpb[45] |
| 14 | dpb[14] | dpb[46] |
| 15 | dpb[15] | dpb[47] |

| PPU | dpb_a | dpb_b |
|---|---|---|
| 16 | dpb[16] | dpb[48] |
| 17 | dpb[17] | dpb[49] |
| 18 | dpb[18] | dpb[50] |
| 19 | dpb[19] | dpb[51] |
| 20 | dpb[20] | dpb[52] |
| 21 | dpb[21] | dpb[53] |
| 22 | dpb[22] | dpb[54] |
| 23 | dpb[23] | dpb[55] |
| 24 | dpb[24] | dpb[56] |
| 25 | dpb[25] | dpb[57] |
| 26 | dpb[26] | dpb[58] |
| 27 | dpb[27] | dpb[59] |
| 28 | dpb[28] | dpb[60] |
| 29 | dpb[29] | dpb[61] |
| 30 | dpb[30] | dpb[62] |
| 31 | dpb[31] | dpb[63] |

| PPU | dpb_a | dpb_b |
|---|---|---|
| 32 | dpb[32] | dpb[48] |
| 33 | dpb[33] | dpb[49] |
| 34 | dpb[34] | dpb[50] |
| 35 | dpb[35] | dpb[51] |
| 36 | dpb[36] | dpb[52] |
| 37 | dpb[37] | dpb[53] |
| 38 | dpb[38] | dpb[54] |
| 39 | dpb[39] | dpb[55] |
| 40 | dpb[40] | dpb[56] |
| 41 | dpb[41] | dpb[57] |
| 42 | dpb[42] | dpb[58] |
| 43 | dpb[43] | dpb[59] |
| 44 | dpb[44] | dpb[60] |
| 45 | dpb[45] | dpb[61] |
| 46 | dpb[46] | dpb[62] |
| 47 | dpb[47] | dpb[63] |

| PPU | dpb_a | dpb_b |
|---|---|---|
| 48 | dpb[48] | dpb[56] |
| 49 | dpb[49] | dpb[57] |
| 50 | dpb[50] | dpb[58] |
| 51 | dpb[51] | dpb[59] |
| 52 | dpb[52] | dpb[60] |
| 53 | dpb[53] | dpb[61] |
| 54 | dpb[54] | dpb[62] |
| 55 | dpb[55] | dpb[63] |
| 56 | dpb[56] | dpb[60] |
| 57 | dpb[57] | dpb[61] |
| 58 | dpb[58] | dpb[62] |
| 59 | dpb[59] | dpb[63] |
| 60 | dpb[60] | dpb[62] |
| 61 | dpb[61] | dpb[63] |
| 62 | dpb[62] | dpb[63] |
| 63 | dpb[63] | 0 |

*Figure 46*

ENCODING OF WEIGHT VALUES STORED ON NEURAL NETWORK INFERENCE CIRCUIT

BACKGROUND

In a typical neural network, a standard computation is a dot product between input values (activations) and weight values. A typical way for an integrated circuit to compute these weight values is to use multiply-accumulate (MAC) circuits that repeatedly perform the multiplication of an input value by a weight value, add that to an existing partial dot product, and store the new partial dot product. However, this requires numerous clock cycles, as each term in the dot product computed by a MAC uses a separate cycle. In addition, the storage of each intermediate term requires the use of memory (contributing to both slowing down of the computation and use of resources for the read/write operations). Accordingly, techniques for parallelization without massively expanding the surface area of the circuit are required.

BRIEF SUMMARY

Some embodiments provide an integrated circuit (IC) for implementing a machine-trained network (e.g., a neural network). The IC of some embodiments includes a set of input processing circuits, a neural network computation fabric that can be configured to apply a neural network to an input value, and a microprocessor (e.g., for controlling the input processing circuits and configuring the neural network computation fabric). The neural network computation fabric of some embodiments includes (i) a set of cores that compute dot products of input values and corresponding weight values and (ii) a channel that aggregates these dot products and performs post-processing operations (as well as performs other operations), in order to compute the outputs of neural network computation nodes.

In some embodiments, at startup of the IC, the microprocessor loads neural network configuration data (e.g., weight values, scale and bias parameters, etc.) from off-chip storage and generates instructions for the neural network computation fabric to write the neural network parameters to memory. In addition, microprocessor loads the neural network program instructions for the computation fabric to its own memory. These instructions are applied by the computation fabric to input data (e.g., images, audio clips, etc.) in order to execute the neural network. The instructions include, e.g., the memory locations to which input values are written, configuration data specifying how to compute specific neural network nodes, etc. Upon receiving input data (e.g., from a sensor on a device that incorporates the IC), the microprocessor provides neural network program instructions to the computation fabric. Once the final output of the neural network is computed, the fabric provides this output back to the microprocessor, so that the microprocessor (or other circuitry on the device) can evaluate this output and perform any actions based on the output.

The microprocessor executes a controller, in some embodiments, that provides the neural network instructions to the computation fabric. Some embodiments provide these instructions to the computation fabric incrementally. For instance, in some embodiments, the system controller on the microprocessor initially loads the instructions for the first layer (or a first portion of the first layer) of the neural network, then waits for a signal from the fabric indicating that these instructions have been completed. Once the first portion of the network is completed by the fabric, the system controller provides the fabric with the instructions for the second portion (either a second portion of the first layer, or the second layer of the network), and so on until the network has been fully executed.

In some embodiments, the computation fabric includes a hierarchical control structure for providing configuration data to the computation circuits of the fabric. The computation fabric of some embodiments includes (i) a fabric controller for interacting with the system controller on the microprocessor, (ii) a set of cluster controllers, and (iii) a set of core controllers. In some embodiments, the dot product cores are grouped into clusters, and the connecting channel includes separate segments for each such cluster. The channel also includes one of the cluster controllers, and each of the cores includes a core controller.

The fabric controller parses the instructions from the system controller to identify which cores are active for those instructions and also uses data stored in its local memory to unpack the fabric-level instructions. The fabric controller provides cluster instructions to the controllers for identified clusters that are in use for the current neural network layer (especially during the initial layers of a neural network when dot product computations are smaller, avoiding the use of some of the clusters provides power savings), and additionally synchronizes these cluster controllers. This synchronization ensures that dot products computed across multiple clusters are aggregated together correctly.

Each of the cluster controllers configures its own segment of the global channel (these circuits are described below) in addition to parsing the instructions to identify configuration data for each of the cores in its cluster. The cluster controllers provide the appropriate configuration data to each of the core controllers, which coordinate the dot product processing in the core. This includes various memory read operations (and, eventually, write operations after the computation node operations are completed in the global channel) as well as addition operations, described in more detail below. Once the instructions are fully executed, the core controllers send completion signals to the cluster controllers. Similarly, once the cluster controllers receive these completion messages, they send similar messages to the fabric controller, which can then notify the system controller in the microprocessor that the instructions are complete (so that the system controller provides the next set of instructions).

As mentioned, the neural network computation fabric includes numerous cores as well as a global channel that connects the cores, with the various data processing circuits configured by the hierarchical set of control circuits. These data processing circuits operate to compute neural network operations in an efficient, low-power manner, according to the configuration data provided by the control circuits.

A typical neural network operates in layers, with each layer including numerous nodes. Examples of neural networks include feed-forward neural networks, regulatory feedback networks, radial basis function networks, recurrent networks, etc. In convolutional neural networks (a type of feed-forward network), a majority of the layers include computation nodes with both a linear function followed by a non-linear activation function (applied to the result of the linear function). The linear function is a dot product of input values (either the initial inputs based on the input data for the first layer, or outputs of the previous layer for subsequent layers) and predetermined (trained) weight values, along with bias (addition) and scale (multiplication) terms, which are also predetermined based on training. As such, for convolutional neural networks, the dot products are the primary computation that uses the most circuit resources.

The neural network computation circuit of some embodiments computes numerous neural network nodes simultaneously, with the computation for one node spread across multiple cores (and subsequently the global channel). That is, each of several cores of the computation fabric computes a partial dot product from a subset of the input values and weight values for the node. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

For a dot product computed across more than one core, these multiple cores compute partial dot products and provide these partial dot products to the global channel. In the simplest case, all of the partial dot products for a given computation node are computed in the same clock cycle and provided at the same time to the global channel. In some cases, however (e.g., for dot products with a very large number of terms), each core computes more than one partial dot product, requiring multiple clock cycles. Based on configuration data specifying which outputs from the cores are to be added together (and whether multiple partial dot products are required from the same core), the global channel aggregates these partial dot products to compute the complete dot product for each node, then applies various post-processing functions (e.g., the bias, scale, and non-linear activation functions) to compute the output of each node.

In some embodiments, each segment of the global channel includes (in addition to the cluster controllers) a dot product bus, a set of post-processing circuits, and an output bus. The dot product bus, in some embodiments, includes a number of independent dot product bus lanes that each receives partial dot products from the cores, aggregates these dot products together, and provides the aggregated dot products to the post-processing circuits. In some embodiments, configuration data from the cluster controllers specifies to which post-processing unit each aggregated dot product is sent. Each lane of the dot product bus spans all of the channel segments, each of which aggregates the partial dot products from its own cores. These aggregated values are then aggregated together by additional circuits of the dot product bus lane, and configuration data specifies whether to pass the aggregated dot products in one direction of the segment or the other, or whether that segment is the final aggregator for the dot product (in which case that aggregated dot product is provided to a post-processing unit in that segment).

In some embodiments, each segment includes the same number of post-processing units as dot product bus lanes, with each post-processing unit receiving the output of a different dot product bus lane as its primary input. The post-processing units, as mentioned, perform the non-dot product functions of the neural network nodes. For a typical computation node of a convolutional (or fully-connected) layer, this includes a bias factor, a scaling factor, and a non-linear activation function. In some embodiments, the outputs of the linear function are quantized or truncated to a particular number of bits (e.g., 4 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design.

The non-linear activation function, in some embodiments, is implemented as a lookup table rather than a hardwired function. This enables the IC to execute different neural networks that use different activation functions and, in some embodiments, allows for different activation functions to be used in different layers of the neural network. For instance, in addition to common activation functions such as the Rectified Linear Unit (RELU), periodic activation functions, etc. are possible. In some embodiments, the lookup table circuit receives a truth-table (e.g., a 4-bit to 4-bit or 5-bit to 4-bit mapping) as configuration data in order to implement the non-linear activation function.

In addition to these operations, in some embodiments the post-processing units include additional circuitry for (i) performing additional dot product operations if required and (ii) performing operations for neural network computation nodes that do not use dot products. The post-processing units of some embodiments each have the ability to combine dot products from two separate cycles if a dot product is too large to be computed in a single cycle across the cores of the computation fabric. In addition, if a particular filter slice needs to be split across multiple cores (because of too many non-zero weight values, as described in greater detail below), the post-processing unit is configured to account for that. Furthermore, some embodiments enable dot products to be double the size of the standard quantized output (e.g., 8-bit rather than 4-bit) by using dot products from multiple cycles and bit-shifting the first set of input data.

Neural network computation nodes that do not use dot products include, for example, pooling layers of convolutional networks (e.g., average pooling and max pooling layers) as well as nodes that perform element-wise operations. In some of these embodiments, the cores provide input values directly to the post-processing units without computing dot products, and the post-processing units are configured to perform the appropriate operations on these inputs.

The output bus carries the computation node outputs from the post-processing units back to the cores, to be stored in the memory of the core and used as inputs for the next layer of neural network computation nodes. In some embodiments, the output values may be computed by post-processing units in one cluster but carried to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value.

As mentioned, the cores compute partial dot products in parallel that are provided to the dot product bus of the local channel segment. In some embodiments, the cores include memory that stores the weight values and input values, an input buffer into which input values are loaded for the partial dot product computations, a set of weight value buffers into which weight values are loaded for the partial dot product computations, a controller or set of controller circuits for loading the input values and weight values from memory into the respective buffers, and a set of partial dot product computation circuits.

In some embodiments, the number of partial dot product computation circuits in each core is equal to (i) the number of weight value buffers in the core (or half of the number of weight value buffers, if primary and secondary buffers are used), (ii) the number of independent lanes of the dot product bus, and (iii) the number of post-processing units of each segment of the global channel. Thus, for a typical neural network computation node, the partial dot products computed by the partial dot product computation circuits having a particular index are aggregated by the dot product bus lane with the same index and that aggregated dot product is provided for post-processing to one of the post-processing units with the same index (i.e., the post-processing unit with that index in one of the channel segments).

As mentioned, each core includes one input value buffer and numerous weight value buffers in some embodiments. In convolutional neural networks, a set of input values are used as the inputs to a number of different nodes, and each layer has numerous different filters (sets of weight values). For parallelization within the cores, such a set of input values are loaded into the input value buffers of the cores used to compute the dot product for a node (by computing partial dot products that are then aggregated), while the weight values for each of these different nodes are loaded into the weight value buffers (for a node computed across multiple cores, the weight values for a given node are loaded into the weight value buffers with the same index in each of the cores). The partial dot product computation circuits corresponding to these weight value buffers then simultaneously compute the partial dot product computations for the loaded input values.

In some embodiments, the weight values for each layer of the network are ternary values (e.g., each weight is either zero, a positive value, or the negation of the positive value), with at least a fixed percentage (e.g., 75%) of the weight values being zero. Using ternary weight values allows for the weights to be treated as {0, 1, −1} (with a potential multiplication by the actual positive weight value in the post-processor), such that the multiplication of each input value by its weight value can be handled with a simple circuit that avoids actual multiplier circuits. The remainder of the partial dot product computation in a core can then be computed with an adder tree. The sparsity requirement allows for some embodiments to reduce the size of the partial dot product computation circuits by mapping each of a first number of input values (e.g., 144) to a second number of dot product inputs (e.g., 36 or 40), such that each input value with a non-zero corresponding weight value is mapped to a different one of the dot product inputs.

Specifically, in some embodiments, the partial dot product computation circuits include at least two sets of wires for each input value, with each of the sets of wires for a given input value providing that input value to two different dot product inputs. With a guarantee of at least 75% weight sparsity (i.e., at least 75% of the weight values for any set of input values are zero), the number of dot product inputs is set at 25% (or slightly more than 25%, for redundancy) of the number of input values provided to the circuit. In some embodiments, the weight sparsity is guaranteed by the training algorithm used to train the weights to perform a specific purpose, and the neural network computation circuit is adaptable for any set of weights that meets the guarantee. In some cases, individual partial dot product computations will not meet the sparsity requirement, and solutions for handling these situations are described below. In addition to storing discrete weight values (e.g., 0, 1, and −1), in some embodiments the input values (which, other than for the first layer, are output values of previous computation nodes) are discrete values (e.g., 4-bit values).

This weight sparsity and the wiring of input values to at least two of the dot product inputs ensures that, so long as the weights meet the sparsity requirement, at runtime it is possible to provide a maximum of one input value with a nonzero corresponding weight value to each of the dot product inputs for most arrangements of the nonzero weight values. In some embodiments, each of the dot product inputs is a multiplexer, and weight data specifies which of its inputs to select (i.e., the input value corresponding to the non-zero weight value). Specifically, in some embodiments for which 75% sparsity reduction is guaranteed, 8:1 multiplexers are used for the dot product inputs (8:1 rather than 4:1 because each input value is wired to two different multiplexers).

These wires are arranged, as mentioned, such that each multiplexer receives only one (or zero) input value with a non-zero corresponding weight. The weight values are not known at the time of IC manufacture, and thus the wiring design is resilient to any set of weight values (that meets the sparsity requirement). For redundancy, some embodiments use a number of dot product inputs (i.e., multiplexers) that is slightly more than 25% of the number of input values for the dot product computation (e.g., for 144 input values, using 40 rather than 36 inputs). This increases the ability to map the input values to the dot product inputs for any set of weights, at a small cost in terms of circuit area. In some such embodiments, a subset of the input values are wired to three of the dot product inputs rather than two. In some embodiments, a cuckoo hashing algorithm (or other such algorithm) is used to optimally map the wires to the various dot product inputs. This algorithm, in some embodiments, computes two hashes for each input value that map into two different dot product inputs, and wires each input value to these two dot product inputs. Other embodiments use other techniques to select the indices of the dot product inputs to which each input value is wired.

The weight values are known before the network is executed by the IC (i.e., at compile time), and thus the compiler can determine which of the two (or three) multiplexers that receive each input value with a non-zero corresponding weight at runtime will select that input value, such that each such input value is selected by exactly one multiplexer. In some embodiments, the compiler uses the same cuckoo hashing algorithm for this mapping as was used to determine the wiring. Specifically, the compiler of some embodiments assigns each input value to one of its wire sets (and thus to a dot product input (multiplexer)). For input values with a corresponding weight of zero, to which wire set the value is assigned does not matter. However, if a first input value with a nonzero corresponding weight is mapped to a dot product input that already has a second input value with a nonzero corresponding weight mapped to it, then the second input value is assigned to its second wire set. If this new mapping overlaps dot product inputs with a third input value with a nonzero corresponding weight, then the third input value is assigned to its other wire set, and so on.

The dot product computation is performed using an adder tree in some embodiments, with the multiplexers providing the inputs to a ternary multiply-accumulator (MAC) circuit, which provide the leaf inputs to the adder tree. As mentioned, the weight values for a particular dot product computation are all either zero, a positive value, or the negation of the positive value in some embodiments. In this case, the dot product does not require any multiplication, as the positive and negative weight values can be treated as 1 and −1, with a single multiplication by the positive value afterwards. Removing the multiplication at the leaves saves significant circuit area for a chip with numerous such computation circuits.

The use of small amounts of data for the weights (e.g., less than 1 bit per weight of the neural network in some cases) and consistently-sized (e.g., 4-bit) input values allows for optimizing the storage of these values in the core memories. In some embodiments, the weight and input values are aligned both within a core and between cores in such a way as to optimize (i) the efficient retrieval and usage of these values to compute the dot products of the neural network computation nodes and (ii) the minimization of the configuration instructions that the controller circuit hierarchy sends to the core controllers in order to execute this retrieval and usage of the values.

The compiler of some embodiments determines the storage location of each of the weight and input values according to sets of rules defined for how these values should be aligned in the memory. In some embodiments, the weight values for all layers of the neural network are stored in the memory at startup (boot time) of the IC (as the weight values are the same for all inputs processed by the neural network), whereas the input values are determined (and stored) during runtime (these values are different for each input processed by the neural network).

Each core of the neural network computation fabric of some embodiments includes the same circuit structure, including the same amount of memory (e.g., random access memory). In each core, this memory is divided between weight memory and activation memory. The weight memory partition is typically larger than the activation memory partition because the weight memory stores data for all of the weights for the network (e.g., encoded weight data) whereas the activation memory only stores the input/output values for a small number of layers at a time. In some embodiments, at least two layers of activations are stored at a time (i.e., the inputs for a current layer as well as the outputs for that layer, which are the inputs to the next layer). Because some layers have too many filters for the entire layer to be computed in a single pass, the input activation values for that layer cannot be overwritten immediately by the output activation values for that layer (as these inputs will be needed for second/third/etc. passes to generate additional output activation values for the layer).

In some embodiments, the compiler determines how many and which cores store the activation values for each layer of the network. The cores that store the input values for a layer are referred to as "source cores" for the layer and the cores to which the output values for the layer are written are referred to as the "destination cores" for the layer (these are then the source cores for the next layer). In general, the compiler will select cores within the same cluster before expanding to additional clusters (i.e., if only four source cores are to be used, the compiler will choose a single cluster rather than two cores of one cluster and two cores of a second cluster). Irrespective of the number of source cores used for a layer, in some embodiments the activation values are aligned across cores, with the same memory locations used in each source core to store the input activation values for the layer. Depending on the structure of the input activation values for a layer (described further below), the number of input activation values stored in each core may differ slightly. However, some embodiments always start the input activation values for a layer at the same memory location in each source core, and use zero-padding in the source cores with fewer activation values.

For convolutional neural networks, the input activation values for each layer (or at least each convolutional layer) are conceptually represented as a three-dimensional array. This three-dimensional array is structured as numerous two-dimensional grids. For instance, the initial input for an image is three two-dimensional pixel grids (e.g., a 1280×720 RGB image will have three 1280×720 input grids, one for each of the red, green, and blue channels). The number of input grids for each subsequent layer is determined by the number of filters used in the previous layer (assuming standard convolutional layers). The size of the grids for the subsequent layer depends on the number of computation nodes in the previous layer, which is based on the size of the filters and how those filters are convolved over the previous layer input activations.

For a typical convolutional layer, each filter is a small kernel of weights (often 3×3 or 5×5) with a depth equal to the number of grids of the layer's input activations. The dot product for each computation node of the layer multiplies the weights of a filter by a subset of the coordinates of the input activation values. For example, the input activations for a 3×3×Z filter are the activation values located at the same 3×3 square of all Z input activation grids for a layer.

To optimize the dot product computations, all of the input activations for a single grid are stored in the same source core, and the total number of grids is divided evenly across the source cores (i.e., if there are Q source cores, then each source core stores the activations of 1/Q of the grids). If the number of grids is not evenly divisible by the number of source cores, then some embodiments use grids of zeros to even out the number of activations in each core.

These activations within a core are not necessarily arranged with all of the activation values of a grid stored contiguously. Instead, within each core, some embodiments store all of the activations for a particular coordinate (i.e., an x-y coordinate) within the grids assigned to that core contiguously. That is, each activation has an x-coordinate, y-coordinate, and z-coordinate in the three-dimensional array, with the z-coordinate indicating the grid to which the activation belongs. Thus, in some embodiments, the activation memory for a layer in a particular core starts with the activations at (0,0) for all of the grids assigned to that core. In some embodiments, if there are more grids assigned to a core than the number of activation values that a memory location (i.e., a RAM word) can store, then these are split up into separate sets of activations, and only a single memory location worth of activation values at the same coordinate are stored contiguously. As a result, a given memory location in one source core for a layer will store activations for the same x-y coordinates as that memory location in any of the other source cores.

As mentioned, arranging the input activation values for a layer in this manner enables optimized use of these activation values for computing dot products of the various computation nodes of a layer. Specifically, the arrangement (and use of a cache for words that are read but not fully loaded into the input buffer) enables the cores to load the values into the input buffer while minimizing the number of memory reads that are required. In addition, the buffer is implemented as a configurable shift register, so that activation values do not need to be re-loaded between subsequent sets of dot product computations.

In some embodiments, when a controller in the core reads a memory location (i.e., a RAM word) storing activation values, the controller stores the contents of the RAM word in a cache. In addition, the activation values from that RAM word that are required for the next set of dot product computations are loaded into the correct locations in the input buffer of the core. In many cases, multiple RAM words are read in order to load the initial values for a layer into the input buffer, and the cache of some embodiments can hold multiple RAM words (e.g., up to a fixed maximum) at once. Once all of the activations are loaded (and the weight data for the layer or layer portion are loaded into the weight buffer), the neural network computation fabric computes the set of dot products (i.e., separate dot products between the set of activations and each of the loaded filters), performs the post-processing for the computation nodes, and provides the computed output activation values to the appropriate destination cores. After this computation, the values in the input buffer are shifted by a predetermined amount that depends on both the filter size and the number of columns in the grid by which the filter moves between computations (the "slide" value). For instance, for a 3×3 filter with a slide value of 1, then in some embodiments that group the activation values of each two-dimensional grid together within the buffer, each group is shifted by 3 values (such that 3 new values are loaded into the buffer for each two-dimensional grid stored in the core). For the next set of dot products, the controller preferably loads this next set of values (i.e., 3 activation values from the next column in each grid) from the cache if possible, without an additional memory read. However, if some or all of these new values are stored in memory locations not already in the cache, then the controller reads the required memory locations (and stores these in the cache). This process can be repeated for each subsequent set of dot products until the end of the current row is reached, in some embodiments.

As mentioned, the memory in the cores is divided into weight data storage and input value storage (the latter of which is described above). In some embodiments, the weight data is stored in an encoded form that minimizes the amount of data required to store the weights (in some cases, less than 1 bit is required per neural network weight). Whereas the input data uses a fixed number of bits per value (e.g., 4 bits), the amount of memory required for a given number of weights is variable in some embodiments, depending on the number of non-zero weight values (with non-zero weight values requiring more data than weight values equal to zero).

Specifically, some embodiments store each layer of weight data (within a core) in a block organized by filter. Within a sub-block allocated to a particular filter, some embodiments store a filter identifier section, a non-zero weight map section, and an additional weight data section. The filter identifier section and non-zero weight map section of each filter block have a fixed width, while the additional weight data of some embodiments is variable depending on the number of non-zero weights in the filter. Weight decoding circuitry in the core reads this weight data from memory, decodes the weight data, and stores the decoded weight data in the filter slice buffers.

As described above, each of the filter slice buffers within a core has an index corresponding to a partial dot product computation circuit in that core, a dot product bus lane, and a post-processing unit in each of the channel segments. The slice identifier section of a filter slice data block identifies (i) the index of the filter slice buffer into which the decoded data of the block should be loaded and (ii) whether this data is loaded into the primary or secondary filter slice buffer with that index (or both).

Each partial dot product computation circuit, as described above, includes a set of input multiplexers that receive multiple input values and select one of these input values to pass through to the corresponding adder tree. In some embodiments, the non-zero weight map section of a filter slice block within the weight data includes one bit for each of these input multiplexers, indicating whether or not the input multiplexer is receiving an input with a non-zero corresponding weight value. As such, the filter slice identifier section and the non-zero weight map section have a fixed width.

The additional weight data section of a filter slice block, in some embodiments, only stores additional data for the non-zero weights. This data includes (i) a bit indicating whether the weight is positive or negative and (ii) select bits for the corresponding input multiplexer of the dot product computation circuit. The select bits specify which of the input values received by that multiplexer is passed through to the adder circuit, while the positive/negative bit indicates whether or not to negate that input value. Because this additional weight data is only stored for the non-zero weight values, the first set of additional weight data (e.g., the first 4 bits) could correspond to any of the input multiplexers of the partial dot product computation circuit.

The filter slice buffers of some embodiments store a full set of weight data (e.g., a non-zero map bit, a positive/negative bit, and multiplexer select bits) for each of the input multiplexers, irrespective of whether that input multiplexer receives an input with a non-zero corresponding weight or not (this still reduces the amount of weight data, from data for every weight in a filter to data for only approximately one-fourth of the weights in the filter). As such, decoding circuitry is used to expand the limited stored weight data into a full set of weight data for each input multiplexer.

This decoder, in some embodiments, (i) aligns the stored additional weight data correctly in the filter slice buffer for the non-zero weights and (ii) fills in additional weight data for the zero-value weights. The non-zero weight map indicates the correct alignment of the stored additional weight data, and the bits of the non-zero weight map are also stored alongside this additional data within the filter slice buffer (e.g., such that 5 consecutive bits are stored for each weight). In some embodiments, the decoder also uses the non-zero weight map to determine the location of the next filter slice block within the core memory (because the non-zero weight map specifies the amount of additional weight data for the current filter slice block).

As described, a portion of the weight data is used by the input multiplexers of the partial dot product computation circuits to select inputs with non-zero corresponding weight values. These input values are then passed to ternary MAC circuits in some embodiments, which are used as the leaves of the adder tree that performs the dot product computation. In some embodiments, the ternary MAC (or other circuit used to incorporate the ternary weight values into the dot product) uses the two's complement technique to negate input values with a negative corresponding weight value. This technique inverts all of the bits of the input value and adds 1 to this inverted value. However, the use of this technique requires a half adder circuit for each ternary MAC, in order to add 1 to the inverted value. In order to save additional circuit space, some embodiments determine (at compile time) the number of negative weight values for each dot product computation and add this number to the dot product at the end of the computation. Thus, rather than a half adder circuit for each pair of input values, a single adder circuit is used after the adder tree to add this number to the dot product. The neural networks of some embodiments also include a bias factor that is added to the dot product anyway, so this number can be added to the bias with minimal cost in terms of circuit surface area. For each input value, the resulting inputs to the adder tree effectively pass (i) the value zero if the corresponding weight value is zero, (ii) the input value if the corresponding weight value is positive, and (iii) the binary inversion of the input value if the corresponding weight value is negative. The non-zero map bit (indicating whether a weight value is zero or non-zero) and the positive/negative bit (indicating whether a non-zero weight value is positive or negative) are used as inputs to the ternary MAC circuit in some embodiments. Specifically, the non-zero map bit specifies whether or not to set pass the value zero rather than the actual input (or inverted input), while the positive/negative bit specifies whether to pass the binary inversion.

As described above, the neural network computation circuit of some embodiments has hardware designed for a specific discrete size input data (e.g., 4-bit inputs). As such, the neural network computation circuit of some embodiments places the following restrictions on the computation: (i) all of the input values should be of the specified discrete size, (ii) the maximum number of input values is the size of the input buffer multiplied by the number of cores, (iii) all of the weight values are either 0, +a, or −a (and thus can be stored as 0, 1, and −1), and a large enough percentage of the weight values are 0 that the input values with non-zero weight values can each map to a different multiplexer input.

However, some embodiments include solutions for cases when each of these restrictions is broken (at least in certain specific ways). As mentioned above, the post-processing units of some embodiments include dot product input processing circuits for performing additional operations on the dot product inputs if needed. Specifically, some embodiments include a register that can be configured to store a dot product received by the post-processing unit on one clock cycle. The register outputs this stored value to an adder that receives both (i) the register output when enabled and (ii) the input from the dot product bus. The post-processing units also include a configurable bit shift circuit that operates on the dot product bus input prior to the adder in some embodiments.

In addition, the input value buffer and each of the weight value buffers in each core actually include both primary and secondary buffers. Each primary input value buffer can hold the specified number of input values for the partial dot product computation circuits (e.g., 144), with the secondary input value buffer able to hold the same number. Similarly, each primary weight value buffer can hold the specified number of weight values (which is the number of inputs to which the input values are reduced) for the partial dot product computation circuits (e.g., 36), with the secondary weight value buffers able to hold the same number.

In a typical dot product computation that meets the requirements listed above (i.e., sparsity, ternary weights, input values of a specified size, and less than the maximum number of dot product components), the secondary buffers are not used. However, this circuitry also enables more complex dot products to be computed if needed, thereby increasing the size and types of neural networks that can be executed by the neural network computation circuit.

Specifically, some embodiments allow up to twice the number of dot product components that can be computed in a single cycle across all of the cores. Such a computation uses the secondary input value buffer as well as the secondary weight value buffers, and uses two (or more) clock cycles of the neural network computation circuit. Weight values for the computation are loaded into the primary and secondary weight value buffers of each core used, while the input values are loaded into the primary and secondary input value buffers. In a typical convolutional neural network layer, each of the nodes has the same dimensions, and thus all of the filters will use both the primary and secondary buffers. In the first clock cycle, the partial dot product computation circuits in the cores and the dot product bus compute the dot products of the input values and weight values from the primary buffers, and the results are stored in the registers of the post-processing units. In a subsequent clock cycle, the dot product computation circuits compute the dot products of the input values and weight values from the secondary buffers, and the stored result is released from the register to be added to this secondary dot product. The results are the full dot products for the computation nodes.

In addition, some embodiments enable dot product computations with input values up to twice the bit length of the specified discrete size. For instance, if the neural network computation circuit is designed for a typical computation that uses 4-bit inputs (and thus 4-bit outputs), some embodiments allow for 8-bit input values (and outputs). To compute this using the hardware designed for the specified discrete size, some embodiments load the least significant bits (e.g., the least significant 4 bits) of the input values into the primary activation buffers in each core used and load the most significant bits (e.g., the most significant 4 bits) of the input values into the secondary activation buffers of these cores (or vice versa). The weight values for each filter are loaded into the primary weight value buffers, with the secondary weight value buffers are unused. Then, in the first clock cycle, the dot product computation circuits compute the dot products of the weight values with the input values from the primary input value buffer. These initial dot products are stored in the post-processing unit registers, as for the dot products with a large number of components. In a subsequent clock cycle, the dot product computation circuits compute the dot product of the same weight values with the input values from the secondary input value buffer. The dot product for the most significant bits is bit shifted by the post-processing unit (e.g., 4 bits in the case of 8-bit input values on 4-bit hardware) before being added to the dot product for the least significant bits (and before being stored in the register if the dot product for the most significant bits is computed first).

Furthermore, some embodiments have solutions if a particular filter slice (i.e., the weights assigned to a particular weight value buffer in a particular core) has too many non-zero values (i.e., the network is not locally sparse enough for the hardware). That is, if the number of non-zero weight values is greater than the number of multiplexer inputs to the dot product computation, then the filter slice is not sparse enough. In addition, the wiring of each input value in the input value buffer to two multiplexers will not accommodate certain configurations of non-zero weight values (which is why the neural network computation circuit of some embodiments includes a number of multiplexers that is slightly more than one-fourth the number of input values in the buffer, with some of the input values wired to three multiplexers).

The input values (and their corresponding weight values), in some embodiments, cannot be easily moved around to different cores because (i) the input values are used for numerous simultaneous dot products and (ii) the input values are efficiently carried in contiguous blocks to the cores by the output bus, with the ordering of these input values dependent on the post-processing unit indices that computed them as output values in the previous layer.

As such, the compiler of some embodiments is responsible for dividing the filter slice into two slices while maintaining efficient computation by the neural network computation circuit. The compiler, in some embodiments, is a software application that is responsible for receiving a trained neural network and converting that network into instructions for loading the weight values onto the neural network computation circuit and instructions for the circuit to execute. The compiler assigns each layer to a particular number of cores, assigns the different filter slices to different weight value buffer/partial dot product computation circuit/ dot product bus lane/post-processing unit indices, specifies which segment will perform post-processing on each output value, etc. Because the computations of a previously-trained network are not dynamic (that is, the computations performed are not dependent on the results of previous computations), the entire execution of a network can be statically scheduled by the compiler.

When a filter slice is not sparse enough for each input value with a nonzero weight value to be mapped to a different multiplexer input, different embodiments use different techniques to divide the filter. Some embodiments move a portion of the weight values to the secondary weight value buffer in the core. For instance, the odd weight values could be moved to the secondary weight value buffer, such that all of the odd values are 0 in the primary weight value buffer and all of the even values are 0 in the secondary weight value buffer. In other embodiments, the compiler does not blindly move half of the weight values to the secondary weight value buffer, but instead moves a subset of the weight values while ensuring that all of the input values with nonzero weights can be mapped to different input multiplexers. In this scenario, the computation of the node incurs an extra clock cycle of latency, as the dot product is computed similarly to the manner described above. That is, a dot product is computed between the primary weight value buffer and the input value buffer, stored in the post-processing unit register, then added to a dot product computed in a subsequent clock cycle between the secondary weight value buffer and the input value buffer (with different mappings of input values to multiplexers for each computation).

However, some embodiments also provide for the ability to split filters without incurring the latency cost. In addition, dot products with a large number of components or with large input values already use the secondary buffers, and thus require a different solution for such filters. In some embodiments, each post-processing unit (or the majority of the post-processing units) receives the output of two different dot product bus lanes. One of these is the output of the dot product bus lane with the same index as the post-processing unit, and one of these is the output of a different lane. In some embodiments, the first half of the dot product bus lanes are only wired to a single post-processing unit in each channel segment (those with the same index), with the secondary inputs all coming from the second half of the lanes. This allows for optimal packing of output values from the post-processing units when filter splits are required.

Using this scheme, when a filter slice needs to be split, a subset of the weight values are assigned to a different input value buffer (i.e., an input value buffer with a different index), with the removed weight values again replaced by zeros. This different input value buffer is selected such that the same post-processing unit receives both of the dot product bus computations from (i.e., as its primary and secondary inputs). The post-processing unit adds these two dot products together before performing the post-processing operations (bias, scaler, etc.). In addition, if a filter split is required for a large dot product or a dot product with large input values, the post-processing unit performs this aggregation before performing the bit shifting and/or storing the initial dot product in the register. However, if a particular dot product index is used for a split filter, then the post-processing unit with that index will not receive a useful primary input. However, that post-processing unit can have its primary input disabled and its secondary input enabled (so long as that filter does not also need to be split). In addition, the use of secondary inputs can be rippled to additional post-processing units if needed, so as to pack the output values next to each other on the output bus (allowing for easier writes to memory in the cores).

Some embodiments also use similar techniques to enable larger numbers of possible weight values, while using the same hardware designed for ternary weights. To illustrate these techniques, the example of quinary weights (e.g., −2, −1, 0, 1, 2) will be used. As an optimal solution if the weights in a filter are sparse enough, then quinary weights can be used without incurring any latency or cost. As noted, each input value in the input value buffer is wired to two different multiplexers. In certain cases, both of the multiplexers that receive input values with weights of −2 or 2 select those inputs, and the weight of 1 or −1 is used for both of these inputs (so that the input value is effectively multiplied by 2 or −2).

However, in many cases the compiler will not be able to find such a solution if the weight values are not sparse enough (i.e., the second multiplexers for all of the input values with +2/−2 weights will not be free to select those input values). In these cases, however, the compiler can use the filter splitting techniques. Rather than move half of the input values to a different input value buffer (either the secondary buffer or a buffer with a different index), the entire filter is duplicated. Weight values of +2/−2 are represented by +1/−1 in both filters, while weight values of +1/−1 are represented by +1/−1 in the first filter and 0 in the second filter. Some embodiments use either of the filter splitting techniques, depending on the requirements of the network (i.e., either using the secondary weight value buffer and incurring a latency penalty or moving the second half of the filter to a weight value buffer with a different index). For example, if the number of filters is large and all of the filters use quinary weights, then using the secondary weight value buffers and incurring the latency penalty may be preferred.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 43 illustrates the operation of the circuits from FIG. 41 to compute dot products with large input values over two or more clock cycles of the chip fabric.

FIG. 44 illustrates the operation of the circuits from FIG. 41 to compute a dot product with a split filter over multiple clock cycles.

FIG. 46 illustrates a table showing the mapping of dot product bus outputs to the different post-processing units for a neural network computation circuit of some embodiments.

DETAILED DESCRIPTION

Some embodiments provide an integrated circuit (IC) for implementing a machine-trained network (e.g., a neural network). The IC of some embodiments includes a set of input processing circuits, a neural network computation fabric (also referred to as a neural network inference circuit) that can be configured to apply a neural network to a set of input values, and a microprocessor (e.g., for controlling the input processing circuits and configuring the neural network computation fabric). The neural network computation fabric of some embodiments includes (i) a set of cores that compute dot products of input values and corresponding weight values and (ii) a channel that aggregates these dot products and performs post-processing operations (as well as performs other operations), in order to compute the outputs of neural network computation nodes.

Figure 1:
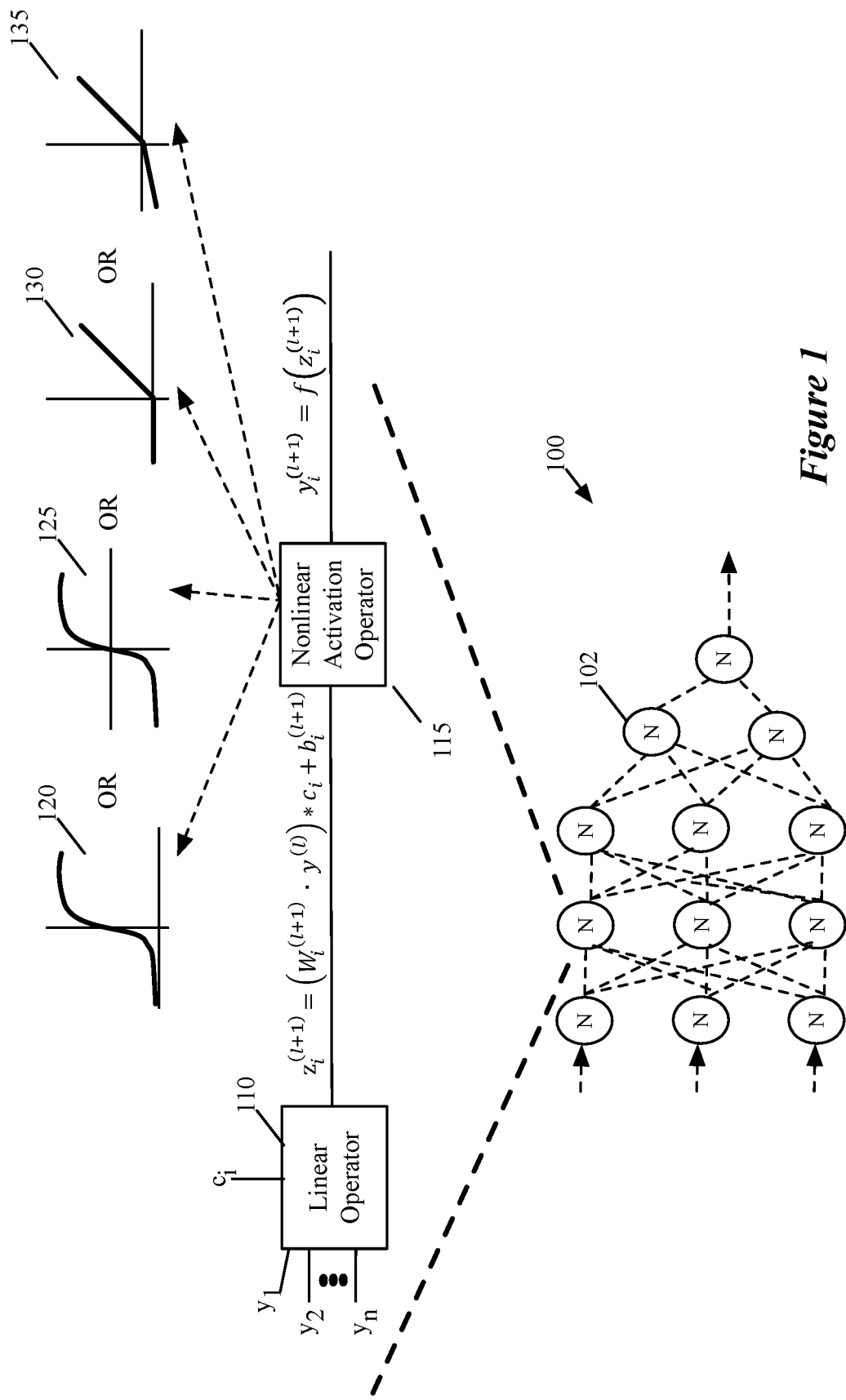
FIG. 1 illustrates an example of a multi-layer machine-trained network of some embodiments.

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a pre-defined set of categories (e.g., for a network that classifies each input into one of eight possible outputs, the output could be a three-bit value).

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 100 is a fully-connected network in which each node in a particular layer receives as inputs all of the outputs from the previous layer. However, the neural networks of some embodiments are convolutional feed-forward neural networks. In this case, the intermediate layers (referred to as "hidden" layers) may include convolutional layers, pooling layers, fully-connected layers, and normalization layers. The convolutional layers of some embodiments use a small kernel (e.g., 3×3×3) to process each tile of pixels in an image with the same set of parameters. The kernels (also referred to as filters) are three-dimensional, and multiple kernels are used to process each group of input values in in a layer (resulting in a three-dimensional output). Pooling layers combine the outputs of clusters of nodes from one layer into a single node at the next layer, as part of the process of reducing an image (which may have a large number of pixels) or other input item down to a single output (e.g., a vector output). In some embodiments, pooling layers can use max pooling (in which the maximum value among the clusters of node outputs is selected) or average pooling (in which the clusters of node outputs are averaged).

As shown in FIG. 1, each node in the neural network 100 has a linear component 110 and a nonlinear component 115. The linear component 110 of each hidden or output node in this example computes a dot product of a vector of weight coefficients and a vector of output values of prior nodes, plus an offset. In other words, a hidden or output node's linear operator computes a weighted sum of its inputs (which are outputs of the previous layer of nodes) plus an offset (also referred to as a bias). Similarly, the linear component 110 of each input node of some embodiments computes a dot product of a vector of weight coefficients and a vector of input values, plus an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable l can be any of the hidden layers (i.e., $l \in \{1, \ldots, L-1\}$ index the hidden layers of the network, with $l=0$ representing the input layer and $l=L$ representing the output layer). The variable $z_i^{(l+1)}$ represents the output of the linear component of a hidden node i in layer l+1. As indicated by the following Equation (A), the variable $z_i^{(l+1)}$ is computed as the dot product of a vector of weight values $W_i^{(l+1)}$ and a vector of outputs $y^{(l)}$ from layer l multiplied by a constant value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n} \left(w_{ik}^{(l+1)} * y_k^{(l)}\right) * c_i + b_i^{(l+1)}. \quad (A)$$

The constant value $c_i$ is a value to which all the weight values are normalized. In some embodiments, the constant value $c_i$ is 1. The symbol * is an element-wise product, while the symbol • is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments use a training technique that maximizes the number of weight values that are equal to zero (such that, e.g., 75% or 90% of the weight values equal zero).

The output $y_i^{(l+1)}$ of the nonlinear component 115 of a node in layer l+1 is a function of the node's linear component, and can be expressed as by Equation (B) below:

$$y_i^{(l+1)} = f(z_i^{(l+1)}). \tag{B}$$

In this equation, $f$ is the nonlinear activation function for node i. Examples of such activation functions include a sigmoid function 120 ($f(x)=1/(1+e^{-x})$), a tan h function 125, a ReLU (rectified linear unit) function 130 or a leaky ReLU function 135, as shown.

Traditionally, the sigmoid function and the tan h function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (B) can be expressed in the following expanded format of Equation (C):

$$y_i^{(l+1)} = f(z_i^{(l+1)}) = f\left[\left(\sum_{k=1}^{n} w_{ik} * y_k\right) * c_i + b_i^{(l+1)}\right]. \tag{C}$$

In this equation, $w_{ik}$ are weight values associated with the inputs $y_k$ of the node i in layer l+1.

Before a multi-layer network can be used to solve a particular problem, the network is put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values).

Figure 2:
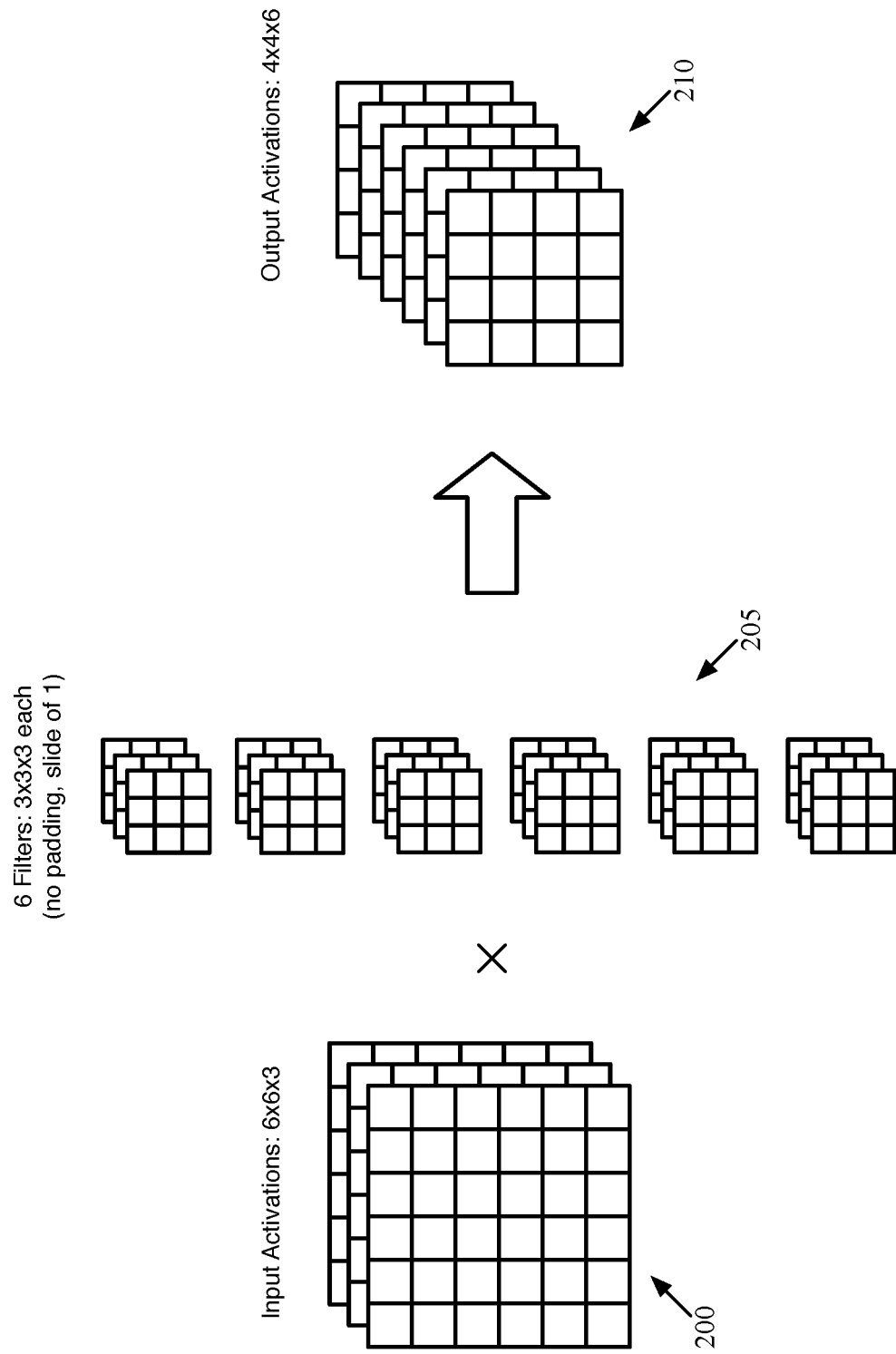
FIG. 2 conceptually illustrates a representation of a convolutional layer of a convolutional neural network.

FIG. 2 conceptually illustrates a representation of a convolutional layer of a convolutional neural network. The convolutional layer receives a set of input activation values 200 organized as a three-dimensional array. This three-dimensional array is either (i) a set of input values for the network, if the convolutional layer is the first layer of the network, or (ii) a set of output values of a previous layer of the network (e.g., a previous convolutional layer, a pooling layer, etc.). The array can be conceptualized as a set of two-dimensional grids, as shown in the figure. In this example, the dimensions of the input values is 6×6×3 (i.e., three 6×6 grids).

Each computation node of the convolutional layer involves a linear component (e.g., a dot product followed by scaling and bias functions) as well as a non-linear component, as described above. The input to each computation node is a subset of the input activation values, and the dot product for the computation node involves multiplying those input activation values by one of the filters of the layer. As shown, in this example the layer includes six filters 205, each of which is 3×3×3. Each value in one of the filters is a weight value that is trained using the techniques described above. Thus, in the example shown in this figure, each filter includes 27 trainable weight values.

The size of the filters in the x and y directions can vary (3×3 and 5×5 are common sizes), but in some embodiments the depth is required to match the depth of the input activations (in this case there are three grids, or channels, so the depth is three). The number of filters in a given layer can also vary—in general, each filter is attempting to identify the presence of a particular feature in the input values. For instance, in image analysis, a filter in an early layer might test for the presence of an edge in a particular direction while a filter in a later layer tests for the presence of a more specific object type in the image (e.g., a nose).

To generate the output activations, each of the filters 205 is applied to numerous subsets of the input activation values. Specifically, in a typical convolution layer, each 3×3×3 filter is moved across the three-dimensional array of activation values, and the dot product between the 27 activations in the current subset and the 27 weight values in the filter is computed. This process starts in the top left corner (i.e., x=0-2, y=0-2) of the grid, and includes the full depth of the array. The filter moves across the rows, in this case using a slide of 1 (i.e., moving one column per computation node, such that the second dot product uses activations at x=1-3, y=0-2). When the end of a row is reached, the filter is moved back to the first columns (i.e., x=0-2) and down one row (i.e., y=1-3), and so on until the bottom right corner of the array is reached. Though not the case in this example, some embodiments use zero-padding at the edges of the grids.

The output activation values 210 are arranged in a 4×4×6 array in this example. The outputs from a single filter are arranged in a single grid, and because the example has six filter 205 the output activations have six grids. Using a slide value of 1 with no zero-padding results in a 4×4 output grid for each filter. These output activation values 210 are then the input activation values for the next layer of the neural network.

As mentioned, some embodiments provide an IC that implements a machine-trained network such as that shown in FIG. 1 (e.g., a convolutional neural network with at least some of the layers being similar in structure to that shown in FIG. 2). The ICs of some embodiments are configurable to implement different networks trained to perform a particular function, which may have various different arrangements of nodes and different trained weight values. For instance, the ICs may implement networks for object or facial recognition in images, voice recognition in audio samples, etc. The IC of some embodiments includes a set of input processing circuits, a neural network computation fabric that can be configured to apply a neural network to an input value, and a microprocessor (e.g., for controlling the input processing circuits and configuring the neural network computation fabric).

Figure 3:
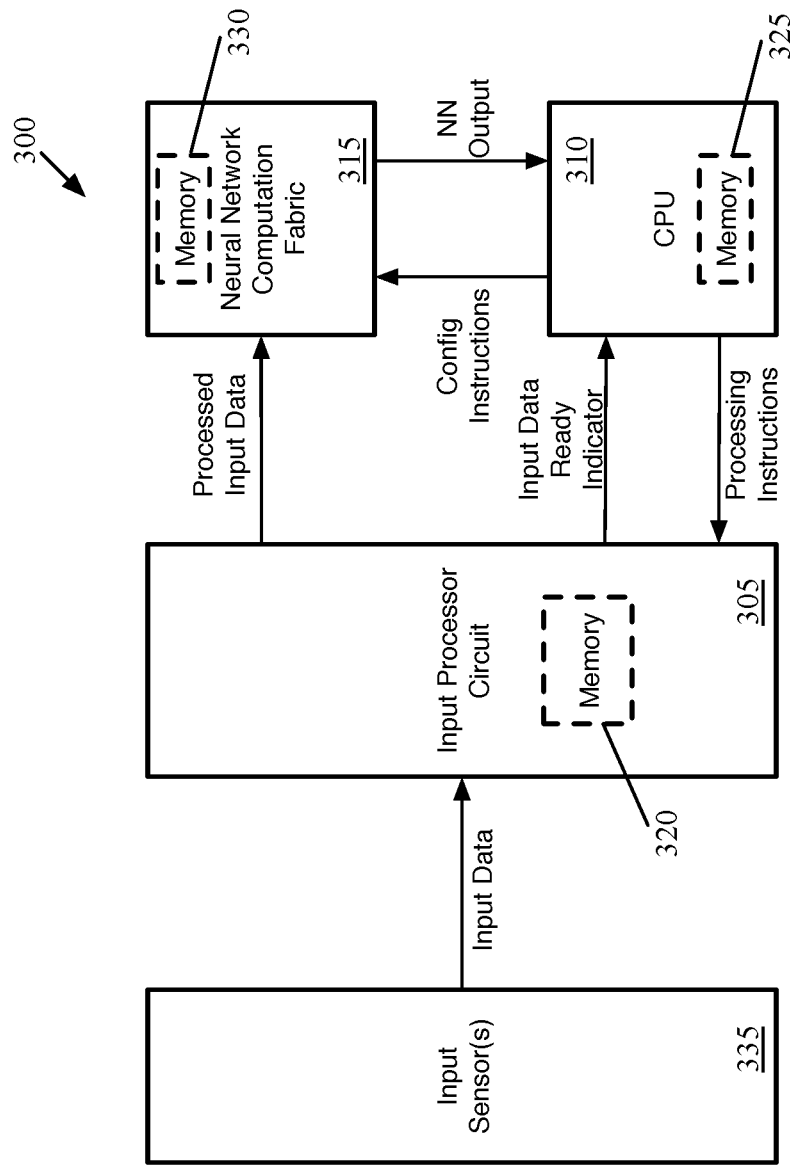
FIG. 3 conceptually illustrates an integrated circuit of some embodiments.

FIG. 3 conceptually illustrates such an IC 300 of some embodiments. As shown, the IC includes an input processor circuit 305, a microprocessor (CPU) 310, and a neural network computation fabric 315. Each of these components 305-315 also has corresponding memory (e.g., random access memory (RAM)) 330. In addition, in some embodiments, the IC is integrated into a device (such as an Internet of Things (IOT) device) with one or more input sensors 335. These input sensors can include cameras (e.g., for capturing video images on which the neural network computation fabric 315 performs face or object recognition, etc.), microphones (e.g., for capturing audio on which the neural network computation fabric 315 performs voice recognition, speech processing, etc.), or other types of input sensors. In other embodiments, the input sensors 335 are located on a separate device that is linked with the IC 300.

In some embodiments, at bootup of the IC 300, the CPU 310 loads neural network configuration data (e.g., weight values, scale and bias parameters, lookup table masks for each layer, memory locations for the weight and input values to use for computing each layer of the network, etc.) from off-chip storage and generates instructions for the neural network computation fabric 315 to write the weight values and other data to its memory 330. In addition, the CPU 310 loads the neural network program instructions for the computation fabric to its own memory 325. These instructions are applied by the computation fabric 315 to input data in order to execute the neural network. These runtime instructions include, e.g., indications as to which pre-loaded sets of instructions to use for each set of calculations, etc.

The input processor circuit 305 receives input data (e.g., still images or video frames, sounds, etc.) from the input sensor(s) 335, and processes these according to processing instructions received from the CPU 310. The CPU 310 stores in its memory instructions for the input processor circuit to prepare input data for the computation fabric 315 as well as the neural network program instructions. These instructions identify, in some embodiments, any sort of initial processing to apply to the raw data (e.g., decompression of compressed data, etc.) as well as how to arrange the data to be provided to the computation fabric 315. For an image, e.g., these instructions might specify the order in which the pixels should be arranged and streamed to the computation fabric 315, so that the computation fabric stores this data in the appropriate locations of its memory 330 for subsequent operations. The input processor circuit 305 also sends signals to the CPU 310 to indicate when it has fully buffered an input (e.g., a frame of video) and when the input is prepared to be sent to the computation fabric 315.

In addition to instructing the input processor circuit 305 how and when to provide input data to the computation fabric 315, the CPU 310 provides the neural network program instructions to the computation fabric. In some embodiments the CPU 310 provides these instructions in stages (e.g., one layer or portion of a layer at a time). Once the final output of the neural network is computed, the fabric 315 provides this output back to the CPU, so that the CPU (or other circuitry on the device) can evaluate this output and perform any actions based on the output.

The computation fabric of some embodiments provides a set of circuits for performing the various computations required for neural networks (e.g., dot product computations, scaler and bias operations, activation functions, etc.), with the network parameters (weight values, bias values, node arrangement, filter size, etc.) configurable. In some embodiments, the computation fabric imposes certain requirements on the networks, such as a maximum size of the network (i.e., a maximum size of the dot product computations), that the weight values be ternary (e.g., 0, $\alpha$, and $-\alpha$ for each layer of the network), and/or that at least a particular percentage of the weight values be equal to zero.

Figure 4:
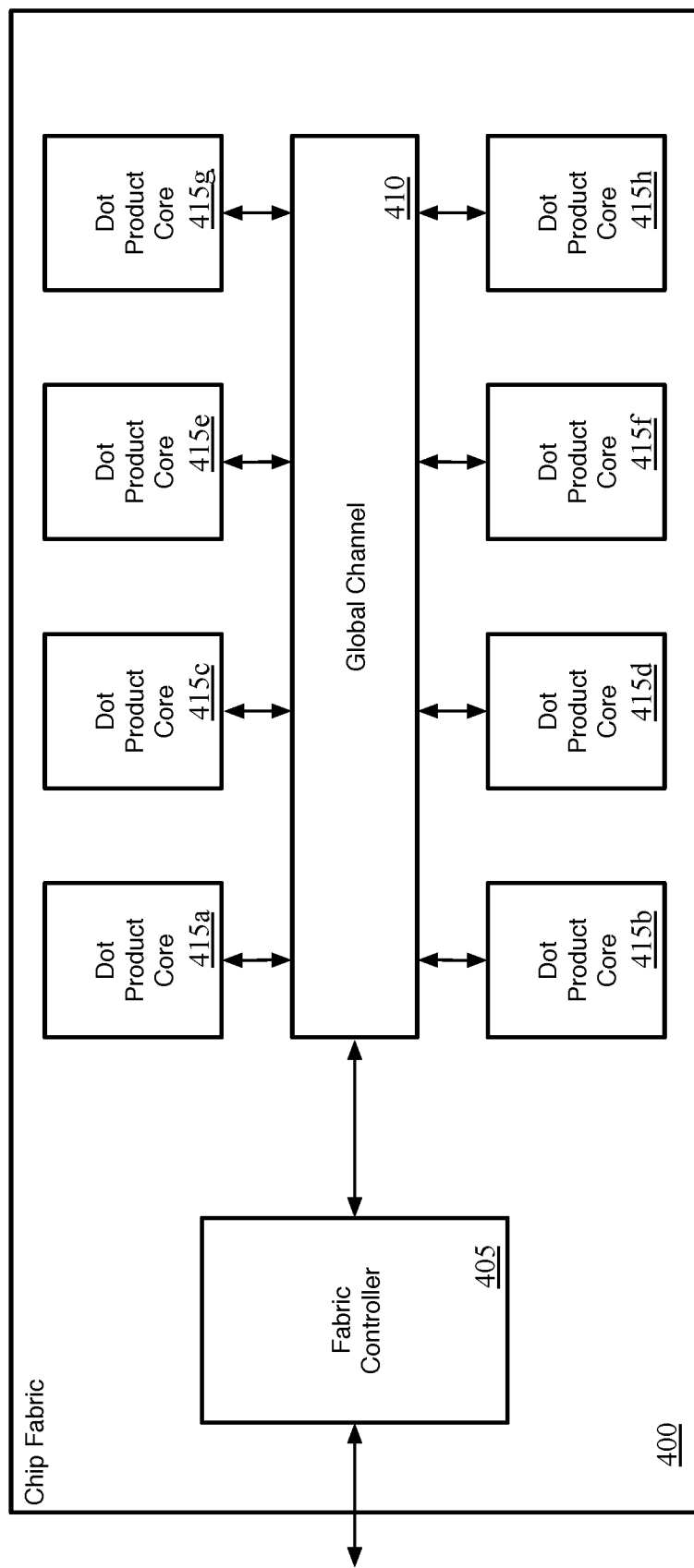
FIG. 4 conceptually illustrates the neural network computation fabric of some embodiments.

FIG. 4 conceptually illustrates the neural network computation fabric 400 (also referred to as the chip fabric) of some embodiments. The chip fabric 400 of some embodiments includes a fabric controller 405, a global channel 410, and a set of dot product cores 415a-h. The connections between the various components 405-415 represent the flow of both control data (e.g., configuration data for a particular neural network layer) and computation data at runtime in some embodiments.

The fabric controller 405 is responsible for managing the operation of the rest of the chip fabric 400 (e.g., the dot product cores 415) in some embodiments. The fabric controller 405 loads instruction arguments (e.g., weight and activation value locations, which cores to use for a particular computation, etc.) from local memory (not shown) on the chip, maps instructions into a sequence of memory-mapped register writes, synchronizes the downstream controllers (e.g., controllers for the various cores 415), etc. The instructions managed by the fabric controller 405 are configured at compile time, in some embodiments, based on the parameters of the network being implemented by the chip fabric 400. In some embodiments, the fabric controller 405 interacts with the microprocessor of the IC as well (i.e., the fabric controller 405 handles the communication with the CPU 310 shown in FIG. 3).

The chip fabric also includes numerous dot product cores 415 as well as a global channel 410 that connects the cores, with these data processing circuits configured by the fabric controller (and a set of hierarchical control circuits, in some embodiments). These data processing circuits 410 and 415 operate to compute neural network operations in an efficient, low-power manner, according to the configuration data provided by the control circuits.

The dot product cores 415a-h include circuitry for computing partial dot products in some embodiments, which is described in further details below. In some embodiments, this circuitry includes memory and/or buffers for storing weights and activations, controllers for reading these values out of memory, and adder trees for computing the partial dot products based on the weight and activation inputs. The core memory, controllers, adder trees, and other core circuitry of some embodiments are described below in greater detail.

The global channel 410 is responsible for providing a communications bus for control and computation data between the fabric controller 405 and the cores 415, as well as from one core to another. The global channel 410, among other operations, accumulates partial dot products from multiple cores when computing dot products that require more computations than can be performed in a single core, and performs post-processing on these dot products. In addition, the global channel 410 carries activations (i.e., computation node outputs) after post-processing for storage (and for use as inputs to subsequent computation nodes) in other cores 415. In some embodiments, the global channel 410 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 410, as described further below.

The chip fabric 400 of some embodiments computes numerous neural network computation nodes simultaneously, with the computation for one node often spread across multiple cores (and subsequently the global channel). In some cases, if a neural network layer is small enough, then computation for that layer may be confined to a single core 415. However, if multiple cores are used for a given layer (any number of cores may be used in some embodiments), then each dot product computed for that layer is spread across all of the cores 415 in use.

That is, for a dot product computed across more than one core 415, each of these cores computes a partial dot product from a subset of the input values and weight values for the node, then provides these partial dot products to the global channel 410. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

In the simplest case, all of the partial dot products are computed in the same clock cycle and provided at the same time to the global channel 410. In some cases, however (e.g., for dot products with a very large number of terms or using larger than standard activation values, or when filters have too many nonzero weight values), each core 415 computes more than one partial dot product for a single computation node, requiring multiple clock cycles (also referred to as time-multiplexing of the dot products). Based on configuration data specifying which outputs from the cores are to be added together (and whether multiple partial dot products are required from the same core), the global channel 410 aggregates these partial dot products to compute the complete dot product for each node, then applies various post-processing functions (e.g., the bias, scale, and non-linear activation functions) to compute the output of each node.

Figure 5:
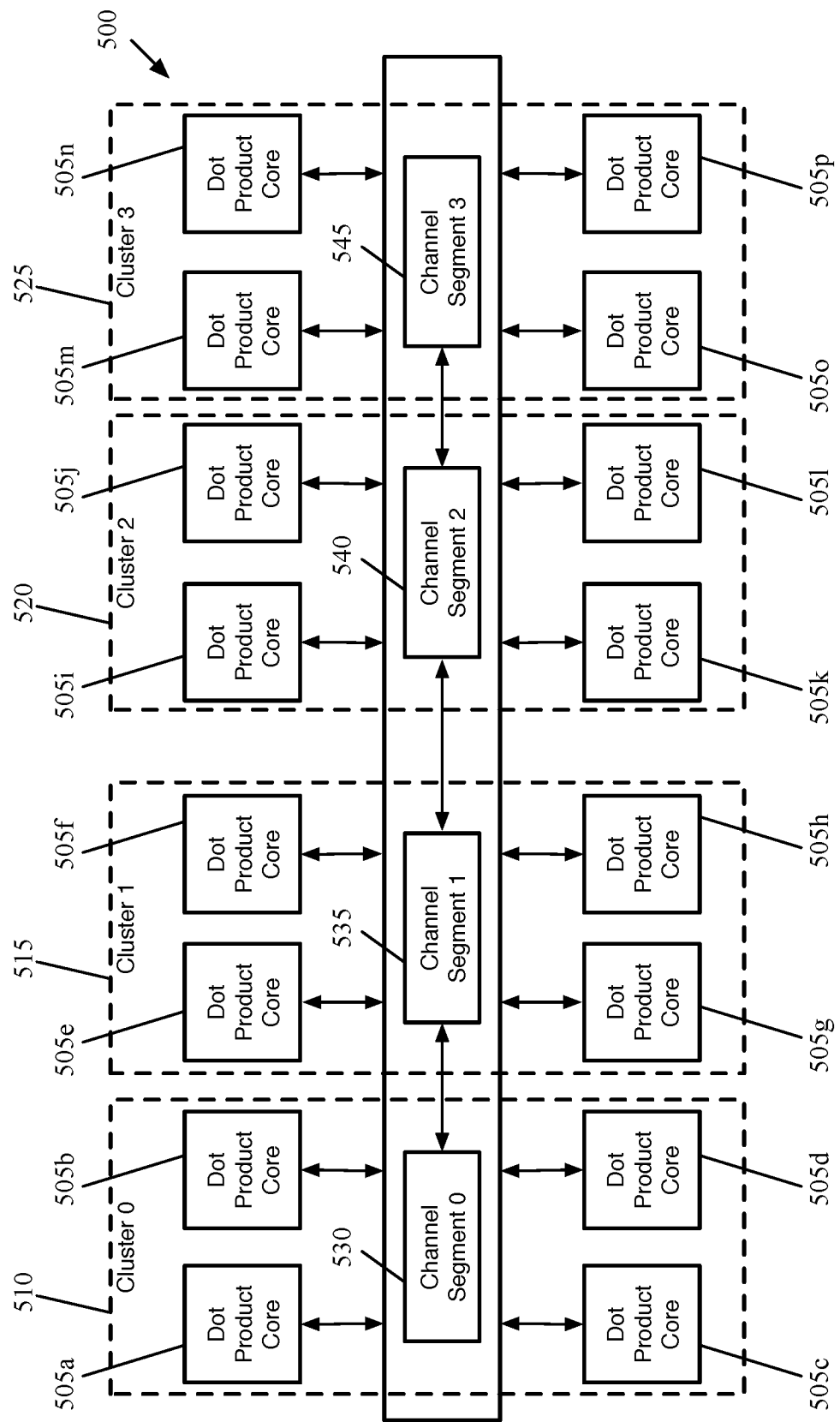
FIG. 5 illustrates a neural network computation fabric of some embodiments with sixteen dot product cores grouped into four clusters.

In some embodiments, the dot product cores are grouped into clusters, and the global channel includes separate segments for each such cluster. FIG. 5 illustrates a neural network computation fabric 500 of some embodiments with sixteen dot product cores 505a-p grouped into four clusters 510-525. In addition, the global channel includes four channel segments 530-545. Each of these channel segments includes the same circuitry in some embodiments, with the exception that buses in the first channel segment 530 and last channel segments 545 only connect to corresponding buses in one other channel segment while the buses in the intermediate channel segments 535 and 540 connect to corresponding buses in two neighboring channel segments.

The data processing circuitry of each of the channel segments 530-545 includes a dot product bus, a set of post-processing circuits, and an output bus in some embodiments. The dot product bus receives partial dot products from the cores, aggregates these dot products together, and provides the aggregated dot products to the post-processing circuits. The post-processing circuits perform the non-dot product computations of the neural network computation nodes, which may include a bias (addition) factor, a scaling (multiplication) factor, and a non-linear activation function (e.g., for a node in a convolutional or fully-connected layer). The output of the post-processing circuits are the computation node outputs (activations). The output bus, or activation write bus, carries the outputs of the post-processing circuits to the cores 505a-p to be stored as inputs for the next computation layer.

In some embodiments, each cluster 510-525 or group of clusters (e.g., clusters 510 and 515 being one group and clusters 520 and 525 being a second group) can execute a separate neural network. This allows the fabric to execute multiple networks simultaneously, so long as the networks are not so large as to require more than the cores of the allocated cluster or clusters. For instance, a single chip of an IOT device could run both a facial recognition network and an object recognition network, a facial recognition network and a language parsing network, etc.

Figure 6:
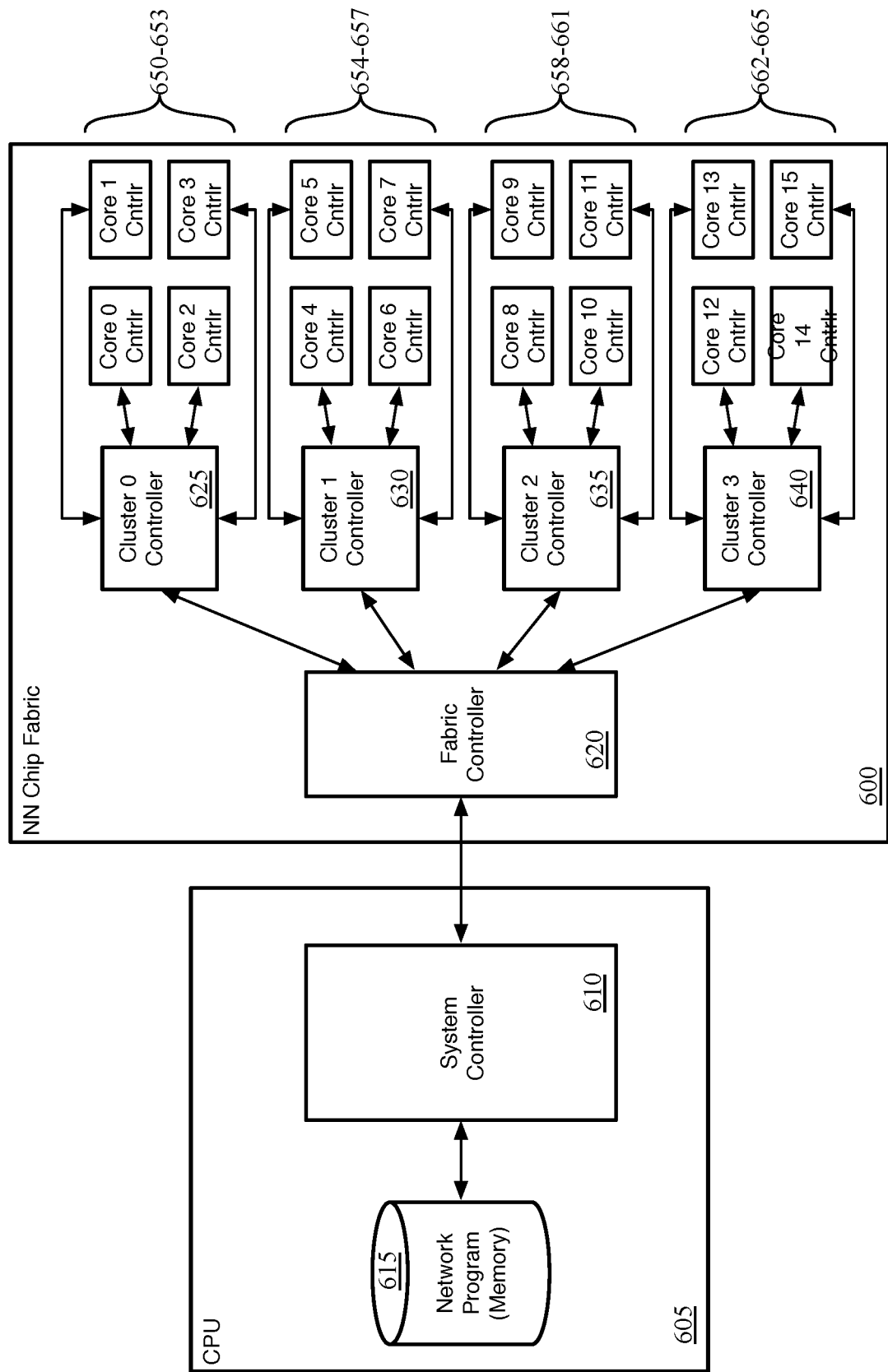
FIG. 6 conceptually illustrates a set of controller circuits for configuring a neural network chip fabric of some embodiments to execute a neural network.

Before describing the structure of the computation circuitry in greater detail, the hierarchical control and configuration of the neural network chip fabric will be described. FIG. 6 conceptually illustrates the set of controller circuits for configuring a neural network chip fabric 600 of some embodiments to execute a neural network. As shown, a CPU 605 executes a system controller 610 and stores a neural network program 615 (i.e., the compiled version of the neural network) in its memory.

The system controller 610 provides the neural network instructions to the chip fabric 600 (per the stored network program 615) for the chip fabric to execute the program on incoming input data (e.g., images, etc.). In some embodiments, the system controller 610 provides these instructions to the chip fabric 600 incrementally. For instance, in some embodiments, the system controller 610 initially loads the instructions for the first layer of the neural network, or a portion of the first layer, then waits for a signal from the chip fabric 600 indicating that these instructions have been completed.

If a layer of the network is small enough to be completed in a single pass, then the compiler of some embodiments schedules the entire layer for one pass. However, in some embodiments, there is a maximum number of filters that can be loaded in a single pass (e.g., 64) due to the structure of the chip fabric. In addition, in some embodiments there is a maximum number of output sets that can be written to the same core in the same pass, so this can also constrict the number of filters in a pass. The chip fabric computes the output for all of the nodes for each filter loaded (i.e., each pass loads all of the input activations for the layer in the correct order for the outputs to be computed). However, if a layer has more than this maximum number of filters, then the layer will be divided across multiple passes. Once the first portion of the network is completed, the system controller 610 provides the fabric 600 with the instructions for the second portion (e.g., a second layer, or a second pass of the first layer), and so on until the chip fabric has fully executed the network.

The chip fabric 600 includes a hierarchical control structure for configuring the data processing circuitry (i.e., the dot product cores and global channel segments) to execute the neural network instructions from the system controller 610. As shown, the chip fabric 600 of some embodiments includes (i) a fabric controller 620 that interacts with the system controller 610 on the CPU 605, (ii) a set of cluster controllers 625-640, and (iii) a set of core controllers 650-665. Some embodiments include one cluster controller for each cluster of the chip fabric and one core controller for each core (in this case the chip fabric 600 has four clusters with four cores each).

Figure 7:
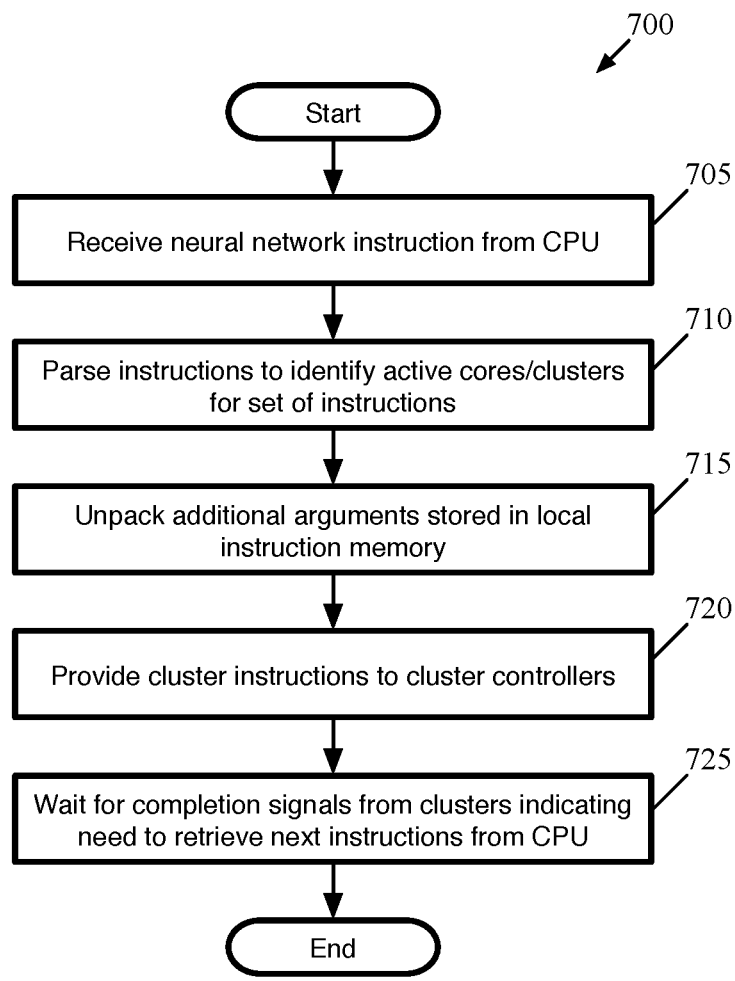
FIG. 7 conceptually illustrates a process of some embodiments for handling neural network instructions from the system controller.

The fabric controller 620 provides the point of interaction with the CPU 605 for the chip fabric 600, receiving neural network program instructions from the system controller 610 and sending signals to the system controller to indicate when instructions have been completed. FIG. 7 conceptually illustrates a process 700 of some embodiments for handling neural network instructions from the system controller (e.g., for a layer of the network or portion of a layer). This process 700 is performed by the fabric controller of some embodiments (e.g., the fabric controller 620).

As shown, the process 700 begins by receiving (at 705) a set of neural network instructions from the CPU (i.e., from the system controller executing on the CPU). The process parses (at 710) these instructions to identify the active cores (and thus the active clusters) for the set of instructions, and also unpacks (at 715) additional arguments stored in local instruction memory on the chip fabric. In some embodiments, in order to minimize power usage, the instructions provided from the CPU are high-level commands that the fabric controller parses in order to determine more detailed instructions for the lower-level controllers. Doing so limits control signal power consumption on the chip while encapsulating implementation details of the lower-level (cluster, core) circuits.

For example, in some embodiments the instructions from the system controller 610 to the fabric controller 620 specify to execute a particular pass of a particular layer of the network, and the fabric controller memory includes the required information to execute this specific pass. In some embodiments, this information is conveyed by the system controller instructions specifying to execute a particular type of pass or layer (e.g., convolution) based on the arguments found at a particular memory location of the fabric controller's memory. The specified memory location stores arguments such as the source cores for the computations (i.e., the cores that will perform the dot product calculations) and the destination cores for the output values (i.e., the cores to which the output values are stored), the memory locations in the cores at which to find the weight and/or input values for the computations (in some embodiments, the weight values are loaded into memory initially such that these memory locations are the same across all of the source cores), information for calculating the non-linear activation function for the layer (e.g., the lookup table mapping information), etc.

Because layers may potentially include thousands of output activation values, having the CPU specify a core and RAM location for each such activation value would require a lot of power. Instead, as described, some embodiments specify only a few parameters required for the chip fabric to determine the memory locations for each activation value (e.g., the cores at which the values will be stored, the starting memory address that is the same for each core, and the dimensions of the activation layer). In addition, similar principles apply to the use of input values already stored in RAM (the outputs of the previous layer) for the dot products of the current layer. The weight values and their location in memory, the location of the input values, the lookup table configuration for a layer, etc. are all the same for each network input (e.g., each frame of video) as the network is statically scheduled, so resources can be saved by storing all of this information on the chip at bootup, with a minimal amount of instruction information sent from the CPU for each layer or pass (i.e., only the location in the fabric controller of the arguments for the current layer).

Next, the process 700 provides (at 720) cluster instructions to the cluster controllers for the identified clusters that are in use for the current neural network layer. Avoiding use of some of the clusters when possible provides power savings, as these cores can be powered down, or at least the memories in the cores put to sleep. Even for networks that require the use of all of the cores of the chip fabric, often the initial layers have smaller dot product computations that require fewer cores. In addition, in some embodiments, the fabric controller synchronizes the cluster controllers, ensuring that dot products computed across multiple clusters are aggregated together correctly.

In some embodiments, the cluster instructions provided by the fabric controller are not fully parsed instructions, pushing some of this work to the cluster and/or core controllers. For instance, the fabric controller may only provide the starting memory address for the activations and the activation layer dimensions, allowing the cluster controllers to determine at which core (and the RAM location within that core) each activation value is to be stored. The fabric controller also broadcasts these instructions in some embodiments, while including certain bits that specify the difference in setup between the clusters (or whether certain clusters even need to act on the instructions). Some embodiments broadcast the instructions only to the clusters involved in the computation (which could include clusters with source cores, destination cores, or both). This broadcasting reduces latency and power consumption as compared to sending separate sets of instructions to each cluster.

Finally, the process 700 waits for completion signals from the clusters indicating that the current set of instructions has been executed and therefore that the fabric controller needs to notify the system controller on the CPU so that the system controller will send the next set of instructions. Once the fabric controller receives completion signals from all of the clusters that are involved in executing the current neural network layer, the fabric controller notifies the system controller that the instructions have been executed, so that the system controller provides the next set of high-level network instructions to the fabric controller on the chip fabric.

Returning to FIG. 6, each of the cluster controllers 625-640 receives instructions from the fabric controller and configures its own segment of the global channel in addition to parsing the instructions to identify configuration data for each of the cores in its cluster. That is, each cluster controller 625-640 that receives cluster instructions for a given high-level instruction directly configures the dot product bus, the post-processing units, and the activation write bus in its channel segment. In addition, these cluster controllers 625-640 determines which of its cores require the instructions and provides these instructions to the core controllers for these identified cores.

Much as the fabric controller 620 parses the high-level instructions from the system controller 610, the cluster controllers 625-640 of some embodiments decompose the instructions from the fabric controller 620 to determine the configuration data to provide to its channel segment circuits (dot product bus, post-processing units, and activation write bus) as well as the sets of instructions for each of its cores. The cluster controllers configure the channel segment circuits to, e.g., aggregate the partial dot products from the cores correctly (both within a channel segment and across channel segments), provide these aggregated dot products to the post-processing units in the correct channel segment, perform post-processing operations, and provide the output of the post-processors to the correct core. In some embodiments, this information both comes from the fabric controller (e.g., the lookup table mapping for the non-linear activation function) as well as from information stored in cluster controller memory.

The use of separate cluster controllers enables the ability of the chip fabric to execute multiple separate networks simultaneously in some embodiments. The fabric controller 620 can provide instructions to the first cluster controller 625 for a layer of a first neural network and, so long as those instructions do not require the use of other clusters, the first cluster can execute the entire neural network layer in a self-contained manner. At the same time, the fabric controller 620 could provide instructions to the second cluster controller 630 for a layer of a second neural network, with the second cluster executing the entire neural network layer in a self-contained manner. The third and fourth cluster controllers 635 and 640 could receive instructions for third and fourth networks as well, to execute at the same time as the first two. In addition, other combinations of clusters can execute multiple networks simultaneously (e.g., the first two clusters executing a first network and the second two clusters executing a second network, the first two clusters executing a first network while the third and fourth clusters each separately execute second and third networks, etc.

The cluster controllers 625-640, as mentioned, also provide the appropriate configuration data to each of the core controllers 650-665, which coordinate the dot product processing in the core (as well as the direct delivery of input activation values to the global channel for pooling, element-wise operations, etc.). In some embodiments, the cluster controllers do not fully parse the instructions to specify each individual memory read or write, but instead provide the higher-level instructions to each core controller. In addition, some embodiments broadcast the instructions from a particular cluster controller to each of the core controllers within the cluster (or the core controllers for each of the cores active in the current pass), while including certain bits that specify the difference in setup between the cores. This broadcasting reduces latency and power consumption as compared to sending separate sets of instructions to each core.

The core controllers 650-665 then parse these instructions to determine the specific configuration data for the operations of the core. This configuration data includes memory locations for various read operations to read and align weight and activation values, enable bits for the dot product operations, memory locations for write operations after activations have been computed, etc. Once the instructions are fully executed, the core controllers 650-665 send completion signals to the cluster controllers 625-640. Similarly, once the cluster controllers 625-640 receive these completion messages, they send similar messages to the fabric controller 620, which can then notify the system controller executing on the CPU that the instructions are complete.

Figure 8:
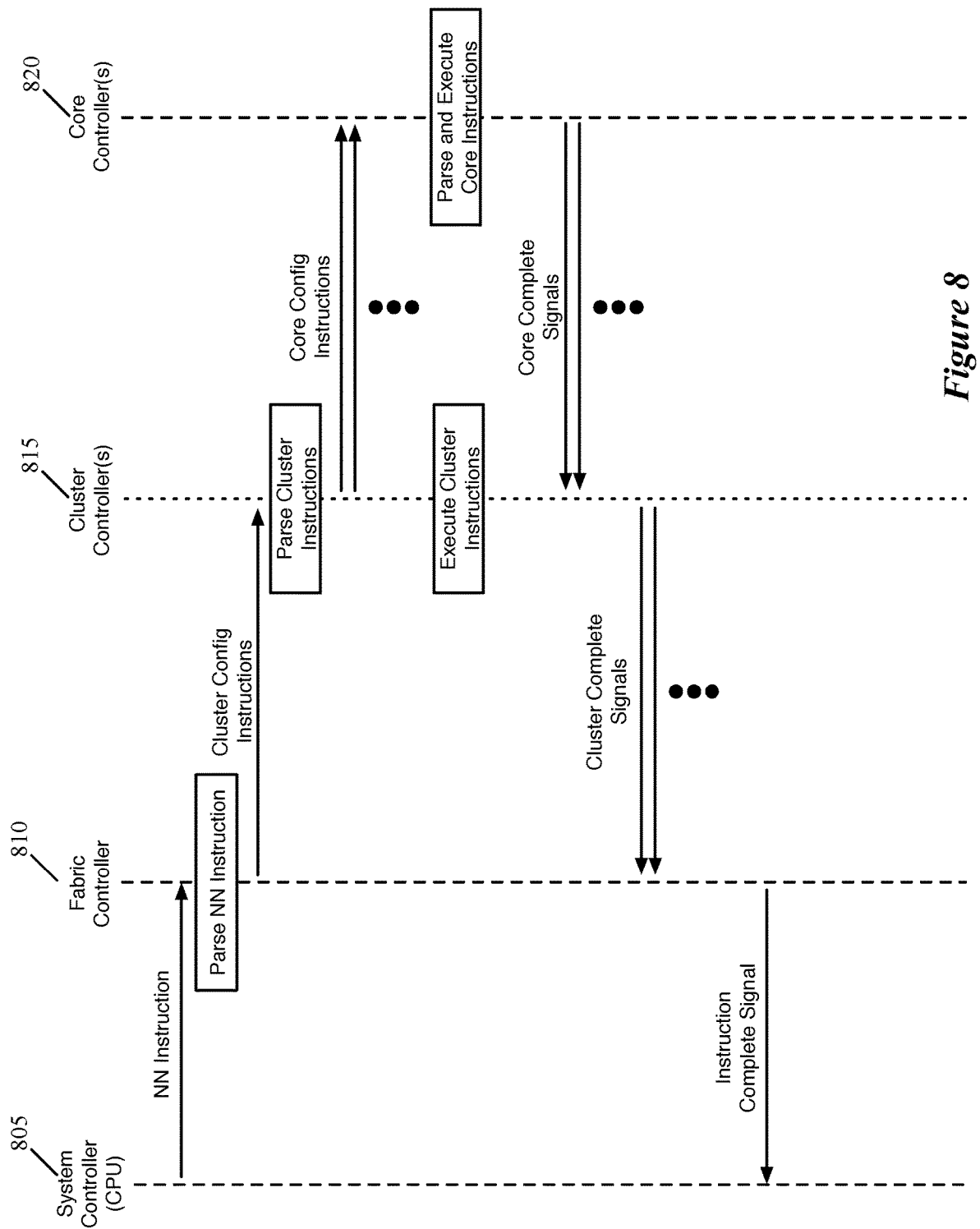
FIG. 8 conceptually illustrates high-level interactions between the controller circuits (and the system controller executing on the CPU) to execute a set of neural network instructions according to some embodiments.

FIG. 8 conceptually illustrates the high-level interactions between the controller circuits (and the system controller executing on the CPU) to execute a set of neural network instructions (e.g., for a layer of a neural network) according to some embodiments. Specifically, this diagram shows the interactions between the system controller 805, fabric controller 810, cluster controllers 815, and core controllers 820. In some embodiments, the system controller 805 is a program that executes on the CPU, while the fabric controller 810, cluster controllers 815, and core controllers 820 are circuit blocks on the neural network computation fabric.

As shown, the system controller 805 initially sends a set of neural network instructions to the fabric controller 810 (e.g., instructions for a neural network layer or portion thereof). The fabric controller 810 parses these instructions and unpacks data in local memory to generate cluster configuration instructions, which the fabric controller sends to the cluster controllers 815. In some embodiments, the fabric controller broadcasts these instructions to all of the cluster controllers (or cluster controllers for all cores involved in the pass), with data specifying differences between the configuration data for the different clusters.

The cluster controllers 815 parse these cluster instructions to generate configuration data for the channel segment circuits, as well as to generate configuration instructions for the cores. Each cluster controller that is instructed to provide data to its cores broadcasts these configuration instructions to all of its core controllers (or the core controllers for all cores involved in the current pass) in some embodiments, whether those core controllers require instructions or not, with data specifying differences between the configuration data for the different cores.

The core controllers 820 parse and execute these instructions, performing the requisite read operations, dot product computations, and write operations. When the instructions have been fully executed by a given core controller 820, that core controller sends a signal to its cluster controller indicating that the instruction is complete. The cluster controllers execute the cluster instructions (e.g., configuring the global channel segment to perform the requisite dot product aggregation, post-processing, and activation transport operations). After both executing these instructions and receiving the completion signals from each of their cores, the cluster controllers 815 send completion signals to the fabric controller. In this figure, the execution of the cluster instructions and the execution of the core instructions are shown as occurring at the same time, as in some embodiments the execution in the cores and the channel segment overlaps. In other embodiments, however, the cluster controllers 815 do not execute their instructions until receiving completion signals from the core controllers 820.

The fabric controller 810 sends a completion signal to the system controller 805 on the CPU once all of the relevant clusters have indicated that they have completed the current instruction set. Upon receiving this, the system controller provides the next set of instructions to the fabric controller, and the process shown in FIG. 8 starts again. In some embodiments, the last set of neural network instructions is a set of memory read operations, for the computation fabric to deliver the neural network output results to the system controller for any post-processing operations (e.g., a softmax operation to generate a probability, etc.). After this, the system controller puts the fabric to sleep until the next set of input data is to be processed, in some embodiments. If only a portion of the fabric is involved in executing the neural network (e.g., because one or more clusters execute a different neural network in parallel), then that portion of the fabric is put to sleep in some embodiments.

Figure 9:
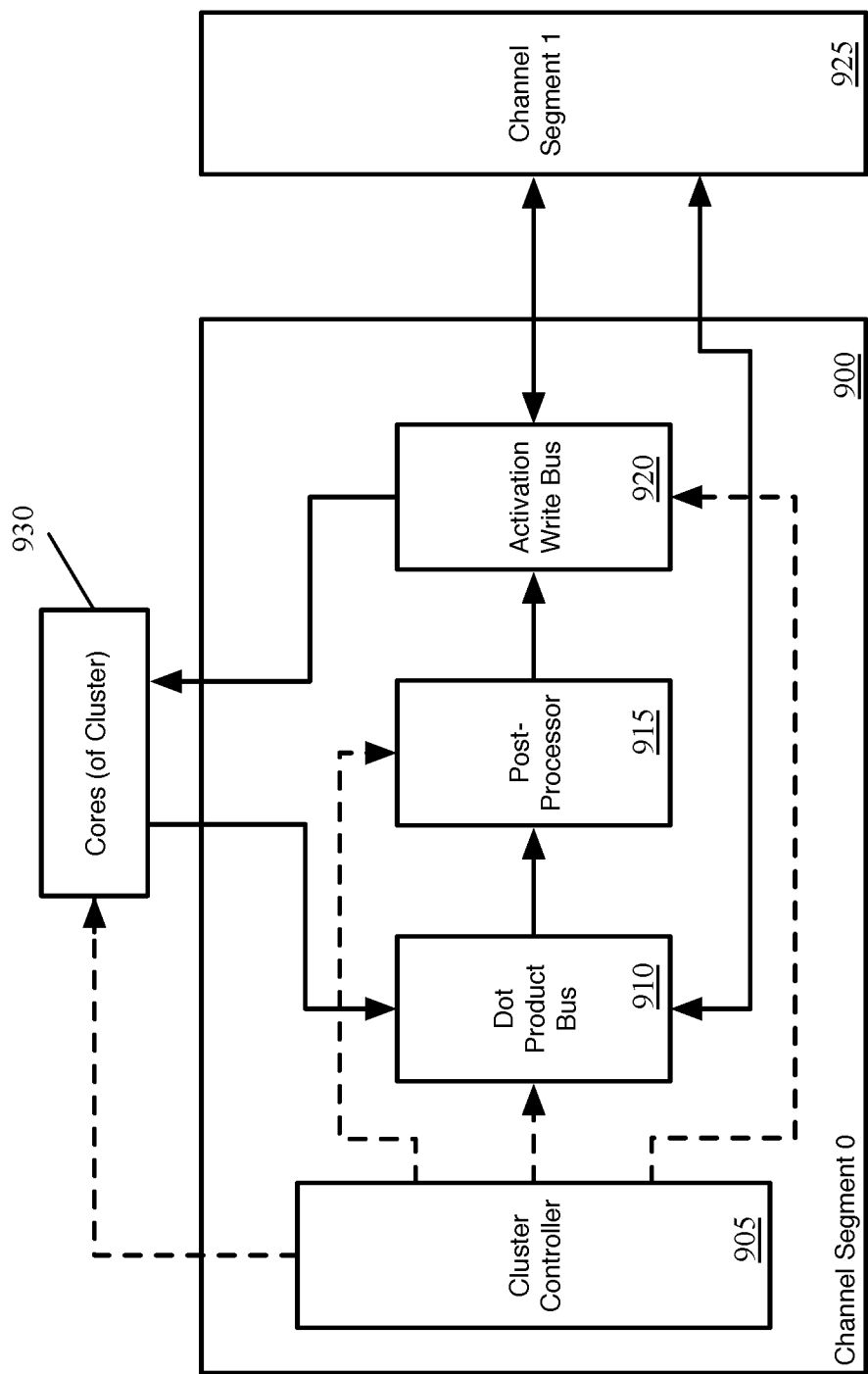
FIG. 9 conceptually illustrates the circuit blocks of a channel segment of some embodiments.

Returning to the neural network computation circuitry, FIG. 9 conceptually illustrates the circuit blocks of a channel segment 900 of some embodiments (e.g., one of the channel segments 530-545 shown in FIG. 5). The channel segment 900 includes a cluster controller 905, a dot product bus 910, a post-processor 915, and an activation write bus 920 (also referred to as an output bus). In addition to the channel segment 900, the figure also illustrates an additional channel segment 925 and the cores 930 of the local cluster for the channel segment 900, as the circuit blocks of the channel segment 900 exchange dot product and configuration data with these other circuits. In this diagram, the dashed lines represent the flow of configuration data while the solid lines represent the flow of neural network computation node data for convolution or fully-connected layer nodes (i.e., nodes that use a dot product based linear function). Additional neural network computation data, such as that flowing directly from the cores 930 to the post-processor 915 for pooling nodes or element-wise operators, is not shown.

The cluster controller 905 configures the dot product bus 910, post-processor 915, and activation write bus 920 as per the configuration instructions received from the fabric controller in some embodiments. For the dot product bus 910, this configuration data specifies, in some embodiments, (i) which partial dot products are to be added together as part of the same neural network computation node and (ii) to which post-processing unit each aggregated dot product is sent (the post-processor 915 of some embodiments includes numerous post-processing units with the same circuitry). In other embodiments, the post-processing unit that receives each aggregated dot product is not specified as configuration data because there are an equal number of dot product bus lanes and post-processing units, so that the data from each lane is provided as the primary input to a different post-processing unit.

For the post-processor 915, the configuration data of some embodiments indicates (for each of the post-processing units) whether a dot product computation node or other computation node (e.g., pooling, element-wise operator) is being executed, the scaler and bias factors for a linear computation, the activation function to use (which may be specified, e.g., as a lookup table), as well as other data. For the activation write bus 920, the configuration data indicates to which cores each output value is to be delivered, in some embodiments.

As mentioned, the solid lines indicate the flow of neural network computation data, for a node in a convolutional or fully-connected layer. The cores 930 (as well as, in some cases, cores of other clusters) compute partial dot products. For a given computation node, these partial dot products may be computed across multiple cores. In some embodiments, if more than one core is used to compute the dot products for a neural network layer, then the partial dot products for each node are computed across all of these active cores.

These partial dot products are output to the dot product bus 910, which aggregates the partial dot products from the cores 930 of the local cluster. The dot product bus 910, in some embodiments, includes a number of independent dot product bus lanes that each receives partial dot products from the cores, aggregates these together, and provides the aggregated dot products to the post-processing circuits. In some embodiments, each lane of the dot product bus corresponds to (i) one of the adder trees in each of the cores (i.e., dot product bus lane N receives the partial dot products from each of the adder trees of index N in the cores), and (ii) one of the post-processing units in each of the clusters (i.e., dot product bus lane N provides its aggregated output to the post-processing unit N in one of the clusters, as specified by the configuration data).

Each lane of the dot product bus 910 spans all of the channel segments, and the dot product bus lanes in each channel segment aggregate the partial dot products from the cores of its local cluster. The dot product bus 910 in the channel segment 900 also exchanges locally-aggregated dot products with its neighboring segments for further aggregation if needed (i.e., if the source cores for the dot product computation span multiple clusters). In this case, the channel segment 900 only has one neighboring segment, but internal channel segments (e.g., the segments 535 and 540 in FIG. 5) will have two such neighboring segments. The configuration data from the cluster controller 905 specifies whether to send these dot products in one direction or the other along the global channel for each dot product bus lane, or to aggregate the dot products from the neighboring channels locally, depending on where post-processing will occur for each dot product.

The post-processor 915 includes numerous post-processing units that receive the dot products from their corresponding dot product bus lane and perform the non-dot product functions of the neural network computation nodes. For a typical computation node of a convolutional (or fully-connected) layer, these functions includes an addition operation to account for the bias factor, a multiplication operation to account for the scaling factor, and a non-linear activation function. In some embodiments, the outputs of the linear function are quantized or truncated to a particular number of bits (e.g., 4 bits, 5 bits, 8 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design. The non-linear activation function, in some embodiments, is implemented as a lookup table rather than a hardwired function. This enables the IC to execute different neural networks that use different activation functions and, in some embodiments, allows for different activation functions to be used in different layers of the neural network.

The activation write bus 920 receives the computation node activation outputs from the post-processing units and carries these outputs back to the cores 930, to be stored in the memory of the core and used as inputs for the computation nodes of the next layer of the neural network. The activation write bus connects to the cores 930 in the local cluster as well as the activation write bus in the neighboring channel segment 925. As with the dot product bus 910, the activation write bus 920 of some embodiments includes lanes, with each post-processing unit of the post-processor 915 sending its output to a different one of these lanes.

In some embodiments, the output values may be computed by the post-processor 915 in one cluster but carried by the activation write bus 920 to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value. The activation write bus 920 also includes a right shift circuit for each core that is used to align the output values for the core, in order for the values to be stored in contiguous blocks within the core RAM.

Figure 10:
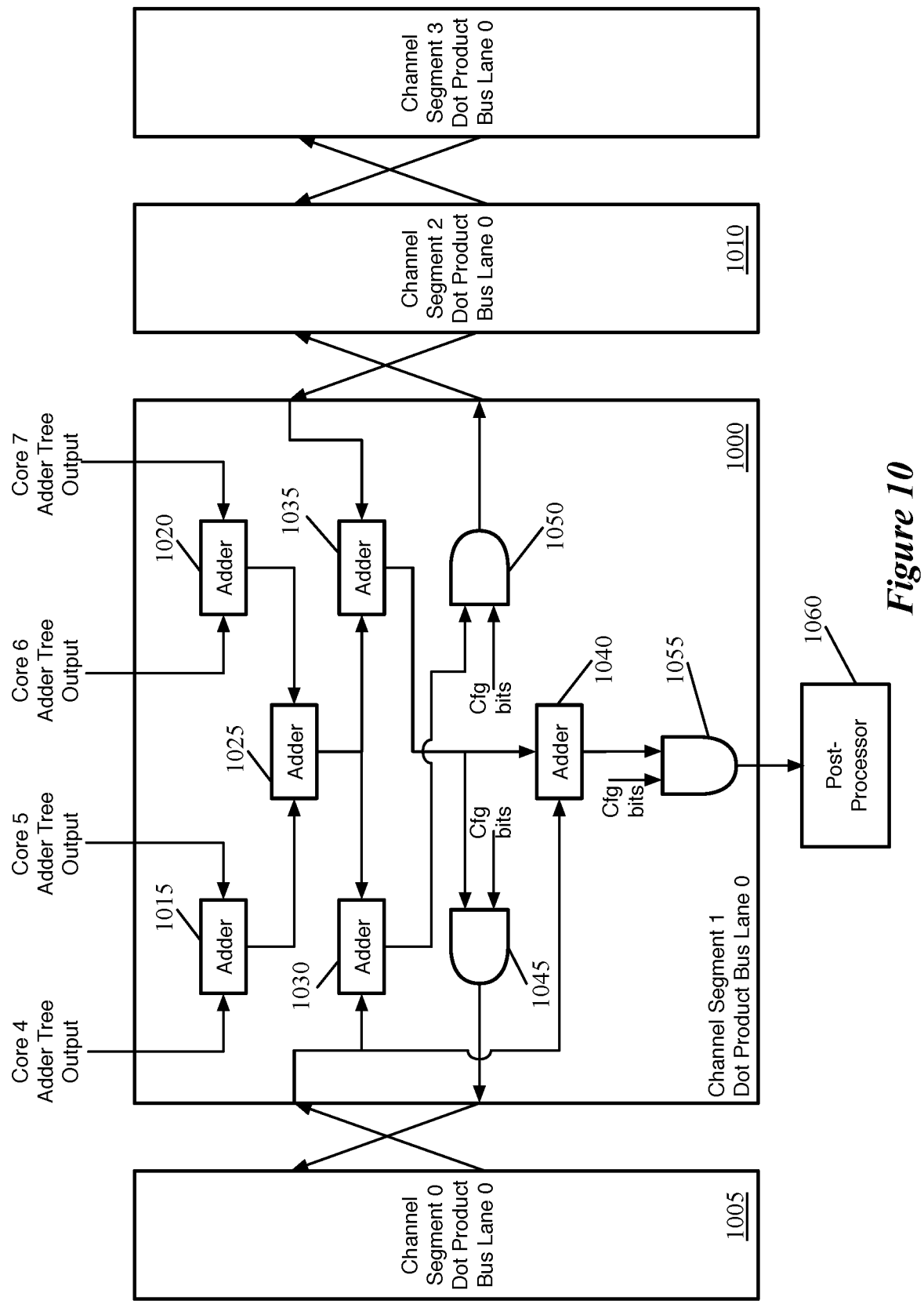
FIG. 10 conceptually illustrates a portion of the dot product bus of some embodiments.

Now that the primary circuit blocks of the global channel have been introduced, these circuits of some embodiments will be explained in greater detail. FIG. 10 conceptually illustrates a portion 1000 of a dot product bus of some embodiments. In this example, the segment for which the dot product bus portion 1000 is shown is an internal segment (in that it has two neighboring segments 1005 and 1010). The dot product bus of some embodiments includes, within each segment, numerous (N) non-interacting lanes, and the portion 1000 is a segment of one of these lanes. In some embodiments, each segment includes the same number of lanes, and lane n E N in one segment is connected to lane n in its neighboring segments for the aggregation of dot products across clusters. In some embodiments, the number N of dot product bus lanes is equal to the number of adder trees computing partial dot products in each core, the number of post-processing units in each post-processor block of a channel segment, and the number of activation write bus lanes. Thus, each computation node has its partial dot product computed by the same adder tree in each of one or more cores, which is aggregated across the corresponding dot product bus lane to calculate the complete dot product. This complete dot product is (in the typical case) provided to the corresponding dot post-processing unit, which provides its output to the corresponding activation write bus lane to be carried to the appropriate core.

The dot product bus portion 1000 includes a set of adders 1015-1040 as well as a set of AND gates 1045-1055. The first three adders 1015-1025 form an adder tree to aggregate the partial dot products output by the corresponding adder trees of the four cores of the local cluster for the channel segment. In some embodiments, if a core does not compute a partial dot product for a particular computation node, then that core outputs a 0 value to the dot product bus. This aggregated partial dot product is output to both of the adders 1030 and 1035.

These adders 1030 and 1035 handle the computation of dot products that are "moving" downstream (to a lower-numbered segment, in this case segment 1005) and downstream (to a lower-numbered segment, in this case segment 1010). The adder 1030 receives the aggregated dot product from the corresponding downstream dot product bus lane 1005 and combines it with the locally aggregated dot product from the adder 1025. If either (i) the cores of the downstream cluster(s) do not participate in the dot product computation or (ii) the dot product will be completely aggregated and sent to a post-processor downstream, then this value received from the downstream dot product bus lane 1005 is gated to 0 (i.e., by the equivalent of AND gate 1050 in the downstream segment).

Correspondingly, the adder 1035 receives the aggregated dot product from the corresponding upstream dot product bus lane 1010 and combines it with the locally aggregated dot product from the adder 1025. If either (i) the cores of the upstream cluster(s) do not participate in the dot product computation or (ii) the dot product will be completely aggregated and sent to a post-processor upstream, then this value received from the upstream dot product bus lane 1010 is gated to 0 (i.e., by the equivalent of AND gate 1045 in the upstream segment).

The output of the adder 1030 is sent to the AND gate 1050, which ANDs this output with configuration bits from the local cluster controller based on where the post-processing for the completed dot product will be performed. If the post-processing segment is upstream, then these configuration bits are 1 (resulting in the aggregated dot product being passed upstream), whereas if the post-processing segment is either downstream or local, then these configuration bits are 0 (resulting in 0 values being passed upstream).

Similarly, the output of the adder 1035 is sent to the AND gate 1045, which ANDs this output with configuration bits from the local cluster controller based on where the post-processing for the completed dot product will be performed. If the post-processing segment is downstream, then these configuration bits are 1 (resulting in the aggregated dot product being passed downstream), whereas if the post-processing segment is either upstream or local, then these configuration bits are 0 (resulting in 0 values being passed downstream).

The final adder 1040 receives (i) the output of the adder 1035 and (ii) the aggregated dot product from the downstream segment 1005 of the dot product bus lane. It should be noted that the directions could be reversed in other embodiments with an equivalent effect, with this adder 1040 instead receiving the output of the adder 1030 and the aggregated dot product from the upstream segment 1010 of the dot product bus lane. This adder aggregates the complete dot product (accounting for the partial dot products from the local cores and upstream cores via the output of adder 1035 and the partial dot products from the downstream cores via the output from the segment 1005).

The output of the final adder 1040 is provided to the post-processor 1060 (e.g., to the post-processing unit that corresponds to the lane of the dot product bus). However, AND gate 1055 is used to gate this output to 0 if the post-processor for this dot product bus lane is not local (i.e., either upstream or downstream). In summary, the dot product bus lane segment 1000 is configured (via the AND gates 1045-1055) to (i) add the local cluster partial product with the downstream partial product and pass this aggregated partial product upstream if the post-processing segment is upstream, (ii) add the local cluster partial product with the upstream partial product and pass this aggregated partial product downstream if the post-processing segment is downstream, and (iii) add the local cluster partial product with the downstream and upstream partial products and pass this completed dot product to the local post-processor if the post-processing will be performed locally. In some embodiments, the post-processing segment is selected by the compiler, with the primary factor in this selection being that the post-processing segment is centrally located among the source clusters (i.e., the cores that compute the partial dot products and a secondary factor being that the selected segment is as close to the destination core(s) as possible, in order to reduce the power required for the computation and write operations.

In addition to the circuitry shown in FIG. 10, the dot product bus also includes a control block in some embodiments. This block is responsible for outputting a signal to the post-processor block to indicate when the output of the dot product bus is valid (i.e., when the dot products are aggregated by the dot product bus), so that the post-processor acts on the data from the dot product bus.

Figure 11:
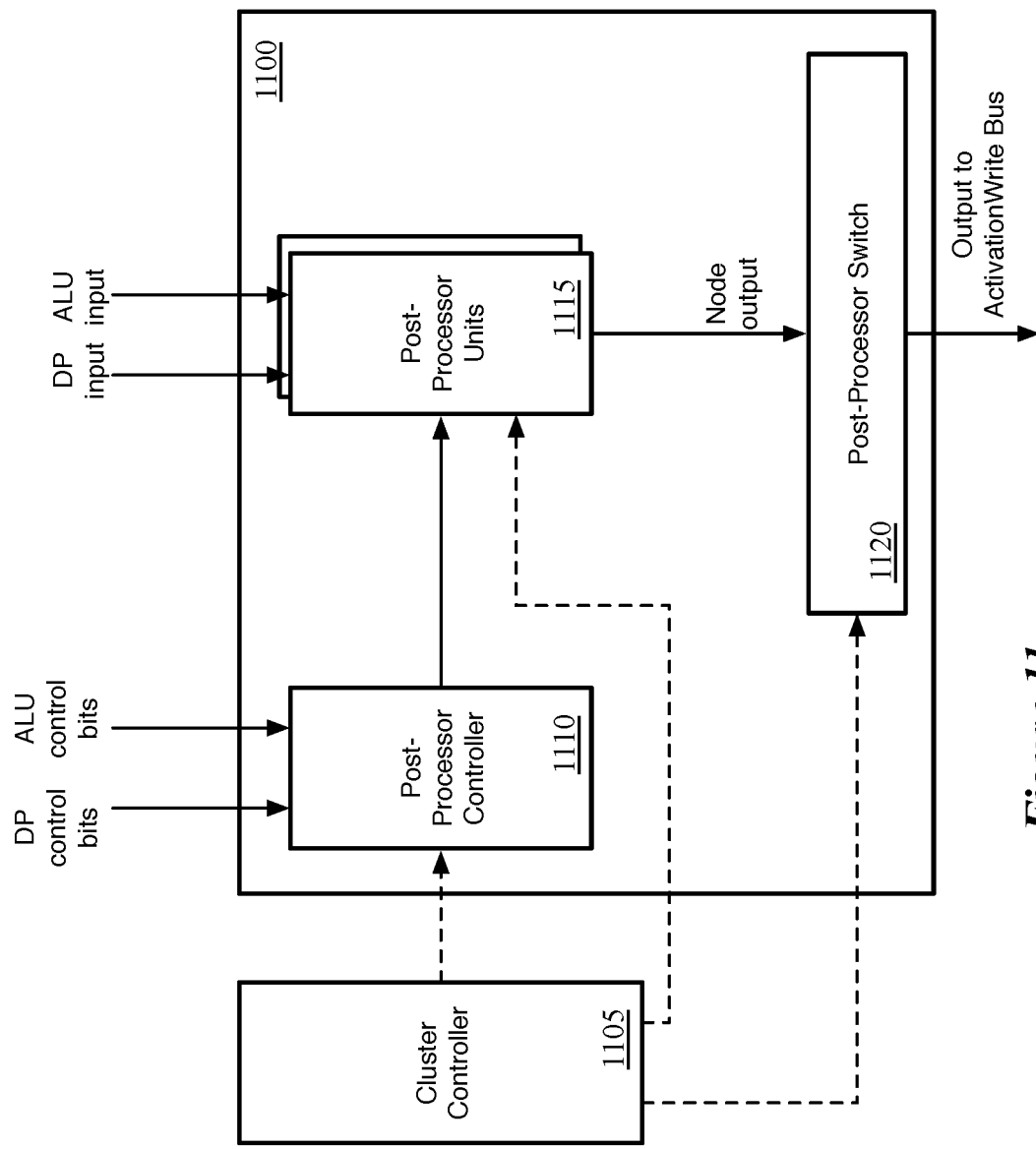
FIG. 11 conceptually illustrates the post-processing circuit block for a channel segment of some embodiments, along with the local cluster controller that provides configuration data to this post-processor.

FIG. 11 conceptually illustrates the post-processing circuit block 1100 for a channel segment of some embodiments, along with the local cluster controller 1105 that provides configuration data to this post-processor 1100. As shown, the post-processing circuit block 1100 includes as sub-blocks a post-processor controller 1110, a set of post-processing units 1115, and a post-processor switch 1120. The cluster controller 1105 provides configuration data to each of these sub-blocks in order to synchronize operations, and to configure the post-processing units 1115 with the correct bias and scale factors as well as the activation function.

The post-processor controller block 1110 aggregates control signals from the dot product bus (for convolution and fully-connected operations) as well as the ALU bus from the cores (for pooling, copy, and element-wise operations). These control bits include accumulate and valid signals for the dot product bus (which indicate to the post-processor whether the incoming data is a final dot product, as dot products are not sent every clock cycle) as well as accumulate, valid, and end of row signals for the ALU bus. The ALU bus, as mentioned, carries activation values directly from the cores without having dot products performed, to be used for pooling and element-wise operation layers. The accumulate and valid signals indicate to the post-processor whether the incoming ALU data is to be used, while the end of row signals that different configuration data should be used for certain post-processing operations when the end of a row of input values is reached (e.g., on account of padding, etc.). The post-processor controller block 1110 aggregates these signals, as mentioned, and outputs signals to the post-processing units 1115 to indicate when the post-processing units are receiving valid dot product or ALU data.

The post-processor 1100 includes numerous post-processing units 1115 that handle the non-dot product computation of the neural network nodes. In some embodiments, the post-processor block within a segment includes the same number of post-processing units 1115 as there are dot product bus lanes and activation write bus lanes (which is also the number of adder trees in each core for computing partial dot products). Each post-processing unit 1115 receives two types of data inputs: (1) dot products from the dot product bus for convolution and fully-connected neural network nodes and (2) activation inputs (ALU inputs) from the core RAM for pooling nodes and element-wise operator nodes.

In some embodiments, each post-processing unit receives a single dot product input, from its corresponding segment in the dot product bus. However, to accommodate certain situations in which one or more filter slices assigned to a core is not sparse enough (i.e., too many of the weight values of a portion of the filter used to compute a partial dot product are nonzero), the post-processing units of some embodiments each receive two dot product inputs. Specifically, some of the dot product bus lane outputs are sent to two or more of the post-processing units (in some such embodiments, different dot product bus lane outputs are sent to different numbers of post-processing units, with each post-processing unit receiving two such outputs). Some of the details of the post-processing units are described further below by reference to FIGS. 12-14.

The post-processing switch 1120 of some embodiments compresses the post-processing unit outputs (i.e., the activation outputs) to be sent to the activation write bus. In some embodiments, the chip fabric can be configured for different size activation outputs (e.g., 4-bit, 8-bit, or 16-bit), but the activation write bus requires the outputs to be in contiguous blocks. As such, for output sizes smaller than the maximum, the post-processing switch compresses these together to eliminate the meaningless bits (e.g., compressing four 4-bit activation outputs onto the wires for one 16-bit activation output).

Figure 12:
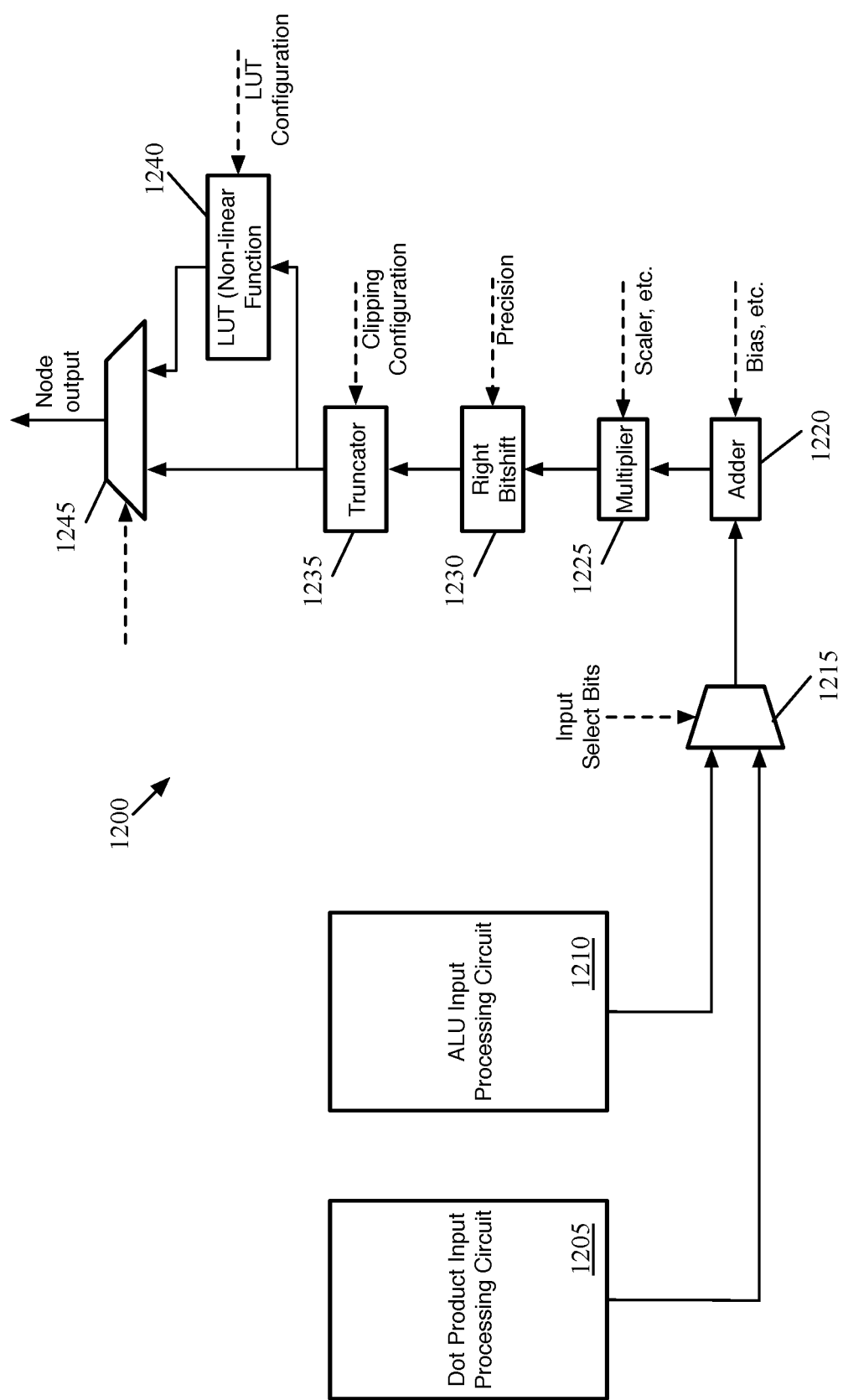
FIG. 12 conceptually illustrates the structure of a post-processing unit of some embodiments.
Figure 13:
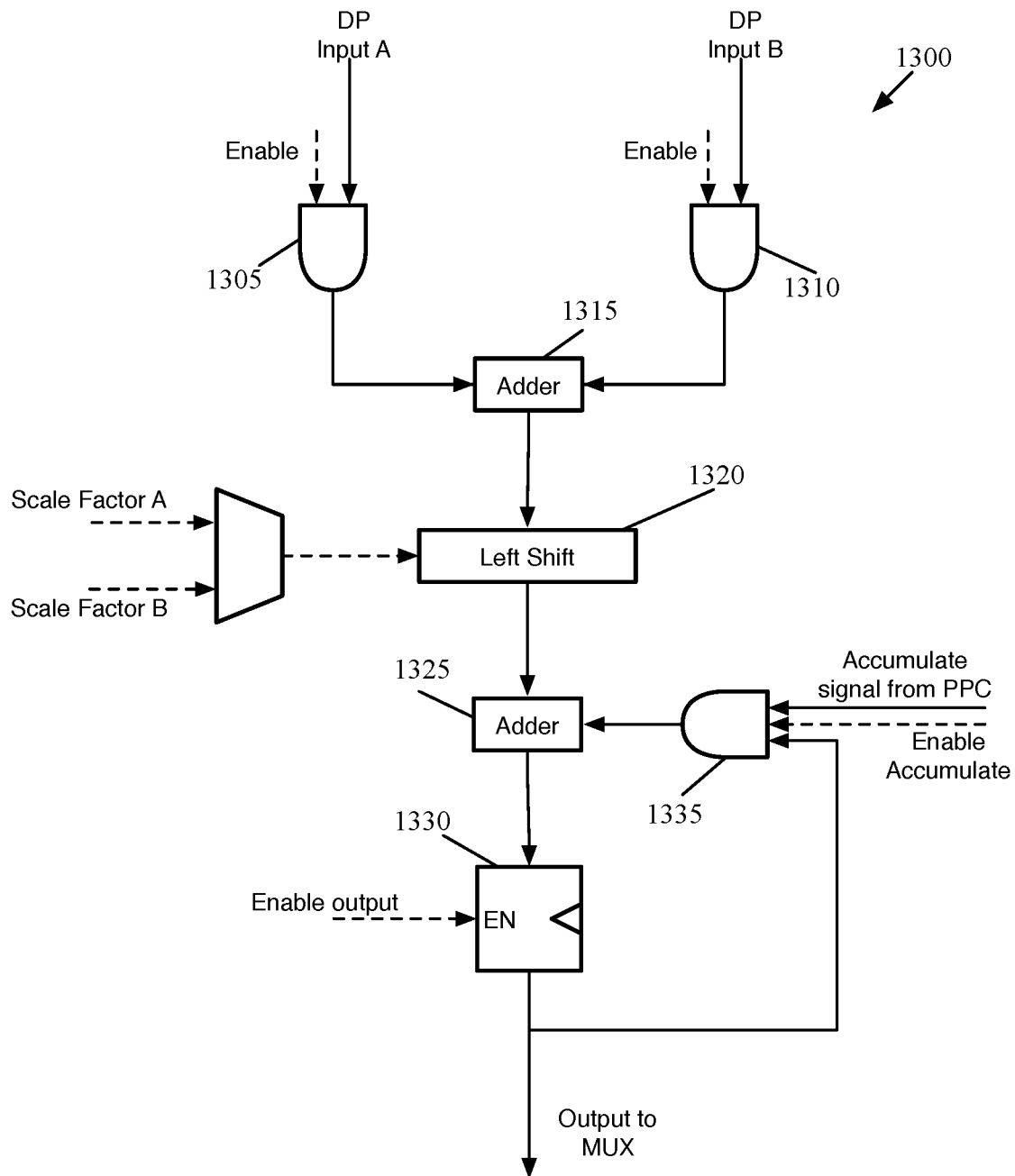
FIG. 13 conceptually illustrates a dot product input processing circuit of some embodiments.
Figure 14:
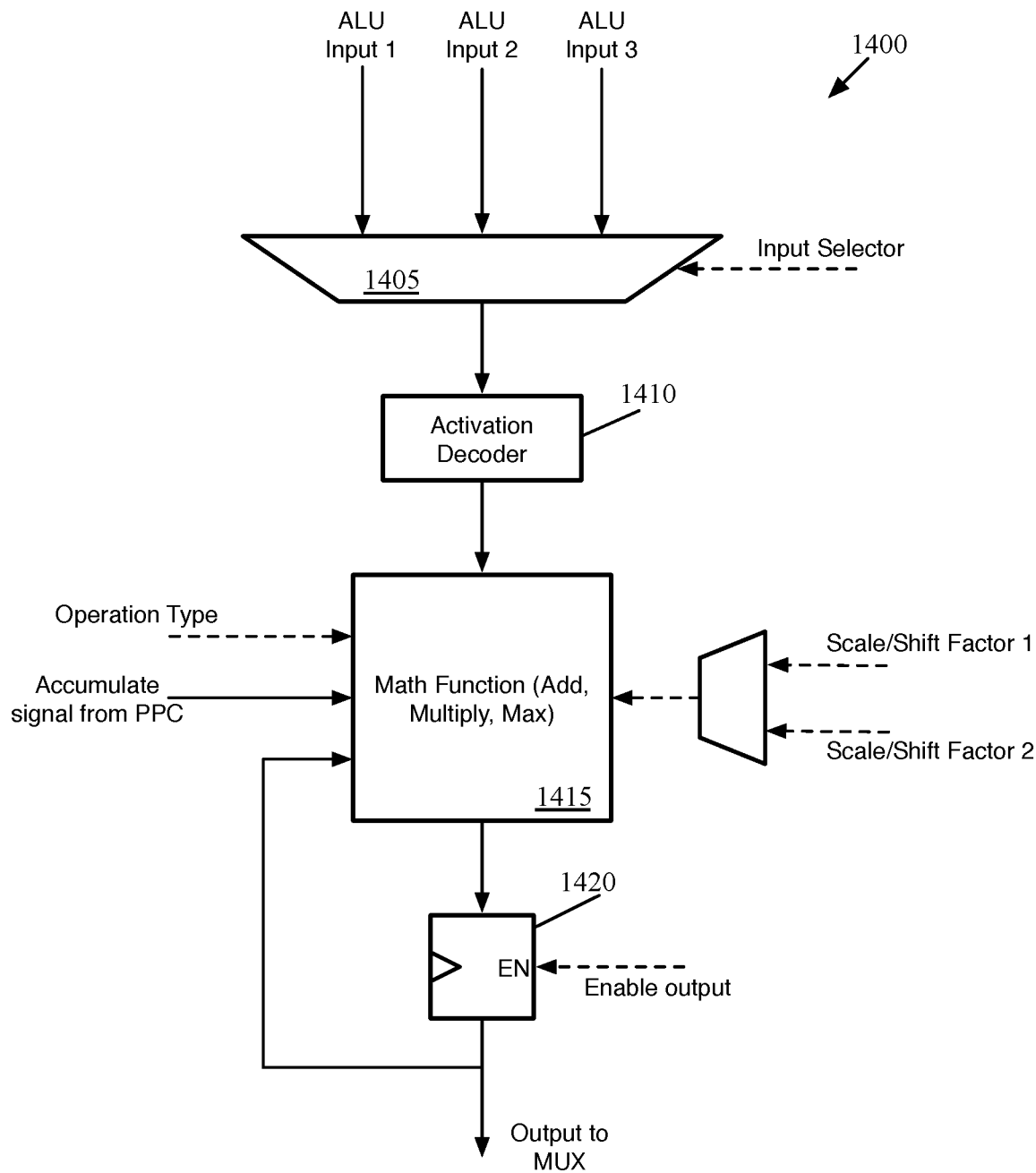
FIG. 14 conceptually illustrates an ALU input processing circuit of some embodiments.

As mentioned, FIGS. 12-14 illustrate the post-processing units in more detail. FIG. 12 conceptually illustrates the structure of a post-processing unit 1200 of some embodiments. As shown, the post-processing unit 1200 includes a dot product input processing circuit 1205, an ALU input processing circuit 1210, a multiplexer 1215 that selects between the outputs of these two circuits, and a set of post-processing operation circuits.

The dot product input processing circuit 1205, described in further detail by reference to FIG. 13, is used to combine dot products from two separate cycles if a dot product is too large to be computed in a single cycle across the cores of the computation fabric. In addition, if a particular filter slice needs to be split across multiple cores (because of too many non-zero weight values), the dot product input processing circuit is configured to account for that by using inputs from multiple dot product buses. Furthermore, some embodiments enable dot products to be double the size of the standard quantized output (e.g., 8-bit rather than 4-bit) by using dot products from multiple cycles and bit-shifting the first set of input data.

The ALU input processing circuit 1210, described in further detail by reference to FIG. 14, is used to perform operations for neural network nodes that do not use dot products (i.e., that are not part of convolutional or fully-connected layers). Neural network computation nodes that do not use dot products include, for example, pooling layers of convolutional networks (e.g., average pooling and max pooling layers) as well as nodes that perform element-wise operations. In some of these embodiments, the cores provide input values directly to the post-processing units without computing dot products, and the post-processing units are configured to perform the appropriate operations on these inputs.

The output of each of these circuits 1205 and 1210 is sent to a multiplexer 1215, and a set of configuration bits is used to select between these two possible inputs. This input value is sent to an adder 1220 and then to a multiplier 1225. For dot product outputs, the adder 1220 adds the bias of the linear function for the node and the multiplier 1225 multiplies this by the scaling factor for the linear function. The bias value sent to the adder 1220, in some embodiments, is a combination of (i) the bias value computed during the training of the neural network and (ii) a number of negative weight values. As described in more detail below, in some embodiments the weight values are ternary in each layer (i.e., either 0, a positive value, or a negation of that positive value). The partial dot product calculation in the cores treats these ternary weights as {0, 1, and −1}, and uses a ternary MAC circuit that performs one's complement addition to account for negative weights. The bias factor in the configuration data then accounts for the number of negative weights, to effectively turn the one's complement addition into two's complement addition.

Furthermore, for larger input and output values (e.g., 8-bit input and output values), in which the dot product input processing circuit 1205 left shifts the dot product of the most significant bits of the inputs (e.g., by 4 bits), the bias factor has to add a larger amount for the negative weights. For the 8-bit case (in which the dot product of the weights with the most significant nibble of the inputs is shifted by 4 bits), the bias factor adds 17 for each negative weight. The value sent to the multiplier 1225, in some embodiments, is a combination of (i) the scaler value computed during the training of the neural network (which is often 1) and (ii) the positive value of the ternary weight (which was removed in order to scale the weight values used in the dot product to 1 and −1).

In some embodiments, a multiplexer is used to select between a bias value specific to the post-processing unit (i.e., allowing for different bias values for different computation nodes in a layer) and a bias value shared across all of the post-processing units in a layer. In general, convolution and fully-connected nodes will use a node-specific bias value (especially when accounting for the number of negative weights), but pooling and element-wise operator layers may use the same value for all of the nodes (often zero). For the scaling factor, a set of multiplexers is used in some embodiments to select between a node-specific scaling value and two possible shared scaling values. In some embodiments, pooling layers will use the same shared scaling value for each node (e.g., to divide by the number of nodes over which average pooling is performed), but at the end of a row will need a different scaling value to account for padding.

The right bit shift operator 1230 ensures that, post-multiplication, the value has the desired precision (i.e., shifting the binary point). As an example, a number with three bits before the binary point and two bits after multiplied by a similar such number would result in a number with six bits before the binary point and four bits after. However, if a number with only two bits after the binary point is desired, the right bit shift removes the last two bits. In some embodiments, the right bit shift receives a set of configuration bits that map to different allowed precisions.

The truncator 1235 performs a clipping operation in some embodiments to truncate the output value of the linear operator down to the desired number of bits. In some embodiments, this can be a 4-bit value, a 5-bit value (a 4-bit signed value), an 8-bit value, or a 16-bit value. In such embodiments, the output has 16 wires, and values of less than 16-bits have 0s for the appropriate number of most significant bits. In other embodiments, the maximum output is 8 bits, in which case 4-bit, 5-bit, and 8-bit values are possible outputs. Different clipping operations that may be used, in different embodiments, can include a modulo operation (that effectively zeroes out a particular number of the most significant bits), clipping values above a maximum down to that maximum (e.g., if outputting a 5-bit value, all values above 15 are clipped down to 15 (1111), etc. In some embodiments, the truncator 1235 receives (as output from the right bit shifter 1230) more bits than it outputs (e.g., receiving 32 bits but outputting a maximum of 16 bits).

Finally, the LUT 1240 implements the non-linear activation function. The full (e.g., 16-bit, 8-bit) output of the truncator 1235 is passed to the multiplexer 1245, while a subset of the output bits (e.g., 5 bits) are also split off to the LUT 1245. This LUT effectively implements a mapping table representing the activation function for the neural network computation node, and the multiplexer 1245 selects between the truncator output and the LUT output. The LUT configuration, in some embodiments, is the same for all nodes in a layer, which only requires one set of mapping table values to be sent as part of the neural network instructions. The multiplexer output is the neural network node output, which is gated by a valid signal (not shown) to indicate when the post-processing unit is outputting a completed activation value to be carried by the activation write bus to the appropriate core and stored in the activation memory of that core.

The use of a LUT rather than a hardwired non-linear function enables the use of different non-linear activation functions for different layers of a neural network as well as for different networks. For instance, in addition to common activation functions such as the Rectified Linear Unit (RELU), periodic activation functions, etc. are possible. In some embodiments, the lookup table circuit receives a truth-table (e.g., a 4-bit to 4-bit or 5-bit to 4-bit mapping) as configuration data in order to implement the non-linear activation function. In some embodiments, periodic functions with can be implemented using the modulus function of the truncator 1235. In this case, the period of the period function is the full truth table provided to the lookup table 1240, with the modulus function meaning that only the 5 least significant bits of the output from the right bit shifter 1230 will affect the value output by the lookup table 1240.

FIG. 13, as mentioned, conceptually illustrates a dot product input processing circuit 1300 of some embodiments. As shown, the circuit 1300 receives the output of two dot product bus lanes (dot product input A and dot product input B). These inputs are each gated by AND gates 1305 and 1310, which use enable bits from the cluster controller to specify which dot product to use as input (or both), in certain cases. As mentioned above, in some embodiments each post-processing unit receives the output of a different corresponding dot product bus lane as its first dot product input (i.e., DP input A). That is, if there are N dot product bus lanes and N post-processing units in a cluster, then the nth post-processing unit receives its first dot product from the nth dot product bus lane. The second dot product input (i.e., DP input B) for each post-processing unit is from a different lane, as described in more detail below by reference to FIGS. 45 and 46

In this example, the activation size has the option of being either a first size (e.g., 4-bit) or twice that size (e.g., 8-bit). In the simplest case, in which (i) the dot product for a node has few enough input/weight values to be performed in one cycle, (ii) the activation size is the smaller size, and (iii) there are no sparsity violations with the filter slices assigned to each core, then the remainder of the circuit 1300 effectively acts as a pass-through for the first dot product input. The AND gate 1305 enables this first dot product input, while the AND gate 1310 gates the second dot product to 0. However, in other situations, the adder 1315, left-shift operator 1320, and adder 1325 enable the dot product calculation for a neural network node to be completed and provided to the other post-processing operations. In addition, the left shift circuit 1320 can also be used to align a dot product to ensure that the binary point is in the correct location for the input value. The operations of these circuits to compute more complex dot products are described further below.

In addition to these dot product operations, in some embodiments the post-processing units include additional circuitry for performing operations for neural network computation nodes that do not use dot products. As noted above, the nodes of some neural network layers use computations that do not include dot products. For example, a convolutional neural network will typically include pooling layers that reduce the number of activations by performing a computation on spatially-proximate groups of activations (i.e., the outputs of spatially-proximate nodes). Typical pooling operations include average pooling (reducing a group of activations to a single activation value by computing the average of the activations) and max pooling (reducing a group of activations to a single activation value by selecting the maximum value of the activations). Element-wise operations, in some embodiments, use inputs from multiple layers that are the same shape, and add or multiply the corresponding elements from those layers.

FIG. 14, as mentioned, conceptually illustrates an ALU input processing circuit 1400 of some embodiments. As shown, the ALU input processing circuit 1400 receives a set of ALU inputs (in this case 3) from an ALU bus that carries activation values directly from the cores. A multiplexer 1405 selects one of these inputs (based on configuration data from the local cluster controller). The selected input is sent to the activation decoder 1410, which sign-extends the input value into (adding an extra bit to this value). For instance, a 4-bit input activation would be sign-extended into a 5-bit value.

The math circuit 1415 is a set of circuit blocks that performs operations on a pair of operands. The first operand is the decoded ALU input from the activation decoder 1410, and the second operand is either a preset value or the previous output of the math circuit 1415. Some embodiments also subject the first input to a reverse shift and scale, if needed, to put this input in the same number system as the second operand. The shift and scale values are determined by configuration data from the cluster controller, which also provides data to the math circuit 1415 to indicate which of a set of possible operations the math circuit 1415 performs in a given cycle.

In some embodiments, the math circuit 1415 can be configured to perform addition (e.g., for both element-wise addition and average pooling), multiplication (e.g., for element-wise multiplication) and comparison (for maximum pooling). Each of these operations requires multiple clock cycles, as only a single input can be received each cycle. The register 1420 holds the previous output of the math circuit 1415 until that output is required as an operand for the next operation of the math circuit 1415, or the operation is complete and the value is sent to the other post-processing operations (as shown in FIG. 12).

Figure 15:
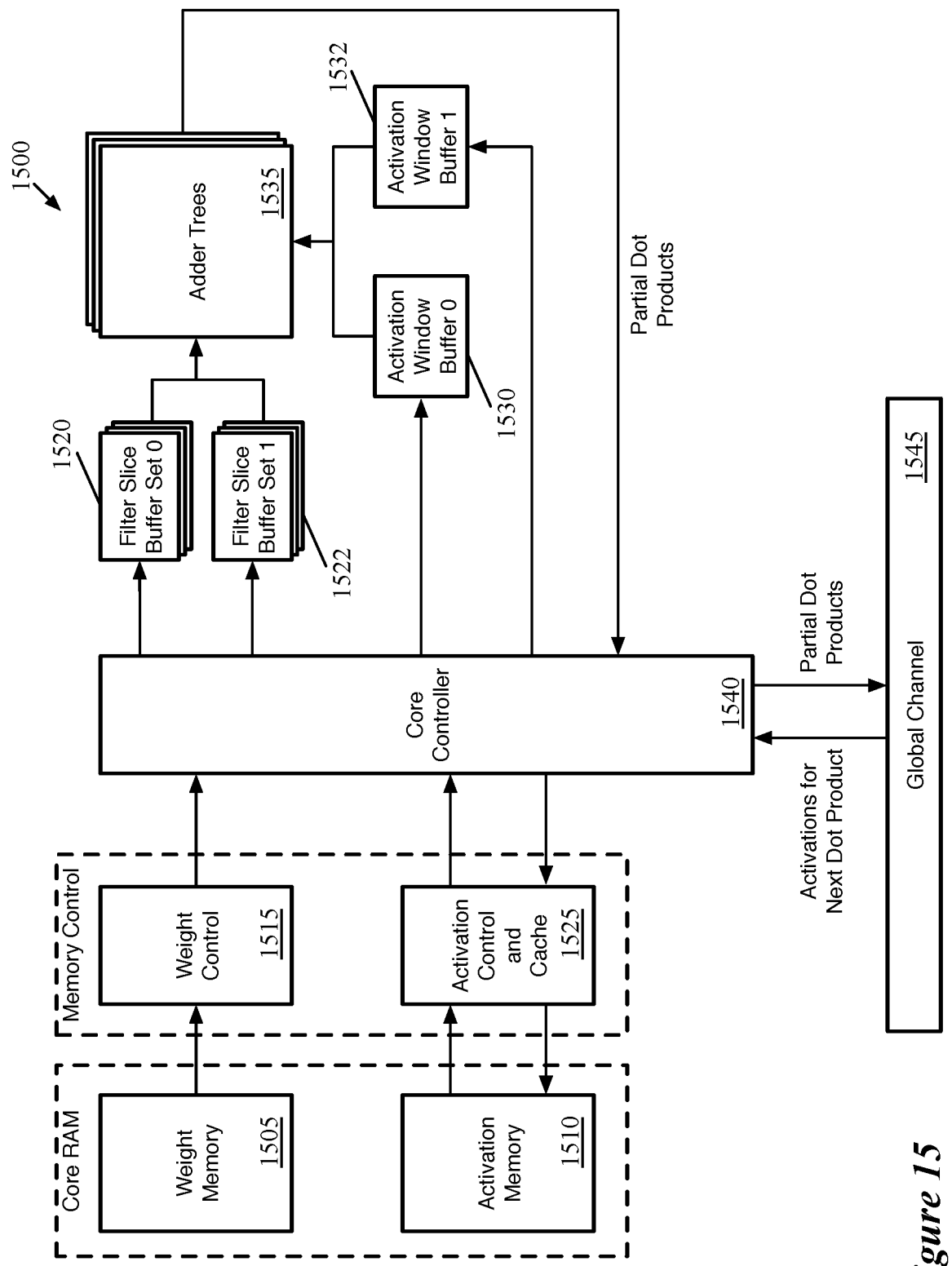
FIG. 15 conceptually illustrates the data flow within one of the cores of some embodiments for a dot product computation.

As mentioned, the dot product cores perform the majority of the dot product computation of the chip fabric of some embodiments. FIG. 15 conceptually illustrates the data flow 1500 within one of the cores of some embodiments for a dot product computation. This data flow will be described with certain specifics (e.g., weight and activation data sizes, number of separate adder trees simultaneously computing partial dot products, etc.) as examples, but it should be understood that different embodiments may use different sizes for weight data and/or activation values, different numbers of adder trees within a core, etc.

In some embodiments, the dot product cores store weight data values (e.g., weights for multiple nodes in multiple layers) in the weight memory 1505 and activation values in the activation memory 1510. In some embodiments, as shown, these memories 1505 and 1510 are part of a single block of memory for the core (e.g., banks of random access memories such as SRAMs). In addition to storing weight and activation values, in some embodiments the microprocessor of the IC can use the memories in the cores as overflow memory (e.g., to store an image before the image is processed and provided as input to the neural network fabric). The manner in which the weight data and activation values are stored in some embodiments is described in detail below by reference to FIGS. 19-21 and 29-30.

The weight values are part of the network parameters and thus are determined at compile time (and do not change at runtime), while the activation values (the input values to a particular node being computed) are the output values from a previous computation (or, for the first layer, are otherwise based on the network input) and thus are determined at runtime. Thus, the weight memory 1505 is typically larger than the activation memory 1510 (e.g., 512 KB to 64 KB), as the activation memory is at least party overwritten for each new layer of the neural network while the weight memory 1505 stores the weights for all of the dot product computations performed by the core. In some embodiments, the weights are stored as 1-bit or 2-bit values (e.g., all values stored as 2-bit values, or zeros stored as a single bit and negative/positive values stored as 2-bit 1/–1). In other embodiments, as described below, the weights are encoded in such a manner that less than 1 bit of the weight memory 1505 is allocated per weight value (e.g., by encoding the weight values in such a way that many of the zeros are removed, while storing additional data for each non-zero weight value).

The weight controller 1515 reads data from the weight memory 1505 into sets of filter slice buffers 1520 and 1522 that store the weight data to be used in the dot products. In some embodiments, as mentioned, a filter is a set of weights that is used to compute a dot product with a set of inputs (e.g., in order to identify a specific feature type within a portion of an image). Depending on the number of channels of the activation inputs, filters may be divided into multiple slices. Each filter, in some embodiments, is used repeatedly to compute dot products with numerous activation windows (e.g., contiguous sets of activation inputs). Some embodiments load data for 36 (or 40) weight values into each filter slice buffer, which are actually used to compute 144 dot product components (with the requirement that at least 75% of the weight values be zero, the actual adder tree only receives 36-40 inputs for each buffer of 144 activation values, as described in detail below).

Some embodiments include both primary filter slice buffers 1520 and secondary filter slice buffers 1522, as shown in this figure. In a given clock cycle, at most one of these sets of filter slice buffers is used to compute dot products (e.g., using multiplexers to select only one of the sets of weight value data). For simpler dot product computations, only the primary filter slice buffer 1520 is needed, so there is no need to load weight values into the secondary filter slice buffers 1522. However, in other cases, both sets of filter slice buffers may be used, as described below (e.g., when dot products are too large to be computed in a single clock cycle using only the primary buffers).

The activation controller 1525 reads data (input values) from the activation memory 1510 into the activation window buffers 1530 and 1532. In addition, the activation controller 1525 arranges the input values within the activation window buffer 1530 in some embodiments to match up with the weight values in the filters. In some embodiments, the input values in an activation window read into the buffer 1530 include all of the values (as opposed to the 25% of the values needed for a particular filter), because the activation window is multiplied by numerous filters simultaneously (i.e., some or all of the filters stored in the filter slice buffers). The input values, in some embodiments, are quantized to have a fixed size (e.g., 4 bits), or set of fixed sizes (e.g., 4 bits or 8 bits) for ease and simplicity of computation.

As with the sets of filter slice buffers, some embodiments include both a primary activation window buffer 1530 and a secondary activation window buffer 1532. In a given clock cycle, at most one of these sets of activation window buffers is used to compute dot products (e.g., using multiplexers to select only one of the sets of activation input values). For simpler dot product computations, only the primary activation window buffer 1520 is needed, so there is no need to load activation inputs into the secondary activation window buffer 1522. However, in other cases, both activation window buffers may be used, as described below (e.g., when dot products are too large to be computed in a single clock cycle using only the primary buffers). The operation of the activation control and cache 1525 and the activation window buffers 1530 and 1532 are described in greater detail below by reference to FIGS. 22-28. In some embodiments, the weight control 1515 and the activation control 1525 are actually a single circuit block that reads data from (and writes data to) the weight and memory partitions 1505 and 1510 of the core memory. In such embodiments, the cache may be used to store weight value data when reading the weights from the weight memory 1505. For each pass, this memory control circuit first reads the encoded weight data and provides this data to the core controller 1540 (which decodes weight data and loads the decoded weight data into the filter slice buffers), then reads input values and provides these values to the core controller 1540 (for the core controller to load the input values into the activation window buffer(s) interspersed with the computation of dot products by the adder tree circuits 1545).

The adder trees 1545 compute the dot products between the weight values represented in the filter slice buffers 1520 and the input values in the activation window buffer 1530. The details of these partial dot product computation circuits of some embodiments are described below by reference to FIGS. 16 and 17. These adder trees 1545 output partial dot products (e.g., 10-bit values) that are provided to the dot product bus, which combines the partial dot products with other partial dot products as described above. In some embodiments, the number of filter slice buffers in each of the sets 1520 and 1522 is equal to the number of adder trees 1535, dot product bus lanes, and post-processing units in each segment. Thus, for a typical neural network computation node, the partial dot products computed by the adder trees 1535 in multiple cores having a particular index are aggregated by the dot product bus lane with the same index and that aggregated dot product is provided for post-processing to one of the post-processing units with the same index (i.e., the post-processing unit with that index in one of the channel segments).

The core controller 1540 configures and coordinates the operation of the memory controllers 1515 and 1525 in addition to the filter slice buffers 1520, activation window buffer 1530, and adder trees 1535. Furthermore, the core controller 1540 receives the input activations and weights from the memory controllers 1515 and 1525, and loads them into the correct slots in the sets of filter slice buffers 1520 and 1522 and the activation window buffers 1530 and 1532 (or directs them to the ALU bus for non-dot product computations). Lastly, when the adder trees 1535 output their partial dot product values, the core controller 1540 sends these values to the dot product bus in the global channel 1545. When the activations for the next layer are output, the activation write bus carries these values to the core controller 1540, which provides them to the activation control 1525 to be written to activation memory 1510.

To reduce the circuit area and power required for dot product computations (which use the majority of resources for neural network inference), the partial dot product computation circuits (e.g., the adder trees 1535) of some embodiments map each of a first number of input values to a second number (e.g., 25% of the first number) of dot product inputs, such that each dot product input only receives at most one input value with a non-zero corresponding weight value. Specifically, in some embodiments, the partial dot product computation circuit includes at least two sets of wires for each input (activation) value, with each of the sets of wires for a given input value connected to at least two different dot product inputs (so that each input value can be provided to at least two different inputs). With a guarantee of at least 75% weight sparsity (i.e., at least 75% of the weight values for any set of input values are zero), the number of dot product inputs is set at 25% (or slightly more than 25%, for redundancy) of the number of input values loaded in an activation window for the dot product computation circuit. In some embodiments, the weight sparsity is guaranteed by the training algorithm used to train the weights to perform a specific purpose, and the IC is adaptable for any set of weights that meets the guarantee.

Figure 16:
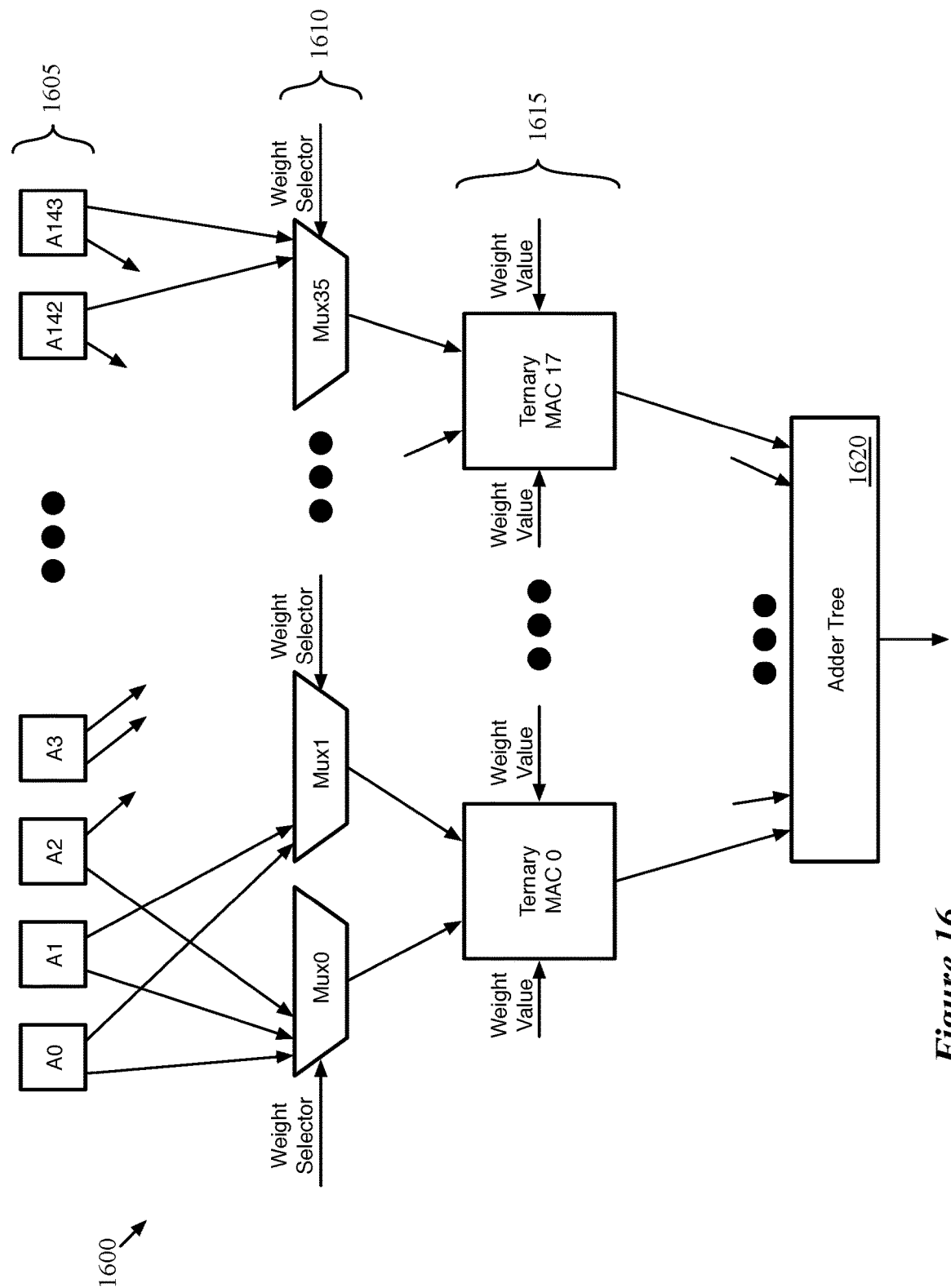
FIG. 16 conceptually illustrates an example of a partial dot product computation circuit for a guaranteed weight sparsity of at least 75%.

FIG. 16 conceptually illustrates an example of such a partial dot product computation circuit 1600 for a guaranteed weight sparsity of at least 75%. The wiring of the input values for this dot product computation circuit is designed to optimize the likelihood that, so long as the weights meet the sparsity requirement, the compiler can ensure that at runtime each input value with a nonzero corresponding weight value is provided to a different dot product input for nearly any arrangement of the nonzero weight values. As shown, the dot product computation circuit 1600 includes a set of activation inputs 1605, a set of multiplexers 1610, a set of ternary multiplier-accumulator (MAC) circuits 1615, and an adder tree 1620.

In this example, the dot product computation circuit 1600 includes 144 input values 1605. In different embodiments, the activation window buffer may have different sizes, which defines the size of the partial dot product computation. Each input value storage (e.g., each location in the activation window buffer) is connected to two of the thirty-six multiplexers 1610. In this example, at least 75% sparsity is assumed for each set of weight values, and thus the 144 activation inputs can be reduced to 36 inputs for the actual dot product computation. This significantly reduces the circuit area required for the dot product computation, as the number of adders is reduced by 75% (the adder tree effectively starts with 36 values rather than 144 values), in addition to reducing the amount of weight data that is stored in memory.

The multiplexers 1610 each have eight inputs and receive a set of select bits (the weight selector input) from the core controller that specifies which of these eight inputs to pass to the dot product computation. As described below, in some embodiments the weight selector input is a 3-bit value that is stored as part of the weight data for each non-zero weight. Having thirty-six 8-input multiplexers 1610 allows for 288 sets of wires from the activation inputs 1605 to the multiplexers 1610, which is two wires for each activation input. If the sparsity guarantee was only 50%, then seventy-two 4-input multiplexers could be used with two sets of wires for each activation input 1605 (or seventy-two 8-input multiplexers with four sets of wires for each activation input 1605), with similar proportions for different sparsity guarantees and numbers of wires per activation input.

The wire sets from the activation inputs to the multiplexers are arranged such that the compiler can verify that each input value with a nonzero corresponding weight is provided to a different one of the multiplexers 1610. The weight values are not known at the time of IC manufacture, and thus the wiring design is resilient to different arrangements of the nonzero weight values (that meet the sparsity requirement). Some embodiments use a cuckoo hashing algorithm (or other algorithm) to optimally map the wire sets from the activation inputs 1605 to the multiplexers 1610. In some embodiments, this algorithm computes two hashes (e.g., with two different hash functions) for each of the activation input locations 1605 that map to two different multiplexers 1610 (e.g., by computing the hash modulo 36). Each activation input location 1605 is wired to these two different multiplexers 1610 determined by the hashes. If one of the hash functions maps an activation input to a multiplexer that already has eight inputs, then some embodiments compute a third hash function for either that activation input or one of the activation inputs previously mapped to the multiplexer.

Other embodiments use other techniques to select the multiplexers to which each input value is wired, so long as each input is wired to two different multiplexers (and thus each multiplexer has input wires from eight different activation inputs). Additional constraints may be imposed as well, such as ensuring that no more than a specified maximum number of activation inputs are wired to the same pair of multiplexers. In addition, it should be understood that these techniques can be applied to dot product computation circuits with different numbers of inputs, different numbers of multiplexers, and different numbers of wires per input.

The weight values are known before the network is executed by the IC (i.e., at compile time), and thus the compiler can determine which of the two multiplexers that receive each input value with a non-zero corresponding weight at runtime will select that input value, such that each input value is selected by a different multiplexer (and only one multiplexer). In some embodiments, the compiler uses the same cuckoo hashing or other algorithm as was used for the wires. The select bits for the multiplexers 1610 are determined by which of the inputs to the multiplexer carries an input activation value with a nonzero corresponding weight value, and are received from the filter slice buffer. As described further below, these multiplexer select bits are stored for each non-zero weight value (for multiplexers that do not receive any inputs corresponding to non-zero weights, the multiplexer select bits do not matter, and thus do not need to be stored in the encoded weight data). These multiplexers 1610 provide their output to a set of ternary multiply-accumulator (MAC) circuits 1615. The ternary MAC circuits effectively form the leaves of the dot product computation, and the number of such circuits is half the number of multiplexers 1610 (18 ternary MAC circuits 1615 in this example).

In some embodiments, the weight values for a particular dot product computation are all either zero, a positive value, or the negation of the positive value in some embodiments. In this case, the dot product does not require any actual multiplication at the leaves of the computation, as the positive and negative weight values can be treated as 1 and −1, with a single multiplication by the positive value afterwards. Removing the multiplication at the leaves saves significant circuit area for a chip with numerous such computation circuits.

To combine the two input values while accounting for the ternary weight values, the ternary MAC circuits 1615 add the two input values from the multiplexers 1610 while also receiving as inputs the corresponding weight data for these input values. In some embodiments, as described further below, the ternary MAC receives two bits of weight data for each of its inputs. If both of the weights are positive, then the ternary MAC outputs the sum of the two input values (and outputs the negative of this sum if both of the weights are negative). If only one of the weight values is negative, then its corresponding input value is subtracted from the other input value (with a positive corresponding weight value), and if both of the weight values are zero, then the ternary MAC output is zero. Lastly, if only one of the weight values is zero, then the ternary MAC outputs the input value (or the negative of the input value) with the corresponding nonzero weight value. The negative values are accounted for in the bias computation within the post-processing unit, as described above. More detail regarding these ternary MACs is provided below by reference to FIGS. 35 and 36.

The outputs of the ternary MACs provide the inputs to the adder tree 1620 that computes the output for the partial dot product computation. In some embodiments, this adder tree is a standard adder tree circuit that adds pairs of values over several layers. For example, the adder tree 1620 receives 18 inputs for 9 adders, which in turn provide outputs to 4 adders (with an additional output to be added in later), etc. In some embodiments, the inputs to the ternary MACs 1615 are 4-bit inputs (the length of the quantized activation values), and the ternary MACs 1615 output 6-bit values. The adder tree 1620 receives these 6-bit values and outputs a 10-bit value after several stages of addition. It should be noted that this description refers to handling of signed 4-bit input values. Some embodiments can also handle unsigned input values by converting them to signed input values before performing the addition operations. For example, some embodiments output and store 4-bit outputs, which can be signed or unsigned. Before performing the addition operations, an additional bit is added that either sign-extends (to convert signed 4-bit inputs to signed 5-bit inputs) or 0-pads (to convert unsigned 4-bit inputs to signed 5-bit inputs).

While this diagram shows the wires (or some of the wires) connecting each of the input values 1605 to a single partial dot product computation circuit, in some embodiments each of these input values 1605 in the activation window buffer is actually connected to each of the partial dot product computation circuits in the core. That is, for the case with 64 such circuits, each value in the activation slice register is carried by 128 total wires to 128 multiplexers (two for each of the partial dot product computation circuits). In some embodiments, the wiring arrangement is the same for each set of multiplexers (i.e., for each partial dot product computation circuit).

Figure 17:
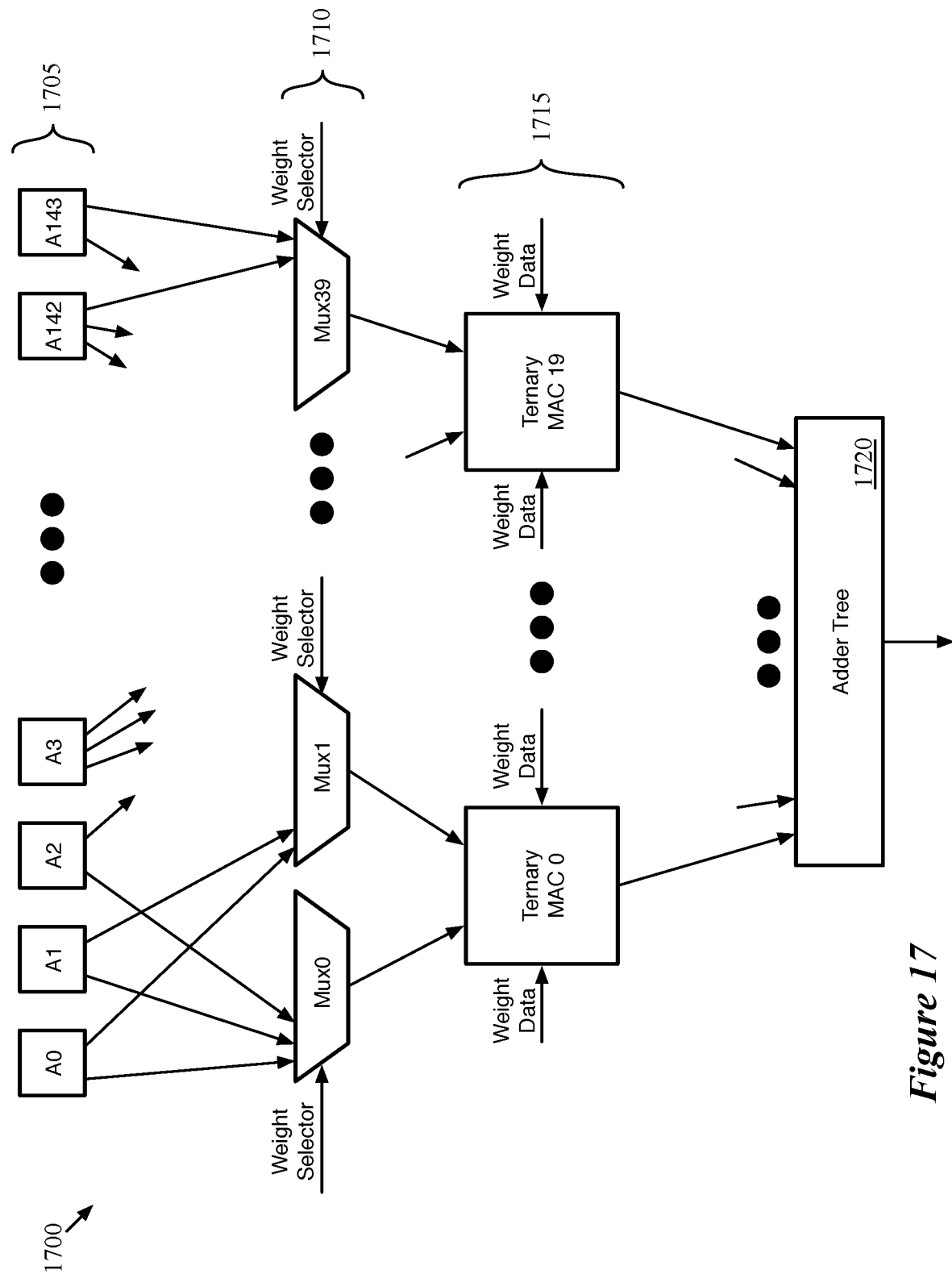
FIG. 17 illustrates a partial dot product computation circuit with redundant multiplexer inputs.

As mentioned, for redundancy, some embodiments use a number of dot product inputs (i.e., multiplexers) that is slightly more than required by the sparsity guarantee for the dot product computation. For instance, in the example above, rather than using 36 inputs (exactly 25% of the 144 input values), some embodiments use 38 or 40 inputs. FIG. 17 illustrates a partial dot product computation circuit 1700 with redundant multiplexer inputs. The partial dot product computation circuit 1700 is structured in the same manner as the circuit 1600, and includes 144 activation inputs 1705, a set of forty multiplexers 1710, a set of twenty ternary MAC circuits 1715, and an adder tree 1720.

The difference between the circuit 1600 of FIG. 16 and the circuit 1700 is that the latter includes additional multiplexers 1710 (in this case, four) and thus additional ternary MACs 1715 (in this case, two). In addition, in some such embodiments, a subset of the input values are wired to three of the dot product inputs rather than two. In this example, the four additional multiplexers allow for thirty-two of the activation inputs to be wired to three of the multiplexers rather than just two. For instance, the fourth activation input value 1705 (A3) includes three wire sets connecting to three different multiplexers 1710, as does the 143rd activation input value (A142). These additional wires provide the compiler with more options for mapping the input values with nonzero corresponding weights to the multiplexers, and thus make this mapping process easier at a small cost in terms of overall circuit area.

Figure 18:
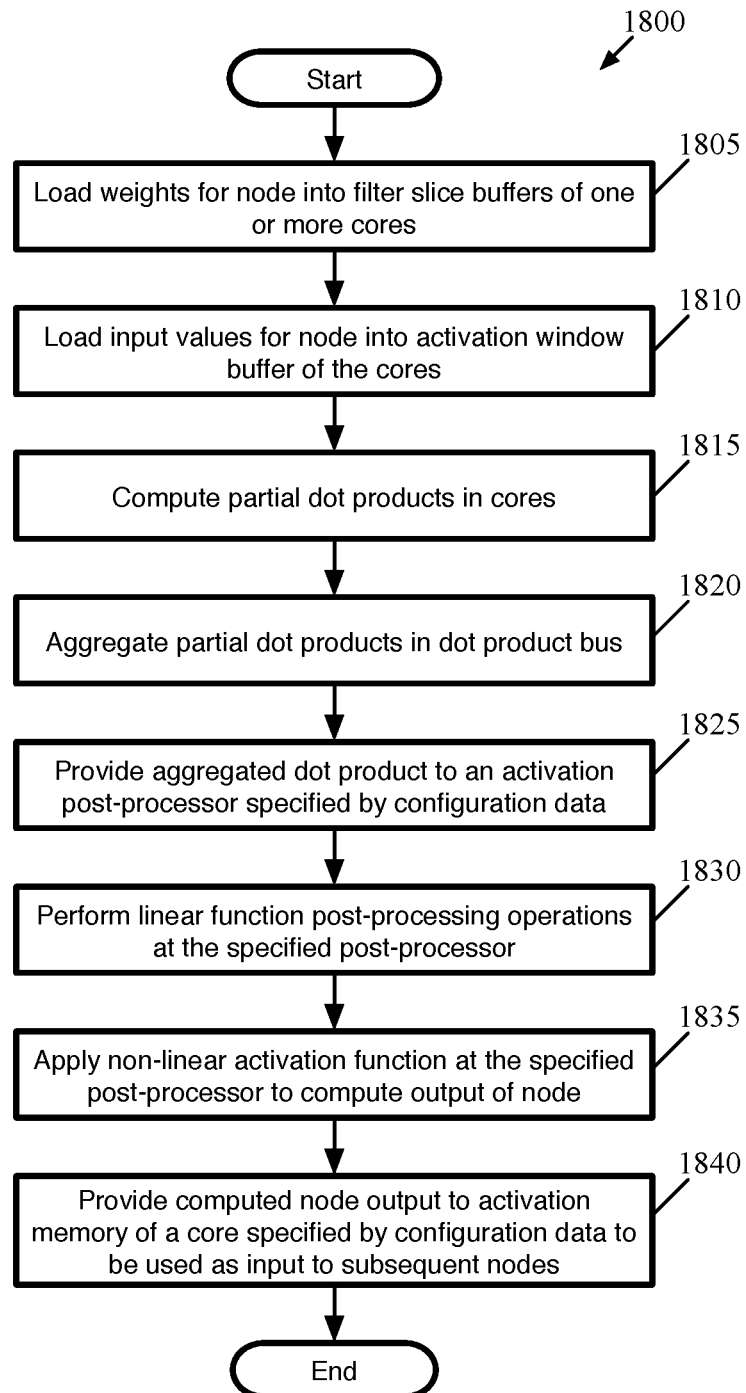
FIG. 18 conceptually illustrates a process of some embodiments for executing a set of instructions (or a portion of a set of instructions) to compute the output of a neural network node.

FIG. 18 conceptually illustrates a process 1800 of some embodiments for executing a set of instructions (or a portion of a set of instructions) to compute the output of a neural network node (specifically, a convolutional or fully-connected node). The process 1800 is executed by the chip fabric of a neural network IC, such as that described above. Typically, the process 1800 is executed simultaneously for multiple nodes, and operations 1810-1840 are performed repeatedly for multiple activation windows (i.e., multiple groups of input values loaded into the activation window buffer) in order to completely execute a layer (or portion of a layer) of the neural network. In the case of the process 1800, the dot product can be computed in a single cycle and does not involve any split filter slices (i.e., no time-multiplexing is required). Additional processes are described below for nodes that involve large dot products, larger input values, or split filters.

As shown, the process begins (at 1805) by loading the weights for a node into filter slice buffers of one or more cores. In addition, the process loads (at 1810) the input (activation) values for the node into the activation window buffer of these cores. In some embodiments, a set of input values are loaded into one activation window buffer in a core while the weight data for several nodes are loaded into several filter slice buffers of the core. Other embodiments load the weight data into the filter slice buffers first, then load the input values into the activation window buffer. Furthermore, some embodiments load the weight data once for a pass (that computes outputs for many activation nodes), then iteratively load sets of input values and compute dot products for numerous nodes without the need to re-load the weight data. In addition, the weights and activations for a node, in some embodiments, are divided among the filter slice and activation window buffers of all of the cores that are active for the current set of instructions. The storage of the weight and activation values and loading of these values into the filter slice buffer and activation window buffer, respectively, are also described in greater detail below.

The process 1800 then computes (at 1815) partial dot products in the cores. As described above, the activation values loaded into the activation window buffers in each of the active cores are multiplied by their corresponding weight values loaded into the filter slice buffers of these cores. In some embodiments, the size of the partial dot products is reduced using the wiring structure shown in FIGS. 16 and 17, and with ternary weight values of {0, 1, −1}, the multiplication is handled by the ternary MAC circuits shown in this figure.

Next, the process aggregates (at 1820) these partial dot products in the dot product bus. In some embodiments, the partial dot products for a particular node are calculated by the adder tree with the same index (i.e., out of several adder trees) in each of the active cores, and thus these partial dot products are all passed to the same corresponding lane of the dot product bus (which has one lane for each of the adder trees in a core). In some embodiments, the final aggregation is performed by the dot product bus lane in the channel segment of the post-processor selected for the particular node.

The process 1800 then provides (at 1825) the aggregated dot product to an activation post-processor specified by configuration data. This configuration data, in some embodiments, is generated by a compiler and parsed by the hierarchical controller circuits of the neural network chip fabric, and indicates which channel segment will perform the post-processing. Each of the channel segments has an equal number of post-processing units, and the post-processing unit in the selected channel that corresponds to the dot product bus lane that aggregates the dot product is the post-processing unit that receives the aggregated dot product.

At the post-processing unit that receives the aggregated dot product, the process 1800 performs (at 1830) linear function post-processing operations. For all dot products, this includes the bias and scale operations described by reference to FIG. 12 above, with the values for these operations sent as configuration data from the cluster controller. In addition, as described below, certain dot products are aggregated over multiple cycles by the dot product input processing circuit shown in FIG. 13 (e.g., if time-multiplexing is required to handle dot products with a large number of components, or for dot products with double the standard number of bits).

Next, the process 1800 applies (at 1835) the non-linear activation function at the post-processing unit to complete the calculation of the node output value. In some embodiments, as shown in FIG. 12, a lookup table is used for this computation (e.g., a 5-bit to 4-bit mapping table). The mapping for each possible set of input bits is provided by configuration data from the cluster controller in some embodiments.

In some embodiments, the operations 1815-1835 are executed to compute the node output without storing the any intermediate values in memory. That is, none of the partial dot products are stored in any memories (e.g., RAM) during the computation within the core, and the same is true before and during the aggregation within the dot product bus. As described below, in some embodiments, the register 1330 is used to aggregate multiple dot product bus inputs. However, in a standard case (e.g., for 4-bit dot products), this register passes the dot product input through and the entire set of operations 1815-1835 is executed in a single clock cycle.

Finally, the process 1800 provides the computed node output to the activation memory of one (or more) of the cores as specified by the configuration data, so that this output can be used as the input to a subsequent set of neural network nodes. In some embodiments, the node output value is carried to the specified core by the activation write bus, with the core index for the value specified by the cluster controller(s).

As mentioned, the process 1800 illustrates the most simplistic case for computing a dot product. For this simplest type of dot product computation, the neural network computation circuit of some embodiments places the following restrictions on the computation: (i) all of the input values should be of the specified discrete size (e.g., 4 bits), (ii) the maximum number of input values is the size of the input buffer multiplied by the number of cores (e.g., 144 inputs×16 cores=2304 total input values), (iii) all of the weight values are either 0, +α, or −α (and thus can be stored as 0, 1, and −1), and a large enough percentage of the weight values are 0 that the input values with non-zero weight values can each map to a different multiplexer input. Solutions for handling the cases when these requirements are not met are described in greater detail below.

As mentioned above by reference to FIG. 15, each core includes a block of memory to store the weight data and activation values used by the core to compute dot products (i.e., the activation values that are loaded into the activation window buffer and the weight data that is loaded into the filter slice buffers). In some embodiments, each core is allocated the same amount of memory in total, which is divided between weight memory and activation memory for a particular network by the compiler that designs the program for the inference circuit to execute the network. Some embodiments require that each core be divided between weight memory and activation memory in the same manner (i.e., the allocation of weight/activation memory to each core is the same for all of the cores), while other embodiments allow for different allocations between the cores. For example, in some embodiments the allocation is the same for each core within a cluster, but can vary between cores in different clusters (e.g., if a subset of cores are used for a majority of the layers of the network, then that subset of cores might need more of its memory allocated to weight data storage.

Within a core, the weight memory and activation memory partitions are themselves subdivided between layers of the network. As described above, all of the weight data used by a core is stored in the memory of that core at bootup time, because these values are the same for every input provided to the network. On the other hand, the activation values are determined at runtime (and occupy more memory per value than the weight data), so the cores do not store all of the activation values at a time. Depending on the type of network, only two layers of activations may need to be stored at once (the input activation values for the current layer being executed as well as the output activation values for that layer). In this case, once layer L is being executed (using the layer L activations as inputs and outputting the layer L+1 activations), the circuit can overwrite the layer L−1 activations. On the other hand, if a network has residual connections (i.e., the output activations from layer L are used as inputs for more than just layer L+1), then more than two layers of activations may need to be stored at once.

Figure 19:
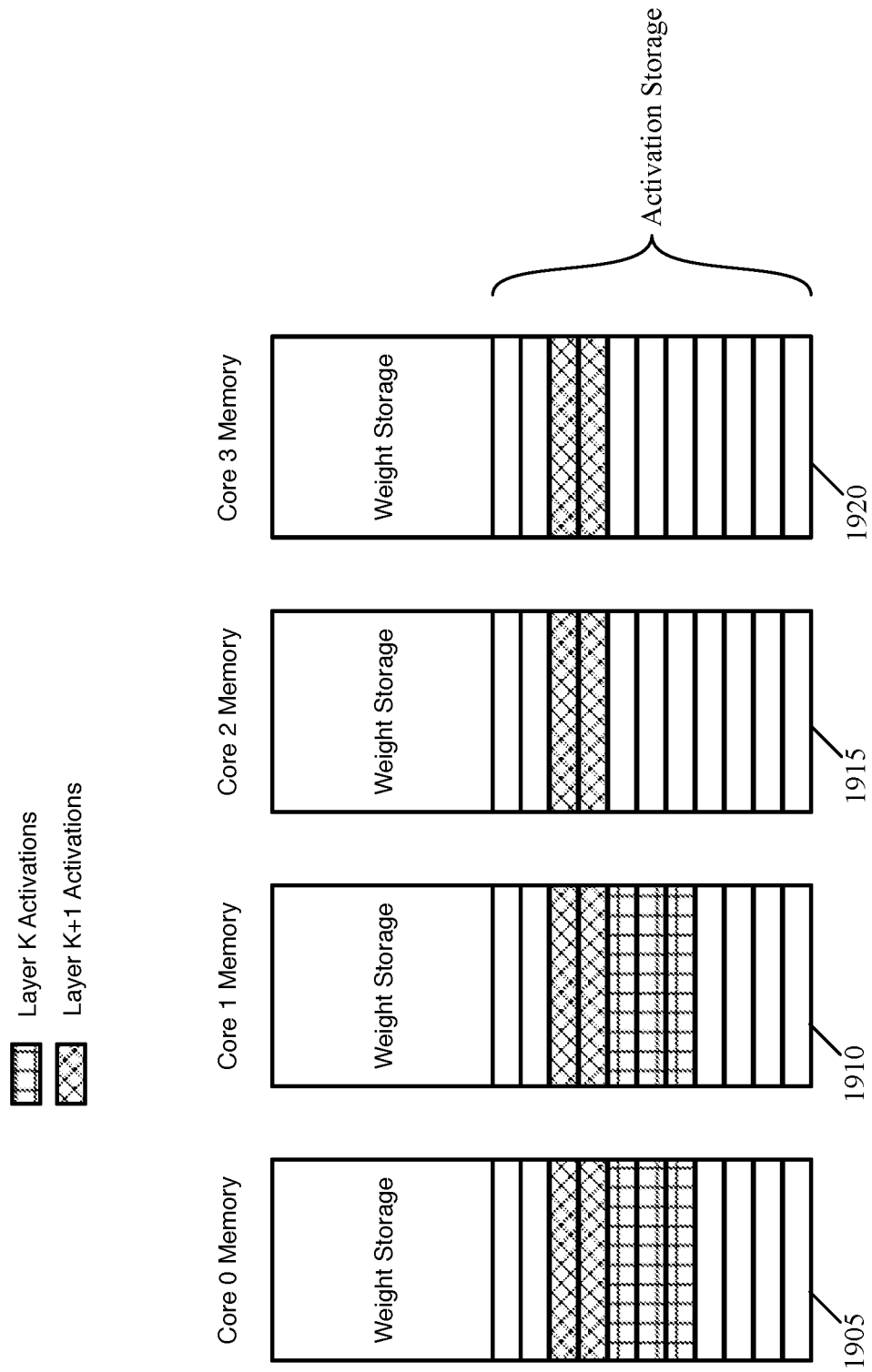
FIG. 19 conceptually illustrates the assignment of layers of activations to memories of four cores within a cluster.

FIG. 19 conceptually illustrates the assignment of layers of activations to memories 1905-1920 of four cores within a cluster. In this example, each of the cores is partitioned into weight storage (shown in the figure as a single block) as well as activation storage (shown as blocks of memory). Each of the blocks within the activation storage represents a set of memory locations (e.g., RAM words) in some embodiments. Though the figure shows a small number of such blocks within each core memory 1905-1920, it should be understood that a typical neural network computation circuit will have thousands of RAM words per memory. In addition, although the activation partition is larger than the weight partition in these examples, the weight partition will often be the larger partition because all of the weight values are stored in the memories at boot time.

The figure illustrates (using different types of cross-hatching) the memory portions allocated to the activation values (i.e., input activations) for each of two layers (layer K and layer K+1). In this example, the activations for layer K are divided across the memories 1905 and 1910 for two of the cores (meaning that only these two cores participate in the dot product calculations for this layer), whereas the activations for layer K+1 are divided across the memories 1905-1920 for all four illustrated cores. For each of the layers, the first RAM word storing activations for that layer is aligned to the same memory address (i.e., the first activation for the layer stored in each core starts at an equivalent memory location within the respective core). In addition, the first activation for a layer starts at the beginning of a RAM word (i.e., the least significant bit in the word) in some embodiments.

In some embodiments, the activation values for a layer are divided evenly among the cores storing the activations for that layer (or as close to evenly as possible). Some embodiments require that the number of cores for a layer is a multiple of the number of cores in a cluster (e.g., a multiple of four for the chip fabric shown above in FIG. 5). Other embodiments simply impose the requirement that the number of two-dimensional activation grids assigned to each core is equal (or as close to equal as possible). Referring to the three-dimensional structure of a layer of activations shown in FIG. 2, each two-dimensional grid of activations is assigned entirely to a single core. As such, if the number of activation grids is not evenly divisible by the number of cores to which those activations are assigned, then some of the cores will be assigned more of the actual activation values than other cores. However, some embodiments assign zero-grids (i.e., grids of activation values equal to zero) to make up the difference and even out the number of activations in each core for the layer. In other embodiments, rather than specifically ensuring the activation values are all zero (which would require generating one or more extra activation value grids of zeros and loading these values into the RAM each time the network is executed), the compiler ensures that the corresponding weight values stored in the weight memory are all zero, such that the data used for these activation value grids does not matter).

In addition, as shown in FIG. 19, all of the activation values for a layer are assigned to a contiguous block of each core's memory. As described further below, in certain cases, a portion of a RAM word may be zero-padded (or left with unverified data that is not used in the computations for the layer) within this contiguous block of memory.

Figure 20:
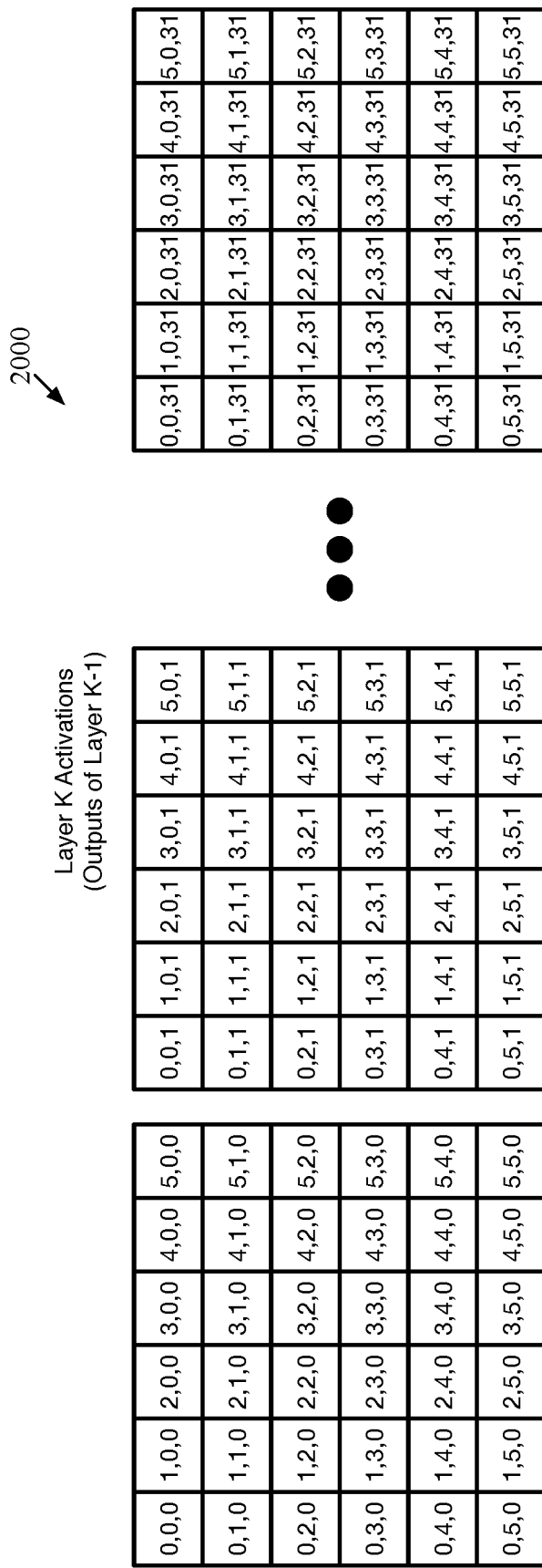
FIG. 20 conceptually illustrates a layer of activation values.
Figure 21:
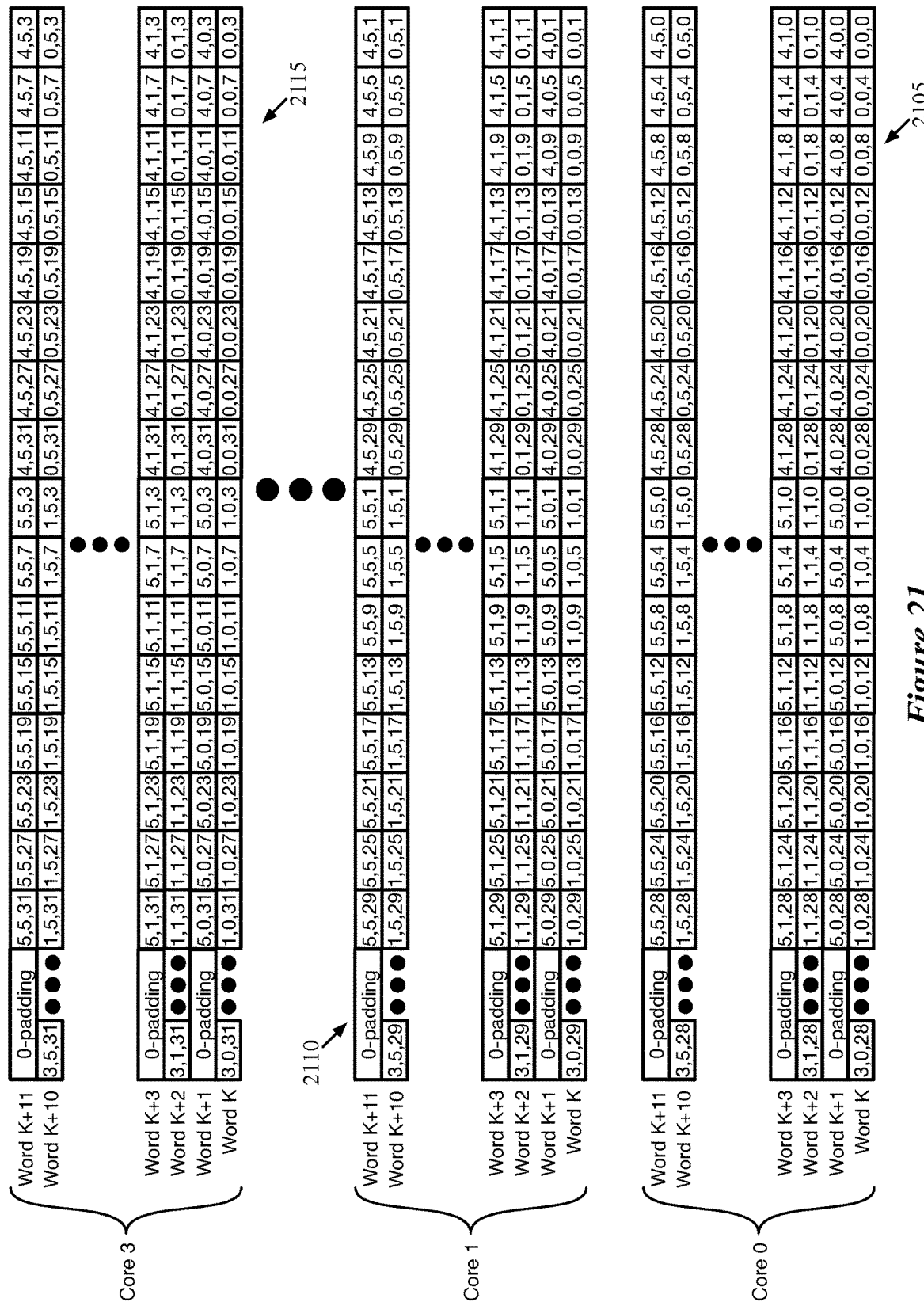
FIG. 21 conceptually illustrates the arrangement of the activation values of FIG. 20 among the memory of four cores.

FIG. 20 conceptually illustrates a layer of activation values 2000, and FIG. 21 conceptually illustrates the arrangement of these activation values 2000 among the memory of four cores. As shown in FIG. 20, the layer K activation values are structured as a 6×6×32 layer (i.e., 32 6×6 grids, meaning that the previous layer most likely had 32 filters). Each activation value in the layer is labeled with a three-dimensional (x, y, z) coordinate. The x-coordinate refers to the column to which the activation belongs (0-5), the y-coordinate refers to the row to which the activation belongs (0-5), and the z-coordinate refers to the grid to which the activation belongs (0-31). Each of these activations will have different values depending on the input data provided to the network, but the activation value at a given coordinate will be stored in the same location in the core memories each time the network is executed.

FIG. 21, as mentioned, illustrates the arrangement of the activation values 2000 according to the activation storage rules of some embodiments. In this case, the compiler determined that the activation values 2000 of Layer K will be stored in four cores of the neural network computation fabric (Cores 0-3). The memories 2105-2115 of each of the cores include numerous banks of RAM in some embodiments, divided into words that can each be read from or written to individually. These words may have different lengths in different embodiments; in this example, the words are each 128 bits long. Thus, if the activation values are each 4-bit values (as is the case in some embodiments), then a single word can hold 32 activation values. When larger 8-bit activation values are used, then a single word holds 16 activation values. In the figure, each word is shown with the least significant bits on the right, which will be referred to as the "start" of the word. Thus, the rightmost 4 bits (least significant nibble) of each word holds the first activation value of the word. In addition, the words are ordered, with this example showing the first word in each core (or at least the first word for the illustrated layer of activation values) at the bottom of the diagram.

To optimize the use of the core memory as well as the efficiency with which the activation values are read from the core memory, some embodiments organize the activation values in the memory according to a set of defined rules (which are shown by way of example in FIG. 21). As mentioned, each two-dimensional grid of activation values is assigned entirely to a single core. In this example, grids {0, 4, 8, . . . 28} are assigned to Core 0, grids {1, 5, 9, . . . 29} are assigned to Core 1, grids {2, 6, 10, . . . 30} are assigned to Core 2, and grids {3, 7, 11, . . . 31} are assigned to Core 3. The compiler may use different algorithms to assign grids of activation values to different cores in some embodiments, so long as the grids are assigned evenly (or as close as possible to evenly) to the cores.

The activation values within a core are not necessarily arranged with all of the activation values of a grid stored contiguously. Instead, within each core, some embodiments store all of the activations for a particular coordinate (i.e., an x-y coordinate) within the grids assigned to that core in a contiguous block. For a typical convolution, all of the activation values at a particular (x,y) coordinate will be used for dot product computations at the same time, so storing these values contiguously helps minimize resources used (and latency) for loading the activation values when computing the dot products for a layer.

As shown, the activation memory for layer K in each core starts with the activations at (0,0) for all of the grids assigned to that core. In this case, eight grids of activation values are assigned to each of the four cores (the 32 grids are evenly divisible by 4, so no zero-grids are required). Thus, the first eight values of the first word in each core (designated as word K) are the activations with (x,y) coordinates of (0,0). In some embodiments, if there are more grids assigned to a core than the number of activation values that a memory location (i.e., a RAM word) can store, then these are split up into separate sets of activations, and only a single word worth of activation values at the same coordinate are stored contiguously. That is, if 35 grids of activation values were assigned to Core 0, then only the first 32 activation values would have coordinates of (0,0). Those first 32 grids would be stored as a contiguous block that iterates through each (x,y) coordinate, followed by the remaining 3 grids of activation values (stored in the same way, iterating through each (x,y) coordinate).

Within the memory 2105-2115 of each core, the first 8 activation values are those located at coordinate (0,0). Next, the algorithm for activation value storage moves to the activation values coordinate (1,0)—that is, the x-coordinate is incremented as the next value in the same row of each grid is stored. This proceeds until the end of the current row is reached (i.e., the activation values with coordinate (5,0)). In some embodiments, once the end of a row in the activation grids is reached, the remainder of the current RAM word is 0-padded. As shown in the figure, this means that the last half (64 bits, or 16 activations) of word K+1 (as well as words K+3, K+5, etc.) in each of the memories 2105-2115 is 0-padded (or padded with unverified data that is never loaded into the activation window buffer). This pattern (arranging the activation values in row-major order) is repeated for each row of activation values in the grids assigned to a given core.

As will be described below, when loading the activation values as inputs to dot product computation, upon reaching the end of a row of the activation grids, the core memory controller returns to the start of the next row, and the activation values from the end of the previous row are not reused. The use of 0-padding (rather than starting the next row of activation values in the same RAM word) avoids the need to read multiple words when starting a new row of convolutional layer computations (which would require additional clock cycles).

As a result of this activation storage algorithm, a given memory location in one source core for a layer will store activations for the same x-y coordinates as that memory location in any of the other source cores. For example, the tenth activation in RAM word K+1 of Core 0 is the activation for coordinate (5,0) in activation grid 4. Correspondingly, the tenth activation in RAM word K+1 of any of the other cores is also an activation for coordinate (5,0), in different activation grids.

The weight values are stored in a similar manner, in some embodiments, with certain differences. Just as activation values for a layer are divided across multiple cores (and, specifically, the activation values for each particular dot product in a layer are divided across the multiple cores), the weight values for each filter in a layer also divided across these same multiple cores. Over the course of a convolutional layer, a particular weight value in a filter is multiplied by numerous activation values, all of which are in the same activation grid. As such, each weight value is stored in the same core as the activation grid that contains the activations by which that weight value is multiplied. However, in some embodiments, the length of each filter slice may be different, even within a single layer, due to the different number of non-zero weight values. That is, even if a filter slice buffer always has 36 (or 40) weight values, the amount of memory required to store those weight values may differ depending on the number of non-zero weight values.

As mentioned, arranging the input activation values for a layer in this manner enables optimized use of these activation values for computing dot products of the various computation nodes of a layer. Specifically, the arrangement (and use of a cache for words that are read but not fully loaded into the input buffer) enables the cores to load the values into the activation window buffers while minimizing the number of memory reads that are required. In addition, the buffer in each core is implemented as a configurable shift register, so that activation values do not need to be re-loaded between subsequent sets of dot product computations.

Figure 22:
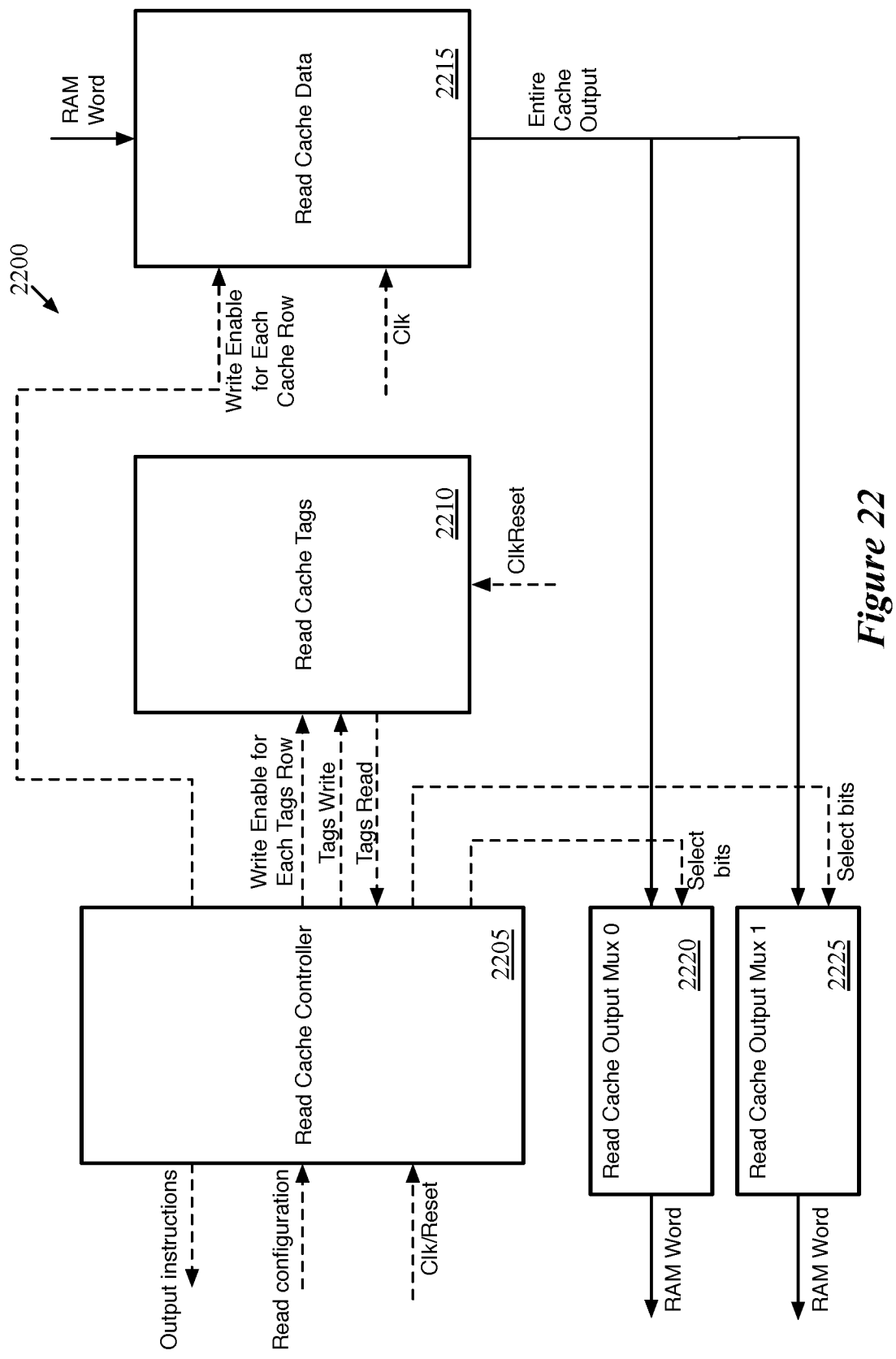
FIG. 22 conceptually illustrates the structure of an activation read cache of some embodiments.

FIG. 22 conceptually illustrates the structure of a read cache 2200 of some embodiments. In some embodiments, the read cache 2200 is a sub-block of the memory control circuit (e.g., the activation memory controller 1525 of FIG. 15). In some embodiments, the read cache 2200 is used for reading both weight data into the filter slice buffers and activation data into the activation window buffer of a core. As shown, the read cache 2200 includes a cache controller 2205, a tags block 2210, a data block 2215 (the cache storage), and output multiplexers 2220 and 2225.

The cache controller 2205 receives read configuration data, which in some embodiments includes some or all of one or more memory addresses for data to be fetched (e.g., one or more addresses in the core RAM for data to be fetched), a read enable bit, a clear bit (to clear the cache), one or more mode bits (indicating in which of at least two possible modes the cache is currently operating), and data indicating whether the read data abuts or crosses a RAM word boundary. In addition, the cache controller 2205 receives clock and reset bits. As output (e.g., to other circuit blocks of the memory controller), in some embodiments the cache controller 2205 provides instructions data regarding read operations from the core memory and whether to read data from the cache data block 2215 (and in which row of the cache this data is found).

The cache controller 2205 receives one or more requested memory addresses (generated based on the read configuration data) and compares this with the memory addresses of the data stored in the cache, received from the tags block 2210. In some embodiments, when the cache is operating in a first mode for reading memory locations in order (e.g., when reading from weight memory to load weight data into the filter slice buffers), the cache controller 2205 performs two comparisons. On the other hand, when the cache is operating in a second mode that allows for reading RAM words out of order (e.g., when loading activation values for a typical convolutional layer), the cache controller 2205 performs only one comparison. When the data is already stored in the cache, the cache controller 2205 instructs the data block 2215 to output that data by providing a cache row number. Otherwise, the cache controller outputs a bit to initiate a read request from the core RAM, along with the required memory address. In some embodiments, if the requested activation data wraps across two RAM words, the cache controller 2205 outputs the incremented memory address (with the bit initiating a read request) as well as the cache row storing the matching RAM word.

The tags block 2210 stores the memory addresses (i.e., core RAM addresses) of the data stored in the data block 2215. When the contents of a memory address are written into the data block 2215, the cache controller 2205 also writes this address to the tags block 2210 (for use in later comparison operations, when a memory address is requested). As such, the tags block 2210 stores the same number of entries as the cache data block 2215, but with fewer bits. The tags block 2210 also stores one additional bit for each row, indicating whether the address data in that row is valid (the cache can be reset by setting all of these bits to the same value that indicates that the data is not valid). In some embodiments, each of these blocks is implemented as a group of registers. When instructed to by the cache controller 2205, the data block 2215 stores a RAM word read from the core memory (the write enable bit specifies which row of the cache will store this RAM word). The data block 2215 outputs its stored data to the output multiplexers 2220 and 2225.

The output multiplexers 2220 and 2225 can each output one of the rows of activation data from the data block 2215, when instructed by the cache controller 2205. The select bits from the cache controller 2205 specify, in some embodiments, which of the cache data rows are to be output by each of the multiplexers. In some embodiments, these two outputs, as well as a RAM word from the core memory, are merged by a separate circuit block of the memory controller and provided to the filter slice buffer or the activation window buffer (both of which are described below), depending on whether weight data or activation values are being read from memory. In some embodiments, the second output is used when the cache is operating in the mode for reading continuously-increasing RAM words (e.g., for weight data). Otherwise, such embodiments only output one RAM word from the cache at a time. In addition, when the merge circuit block merges activation values from the cache with activation values from a RAM word read from the core memory, some embodiments delay the output of the cache row by the latency required for the memory read operation (e.g., 5 clock cycles). This merge circuit block then shifts and merges the data as needed to provide the required set of data to the core controller (for provision to either the filter slice buffers or the activation window buffer). If the amount of data in a given cycle is less than a full RAM word (e.g., the amount of weight data or number of activation values is less than a full RAM word), in some embodiments this merge circuit block aligns the required data (e.g., weight information or activation values) such that there are no gaps within the data.

Figure 23:
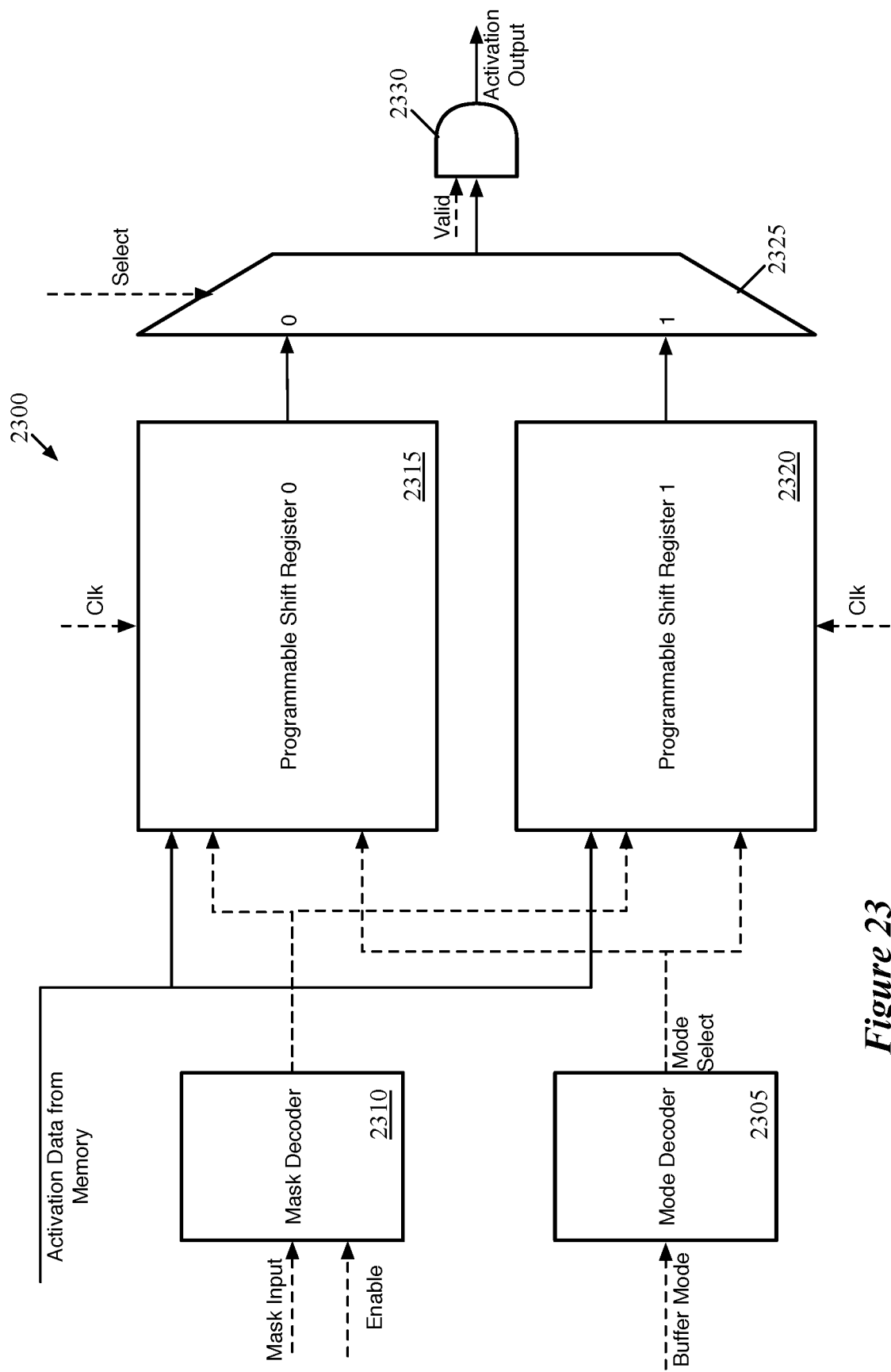
FIG. 23 conceptually illustrates the structure of an activation window buffer of some embodiments.

FIG. 23 conceptually illustrates the structure of an activation window buffer 2300 of some embodiments. As shown, the activation window buffer 2300 (i.e., collectively, the buffers 1530 and 1532 of FIG. 15) includes a mode decoder 2305, a mask decoder 2310, two programmable shift registers 2315 and 2320, a multiplexer 2325, and an AND gate 2330. The two programmable shift registers 2315 and 2320 correspond to the primary and secondary activation window buffers, described above.

The mode decoder 2305 receives configuration data specifying one of several modes for the shift registers, and outputs a one-hot decoded mode input for the shift registers 2315 and 2320. Depending on the kernel size for a set of filters, the increments by which the activation values will be shifted within the window buffer after each dot product may vary. In some embodiments, the available modes are designed for optimizing the efficiency of square (e.g., 3×3, 4×4, 5×5, etc.) kernels during convolutional layers. In addition, whether time-multiplexed dot products are required (e.g., due to large activations, a large number of dot-product components, or filter slicing) also affects the mode setting in some embodiments. These different modes will be described in more detail below when describing the programmable shift registers 2315 and 2320.

The mask decoder 2310 receives configuration data specifying an input mask and outputs this mask for each of the two programmable shift registers 2315 and 2320. The mask bits allow for additional control on the length of the shift registers in some embodiments. In some embodiments, the compiler can define this mask data to disable unused portions of the shift register in order to save power. In addition, in some embodiments when an enable bit input to the mask decoder 2310 is set to zero, the mask decoder 2310 outputs entirely zeros (thereby preventing the shift registers from shifting data for that cycle).

Each of the programmable shift registers 2315 and 2320 includes a number of cells, with each cell storing a single activation value. For instance, in the examples described herein, each shift register includes 144 cells (corresponding to the 144 activations shown in FIG. 16). When no time-multiplexing is required (e.g., for a standard partial dot product with 144 or fewer components, with no filter slicing needed, and with standard-size activation values), only the first programmable shift register 2315 is used.

As mentioned, the different modes for the programmable shift registers 2315 and 2320 depend on the kernel size of the filters. For example, in the non-time-multiplexed case (using only the first programmable shift register 2315) with a 144-cell shift register, these different modes could have the programmable shift register 2315 implementing (i) 32 shift registers of length 4 for 2×2 kernels (no more than 32 shift registers are used, in some embodiments, because only 32 activation values (the length of a RAM word) can be received in a given clock cycle), (ii) 16 shift registers of length 9 for 3×3 kernels, (iii) 9 shift registers of length 16 for 4×4 kernels, (iv) 5 shift registers of length 25 for 5×5 kernels, (v) 4 shift registers of length 36 for 6×6 kernels, or (vi) 2 shift registers of length 72 for 7×7 kernels (in this case, only 49 cells of each of these shift registers will actually be used).

The length and number of shift registers is based on the kernel size in the following way, in some embodiments. Using a 3×3 kernel as an example, in order to avoid time-multiplexing, at most 16 two-dimensional activation grids can be assigned to a single core (because otherwise the partial dot product for a single computation node would require more than 144 activation values in each core). Thus, each of the 16 shift registers holds 9 values for a given dot product—one shift register for each possible 3×3 portion of a two-dimensional activation grid. For a slide of 1 between computation nodes, the activation values will be shifted by a length of 3 cells between dot product computations, which requires at least three clock cycles in some embodiments. Similarly, if the slide value for the convolution using a particular set of filters is 2, then the values are shifted by a length of 6 between dot products (i.e., requiring at least six clock cycles).

In some embodiments, each of the cells of the programmable shift registers 2315 and 2320 is itself a set of registers (e.g., blocks of four registers to hold the 4-bit activation values). These include both static registers and programmable registers. The static register blocks of some embodiments cannot receive activation values directly from memory, and instead only receive their activation values from the previous register block. Each static register block receives input (e.g., a 4-bit activation value) from a previous register block and outputs its value to the next register block. In some embodiments, each such static register outputs its value on the clock cycle. However, the register block also receives an enable signal (from the mask decoder 2310), and when this signal is 0 the clock signal is gated. Thus, the enable bit to the mask decoder 2310 can be used to prevent the entire set of register blocks from shifting their activation values (e.g., while waiting for a memory read operation to complete). The mask signal from the mask decoder 2310 can also be used to prevent some register blocks from shifting their output when the rest of the programmable shift register executes a shift operation, so that unused activation register blocks will not consume the power required to change their values. For instance, if the register is in 16×9 mode (for 3×3 kernels), but only 12 two-dimensional activation grids are stored in each core, then four of the shift registers (36 register blocks in total) will be disabled.

The programmable register blocks of some embodiments are capable of receiving their activation values from the previous register block or from the activation memory (i.e., from the merged output of the cache and the core memory), depending on the current mode of the programmable shift registers. Essentially, each programmable register block operates like the static register block, with multiplexers specifying which input the register block receives based on the mode received from the mode decoder 2305.

The static and programmable registers are arranged such that any cell that needs to receive its input from the activation memory in at least one mode of the activation window buffer is a programmable register, while all of the other cells are static registers (as the static registers occupy less surface area and require less power). Referring again to the 3×3 kernel mode that programs the programmable shift register 2315 as 16 shift registers of length 9, in this case every ninth cell receives its value from the activation memory. When loading the first set of activation values for a row of computations, the activation values are loaded in to this programmable register block one at a time, and then shifted on each clock cycle as the next activation value is loaded into the programmable register block. Thus, the initial load for a row of computations with 3×3 kernels requires at least nine clock cycles (in addition to the time required to read the data from the core memory). For subsequent computations, if the slide value is less than the size of the kernel, fewer clock cycles are required to prepare the programmable shift register for the next set of computations (e.g., three clock cycles if the slide value is 1).

These programmable shift registers 2315 and 2320 output their activation values to a multiplexer 2325 that receives a select bit indicating which value to pass through. For non-time-multiplexed dot products, the output of the first programmable shift register 2315 is always used. For time-multiplexed dot products, the output of the first programmable shift register 2315 is used on a first clock cycle and the output of the second programmable shift register 2320 is used on a subsequent clock cycle. The output of this multiplexer is gated by an AND gate 2330 so that the output is passed to the adder trees only once the activation values are fully loaded into the register(s). This prevents the adder trees from wasting power by performing unnecessary dot product operations on invalid data (e.g., during cycles when the activations are being loaded into the activation window buffer).

Figure 24:
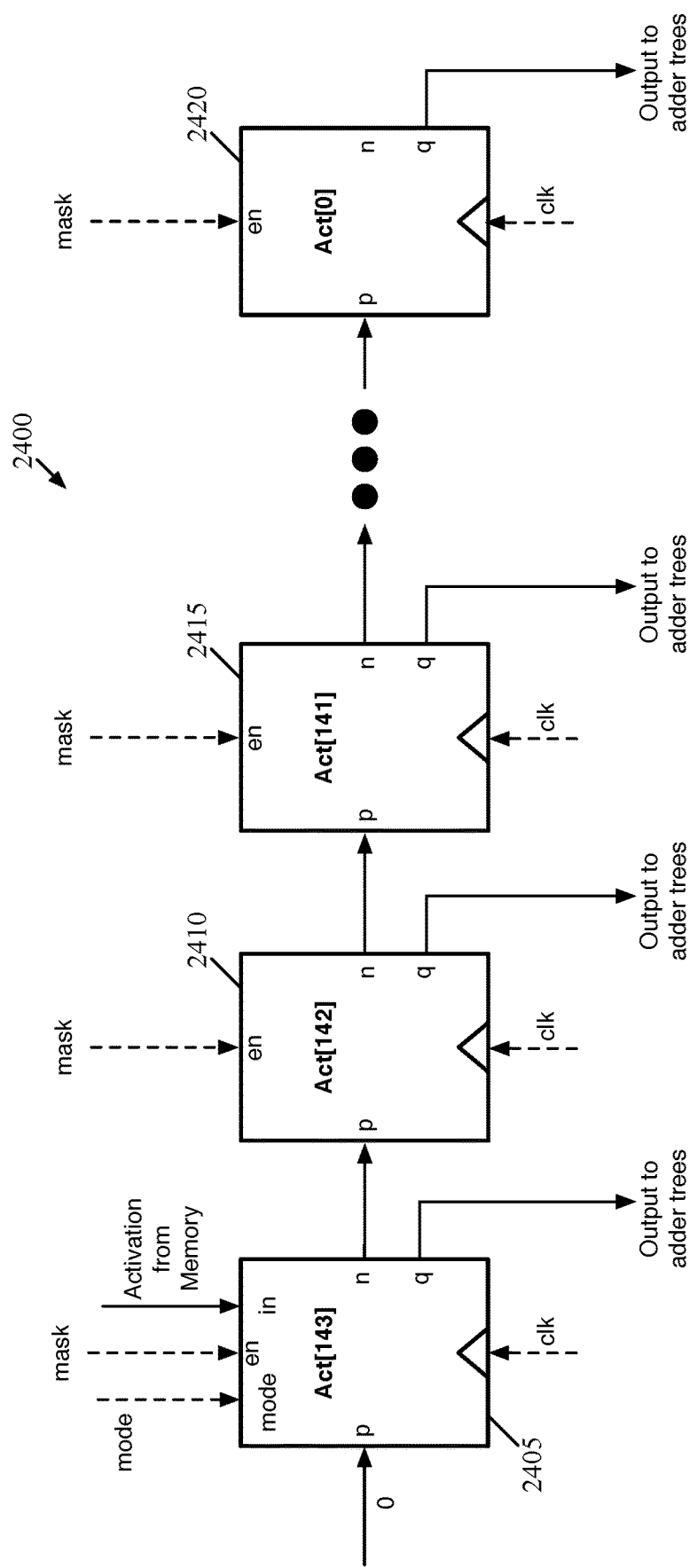
FIG. 24 conceptually illustrates the structure of a programmable shift register of some embodiments.

FIG. 24 conceptually illustrates the structure of one of the programmable shift registers 2400 of some embodiments (e.g., either the primary or secondary programmable shift registers 2315 and 2320). As shown, the programmable shift register 2400 includes several activation storage blocks 2405-2420 (in this case, there are 144 such cells, as in the example shown in FIG. 16). Each of these activation storage blocks 2405-2420 is a register (e.g., a 4-bit register), some of which are static registers and some of which are programmable registers.

In the illustrated programmable shift register 2400, the first activation storage block 2405 (numbered 143) is a programmable register while the other three illustrated activation storage blocks 2410-2420 (the second, third, and last blocks) are static registers. As mentioned, the programmable registers receive activation values from both activation memory and from the previous activation storage block (except in the case of the first activation storage block 2405, which has no previous activation storage block and instead receives the value 0 at this input).

All of the activation storage blocks 2405-2420 receive an input from the previous activation storage block (except the first block 2405, as noted in the previous paragraph), output their value to the next activation storage block (except for the last block 2420), and also output their value to the adder tree multiplexer inputs (those shown in FIG. 16). The activation storage blocks 2405-2420 are activated by the clock signal; however, this clock signal is internally gated by an enable signal from the activation buffer mask decoder. When the enable signal is 0 for a particular activation storage block, then the clock is internally gated so that the values are not shifted between activation storage blocks.

The programmable register block 2405 of some embodiments also includes input wires capable of carrying activation values from memory for each mode in which that block receives such an activation value. In addition, for each such mode in which the register block 2405 participates (i.e., receives an activation value), the block also has an input wire for the mode bit. For example, if the register block 2405 receives activation values in six of the possible modes, then the mode input is 6 bits wide. If one of these bits is set to 1, then the corresponding activation input for that mode is selected over (i) the other activation inputs and (ii) the input from the previous activation block (which is 0 for the first activation storage block 2405, but is an actual value from previous activation storage blocks for intermediate programmable register blocks). In some embodiments, a set of multiplexers that select based on the mode bits are used to implement these choices.

As described, the memory controller (including the activation cache) operates to read activation values from the memory and load these values into the activation window buffer in an efficient manner (both time-efficient and power-efficient). Once the data is loaded (and the weight values loaded into the filter slice buffers), the activation window buffer output is enabled and the partial dot product for the core computed (in addition to the further dot product computation and post-processing also occurring).

Figure 25:
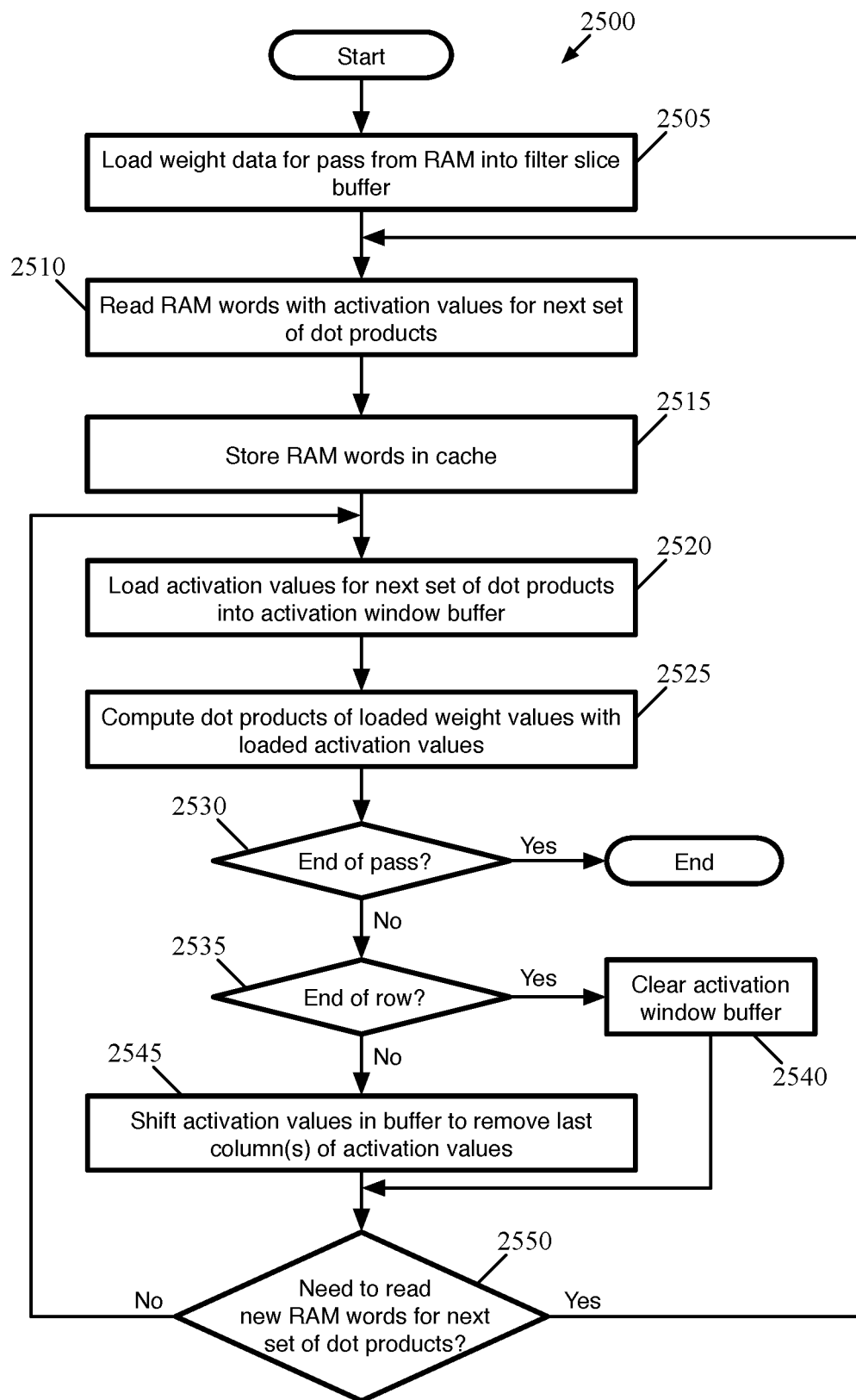
FIG. 25 conceptually illustrates a process of some embodiments for executing a pass (i.e., a layer or a portion thereof, depending on the number of filters in the layer) of a neural network.

FIG. 25 conceptually illustrates a process 2500 of some embodiments for executing a pass (i.e., a layer or a portion thereof, depending on whether the number of filters in the layer exceeds the number of filter slice buffers available) of a neural network. Specifically, the pass executed by the process computes all of the dot products for a particular set of filters of the neural network. The process 2500 is performed by a set of cores of a neural network computation circuit in some embodiments (i.e., the set of source cores for the layer), with the global channel (i.e., the dot product bus and possibly the post-processing units) also participating in the dot product computation. The process 2500 will be described in part by reference to FIGS. 26-28, which illustrate the loading of the activation values 2000 of FIG. 20 into an activation window buffer according to some embodiments.

As shown, the process 2500 begins by loading (at 2505) weight data for the pass from the core RAMs into the filter slice buffer. In some embodiments, for each active core, the weight controller (i.e., weight control circuit 1515 of FIG. 15) reads and decodes the weight values from the weight partition of the core memory. The core controller provides the weight controller with configuration data that specifies which memory locations (i.e., which RAM words) to read for each of the filter slice buffers, and the weight controller decodes this data to identify the weight values (i.e., as either 0, 1, or −1) and load these weight values into the appropriate filter slice buffers. As mentioned above, in some embodiments the same read cache is used for loading weight values into the filter slice buffers as is used for loading activation values. The loading (and decoding) of weight data into the filter slice buffers is described in greater detail below by reference to FIGS. 29-34.

It should be understood that the process 2500 is a conceptual process, and certain operations in the process are executed synchronously with other operations in the process in some embodiments. For instance, loading the weight data for a pass might require numerous clock cycles in some embodiments (because many RAM words need to be read and decoded in order to load all of the weight data for a large number of filters. While this weight data is being loaded into the filter slice buffers, the cores concurrently read the first round of activation values from the core memory and load these activation values into the activation window buffers in some embodiments. For subsequent rounds of dot products using the same filters, the weight values will already be loaded into the filter slice buffers, and only the activation values need to be loaded. In other embodiments, all of the weight data is loaded before loading the activation values, because the same architecture for reading data from the core memory is used for both sets of values.

Thus, the process 2500 reads (at 2510) the RAM words storing input values for the next set of dot products. In addition, the process stores (at 2515) the RAM words that are read out of the core memory in the activation cache. In some embodiments, as described above, the activation memory controller includes a cache for storing up to a particular number of RAM words (e.g., 5, 7, 10, etc.).

When the activation values are stored in the RAM words in the manner shown in FIG. 21, a RAM word read from memory will often include activation values for both the next set of dot products as well as at least some of the activation values for the set of dot products to follow. While more RAM words may be read for a particular dot product than the total number of available spaces in the cache, many of these words will be completely used for the current dot product and thus do not need to be stored in the cache for use in the subsequent set of dot products. In general, for a convolutional layer using 3×3 filters, a maximum of three RAM words in a core will include both input values for the current set of dot products as well as input values for the subsequent set of dot products (one for each row of the input activation values). In this case, storing these RAM words in the activation cache allows the core to avoid re-reading the words out of memory, thereby realizing significant power savings.

Some embodiments store each RAM word read from the core memory in the cache, irrespective of whether any of the activation values will be used for subsequent dot products. In general, even if a RAM word is used entirely for the current dot product, multiple clock cycles are required to load all of the values from the RAM word into the activation window buffer (one exception to this being when all of the activation values stored in the RAM word belong to different two-dimensional activation grids at the same x-y coordinate). When overwriting rows of the cache, some embodiments simply write each newly read RAM word in order, while other embodiments selectively overwrite RAM words that do not contain activations needed for subsequent operations.

The process 2500 then loads (at 2520) the activation values for the next set of dot products into the activation window buffer. For the first set of dot products of a pass, all of the activation values will be newly read from the core memory (although other than the first set of coordinates loaded into the shift registers, the activation values will still be loaded from the cache rather than directly from memory). For subsequent sets of dot products, some of these activation values will already be stored in the activation window buffer, having been used for a previous set of dot products. Each of the activation values is loaded into the correct cell in the activation window buffer based on its coordinate within the three-dimensional activation array for the layer, in some embodiments. This will typically require several clock cycles, as the activation values are loaded one coordinate at a time. As described above by reference to FIGS. 23 and 24, in some embodiments the activations for each two-dimensional grid are stored in subsequent cells of the activation window buffer that are implemented as shift register for that two-dimensional grid.

Once all of the activation values for a given set of dot product computations are loaded into all of the cells of the activation window buffer (assuming that the weight values are also loaded into the filter slice buffer), the process 2500 computes (at 2525) the dot products between the loaded weight values of each filter and the loaded activation values. As described in more detail above by reference to FIG. 18, the cores compute partial dot products, which are aggregated in the dot product bus. In addition, the post-processing units perform post-processing to generate the next layer of activation values, which the activation write bus transports to the correct destination cores.

Figure 26A:
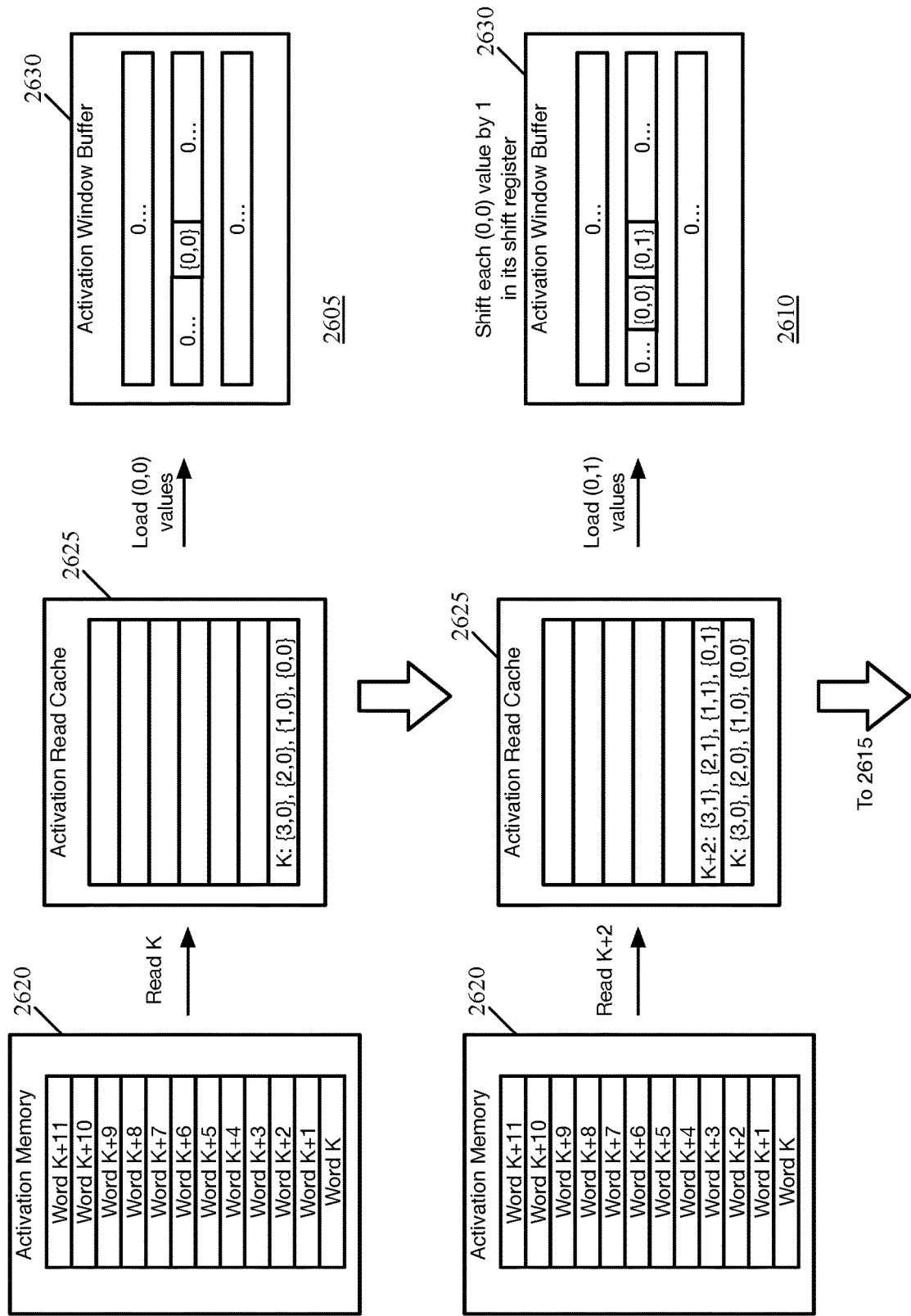
FIGS. 26A-B conceptually illustrates the loading of a first set of activation values into an activation window buffer in order to compute a set of dot products using the first set of activation values.
Figure 26B:
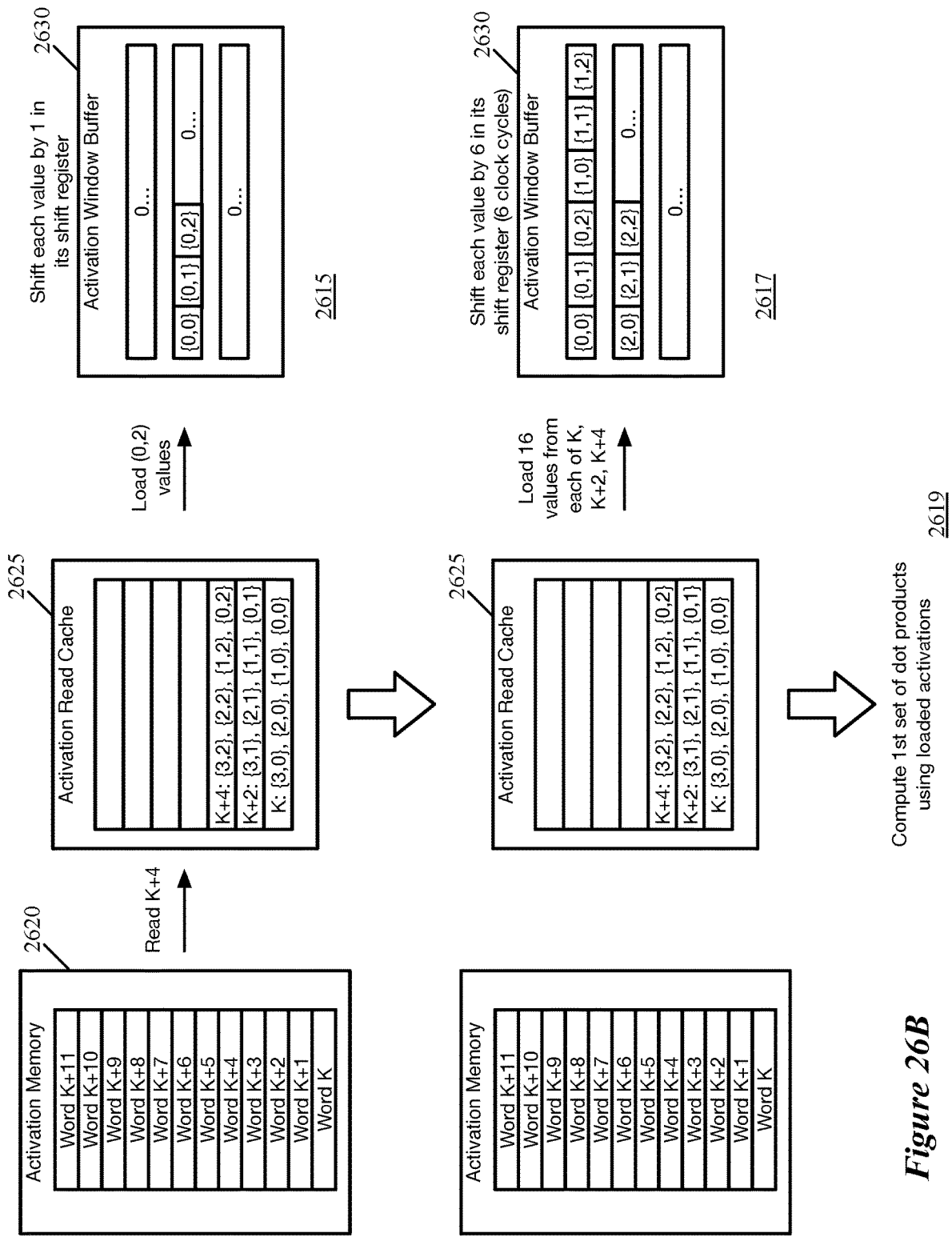

FIGS. 26A-B conceptually illustrate, over five stages 2605-2619, the loading of a first set of the activation values 2000 into an activation window buffer in order to compute a set of dot products using the first set of activation values. The first stage 2605 illustrates activation memory 2620, activation read cache 2625, and activation window buffer 2630. The activation memory 2620 represents the portion of the core memory that stores the activation input values 2000 of a layer K. As shown, this includes twelve RAM words, labeled K-K+11. The content of these RAM words corresponds to the RAM words shown in FIG. 21 for one of the core memories 2105-2115.

The activation read cache 2625 represents the data stored in the read cache 2200 of FIG. 22 (i.e., the contents of the data block 2215). In this example, the activation read cache 2625 can store up to seven RAM words at a time. The activation window buffer 2630 represents the data stored in the programmable shift register 2315 (in this example, no time-multiplexing is required for the dot product calculations, so only the primary activation window buffer is used). While this figure (and the subsequent figures) show the activation memory, activation read cache, and activation window buffer for a single core, it should be understood that all of the other source cores for the neural network layer also execute the same operations to read activation values and store these values in the read cache and the activation window buffer.

In the first stage 2605, the first RAM word K is read from the activation memory 2620 into the activation read cache 2625, and the set of activation values for coordinate (0,0) are loaded into the activation window buffer 2630. In some embodiments, the memory read operation requires a fixed number of clock cycles (e.g., 5 cycles), and the entire RAM word is read into the cache at the same time that the (0,0) activation values are loaded into their respective shift registers within the activation window buffer 2630. Each of the words within the activation read cache 2625 includes 32 activation values, (i.e., 8 values for each of four (x,y)

coordinates). The coordinates for which activation values are included in each word are shown in brackets in the figure. In some embodiments, the blank rows of the activation read cache 2625 and the portions of the activation window buffer 2630 shown as zeros may actually store data from a previous set of calculations (effectively junk data for the subsequent calculations), or may have been fully reset to all zeros at this point.

As shown, the activation values loaded into the activation window buffer 2630 are inserted into a specific register block at the entry point for each of the configured shift register. In this case, of the 16 possible shift registers available in the programmable shift register mode for 3×3 kernels, 8 of these shift registers are used. At this stage, only the activation values at coordinate (0,0) have been loaded. Though shown as blocks of 8 activation values in FIG. 26 (and in subsequent figures), it should be understood that the values at the same (x,y) coordinate are not stored next to each other in the activation window buffer 2630, for the reasons described above (they are each in a separate shift register for their respective two-dimensional activation grids).

The second stage 2610 illustrates that the memory controller reads the RAM word K+2, that stores the next set of data to be loaded into the activation window buffer 2630, from the activation memory 2620, and loads this word into the activation read cache 2625. In addition, the (0,1) activation values are loaded into the activation window buffer 2630, at the entry points in each shift register. Concurrently, the activation values at coordinate (0,0) are shifted by one register block.

In the third stage 2615, the memory controller reads the RAM word K+4, that stores the next set of data to be loaded into the activation window buffer 2630, from the activation memory 2620, and loads this word into the activation read cache 2625. In addition, the (0,2) activation values are loaded into the activation window buffer 2630, at the entry points in each shift register. Concurrently, the activation values at coordinates (0,0) and (0,1) are shifted by one register block within the activation window buffer 2630.

At this point, all of the activation values for the upcoming dot product have been read into the cache 2625, so additional memory reads are not required. Instead, as shown in the fourth stage 2617, over the next six clock cycles, the activation values for the next two columns of data are loaded into the activation window buffer 2630, starting with the activation values at coordinate (1,0) and finishing with the activation values at coordinate (2,2). These last values to load are stored at the programmable register blocks that receive activation values from the activation memory (as opposed to from the previous register block). With all of the activation values loaded, the chip fabric computes the first set of dot products in the fifth stage 2619.

Returning to FIG. 25, after computing the dot products using the loaded activation values, the process 2500 determines (at 2530) whether the end of the current pass has been reached. If the end of the pass has been reached, then all new filters and activations will need to be loaded for the next pass (possibly the next layer), and the process ends.

On the other hand, if the end of the current pass has not been reached, then the process 2500 determines (at 2535) whether the end of the current row has been reached. As described above, a convolutional layer typically convolves a filter over the set of activation grids starting at a first set of rows (e.g., first three rows for a 3×3 filter). Upon reaching the end of that row, the convolution returns to the beginning of the next set of rows. Depending on how the neural network is designed, this may include either some of the previous rows of input activations included or with all new rows of activation values (i.e., for the 3×3 filter example, if the first set of rows includes rows 0-2, then the next set of rows could include rows 1-3, rows 2-4, or rows 3-5). In some embodiments, an end of row signal is transmitted as part of the configuration data (e.g., this signal is usually 0, but is set to 1 when the end of a row is reached).

When the end of the current row has been reached, the process clears (at 2540) the activation window buffer in some embodiments, as the currently loaded activations will typically not be used for the subsequent set of computations. In other embodiments, the buffer is not "cleared" as such, but rather the values will be entirely shifted out of the buffer as the new values are shifted in, in subsequent operations.

If the end of the row has not been reached, the process shifts (at 2545) the activation values in the buffer to remove one or more columns of activation values. As mentioned, the process 2500 is a conceptual process, representing the set of operations performed in different circumstances. In some embodiments, the shifting is actually performed as the new activation values from activation memory (either from the cache or directly from the core memory) are loaded into the activation window buffer. That is, though shown in FIG. 25 as a separate operation, the shifting of previously-loaded activation values actually occurs at the same time as the loading of these values (as shown in FIGS. 26-28).

Next, the process 2500 determines (at 2550) whether additional RAM words need to be read from the core memory for the next set of dot product computations. That is, the process determines whether all of the activations required for the next set of dot products (that are not already in the activation window buffer) are stored in the activation read cache, or if they need to be read from the core RAM. As discussed above, in some embodiments the activation read cache controller 2205 compares the address of each RAM word with the required activation values to the addresses of the RAM words stored in the read cache to determine whether the RAM word needs to be read out of the core memory. In addition, though shown as a single determination in the conceptual process 2500, in some embodiments the comparison is made for each set of activation values loaded at one time into the activation window buffer 2630 (e.g., the activation values for each x-y coordinate).

When the RAM words are not stored in the cache, the process 2500 returns to 2510 to read these RAM words with the desired activation values from the core memory, store them in the cache, load the activation values for the next set of dot product computations into the activation window buffer, and compute the next set of dot products. On the other hand, when all of the required RAM words are already stored in the cache, the process 2500 does not need to execute any read operations from the core memory, and so instead returns to 2520 to load the activation values for the next set of dot product computations into the activation window buffer, and compute the next set of dot products. Once the end of the current pass is reached, the process 2500 ends.

Figure 27:
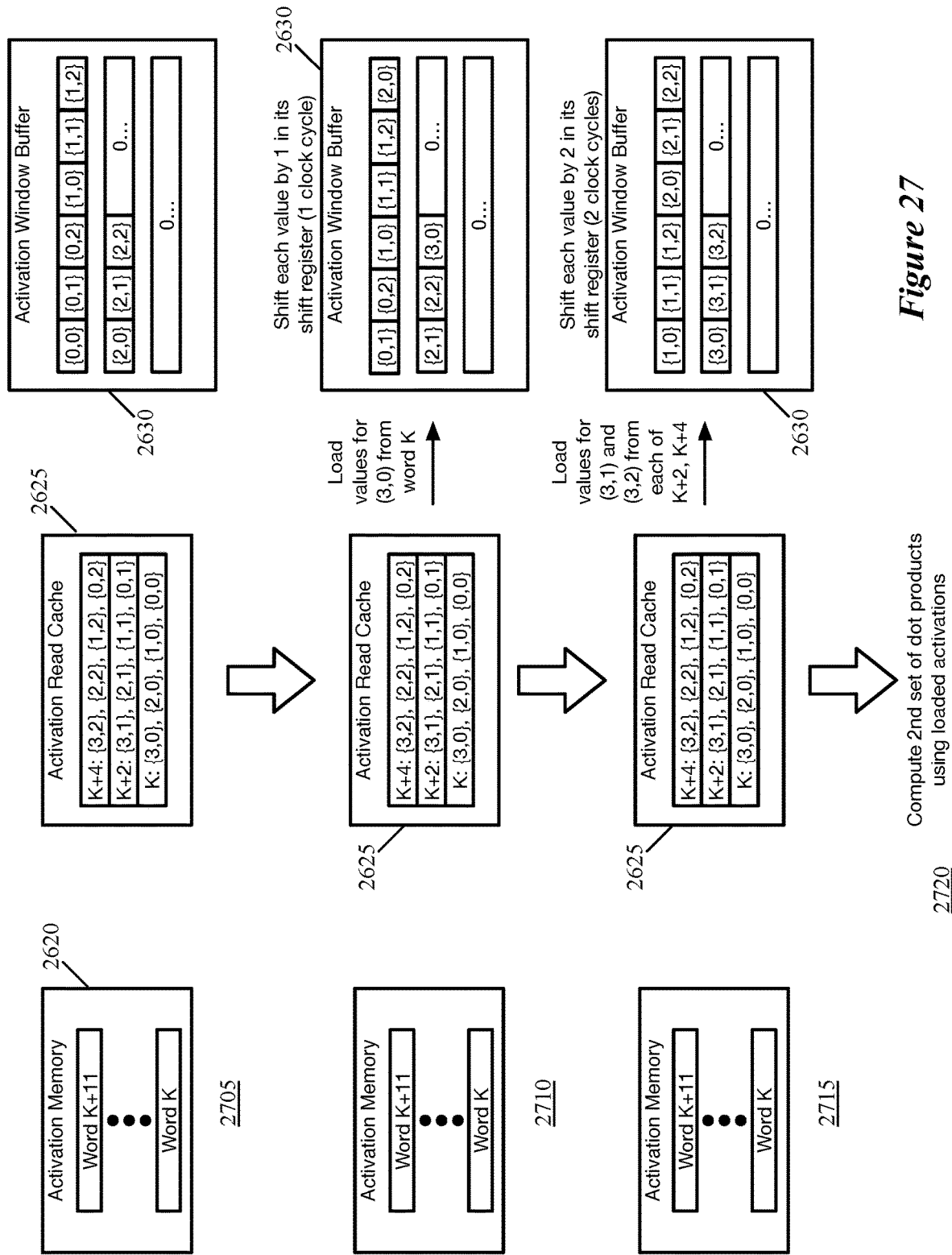
FIG. 27 conceptually illustrates the loading of activation values for a second set of dot products into the activation window buffer while shifting activation values from the previous dot product within the activation window buffer.

FIG. 27 conceptually illustrates the loading of activation values for a second set of dot products into the activation window buffer 2630 while shifting activation values from the previous dot product within the activation window buffer 2630 over four stages 2705-2720. In this example, all of the activation values required for the computation are already either (i) already loaded into the activation window buffer or (ii) already stored in the activation read cache 2625, so that no RAM words need to be read out of the activation memory 2620. For simplicity, the activation read cache 2625 only shows the three rows currently storing valid data (RAM words K, K+2, and K+4), rather than including the rows storing blank or invalid data.

The first stage 2705 illustrates the activation memory 2620, activation read cache 2625, and activation window buffer 2630 in the same state as in stage 2610 of FIG. 26, as the set of dot products are computed. The second stage 2710 illustrates the activation window buffer 2630 after one clock cycle of loading/shifting of activation values. Specifically, the eight values with coordinates of (3,0) are loaded into the programmable register blocks of the buffer 2630, the eight values with coordinates of (0,0) are shifted out of the buffer 2630, and the other activation values stored in the buffer 2630 are shifted by one register block.

The third stage 2715 illustrates the activation window buffer 2630 after two more clock cycles of loading/shifting activation values. After three cycles, all of the activation values with an x-coordinate of 0 have been shifted out of the activation window buffer 2630, while the activation values with coordinates of (3,0), (3,1), and (3,2) have been shifted into the buffer 2630 and the activation values with x-coordinates of 1 and 2 have been shifted by three register blocks. In the fourth stage 2720, the second set of dot products are computed using these activations. By shifting the values within the window buffer 2630, the activation values with x-coordinate of 1 will be multiplied by the same weight values in this set of dot products as the activation values with x-coordinate of 0 were multiplied by in the previous set of dot products (and similarly for the other activation values).

Figure 28A:
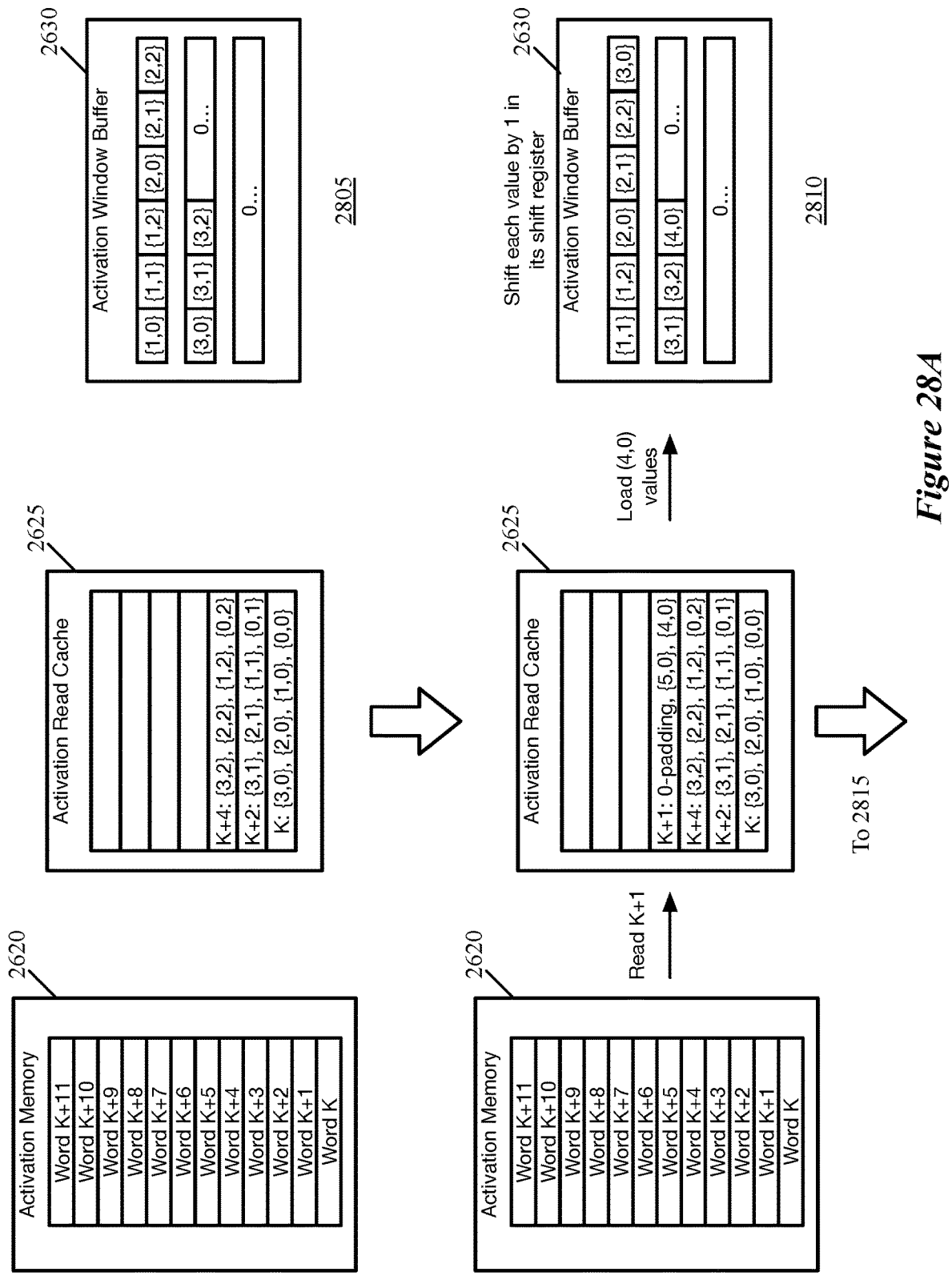
FIGS. 28A-B conceptually illustrate the loading of activation values for a third set of dot products into the activation window buffer while shifting activation values from the second dot product within the activation window buffer.
Figure 28B:
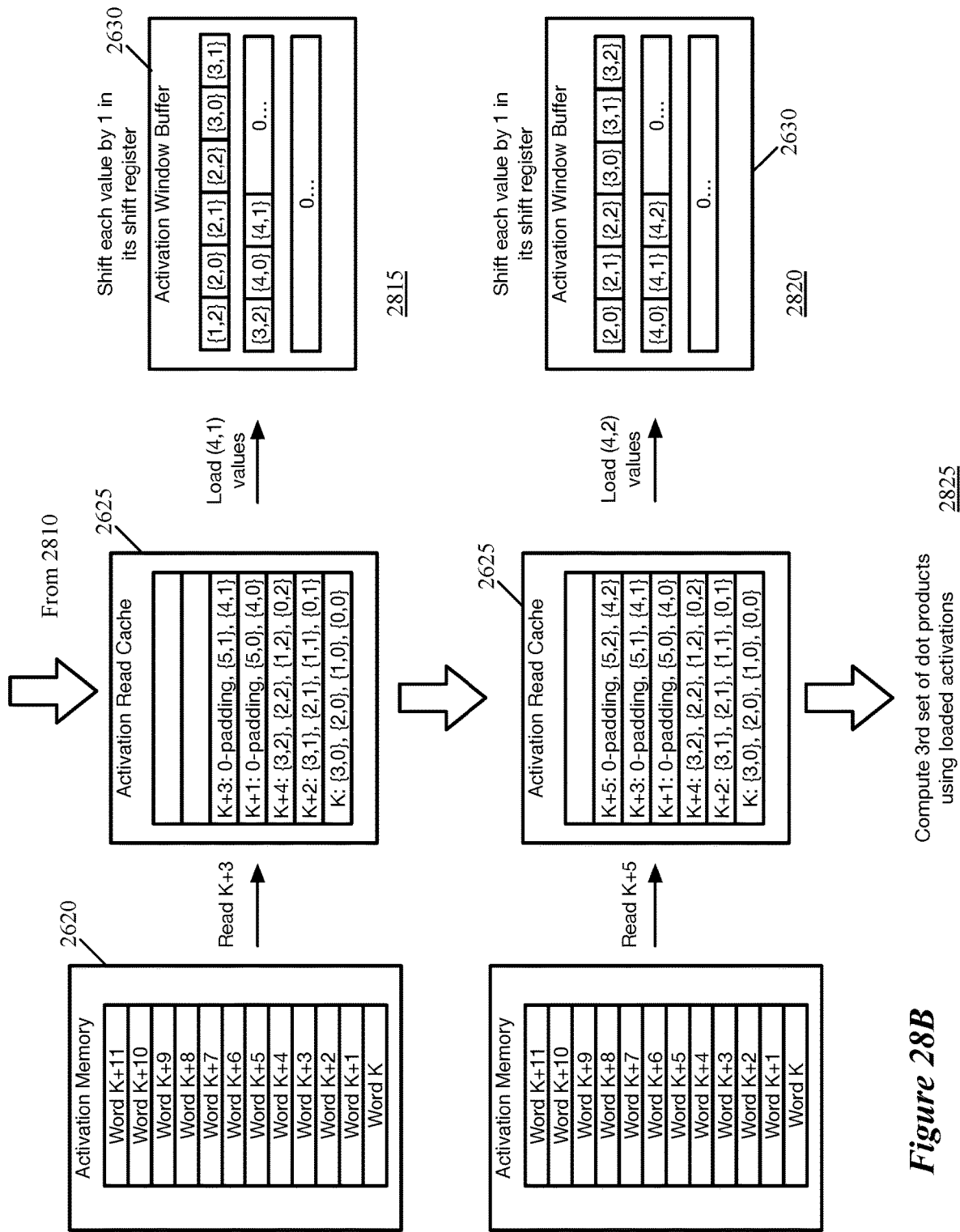

FIGS. 28A-B conceptually illustrate the loading of activation values for a third set of dot products into the activation window buffer 2630 while shifting activation values from the second dot product within the activation window buffer 2630 over five stages 2805-2825. In this example, activation values are required that are stored in RAM words that have not yet been read from the core memory 2620.

The first stage 2805 illustrates the activation memory 2620, activation read cache 2625, and activation window buffer 2630 in the same state as in stage 2610 of FIG. 27, as the second set of dot products are computed. The second stage 2810 illustrates that the RAM word K+1 is read from activation memory 2620 by the activation memory controller and stored in the activation read cache 2625. In addition, the first set of activation values from this RAM word, with the coordinate (4,0), are loaded into the activation window buffer 2630 (while shifting the data within that buffer by one register block). In some embodiments, the word K+1 is stored in a new (currently unused row) of the activation read cache 2625. In this example, some of the activations stored in the words K+2 and K+4 will be used in the next row of dot products (though the activations stored in the word K will not be), so these words remain in the cache instead of being overwritten. Other embodiments also only overwrite words in the cache when the cache rows are completely full, which is not the case in this example.

The third stage 2815 illustrates that the memory controller reads the RAM word K+3 from the activation memory 2620 and stores this word in the activation read cache 2625. In addition, the activation values at coordinate (4,1) are loaded into the activation window buffer 2630, at the entry points in each shift register. Concurrently, the activation values in the buffer are shifted by one register block.

Similarly, in the fourth stage 2820, the memory controller reads the RAM word K+5 from the activation memory 2620 and stores this word in the activation read cache 2625. In addition, the activation values at coordinate (4,2) are loaded into the activation window buffer 2630, at the entry points in each shift register. Concurrently, the activation values at coordinate (0,0) are shifted by one register block. Finally, in the fifth stage 2825, the next set of dot products are computed using the activations loaded into the activation window buffer 2825. This process continues until the row of dot products is completed (with a fourth dot product that does not require any additional memory reads), and the process returns to the start of the next row of dot products.

Figure 29:
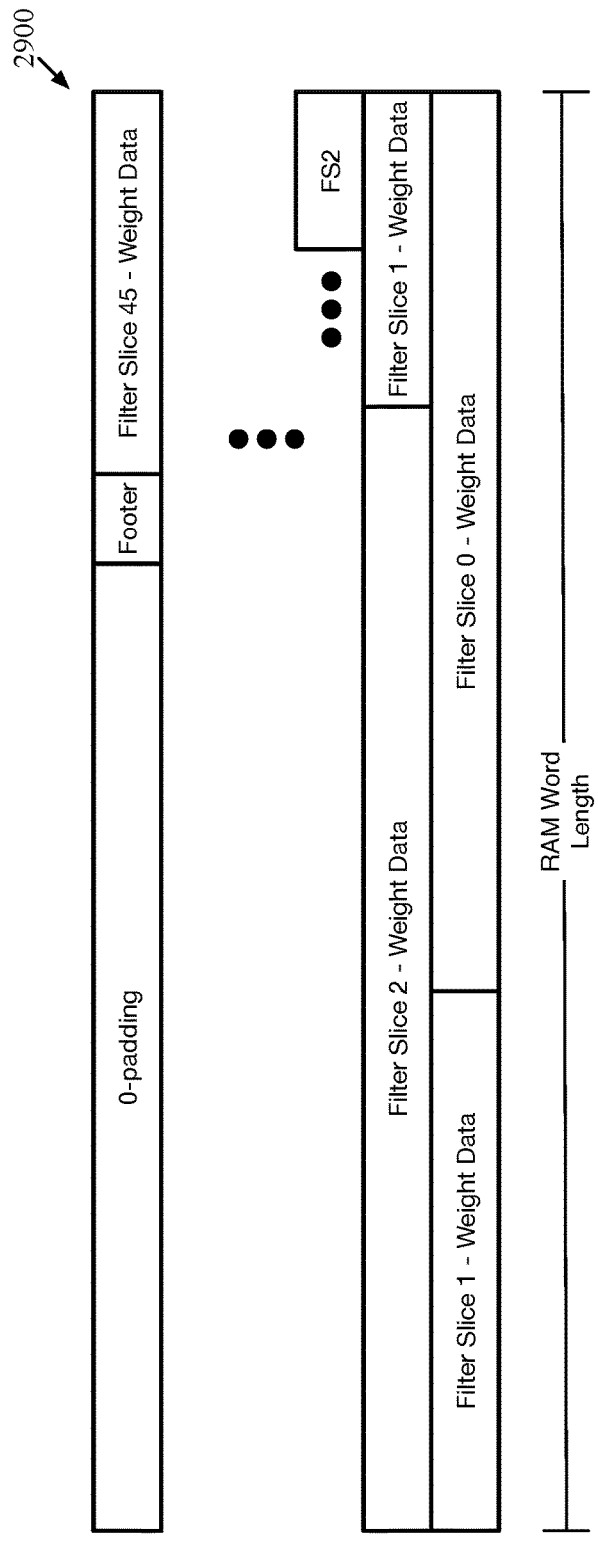
FIG. 29 illustrates the organization of a block of weight data within a single core for a single pass of the neural network computation circuit.

FIG. 19, described above, illustrates that the memory in the cores is divided into weight data storage and activation value storage. While the organization of the activation values in memory is described above, FIGS. 29 and 30 illustrate the organization of the weight data in memory. Specifically, FIG. 29 illustrates the organization of a block of weight data 2900 within a single core for a single pass of the neural network computation circuit (i.e., a layer or a portion of a layer of the neural network). In some embodiments, as with the activation data, each of the cores across which the dot products of the network layer are spread includes a similar weight data block starting at the same memory address. However, unlike in the case of activations, due to the encoding of the weight data, different cores will store different amounts of data for the same pass (which includes the same number of filter slices in each core).

As shown in FIG. 29, each filter slice is allocated a variable amount of memory. In some embodiments, the filter slices are stored in order based on the filter slice index (i.e., the index 0-63 of the filter slice buffer and the corresponding adder tree, dot product bus lane, and post-processing units), though storing this data in order is not required. In some embodiments, the amount of memory required depends on the number of non-zero weight values, with non-zero weight values requiring more data than weight values equal to zero. For example, in the encoding described below by reference to FIG. 30, a filter slice with all zero weight values would use 48 bits of memory (significantly less than a 128-bit RAM word), while a filter slice with entirely non-zero weight values (i.e., 40 non-zero weight values, corresponding to the 40 multiplexers that reduce the number of inputs to an adder tree from 144 to 40 as shown in FIG. 17) would use 208 bits of memory (more than a 128-bit RAM word).

In the example shown in FIG. 29, data is stored for 46 filter slices. If a pass does not use all of the filter slice buffers because there are fewer filters in a layer than the number of filter slice buffers in the cores (or a layer is divided evenly between multiple passes), some embodiments do not require data to be stored for all of the unused filter slices. The weight block 2900 (and all such weight blocks for a pass, in some embodiments) begin at the start of a RAM word, though the weight data for individual filters within that weight block are not required to begin at RAM word boundaries. As described above, the read cache can output activation or weight data that crosses a RAM word boundary, so that, e.g., all of the data for filter slice 1 could be loaded into the appropriate filter slice buffer at once (subject to constraints described below) even though it crosses the boundary between two RAM words. As shown, because the amount of data stored in a weight block is variable, a footer (e.g., a succession of 0s) is used to mark the end of the weight block 2900. Some embodiments then 0-pad the final RAM word of the weight block (or use random data, as this data will never be used) so that the next weight block can start at the beginning of the next RAM word.

Figure 30:
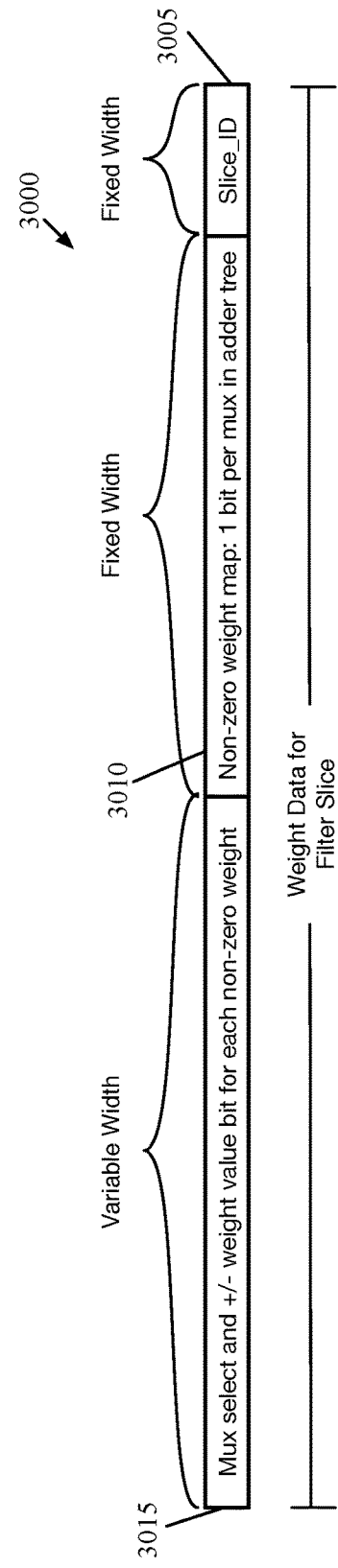
FIG. 30 illustrates the format of the encoded weight data for a single filter slice buffer in some embodiments.

FIG. 30 illustrates the format of the encoded weight data 3000 for a single filter slice in some embodiments. As shown in this example, some embodiments divide the weight data for a filter slice into three sections: a slice identifier 3005, a non-zero weight map 3010, and additional weight data 3015 for each of the non-zero weights. The slice identifier 3005 and the non-zero weight map 3010 have a fixed width (i.e., a fixed number of bits) in some embodiments, while the additional weight data 3015 has a variable width that depends on the number of non-zero weights in the filter slice.

The slice identifier 3005, in some embodiments, includes information indicating to which filter slice buffer the decoded weight data based on sections 3010 and 3015 will be written. This data includes (i) write enable bits for the primary and secondary filter slice buffers and (ii) a filter slice buffer index address. Thus, for a circuit with 64 filter slice buffers, the slice identifier includes 8 bits (1 bit for each of the write enables and 6 bits for the filter slice buffer index address). This information is not stored in the filter slice buffer, but is used by the control circuitry to ensure that the subsequent data is stored in the correct filter slice buffers. In some embodiments, only one of the write enable bits will be non-zero, while other embodiments allow for the same filter slice to be written to both primary and secondary filter slice buffers (e.g., in certain filter slicing cases).

The non-zero weight map 3010, in some embodiments, includes a bit for each of the multiplexers in the partial dot product computation circuit (i.e., the adder tree input multiplexers) corresponding to the filter slice buffer identified in the slice identifier 3005. Thus, for a chip fabric with partial dot product computation circuits as shown in FIG. 16, the non-zero weight map 3010 includes 36 bits. For a chip fabric with partial dot product computation circuits as shown in FIG. 17 (i.e., having redundant input multiplexers to better ensure that all of the inputs with non-zero weights are mapped to different input multiplexers), the non-zero weight map includes 40 bits. Each bit of the non-zero weight map 3010 specifies whether the corresponding input multiplexer receives an input with a non-zero corresponding weight value (with the bit set to 1 to indicate this case, and with the bit set to 0 to indicate that none of the inputs received by the multiplexer have non-zero corresponding weight values).

The variable width additional weight data 3015 includes additional data for each non-zero weight indicated in the non-zero map 3010. Thus, if all of the weights are zero for an entire filter slice, then no additional weight data 3015 is required (in certain cases, the entire filter slice can be eliminated in this case, and no data need be stored). For each non-zero weight indicated in the non-zero map, some embodiments store (i) a bit indicating whether that weight is positive or negative and (ii) select bits for the corresponding input multiplexer. The select bits for the input multiplexer are used to indicate which of the activation inputs that multiplexer selects to output to the adder tree, while the positive/negative weight bit is used along with the corresponding bit from the non-zero weight map 3010 to direct the operation of the corresponding ternary MAC. For the example multiplexers 1610 or 1710 that have eight inputs, three select bits are stored. The additional weight data 3015 is organized with the sets of data for each multiplexer in the same order as the bits in the non-zero weight map 3010. Thus, the first set of 4 bits in the additional weight data 3015 corresponds to the multiplexer indicated with the first non-zero in the non-zero weight map 3010 (which could be the first bit, second bit, etc. all the way to the last bit). As described below, weight data decoder circuits are used to (i) align the non-zero weight map bits with their corresponding additional weight data within the filter slice buffer and (ii) fill in the additional data for the input multiplexers with no inputs corresponding to non-zero weights.

Figure 31:
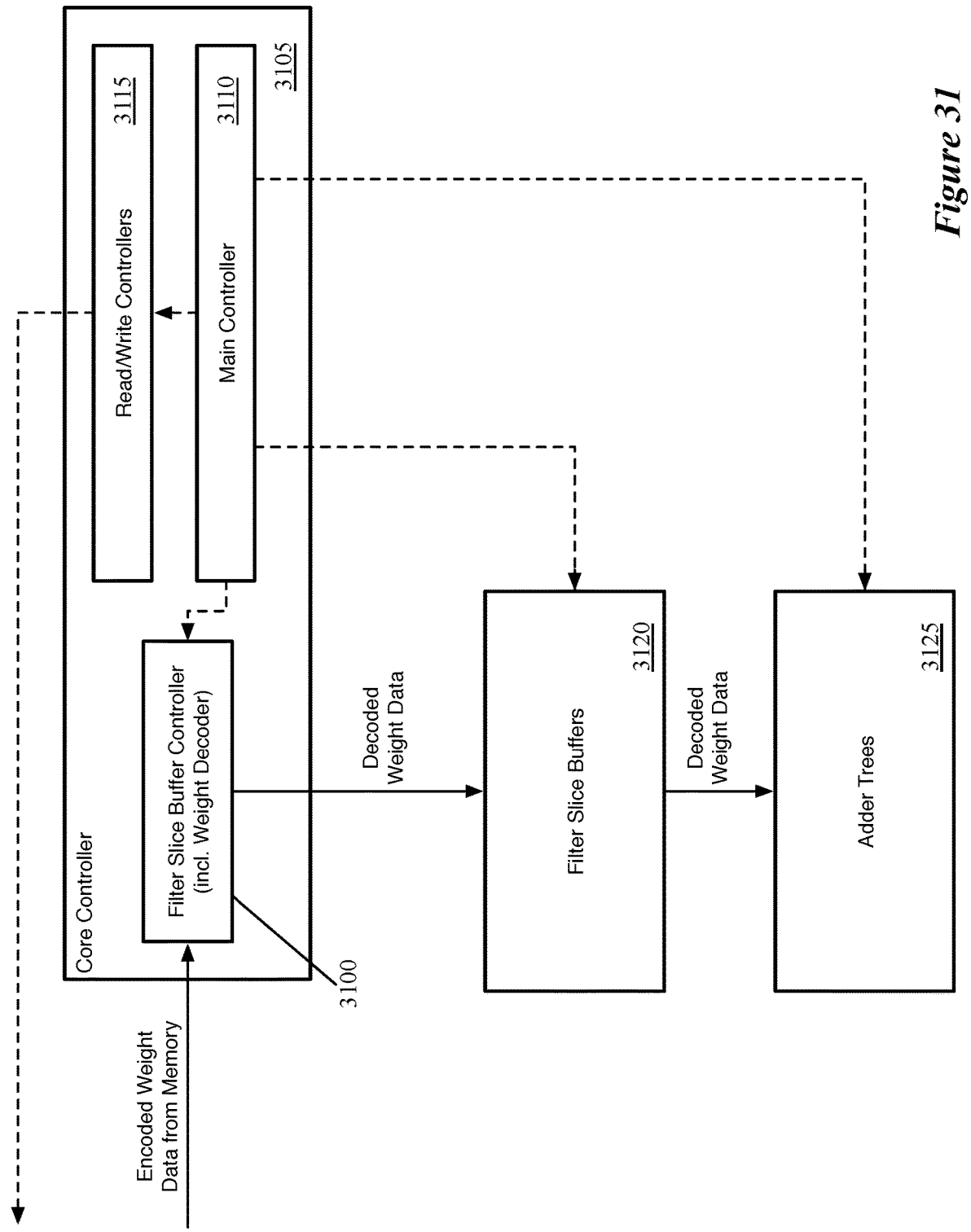
FIG. 31 conceptually illustrates several circuit blocks within a core that are used to process weight data and use the weight data for dot product computations.

FIG. 31 conceptually illustrates several circuit blocks within a core that are used to process the weight data and use the weight data for dot product computations. In some embodiments, the core controller 3105 includes a main controller 3110 as well as read and write controllers 3115, in addition to a filter slice buffer controller 3100. The read/write controllers 3115 direct the memory controller to perform the read operations to retrieve weight and activation data from the core memory.

The main controller 3110 receives configuration data from the configuration registers in the core and directs the operation of the various other entities of the core (including the read/write controllers 3115 and the filter slice buffer controller 3100). For example, the main controller 3110 provides enable signals to the other circuit blocks (e.g., the filter slice buffers 3120 and adder trees 3125, as well as other blocks not shown in this figure). The main controller 3110 also receives signals from the other controllers within the core (e.g., the filter slice buffer controller 3100) that indicate when these other controllers have completed their operations, so that the main controller 3110 can communicate this information back to its corresponding cluster controller (i.e., as described above by reference to FIG. 8).

As shown, encoded weight data is read from memory and provided in blocks of data (as determined by the memory read controller, including the cache as shown in FIG. 22) to the filter slice buffer controller 3100 of the core controller 3105. In some embodiments, each the weight data for each filter slice in use is provided over the course of two clock cycles because that data could be more than the width of one RAM word, but will be less than the width of two RAM words. Specifically, some embodiments read the header, the non-zero weight map, and up to 20 sets of additional weight data in the first cycle, and read the remainder of the additional weight data in the second cycle. The filter slice buffer controller 3100 includes a weight decoder circuit that decodes the weight data (i.e., expands the weight data to include weight information (indicating whether the weight is positive/negative/zero) and multiplexer select information for each of the input multiplexers in the adder tree corresponding to the filter slice. More detailed operation of the weight decoder circuitry and the filter slice buffer controller operation is described by reference to FIGS. 32 and 33 below.

The filter slice buffer controller 3100 provides this decoded weight data, as well as the filter slice index and write enable data to the filter slice buffers 3120, which store the decoded weight data (e.g., in a set of registers). More detailed description of the filter slice buffers 3120 is described below by reference to FIG. 34. Once all of the weight data for a pass is loaded into the filter slice buffers 3120 and an activation window is loaded into the activation window buffer (not shown in this figure), the main controller 3110 instructs these buffers to output their data (e.g., the decoded weight data) to the adder trees 3125 and instructs the adder tree to perform the partial dot product computations.

Figure 32:
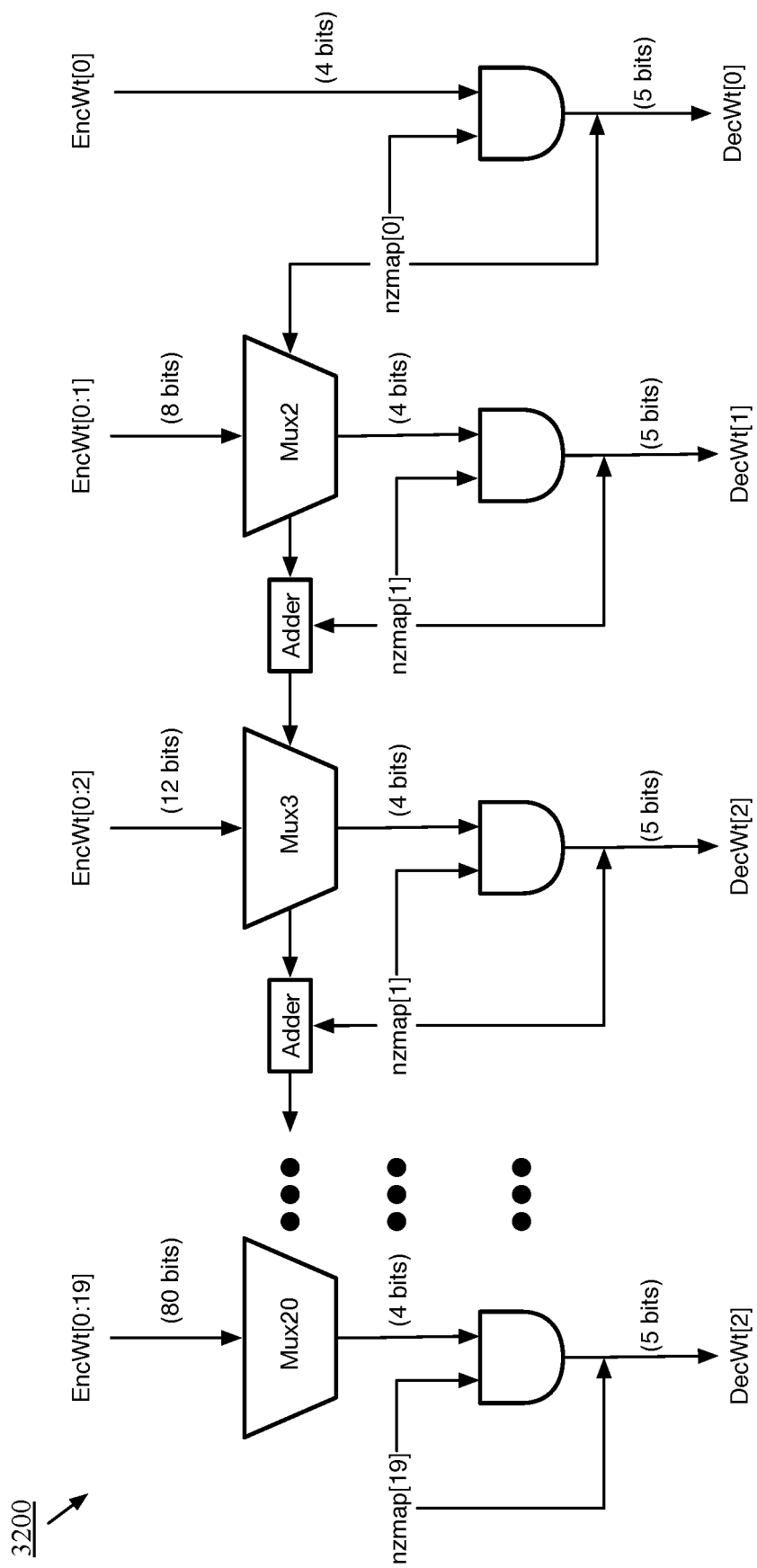
FIG. 32 illustrates the weight decoder circuitry of some embodiments.

As mentioned, FIG. 32 illustrates the weight decoder circuitry 3200 of some embodiments. This weight decoder circuitry 3200 assumes that each filter slice buffer holds weight data for 40 inputs (i.e., the adder trees include 40 input multiplexers). Chip fabric with a different number of input multiplexers per adder tree would have similar weight decoder circuitry but with a different number of outputs (e.g., 18 outputs rather than 20 for adder trees with 36 input multiplexers). The weight decoder circuitry 3200 receives the weight data stored in the weight memory and decodes this data to be formatted for storage in one of the filter slice buffers (the filter slice identifier is also sent to the filter slice buffers so that the decoded data is routed to the correct filter slice buffer).

As shown, in a particular cycle the decoder circuitry 3200 receives 20 non-zero map bits (i.e., the first 20 bits in a first cycle and the latter 20 bits in the next cycle) as well as up to 20 sets of additional weight data. Each set of additional weight data is 4 bits wide, and the decoded output includes 20 sets of 5-bit wide weight data (e.g., a non-zero map bit combined with 4 bits of additional data). The non-zero map bit is used to gate this data such that if the non-zero map bit corresponding to a particular input multiplexer is zero, then the data sent to the filter slice buffer for this input is all zeros (zeroing out this data saves power).

The first AND gate in the decoder always receives the first set of additional weight data (i.e., the first 4 bits), and this is either gated off or passed through (depending on the value of the first non-zero map bit). Each subsequent AND gate is prefaced by a multiplexer that selects between two or more sets of encoded additional weight data based on the previous non-zero map bits. Specifically, the second AND gate can receive either the first or second (indices 0 or 1) set encoded additional weight data, the third AND gate can receive any of the first, second, or third (indices 0-2) sets of encoded additional weight data, and so on up to the twentieth AND gate that can receive any of the twenty sets of encoded additional weight data. The select bit(s) for each of these multiplexers is the number of previous non-zero weight bits, which indicates which set of encoded additional weight data to select. Thus, e.g., the second multiplexer (that provides the input to the third AND gate) outputs (i) the first set of additional weight data if the first and second non-zero weight map bits are 0, (ii) the second set of additional weight data if exactly one of the first and second non-zero weight map bits are 1, and (iii) the third set of additional weight data if both of the first and second non-zero weight map bits are 1. However, if the third non-zero weight map bit is 0, then the output of this multiplexer will be gated anyway by the AND gate.

For each 4-bit AND gate output, the decoder circuitry 3200 includes the corresponding non-zero weight map bit so that all 5 bits of weight data for each input multiplexer and ternary MAC are provided together to the filter slice buffer. In some embodiments, the filter slice buffer controller 3100 also includes circuitry that counts (i) the total number of non-zero bits in the non-zero weight map and (ii) the number of non-zero bits in the first half of the non-zero weight map, in order to identify the data to read for the second decoder cycle for a filter slice.

Figure 33:
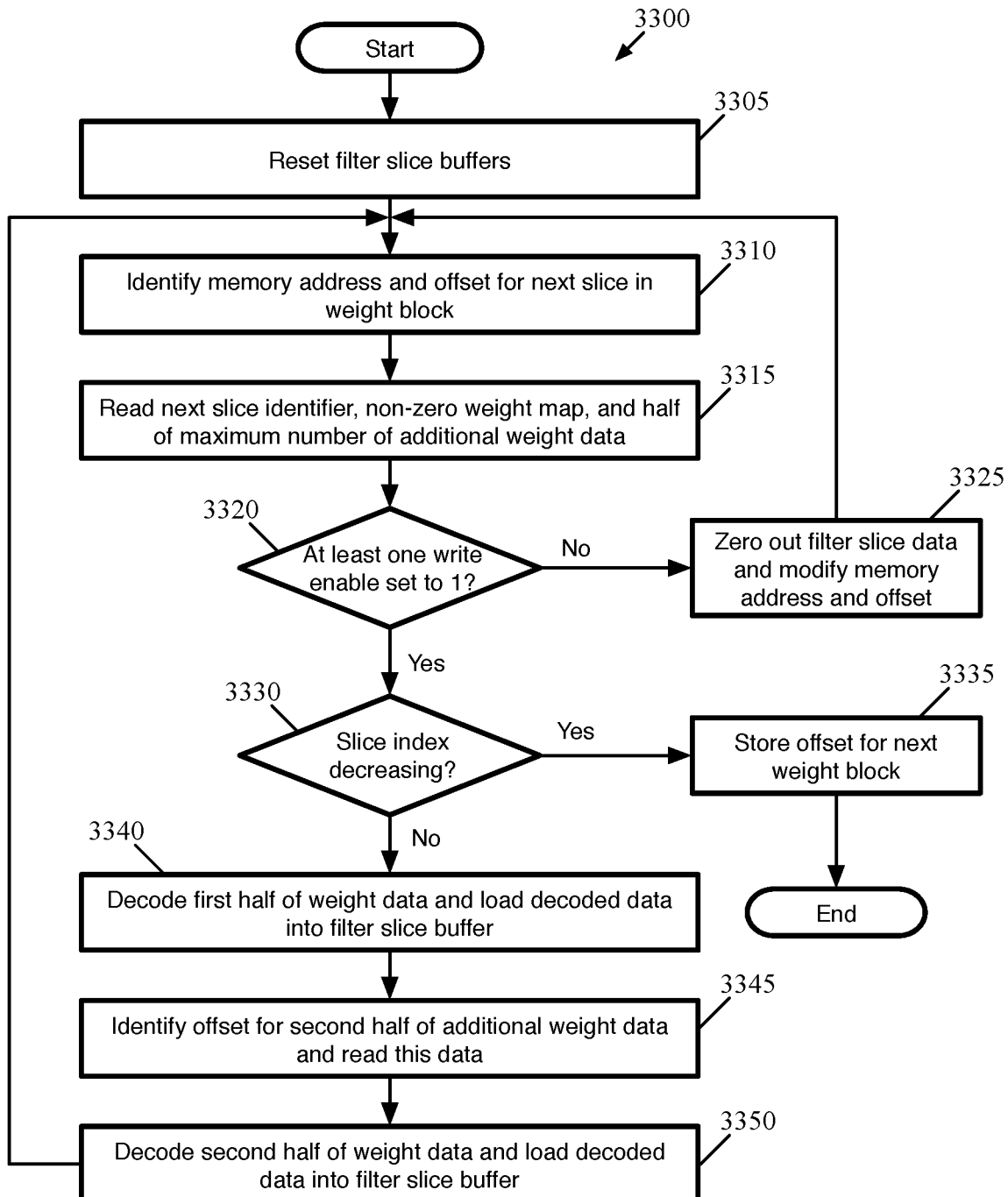
FIG. 33 conceptually illustrates a process of some embodiments for reading, decoding, and loading into the filter slice buffers a weight block for a pass of the neural network computation circuit.

FIG. 33 conceptually illustrates a process 3300 of some embodiments for reading, decoding, and loading into the filter slice buffers a weight block for a pass of the neural network computation circuit. The process 3300 is performed, in some embodiments, by the filter slice buffer controller within a core (though this process is performed by the filter slice buffer controllers within each core that is active for the current neural network layer). In some embodiments, this process is controlled by a state machine based on the values of configuration data provided by the main controller as well as, in part, by the values in each non-zero map of the weight data read by the controller.

As shown, the process 3300 begins by resetting (at 3305) all of the filter slice buffers in the core (e.g., by sending a reset signal to these buffers). In some embodiments, this reset signal sets all of the data in the buffers to zero. In some embodiments, after sending this reset signal, the filter slice buffer controller waits a predetermined number of clock cycles so that the read cache in the memory controller (e.g., the read cache 2200) can begin reading weight data from the core memory. For loading the filter slice buffers, the cache operates in sequential access mode as the weight data is always read in order.

After this wait (once enough data has been read into the cache), the process 3300 identifies (at 3310) the memory address and offset for the next filter slice in the weight block. In some embodiments, this data is provided as configuration data for the first filter slice in a pass, and then updated for each subsequent filter slice during the pass based on how much weight data is stored for each previous filter slice (i.e., based on the number of non-zero weights in the filter slice).

Using the identified memory address and offset, the process 3300 reads (at 3315) the next slice identifier (e.g., 8 bits, including 2 enable bits and 6 slice index bits), the non-zero weight map (e.g., 40 bits), and half of the maximum number of sets of additional weight data (e.g., 20×4=80 bits). In some embodiments (i.e., when there are 40 multiplexer inputs for each adder tree), this amounts to exactly 128 bits. As this data will have been previously read into the cache, the cache outputs this to the filter slice buffer controller as though it is a single RAM word, even when the data wraps across a RAM word boundary. If the filter slice includes less than 20 non-zero weight values, then the sets of additional weight data may include part of the weight data for the next filter slice. However, the decoder will not output this data, and the filter slice buffer controller identifies the correct starting point of the weight data for the next filter slice based on the number of non-zero weight values, so the data will be re-read as needed.

Next, the process 3300 determines (at 3320) whether at least one of the write enable bits in the slice identifier portion is set to 1. If both of these bits are 0, then the filter slice block is zeroed out, and the process modifies (at 3325) the memory address and/or offset to skip to the next filter slice identifier. The extent to which the memory address/offset is modified depends on the format used for all-zero filters; some embodiments include 40 bits of zeros in the non-zero map, while other embodiments do not include a non-zero map. In addition, some embodiments entirely skip all-zero filter slices in the weight data, and so this situation would not occur.

Assuming at least one of the write enable bits is set to 1, the process 3300 also determines (at 3330) whether the slice index (in the slice identifier field) is decreasing as compared to the previously loaded filter slice. Some embodiments arrange the filter slices within a weight block in order by index (though noting that some filter slices may be skipped) such that the filter slices within a weight block are always increasing. Some embodiments also allow for the slice index of a filter slice block to be equal to that of the previously loaded filter slice to allow for the loading of separate data into primary and secondary filter slice buffers having the same index. In some embodiments, the register or other structure storing the previously loaded filter slice is set to 0 for the start of each weight block.

If the slice index has decreased (e.g., is set to 0), then the process 3300 stores (at 3335) the offset for the next weight block (e.g., the weight block for the next pass). In some embodiments, the filter slice buffer controller also sends a signal to indicate that the weight data for the current pass is completely loaded (e.g., to the main controller for the core), so that the loading of the activation data for the first dot products of the pass can begin.

When the slice index is still increasing (or is the same, for a secondary filter slice buffer), the process 3300 decodes (at 3340) the first half of the weight data for the filter slice and loads the decoded data into the filter slice buffer (i.e., outputs the weight data to the filter slice buffer along with the write enable bits and the slice index identifier). As described above, for this first half of the weight data, the weight decoder receives the maximum amount of additional weight data, in case all of these weight values are non-zero. The decoder outputs to the filter slice buffers the decoded weight data for the first half of the weight data, with the non-zero map bits aligned correctly with the additional weight data (e.g., as 20 5-bit sets of data).

In addition, the process 3300 identifies (at 3345) the offset for the second half of the additional weight data (if there is any data) and reads this data (e.g., requests this data from the read cache). This second read for the filter slice, in some embodiments, is not a full RAM word, but rather only reads the specific additional weight data required for the remainder of the filter slice. In many cases, some or all of the data in this second read will also have been part of the first read at 3315 (unless all of the first half of the non-zero map indicates non-zero weights). To determine the offset, some embodiments count (i) the total number of non-zero weights indicated by the non-zero weight map and (ii) the number of non-zero weights in the first half of the non-zero weight map. If these two values are the same, then some embodiments do not issue a read (as there is no additional data to be read). Otherwise, the change in the offset for this second read is the fixed width bits (slice identifier and non-zero map fields) plus the number of non-zero weights in the first half of the non-zero weight map multiplied by the number of additional weight bits per non-zero weight (i.e., ×4).

The process 3300 then decodes (at 3350) the second half of the weight data for the filter slice and loads the decoded data into the filter slice buffer (i.e., outputs the weight data to the filter slice buffer along with the saved write enable bits and slice index identifier from the previous read). For this second half of the weight data, as indicated in the previous paragraph, the weight decoder receives only the additional weight data required for the decoding, rather than a full RAM word worth of data. The decoder outputs to the filter slice buffers the decoded weight data for the second half of the weight data, with the non-zero map bits aligned correctly with the additional weight data (e.g., again as 20 5-bit sets of data). The process 3300 then returns to 3310 to identify the memory address and offset for the next filter slice (i.e., by increasing the offset by the amount of data read at 3345).

Figure 34:
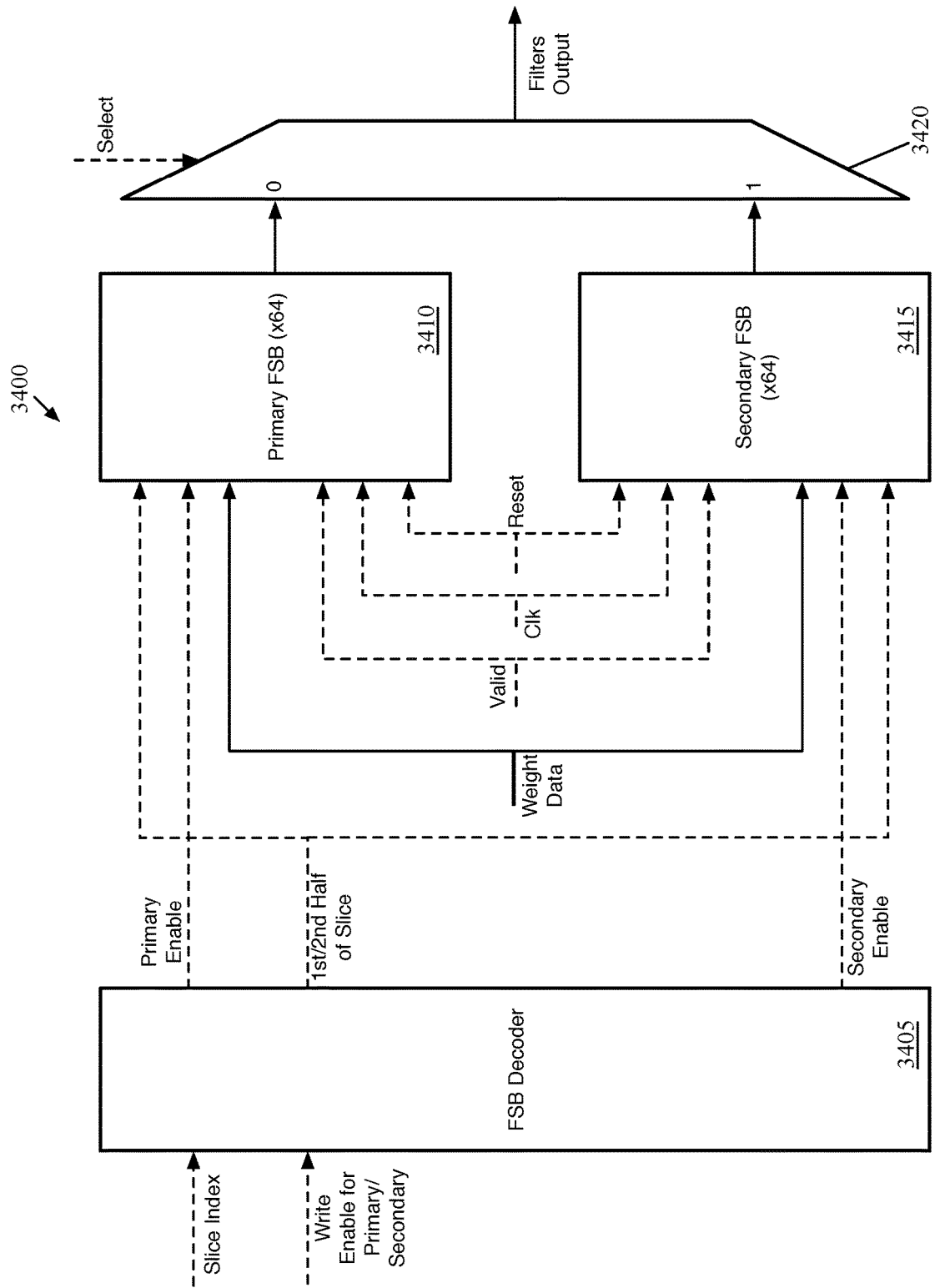
FIG. 34 conceptually illustrates the structure of the filter slice buffers of some embodiments.

The filter slice buffers receive weight data from the filter slice buffer controller (e.g., the weight decoder) and route this data to the correct slice buffer based on the write enable bits and the filter slice index. FIG. 34 conceptually illustrates the structure of the filter slice buffers 3400 of some embodiments. As shown, the filter slice buffers include a filter slice buffer decoder 3405, a set of primary filter slice buffers 3410, a set of secondary filter slice buffers 3415, and an output multiplexer 3420 that selects between outputting the primary or secondary filter slice buffers for a given clock cycle. The primary and secondary filter slice buffers 3410 and 3415 have the same structure, in some embodiments. As described below, the secondary filter slice buffers 3415 are used for certain types of dot products that require time-multiplexing (e.g., filter slicing, large dot products).

The filter slice buffer decoder 3405 receives the slice index, which includes an additional toggle bit in some embodiments specifying whether the data being received from the weight decoders is for the first half or second half of the filter slice. That is, if 6 bits are required to specify the filter slice, then the slice index includes a seventh bit to indicate in which half of the filter slice the received data will be stored. In addition, the filter slice buffer decoder 3405 receives the primary and secondary write enable bits from the stored weight data.

Using this data, the filter slice buffer decoder 3405 outputs a bit that enables either the first or second half of a filter slice (i.e., specifies to the enabled filter slice buffer whether to store the received weight data in the first or second half of the buffer). The value of this bit is the same for all of the filter slice buffers (i.e., all indexes, both primary and secondary). In addition, the filter slice buffer decoder 3405 includes a one-hot decoder that outputs a one-hot-zero address based on the slice index, then combines this with the primary and secondary write enable bits. The primary enable bus output either 0s to all of the primary filter slice buffers 3410 (if the primary write enable bit is 0) or a single 1 to the primary filter slice buffer specified by the slice index (if the primary write enable bit is 1). Similarly, the secondary enable bus outputs either 0s to all of the secondary filter slice buffers 3410 (if the secondary write enable bit is 0) or a single 1 to the secondary filter slice buffer specified by the slice index (if the secondary write enable bit is 1).

In addition, each of the primary and secondary filter slice buffers receive (i) the weight data, (ii) a valid signal, (iii) a clock signal, and (iv) a reset signal. The reset signal specifies to reset all of the filter slice buffers to 0. When a given filter slice buffer receives an enable signal, it uses the bit indicating whether the weight data is for the first or second half of the filter slice to write the received weight data to the correct set of registers that make up the filter slice buffers. Finally, when the signal is received to output the filter slice buffer contents to the adder tree input multiplexers, the multiplexer 3420 selects between the primary and secondary filter slice buffer outputs.

FIGS. 16 and 17, as described above, illustrate that the weight data from the filter slice buffers is used by (i) the input multiplexers 1610 and 1710 to the adder trees and (ii) the ternary MAC circuits 1615 and 1715. As explained, the multiplexer select bits from the weight data are used to select one of the multiplexer inputs, while the non-zero map and positive/negative bits are provided to the ternary MACs 1615 and 1715. The following describes two different possibilities for ternary MAC circuits of some embodiments, as well as how these circuits use the weight bits.

In some embodiments, the ternary MAC (or other circuit used to incorporate the ternary weight values into the dot product) uses the two's complement technique to negate input values with a negative corresponding weight value. This technique inverts all of the bits of the input value and adds 1 to this inverted value. However, the use of this technique requires a half adder circuit for each ternary MAC, in order to add 1 to the inverted value.

Figure 35:
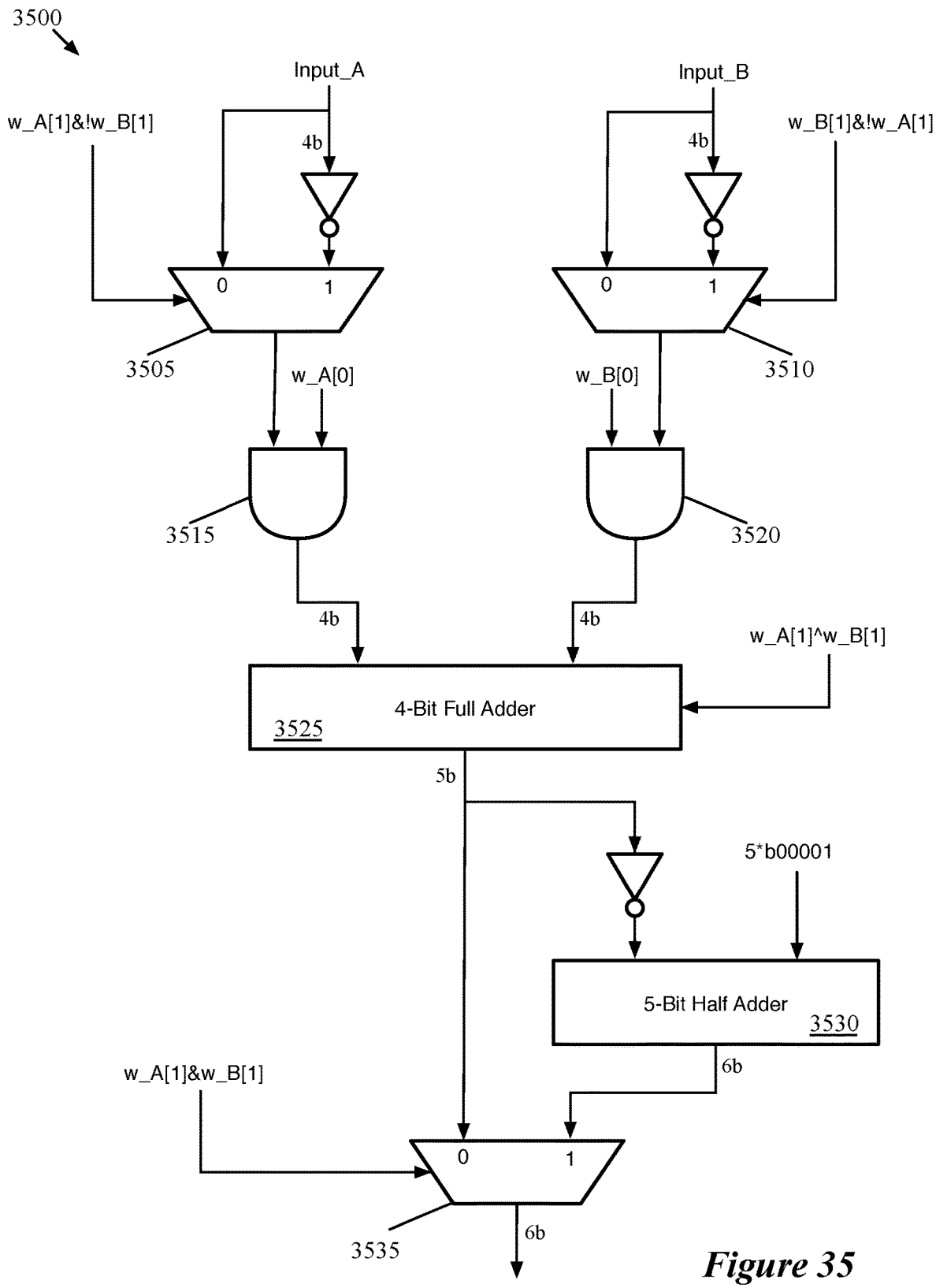
FIG. 35 illustrates a ternary MAC circuit of some embodiments.

FIG. 35 illustrates such a ternary MAC circuit 3500. As shown, the ternary MAC 3500 includes a pair of 2-input multiplexers 3505 and 3510, a pair of AND gates 3515 and 3520, a full adder 3525, a half adder 3530, and a final 2-input multiplexer 3535. This example circuit 3500 receives two 4-bit activation inputs A and B and outputs a 6-bit value, though other embodiments with different activation inputs use similar circuits (e.g., with adders for different bit lengths).

The first multiplexer 3505 receives as its two inputs the first activation input A as well as the binary inversion of this value (e.g., if A=0110, then the inversion of this is 1001). With signed integers, inverting a binary number then adding 1 to that inverted value gives the negative of the binary number, so in this case the multiplexer receives A and (−A −1).

In the notation used in this and the subsequent figures, the value w_A[0] is the non-zero map bit for the weight value corresponding to the Input_A, and the value w_A[1] is the positive/negative bit (from the additional weight data). Thus, if the corresponding weight value is 0, then the bits w_A[0]=0 and w_A[1]=0 (w_A[1] will be generated as 0 by the weight decoder in this case). If the corresponding weight value is 1, then the bits w_A[0]=1 and w_A[1]=0, and if the corresponding weight value is −1, then the bits w_A[0]=1 and w_A[1]=1. Similarly, the bits w_B[1] and w_B[0] relate in the same way to the corresponding weight value for Input_B. As such, the select bit for the multiplexer 3505 is true (equal to 1) if the corresponding weight value for A is negative and the corresponding weight value for B is negative (equal to 0). Thus, the multiplexer 3505 passes the inversion of the value A if A has a negative corresponding weight and B does not have a negative corresponding weight, and otherwise passes the value A. The other multiplexer 3510 (for Input_B) has a similar select bit, such that the multiplexer 3510 passes the inversion of the value B if B has a negative corresponding weight and A does not have a negative corresponding weight, and otherwise passes the value B.

These inputs are then gated using AND gates 3515 and 3520 so that the value 0 is passed for either input if that input has a corresponding weight value of 0. That is, the bit w_A[0] is true and thus the AND gate 3515 passes the input A (or the inversion of A) if the weight value for A is not zero. Similarly, the bit w_B[0] is true and thus the AND gate 3520 passes the input B (or the inversion of B) if the weight value for B is not zero. Gating the inputs early reduces the power consumption in some embodiments (in case, e.g., both inputs to the adder 3525 are 0).

The full adder 3525 adds the two 4-bit values received from the AND gates 3515 and 3520, and outputs a 5-bit value. Here the carry bit is a value that is equal to 1 if either of the weight values for the two inputs is equal to −1, but not if both of the weight values are equal to −1. The full adder 3525 is a standard adder, and this carry bit adds in the 1 to account for one of the input values being inverted. As noted above, if both weight values are −1, then the values are not inverted at this point, and thus the adder 3525 adds the positive inputs, and no carry bit is needed.

The output of the full adder 3525 is (i) provided to one of the inputs of a 2-input multiplexer 3535 and (ii) inverted and provided to a half adder 3530, which provides its output to the second input of the multiplexer 3535. This half adder 3535 adds the value 1 to the inverted output and is selected by the multiplexer 3535 only if both of the weight values are −1. That is, if only one of the weight values are negative, then the full adder 3525 adds the binary inversion of the input with the negative corresponding weight to the input with the positive corresponding weight (or to zero) and the carry bit accounts for addition of 1 with the two's complement technique. On the other hand, if both of the weight values are negative, then the inputs are added as though the weights are positive, then this output is inverted and the half adder 3530 adds one to complete the two's complement technique.

This ternary MAC circuit 3500 fully accounts for the weight values (except for any multiplication if the positive weight value is actually a value other than 1. The values passed to the adder tree simply need to be added together. However, in order to save additional circuit space, in some embodiments the compiler determines the number of negative weight values for each dot product computation and add this number to the dot product at the end of the computation (e.g., by incorporating this number into the bias value provided to the adder 1220). This enables the dot product computation circuits to use ternary MAC circuits without the half adder 3530 and the multiplexer 3535, which is a substantial cost savings in terms of circuit surface area.

Figure 36:
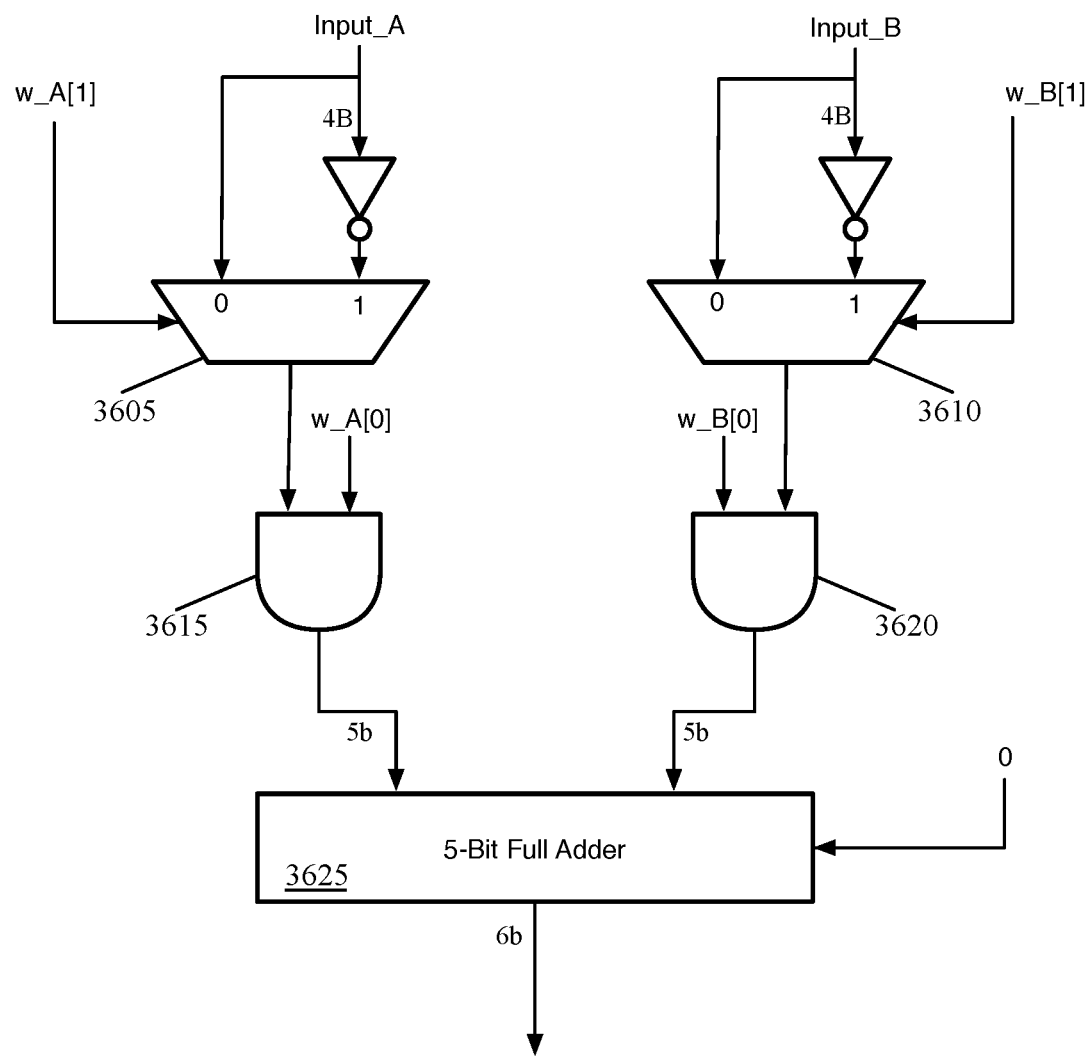
FIGS. 36 and 37 illustrate reduced-area ternary MAC circuits of some embodiments.

FIG. 36 illustrates an example of such a reduced-area ternary MAC circuit 3600 of some embodiments. For each input value, this ternary MAC circuit 3600 provides to the dot product computation (i) the value zero if the corresponding weight value is zero, (ii) the input value if the corresponding weight value is positive, and (iii) the binary inversion of the input value if the corresponding weight value is negative (without adding 1 to the binary inversion).

As shown, the ternary MAC circuit 3600 includes a pair of 2-input multiplexers 3605 and 3610, a pair of AND gates 3615 and 3620, and a full adder 3625. Compared to the circuit 3500, this circuit 3600 removes an inverter, a half adder, and a multiplexer. As an example, an IC with 20 ternary MAC circuits for each of 64 partial dot product computation circuits on each of 16 cores would have over 20,000 such ternary MAC circuits, so the area savings by removing these adders and multiplexers is substantial.

The first multiplexer 3605 receives as its two inputs the first activation input A as well as the binary inversion of this value. In this case, the select bit for the multiplexer is simply w_A[1], which is set to 1 only if the corresponding weight value for A is negative. As such, if activation input A has a negative weight value, then the multiplexer 3605 selects the binary inversion of the input value, and if activation input A has a positive weight value (or a weight value of 0), then the multiplexer 3605 selects the input value. The multiplexer 3610 provides a corresponding selection of either the activation input value B or the binary inversion of this value B based on the corresponding weight value for input B.

As with the ternary MAC circuit 3500, the outputs of the multiplexers 3605 and 3610 are provided to AND gates 3615 and 3620 where the inputs are gated with the w_A[0] and w_B[0] bits (i.e., the non-zero map bits for these inputs), respectively, so that the value 0 is passed for activation inputs with a corresponding weight of 0. These inputs (either the input value, the binary inversion of the input value, or the value 0) are provided to the full adder 3525, which adds the two values (with a carry bit of 0) and outputs a 6-bit value (assuming 5-bit decoded inputs) to the full adder tree.

Figure 37:
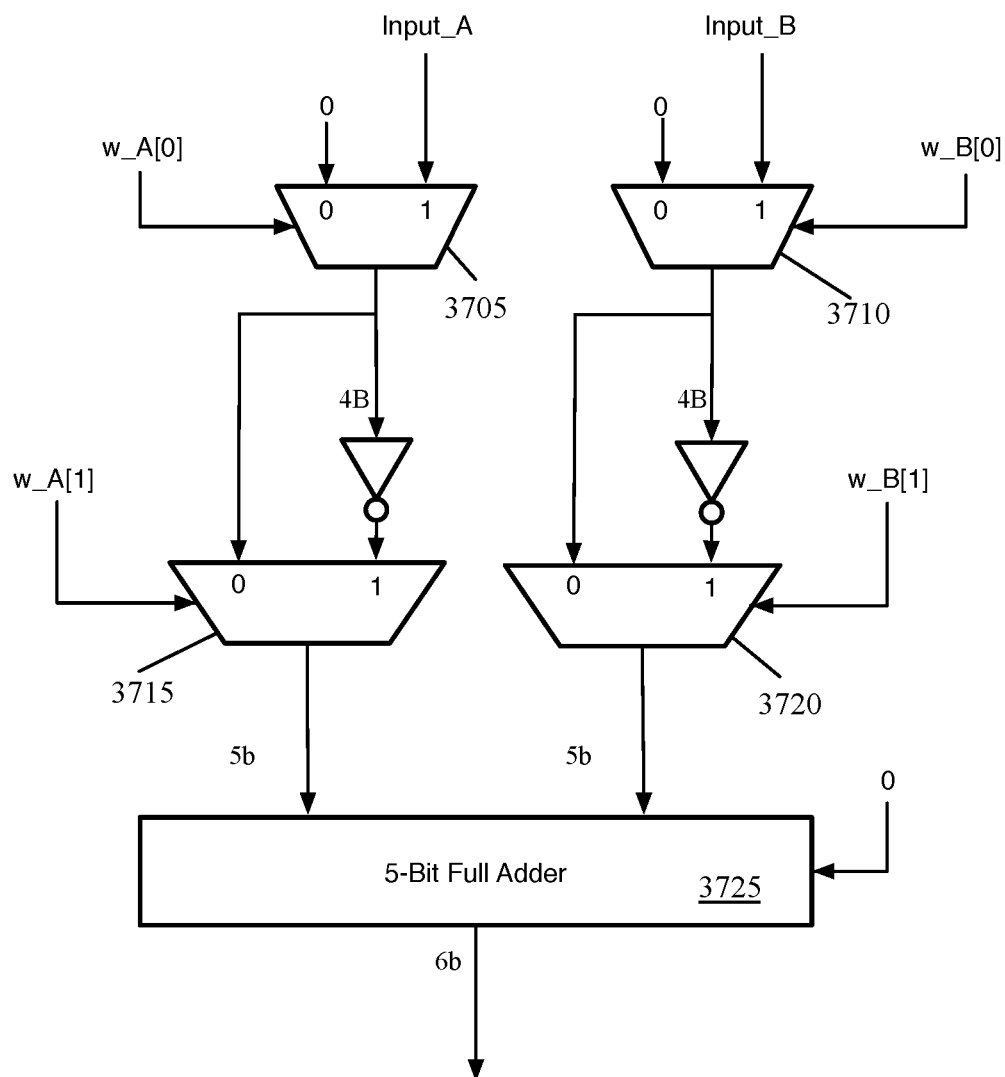

Rather than using an AND gate to incorporate the non-zero map bits, some embodiments use the structure 3700 shown in FIG. 37 which instead uses multiplexers to accomplish the same function. Here, the multiplexers 3705 and 3710 effectively gate the inputs using the non-zero map bits w_A[0] and w_B[0], which each select either the value 0 (if the non-zero map bit is 0) or the corresponding input (if the non-zero map bit is 1). This is provided to the multiplexers 3715 and 3720, which operate in the same manner as the multiplexers 3605 and 3610 (with binary inverters inverting one of the inputs to each multiplexer). If the positive/negative bit is set to 0 (for a zero or positive corresponding weight value), then the output of the previous multiplexer is selected. If the positive/negative bit is set to 1 (for a negative corresponding weight value), then the binary inversion of the output of the previous multiplexer is selected. The outputs of these multiplexers are provided to the full adder 3725, as in the previous example of FIG. 36.

Figure 38:
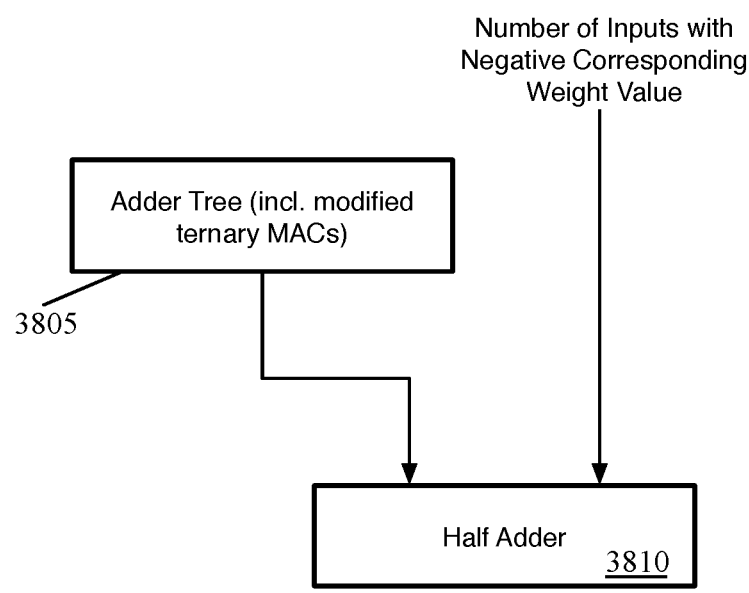
FIG. 38 illustrates an adder tree that uses the modified ternary MACs such as those shown in FIG. 36.

Both of these ternary MAC circuits 3600 and 3700 are simpler than that shown in FIG. 35, but do not account for the need to add 1 to each binary inversion in order to accurately negate those input values. Thus, as shown in FIG. 38, some embodiments use one additional half adder to add in these additional bits to the dot product. This additional half adder may be incorporated into the IC per adder tree (i.e., per partial dot product computation) or per overall dot product computation (e.g., into the activation post-processing, by incorporating this as part of the bias value provided to the adder 1220).

FIG. 38 illustrates an adder tree 3805 that uses the modified ternary MACs such as those shown in FIG. 36. This adder tree provides an output to an additional half adder 3810, which receives as its other input a value equal to the number of inputs used by the adder tree 3805 that have a negative corresponding weight value. The half adder 3810 incorporates this additional value into the dot product and thus completes the two's complement addition of the inputs with negative corresponding weight values. In some embodiments, the network includes a bias factor for each dot product that is added into the dot product, and in this case the number of negative weights can be added in along with this bias, in which case no additional circuitry is required to incorporate this value.

Figure 39:
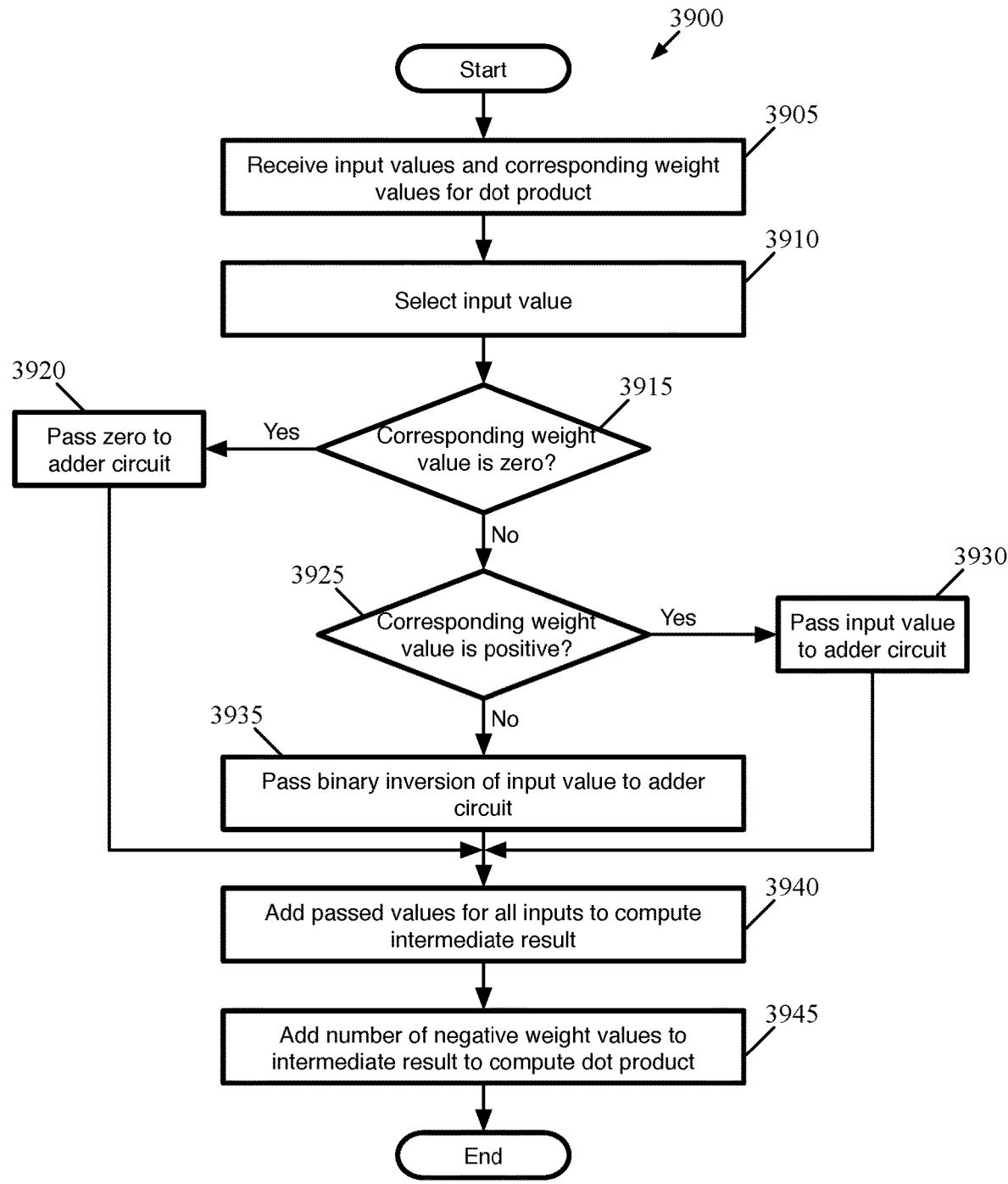
FIG. 39 conceptually illustrates a process of some embodiments for computing a dot product.

FIG. 39 conceptually illustrates a process 3900 of some embodiments for computing a dot product (or a partial dot product). This process 3900 is performed by an IC of some embodiments (e.g., by a partial dot product computation circuit, by a set of such circuits that compute a complete dot product, etc.) that uses ternary MACs such as that shown in FIG. 36, which pass, for each input value, (i) the value zero if the corresponding weight value is zero, (ii) the input value if the corresponding weight value is positive, and (iii) the binary inversion of the input value if the corresponding weight value is negative.

As shown, the process 3900 begins by receiving (at 3905) a set of input values and corresponding weight values for the dot product. By reference to FIG. 15, these may be the weight values loaded into a particular filter slice buffer and the activation input values loaded into the activation window buffer, or numerous instances of these weight values and activation input values required for a complete dot product for a node of a neural network.

The process 3900 then determines what value to pass to the dot product computation for each input value. As shown, the process selects (at 3910) an input value. It should be understood that the process 3900 is a conceptual illustration of the process performed by the IC. While shown as an iterative process that selects each input value in process, the actual operation of some embodiments performs these operations in parallel (e.g., in the same clock cycle) across numerous ternary MACs (which each handle two inputs). In addition, the ternary MACs do not make decision operations per se, but instead operate as described by reference to FIG. 36.

For the selected input value, the process 3900 determines (at 3915) whether the corresponding weight value is zero. If this is the case, the process passes (at 3920) the value zero to the adder circuit. In the ternary MAC circuit 3600, this operation is implemented by the AND gates 3615 and 3620. If the weight value is not zero, the process determines (at 3925) whether the corresponding weight value is positive. If the weight value is positive, the process passes (at 3930) the input value to the adder circuit. On the other hand, if the weight value is not positive (and therefore is negative), the process passes (at 3935) the binary inversion of the input value to the adder circuit. These operations are implemented by the multiplexers 3605 and 3610 (along with the inverters) in the ternary MAC circuit 3600.

Next, the process 3900 adds (at 3940) the values passed for each input to compute an intermediate result for the dot product. In the IC of some embodiments, the full adders 3625 as well as the adder trees for each partial dot product computation (and, in some embodiments, the additional adders that combine the partial dot products) perform this addition.

Finally, the process 3900 adds (at 3945) the number of negative weight values to this intermediate result to complete the computation of the dot product. As described above, the compiler determines the number of negative weight values used for each portion of the dot product and is able to factor this value into the appropriate adder, which may be incorporated at the end of each partial dot product computation, or at the end of each complete dot product computation (e.g., along with the bias constant).

In the typical dot product computation described by reference to the process 1800 that meets the requirements listed above (i.e., sparsity, ternary weights, input values of a specified size, and less than the maximum number of dot product components), the secondary filter slice and activation window buffers are not used, and the left shift circuit 1320, adder 1325, and register 1330 effectively act as pass-throughs. However, this circuitry also enables more complex dot products to be computed if needed, thereby increasing the size and types of neural networks that can be executed by the neural network computation circuit.

Figure 40:
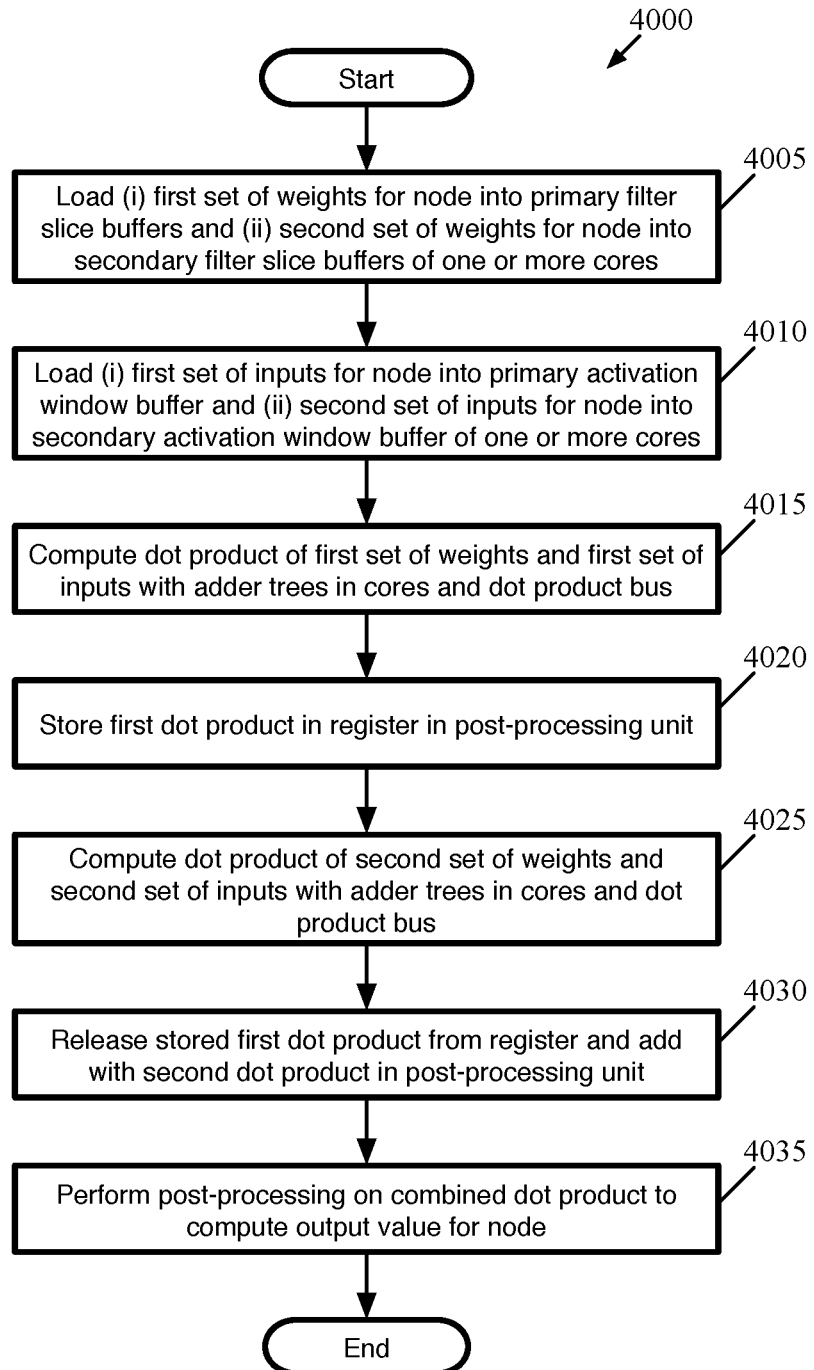
FIG. 40 conceptually illustrates a process of some embodiments for executing a neural network computation node with up to twice the number of dot product components that can be computed in a single cycle across all of the cores.

FIG. 40 conceptually illustrates a process 4000 of some embodiments for executing a neural network computation node with up to twice the number of dot product components that can be computed in a single cycle across all of the cores. Such a computation uses the secondary input value buffer as well as the secondary weight value buffers, and uses two (or more) clock cycles of the neural network computation circuit. The process 4000 is executed by the chip fabric of a neural network IC, such as that described above. Typically, the process 4000 is executed simultaneously for multiple nodes, and will be performed repeatedly for multiple activation windows (i.e., multiple groups of input values loaded into the activation slice buffer) in order to completely execute a layer of the neural network.

This process 4000 will be described in part by reference to FIG. 41, which illustrates the operation of various circuits to compute such large dot products over two or more clock cycles of the chip fabric. Specifically, this figure illustrates primary filter slice buffers 4105, secondary filter slice buffers 4110, primary activation window buffer 4115, secondary activation window buffer 4120, adder trees 4125, and post-processing units 4130. Each activation window buffer represents that (primary or secondary) buffer across all of the cores active for the dot product computation, and similarly each of the filter slice buffers and adder trees of a particular index represents that (primary or secondary) buffer and adder tree at the particular index across all of the active cores. Along these lines, each PPU for a particular index represents the selected PPU for that index that performs the post-processing for a given node (and thus could include PPUs in different channel segments).

As shown, the process 4000 begins by loading (at 4005) (i) a first set of weight values for the node into the primary filter slice buffers and (ii) a second set of weight values for the node into the secondary filter slice buffers of one or more cores. In addition, the process loads (at 4010) (i) a first set of input values for the node into the primary activation window buffers and (ii) a second set of input values for the node into the secondary activation window buffers of the cores. In some embodiments, the sets of input values are loaded into the activation window buffers in the core while the weight values for the various filters are loaded into multiple filter slice buffers (unless there is only a single filter).

In a typical convolutional neural network, all of the nodes in a layer will have the same dimensions, and therefore the same number of weights. As such, if one of the dot products has too many components to be computed in a single cycle, then all of the dot products computed simultaneously will also require to the use of multiple cycles, so the secondary filter slice buffers will be loaded for all of the indices in use. If the number of dot product components (i.e., number of input values and weight values) is larger than the maximum that can be computed in a single cycle but less than twice that amount, some embodiments do not necessarily use all of the cores. For instance, if the maximum number of components for a single clock cycle is 2304 (16 cores with 144 inputs in each activation window buffer) and a dot product has 2880 components, the compiler of some embodiments assigns the inputs and values to the primary and secondary buffers of ten cores rather than using the primary buffers of all sixteen cores and the secondary buffers of only four of the cores. Other embodiments use the latter option, however.

Next, the process 4000 computes (at 4015) the dot product of the first set of weight values (from the primary filter slice buffer) and the first set of input values (from the primary activation window buffer), and stores (at 4020) this dot product in the register of the post-processing unit. The first clock cycle (cycle 0) shown in FIG. 41 illustrates these computations. For each filter slice buffer in use (depending on the number of filters in the layer, all of the filter slice buffers and adder trees may not be required), the corresponding adder tree 4125 in each active core receives the first weight values from the primary filter slice buffer 4105 and the input values from the primary activation window buffer 4115 in the core (as well as configuration data specifying which input values to select), and computes the partial dot product. In some embodiments, sets of multiplexers are used to select whether the input values from the primary or secondary activation buffer and weight values from the primary or secondary set of filter slice buffers are provided to the adder trees. For the input values, these multiplexers select each primary or secondary input value prior to providing each of those input values to the two different input multiplexers as shown in FIG. 16.

The corresponding dot product bus lane for each adder tree (not shown for simplicity) aggregates these partial dot products, and provides this data to one of the corresponding post-processing units 4130 (with the specific channel segment for each post-processing unit identified by configuration data directing the flow of aggregation and enabling the correct post-processing unit). In this first cycle, the bit shifter 4135 and adder 4140 are passed through without modifying the dot product, and the register 4145 is configured to store the first dot product. In some embodiments, these components correspond to the left shift circuit 1320, adder 1325, and register 1330 of FIG. 13.

In a subsequent clock cycle, the process 4000 computes (at 4025) the dot product of the second set of weight values (from the secondary filter slice buffer) and the second set of input values (from the secondary activation window buffer). The process also releases (at 4030) the stored first dot product from the register and adds this with the second dot product in the post-processing circuit. In different embodiments, this second clock cycle may be the next clock cycle after the cycle in which the first dot product is computed, or may be multiple cycles later. For instance, some embodiments initially load the primary buffers and then continue to load the secondary buffers while the first dot product is computed, in which case several cycles may pass before the secondary buffers are ready for the second dot product computation.

Figure 41:
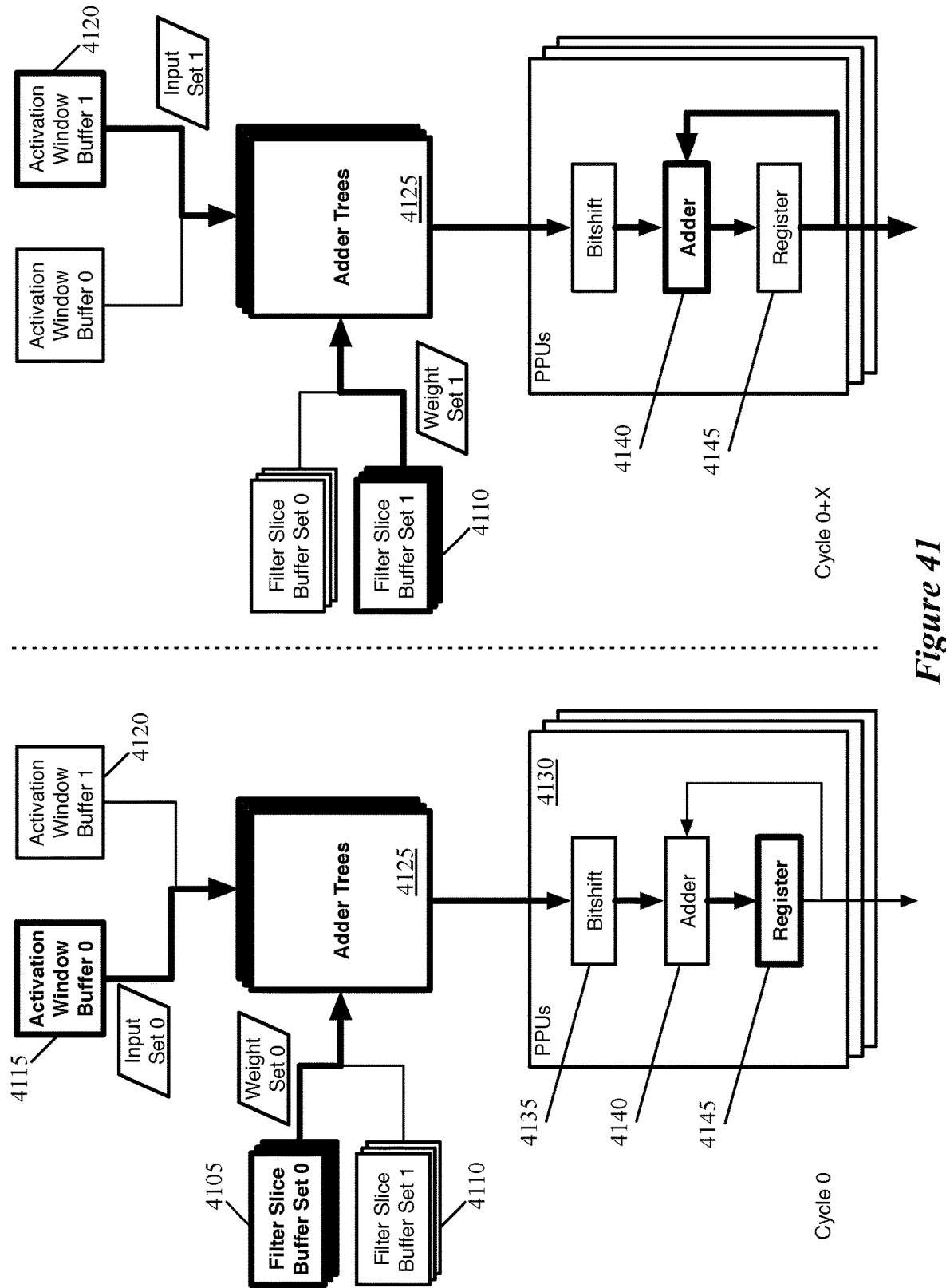
FIG. 41 illustrates the operation of various circuits to compute large dot products over two or more clock cycles of the chip fabric.

The second clock cycle (cycle 0+X) shown in FIG. 41 illustrates the second set of computations. For each filter slice buffer in use (depending on the number of filters in the layer, all of the filter slice buffers and adder trees may not be required), the corresponding adder tree 4125 in each active core receives the second set of weight values from the secondary filter slice buffer 4110 and the input values from the secondary activation window buffer 4120 in the core (as well as configuration data specifying which input values to select for each input), and computes the partial dot product.

The corresponding dot product bus lane for each adder tree aggregates these partial dot products in the second clock cycle, and provides this data to one of the corresponding post-processing units 4130 (for each index, the post-processing unit in the same channel segment is selected as in the first clock cycle). In this second clock cycle, the stored first dot products are released from the registers 4145 and passed to the adder 4140, which combines the dot products from the first and second clock cycles. This value can then be output to the remainder of the post-processing unit (not shown).

With the complete dot product calculated, the process performs (at 4035) post-processing on the combined dot product in order to compute the output value for the node. As described above, this post-processing may include addition of a bias factor, multiplication by a scaler, any required truncation/quantization, and application of the non-linear function.

Figure 42:
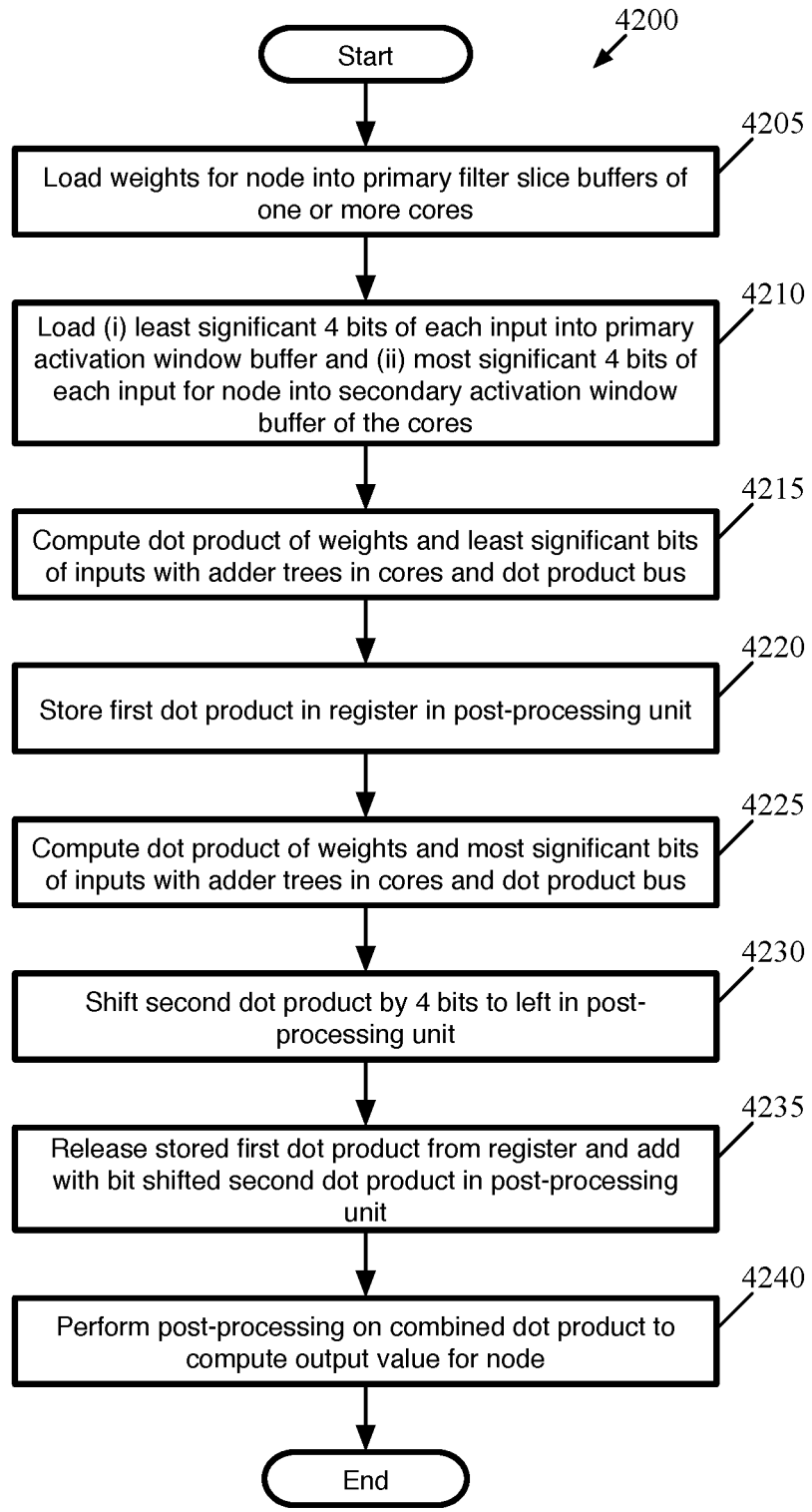
FIG. 42 conceptually illustrates a process of some embodiments for executing a neural network computation node that uses input values (and output values) up to twice the size for which the circuitry is designed.

FIG. 42 conceptually illustrates a process 4200 of some embodiments for executing a neural network computation node that uses input values (and output values) up to twice the size for which the circuitry is designed. That is, if the dot product computation circuits (e.g., the adder trees, dot product bus, etc.) are designed for 4-bit input values, then the process 4200 allows for up to 8-bit input values to be used. Such a computation uses the secondary input value buffer but only the primary weight value buffers, and like the computation for dot products with a large number of components, uses two (or more) clock cycles of the neural network computation circuit. The process 4200 is executed by the chip fabric of a neural network IC, such as that described above. Typically, the process 4200 is executed simultaneously for multiple nodes, and will be performed repeatedly for multiple activation windows (i.e., multiple groups of input values loaded into the activation slice buffer) in order to completely execute a layer of the neural network. Often, if larger input (and output) values are used, the input values for all layers of the will be of the larger size. This process 4200 will be described in part by reference to FIG. 43, which illustrates the operation of the circuits from FIG. 41 to compute such dot products with large input values over two or more clock cycles of the chip fabric.

As shown, the process 4200 begins by loading (at 4205) weight values for the node into the primary filter slice buffers of one or more cores. In addition, the process loads (at 4210) (i) the least significant 4 bits of each input value for the node into the primary activation window buffers and (ii) the most significant 4 bits of each input value for the node into the secondary filter slice buffers of the core. As an example, for the input value 11010001, the least significant nibble (0001) would be loaded into the primary activation window buffer while the most significant nibble (1101) would be loaded into the secondary activation window buffer. In some embodiments, the input values are loaded into the activation window buffers in the core while the weight values for the various filters are loaded into multiple filter slice buffers (unless there is only a single filter). Whereas dot products with a large number of input values will necessitate the use of a large number of cores (i.e., more than half of the cores), neural networks that use large input values may have all different sizes of dot products, and thus any number of cores could be used for a given calculation depending on the size of the dot product.

It should be understood that, while the process 4200 uses 4-bit and 8-bit values, other sizes of input/output values are possible. For instance, the hardware could be designed for 5-bit values (such that up to 10-bit values are possible using this technique), 8-bit values (allowing for up to 16-bit values with this technique), etc. In addition, intermediate-sized values are possible. In the 4-bit and 8-bit example, the circuit would also be configured to 5-bit, 6-bit, or 7-bit input values in the same way. For a 5-bit value, for example, the least significant 4 bits would be loaded into the primary buffer while the remaining bit would be loaded into the secondary buffer with three bits of 0-padding to reach 8 bits.

Next, the process 4200 computes (at 4215) the dot product of the weight values (from the primary filter slice buffer) and the least significant bits of the input values (from the primary activation window buffer), and stores (at 4220) this first dot product in the register of the post-processing unit. The first clock cycle (cycle 0) shown in FIG. 43 illustrates these computations. For each filter slice buffer in use (depending on the number of filters in the layer, all of the filter slice buffers and adder trees may not be required), the corresponding adder tree 4125 in each active core receives the weight values from the primary filter slice buffer 4105 and the least significant nibble of the input values from the primary activation window buffer 4115 in the core (as well as configuration data specifying which input values to select), and computes the partial dot product.

The corresponding dot product bus lane for each adder tree aggregates these partial dot products for the least significant bits of the input values, and provides this data to one of the corresponding post-processing units 4130 (with the specific channel segment for each post-processing unit identified by configuration data directing the flow of aggregation and enabling the correct post-processing unit). In this first cycle, the bit shifter 4135 and adder 4140 are passed through without modifying the dot product, and the register 4145 is configured to store the first dot product.

In a subsequent clock cycle, the process 4200 computes (at 4225) the dot product of the weight values (again from the primary filter slice buffer) and the most significant bits of the input values (from the secondary activation window buffer). In the post-processing circuit for the node, the process 4200 also shifts (at 4230) the result of this second dot product left by 4 bits (i.e., so that the 4 least significant bits of the new dot product become 0). This results in the dot product second being the same value as if all of the inputs to the second dot product computation were 8-bit values with the 4 least significant bits being 0. In addition, the process 4200 releases (at 4235) the stored first dot product from the register and adds this with the second bit shifted dot product in the post-processing circuit. In different embodiments, this second clock cycle may be the next clock cycle after the cycle in which the first dot product is computed, or may be multiple cycles later. For instance, some embodiments initially load the primary activation window buffer and then continues to load the secondary activation window buffer while the first dot product is computed, in which case several cycles may pass before the secondary buffers are ready for the second dot product computation.

The second clock cycle (cycle 0+X) shown in FIG. 43 illustrates this second set of computations. For each filter slice buffer in use, the corresponding adder tree 4125 in each active core receives weight values from the primary filter slice buffer 4105 and the most significant nibble of the input values from the secondary activation window buffer 4120 in the core (as well as configuration data specifying which input values to select for each input), and computes the partial dot product.

The corresponding dot product bus lane for each adder tree 4125 aggregates these partial dot products in the second clock cycle, and provides this data to one of the corresponding post-processing units 4130 (for each index, the post-processing unit in the same channel segment is selected as in the first clock cycle). The bit shifters 4135 in the post-processing units are configured to shift this incoming second dot product left by 4 bits in this second clock cycle. In addition, the stored first dot products are released from the registers 4145 and passed to the adder 4140, which combines the dot products from the first and second clock cycles. This value can then be output to the remainder of the post-processing unit (not shown).

This example describes the least significant nibble being loaded into the primary activation window buffer and the most significant nibble being loaded into the secondary activation window buffer. However, it should be understood that other embodiments load the least significant nibble into the secondary activation window buffer and the least significant nibble into the primary activation window buffer. In the latter case, the initial dot product would be bit shifted 4 bits to the left rather than this bit shift being applied to the latter dot product, and the bit shifted dot product stored in the register.

With the complete dot product calculated, the process performs (at 4240) post-processing on the combined dot product in order to compute the output value for the node. As described above, this post-processing may include addition of a bias factor, multiplication by a scaler, any required truncation/quantization, and application of the non-linear function. In some embodiments, the bias factor includes an addition of +17 for each negative weight value in the filter (as compared to +1 for each negative weight for standard activation size dot products).

In addition to these techniques for computing large dot products or dot products with large input values, some embodiments have solutions if a particular filter slice (i.e., the weights assigned to a particular weight value buffer in a particular core) has too many non-zero values (i.e., the network is not locally sparse enough for the hardware). That is, if the number of non-zero weight values is greater than the number of multiplexer inputs to the dot product computation, then the filter slice is not sparse enough. In addition, the wiring of each input value in the activation window buffer to two multiplexers will not accommodate certain configurations of non-zero weight values (which is why the neural network computation circuit of some embodiments includes a number of multiplexers that is slightly more than one-fourth the number of input values in the buffer, with some of the input values wired to three multiplexers, as shown in FIG. 17).

The input values (and their corresponding weight values), in some embodiments, cannot be easily moved around to different cores because (i) the input values are used for numerous simultaneous dot products and (ii) the input values are efficiently carried in contiguous blocks to the cores by the output bus, with the ordering of these input values dependent on the post-processing unit indices that computed them as output values in the previous layer.

As such, the compiler of some embodiments is responsible for dividing the filter slice into two slices while maintaining efficient computation by the neural network computation circuit. As noted, the compiler of some embodiments is a software application that is responsible for receiving a trained neural network and converting that network into instructions for loading the weight values onto the neural network computation circuit and instructions for the circuit to execute. The compiler assigns each layer to a particular number of cores, assigns the different filter slices to different weight value buffer/partial dot product computation circuit/dot product bus lane/post-processing unit indices, specifies which segment will perform post-processing on each output value, etc. Because the computations of a previously-trained network are not dynamic (that is, the computations performed are not dependent on the results of previous computations), the entire execution of a network can be statically scheduled by the compiler. Networks that do not have local sparsity issues are also scheduled by the compiler, and the local sparsity issues that result in filter splitting lead to additional complexity in the compiler.

When a filter slice is not sparse enough for each input value with a nonzero weight value to be mapped to a different multiplexer input, different embodiments use different techniques to divide (split) the filter. Some embodiments move a subset of the weight values to the secondary weight value buffer in the core and compute the dot product over multiple clock cycles. FIG. 44 illustrates the operation of the circuits from FIG. 41 to compute a dot product with a split filter over multiple clock cycles.

In this example, a first subset of the weight values of the split filter are loaded into the primary filter slice buffer 4105 while the remainder of the weight values are loaded into the secondary filter slice buffer 4110. In this case, the weight values in the primary filter slice buffer 4105 that correspond to the weight values moved to the second subset are zero, and similarly the weight values in the secondary filter slice buffer 4110 that correspond to the weight values remaining in the first subset are zero. As mentioned, some embodiments move half of the weight values to the secondary filter slice buffer (e.g., the odd values or even values). Other embodiments move a subset of weight values so as to ensure that each subset of weight values is adequately sparse so that each input value with a nonzero weight value can be mapped to a different multiplexer input. In either case, all of the input values are loaded into the primary activation window buffer 4115.

In the first clock cycle (cycle 0) shown in this figure, the adder trees 4125 compute dot products of the first subset of weight values from the primary filter slice buffer 4105 and the input values from the primary activation window buffer 4115. In some embodiments, only the dot products for filters that require splitting are computed over two cycles, whereas other dot products that use the same set of input values are computed in a single cycle. However, in order to align all of the output values on the activation write bus, some embodiments either hold all of the dot products in the registers 4145 until those with split filters are complete or split all of the filters for which dot products are computed simultaneously (e.g., all of the filters for the layer or portion of a layer). In some embodiments, when a particular filter is not split, but two cycles are used, weight values of zero are loaded into all of the unused filter slice buffers so that the computed partial dot products will be zero and not affect any dot product totals.

The corresponding dot product bus lane for each adder tree 4125 aggregates these partial dot products (if more than one core is used for the computation) of the input values and the first subset of weight values, and provides this data to one of the corresponding post-processing units 4130 (with the specific channel segment for each post-processing unit identified by configuration data directing the flow of aggregation and enabling the correct post-processing unit). In this first cycle, the bit shifter 4135 and adder 4140 are passed through without modifying the dot product, and the register 4145 is configured to store the first dot product.

In a subsequent clock cycle (cycle 0+X), the adder trees 4125 in use (or at least the adder trees for the split filters, if not all of the filters are split) receive the second subset of weight values from the corresponding secondary filter slice buffers 4110 as well as the input values from the primary activation window buffer 4115 and compute the partial dot product of these values. The corresponding dot product bus lane for each adder tree 4125 aggregates these partial dot products (if more than one core is used) and provides this data to one of the corresponding post-processing units 4130 (for each index, the post-processing unit in the same channel segment is selected as in the first clock cycle). In this second clock cycle, the stored first dot products are released from the registers 4145 and passed to the adder 4140, which combines the dot products from the first and second clock cycles. This value can then be output to the remainder of the post-processing unit (not shown).

However, some embodiments also provide for the ability to split filters without incurring this latency cost. In addition, dot products with a large number of components or with large input values already use the secondary buffers and second clock cycle, and thus require a different solution for such filters. As shown above by reference to FIG. 13, each post-processing unit actually receives two dot product inputs, which for the majority of the post-processing units are outputs of two different dot product bus lanes. One of these is the output of the dot product bus lane with the same index as the post-processing unit, and one of these is the output of a different lane. In some embodiments, the first half of the dot product bus lanes are only wired to a single post-processing unit in each channel segment (those with the same index), with the secondary inputs all coming from the second half of the lanes. This allows for optimal packing of output values from the post-processing units when filter splits are required.

Figure 45:
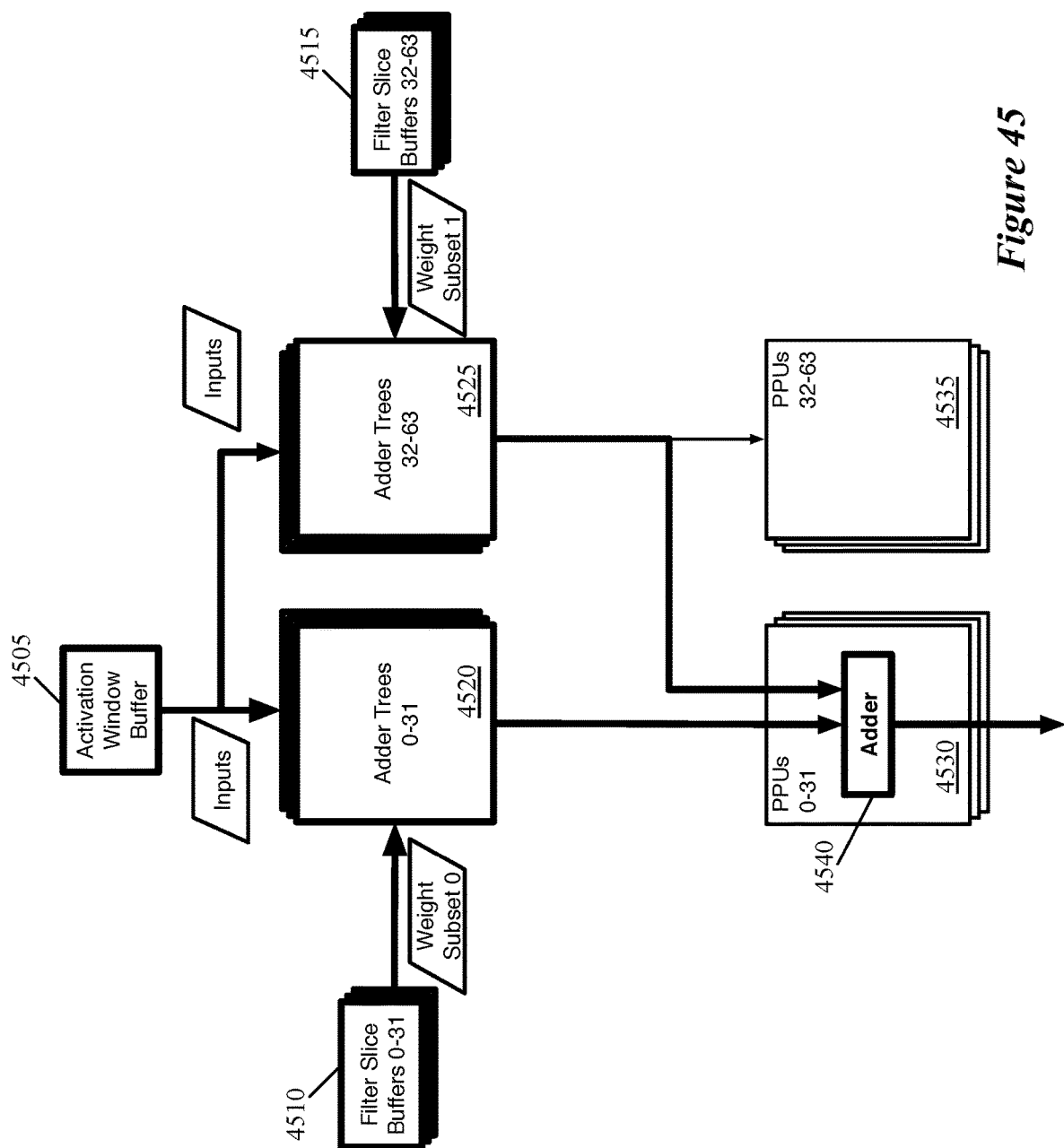
FIG. 45 conceptually illustrates an example of dot product computations using this filter splitting without latency according to some embodiments.

FIG. 45 conceptually illustrates an example of dot product computations using this filter splitting without latency according to some embodiments. Rather than using the secondary input value buffers, for a filter slice that needs to be split, a subset of the weight values are assigned to a different input value buffer (i.e., an input value buffer with a different index), with the removed weight values again replaced by zeros. This different input value buffer is selected such that the same post-processing unit receives both of the dot product bus computations from (i.e., as its primary and secondary inputs).

As shown, FIG. 45 illustrates the primary activation window buffer 4505, the first half (indices 0-31) of the primary filter slice buffers 4510, the second half (indices 32-63) of the primary filter slice buffers 4515, the first and second halves of the adder trees 4520 and 4525, and the first and second halves of the post-processing units 4530 and 4535. The second set of adder trees 4525 (via their respective dot product bus lanes, which are not shown) provide their output to both their post-processing units 4535 with the same indices as well as to the first half of the post-processing units 4530 (which also receive inputs from their corresponding adder trees 4520 via the respective dot product bus lanes). As in the above figures, the activation window buffer 4505 and each filter slice buffer and corresponding adder tree (e.g., filter slice buffer and adder tree with index 0) are representative of these circuits across all of the active cores for a computation. Similarly, the post-processing unit with a given index is representative of that post-processing unit across all of the channel segments.

As in a typical dot product computation, the activation window buffer 4505 provides the input values to all of the adder trees 4520 and 4525. For a split filter, the lower-indexed adder tree (one of the adder trees of the set of adder trees 4520) receives the first subset of the weight values while the higher-indexed adder tree (one of the adder trees of the set of adder trees 4525) receives the second subset of the weight values, with the removed weight values set to zero. In some embodiments, filters that do not have local sparsity problems do not need to be split, in which case the filter can be assigned (if needed) to one of the adder trees 4525 that is not being used for a split filter. Thus, with this scheme, 63 dot products could be computed simultaneously if only a single filter required splitting.

As shown, the post-processing unit 4530 for the split filter adds these two dot products together using adder 4540 (which corresponds to the adder 1315 in FIG. 13, with bot dot product inputs enabled) before performing the other post-processing operations (bias, scaler, etc.). In addition, if a filter split is required for a large dot product or a dot product with large input values, the post-processing unit performs this aggregation before performing the bit shifting and/or storing the initial dot product in the register.

FIG. 46 illustrates a table 4600 showing the mapping of dot product bus outputs to the different post-processing units for a neural network computation circuit of some embodiments with 64 filter slices/adder trees/dot product bus lanes/post-processing units. In this table 4600, the first column is a post-processing unit index, the second column is the primary dot product bus lane input by index and the third column is the secondary dot product bus lane input by index. As shown, the primary input for each post-processing unit is the dot product bus lane with the same index (e.g., post-processing unit 27 receives the output of dot product bus lane 27 as its primary input and, when filter splitting is not required, performs post-processing on this input).

Only the second half of the adder tree/dot product bus indices are used as secondary inputs in this example. For the first half of the post-processing units (indices 0-31), the higher-indexed dot product bus lanes are the secondary inputs, in order (i.e., the index of the secondary input is the primary input index plus 32). For the next sixteen post-processing units (indices 32-47), the secondary input indices are 48-63. Then for the next eight post-processing units (indices 48-55), the secondary input indices are 56-63. For the next four post-processing units (indices 56-59), the secondary input indices are 60-63, and for the next two post-processing units after that (indices 60-61), the secondary input indices are 62-63. Lastly, the secondary input for post-processing unit 62 is index 63, and the secondary input for post-processing unit 63 is always the value 0 (i.e., there is no secondary input). As such, the dot product from adder tree/dot product bus lane 63 is the secondary input for six different post-processing units. This provides various options for selecting to which filter slice buffer to assign a filter that needs to be split.

In the most simplistic case of this type of filter splitting, 32 or fewer filters are used at one time, in which case any filter that needs to be split will be associated with one of indices 0-31 and thus can be extended into the second set of filters (indices 32-63). When a neural network layer includes a larger number of filters, however, additional rearranging by the compiler may be required. When a first post-processing unit uses its secondary dot product input, that means that a second post-processing unit with the same index as the dot product bus lane that provides that secondary input to the first post-processing unit cannot use its primary input. Simply skipping this post-processing unit is not a preferred option, however, because active post-processing units should optimally be packed next to each other rather than spread out, so that output values on the activation write bus will then be packed together and can be written to the core memory as a contiguous block of output values. Instead, this second post-processing unit can use its secondary input, which of course means that a third post-processing unit will have its primary input borrowed. This borrowing of primary inputs and use of secondary inputs can be rippled until the last post-processing unit is reached.

For an example of this borrowing, one can assume that filters 0-34 are all adequately sparse, but filter 35 needs to be split. This means that post-processing unit 35 will use its secondary input from filter 51 (filter here meaning filter/adder tree/dot product bus lane) in addition to its primary input from filter 35. Thus, if there are enough filters in the layer that post-processing unit 51 is needed, it will need to use its secondary input from filter 59. Filters 36-50 and 52-58 (if also needed) will receive and use their own primary inputs in this case. If necessary, post-processing unit 59 receives uses its secondary input from filter 63, which means that post-processing unit 63 will not have any input enabled. By mapping progressively smaller groups of filters ending at the last filter to the secondary inputs (e.g., 32-63, then 48-63, then 56-63, etc.), this scheme minimizes the number of post-processing units with their primary inputs used, while enabling the compiler to effectively pack the active post-processing units together.

Figure 47:
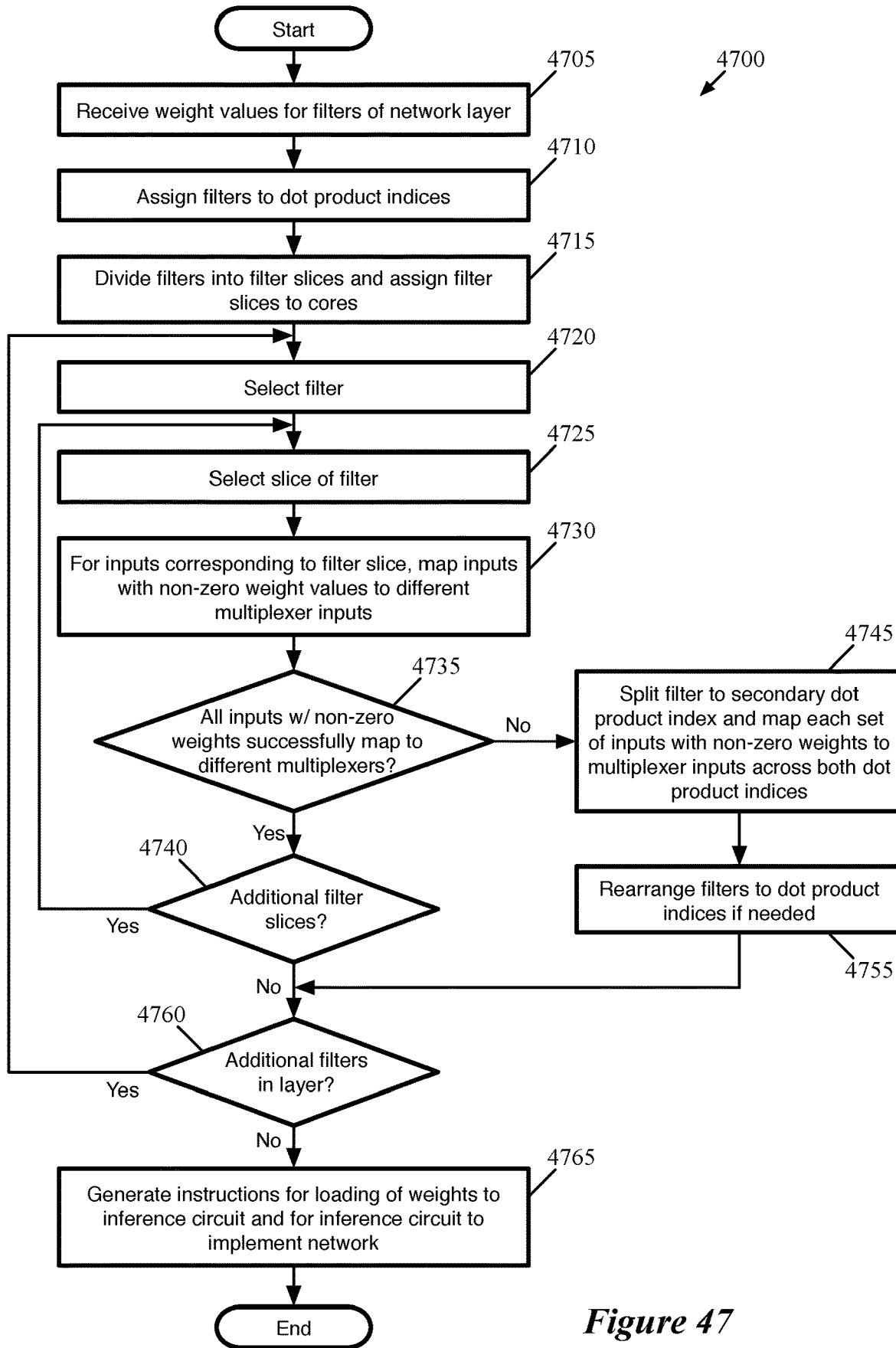
FIG. 47 conceptually illustrates a process of some embodiments for generating program instructions for a layer of a neural network while accounting for split filters.

FIG. 47 conceptually illustrates a process 4700 of some embodiments for generating program instructions for a layer of a neural network. The process 4700 is performed by a compiler of some embodiments in order to generate neural network program instructions that can be executed by the neural network computation fabric. As mentioned, the compiler receives a neural network definition (e.g., definitions for each layer, including layer type, filter dimensions, and parameter values, including weights). The process 4700 relates specifically to a process performed by the compiler to assign the filters of a convolutional layer to different filter slice buffers and generate instructions that define the configuration data for the post-processing units specifying which inputs to enable and disable. It should be understood that other operations will also be performed by the compiler in some embodiments (e.g., assigning the active cores for the particular layer, assigning the channel segment to perform post-processing for each post-processing unit, etc.).

As shown, the process 4700 begins by receiving (at 4705) weight values for the filters of a network layer. In some embodiments, the filter dimensions are defined by a kernel size (e.g., 3×3, 5×5, etc.) as well as the number of channels (which is based on the output values of the previous layer). Based on the training of the neural network, the compiler receives the weight values for each filter. In some embodiments, each of these weight values is in the set {0, α, −α}, with a varying for each layer. In some such embodiments, the compiler receives these weights normalized to {0, 1, −1} along with a as a scaling value. As discussed, in some embodiments, ideally at least 75% of the weight values of each filter are 0; however, in some cases, even if the overall sparsity of the network is greater than 75%, a single filter may not meet this threshold.

Next, the process 4700 assigns (at 4710) each filter to a dot product index. Each dot product index corresponds to the filter slice buffers, adder trees, dot product bus lane, and post-processing units with that index. In some embodiments, the compiler initially assigns the filters to consecutive indices starting at index 0. That is, if the layer includes 25 filters, then these are assigned to filters 0-24; if the layer includes 52 filters, these are assigned to filters 0-51. In this way, if none of the filters require splitting, then the output values will all be aligned on the activation write bus. In some embodiments, the order in which filters are assigned to dot product indices may be random or in a specific order, so long as the order is accounted for in the subsequent layer (i.e., because specific weight values of the subsequent layer will need to be multiplied by specific corresponding input values that are aligned based on the order of the filters in the current layer).

The process 4700 then divides (at 4715) each filter into filter slices and assigns these filter slices to cores. The compiler will have identified the location for each output value of the previous layer, which determines to which cores each group of weight values is assigned. For a set of filters in a layer that all have equivalent dimensions (e.g., 3×3×36), each filter will be divided in the same manner, so that two weights having the same coordinates in their respective filters are assigned to the same core and will always be multiplied by the same input value. In some embodiments, the number of cores used for the filters is based on the number of weights in each filter. For instance, if the activation window buffer size for a given core is 144, then the 3×3×36 filter mentioned above would have 324 weight values and require three cores.

Next, the process 4700 selects (at 4720) a filter. Some embodiments start at the filter assigned to dot product index 0 and proceed from that point. In addition, the process 4700 selects (at 4725) a slice of the selected filter assigned to a particular core. For this selection, the order does not matter, so different embodiments select a filter slice randomly, or start from the lowest indexed core.

For inputs corresponding to the selected filter slice, the process 4700 maps (at 4730) the inputs with non-zero weight values to different multiplexer inputs. As previously noted, for the partial dot product computation circuits shown above, ideally at least 75% of the inputs have corresponding weight values equal to 0. In these examples, if the number of non-zero weight values in a filter slice is greater than 36 (or 40, if the redundant circuits shown in FIG. 17 are used), then it will not be possible to successfully perform this mapping. To perform the mapping, some embodiments use the same cuckoo hashing algorithm used to design the wiring of activation window buffer slots to multiplexers.

The process 4700 then determines (at 4735) whether all of the inputs with nonzero weights are successfully mapped to different multiplexers. As noted, if the number of nonzero weights in the filter slice is larger than the number of multiplexers, then compiler can identify that the condition is not met without performing the mapping algorithm (e.g., cuckoo hashing). However, in some cases, depending on the arrangement of the input values with nonzero weight values, even if there are fewer of such input values than available multiplexers a successful mapping is not possible. Using cores with redundant multiplexers (as shown in FIG. 17) significantly increases the likelihood of a successful mapping for sparsity very close to 75%, but if the amount is slightly larger then success is not be guaranteed.

If a successful mapping of the input values is available, then the filter slice does not necessitate splitting the filter, and the process 4700 determines (at 4740) whether additional filter slices remain for the currently selected filter. If additional filter slices remain, then the process returns to 4725 to select the next filter slice (i.e., the slice assigned to the next core of the neural network computation fabric) and test this filter slice. Otherwise, the process 4700 proceeds to 4760, which is described below.

On the other hand, if the input values with nonzero corresponding weight values cannot be successfully mapped to separate multiplexers, then the process 4700 splits (at 4745) the filter to a secondary dot product index and maps each set of inputs with non-zero weights to multiplexer inputs across both the original dot product index for the filter and the secondary dot product index. In some embodiments, the remaining weight values are filled in as zeros. The secondary dot product index, in some embodiments, is the index of the dot product bus lane that provides its output as the secondary input to the post-processing unit having the index to which the currently selected filter is assigned. For instance, referring to the table 4600 of FIG. 46, if the filter to be split is filter 17, then half of the filter is assigned to index 49.

To map the sets of inputs with non-zero weights to multiplexer inputs with the split filter, the compiler of some embodiments intelligently moves weights from the original dot product index to the secondary dot product index. In some embodiments, the compiler maps the input values to multiplexer inputs collectively across both of the dot product indices. That is, each input value is wired to four different possible multiplexer inputs (or six for certain inputs in the case of redundant circuits) rather being wired to two different multiplexer inputs. This provides significantly more possibilities for successfully mapping all of the input values with non-zero weights to different multiplexer inputs. The compiler then moves the corresponding weights to the secondary dot product index for the filter slice.

It should be noted that some embodiments split all of the filter slices of a particular filter once one of those filters needs to be split, as doing so does not impose a significant additional cost in terms of the usage of a dot product index (even for cores in which the filter does not require splitting, that index cannot be used for a different filter because the dot product bus lane is occupied). In this case, the mapping (or re-mapping) is performed for all of the filter slices of the current filter. However, other embodiments only split the filter slices for which doing so is required, in order to save weight memory usage (i.e., all of the extra zeros that are stored for the split filters).

Next, the process 4700 rearranges (at 4755) the filters to dot product indices if needed. If a second filter is currently assigned to the secondary dot product index for the selected filter, then that second filter is reassigned to a different dot product index. To preserve contiguous use of post-processing unit indices (and thus contiguous packing of output values on the activation write bus), some embodiments assign the second filter to the dot product index used as the secondary input to the post-processing unit index to which the second filter was previously assigned (before that dot product index was used for the split filter). In addition, if the use of that dot product index necessitates reassigning a third filter, then that third filter is also reassigned, and so on. Once a dot product index is borrowed that does not already have a filter assigned, the reassignment is complete. If too many filters need to be split, then some embodiments also reorder the filters (such that the outputs will be reordered). However, doing so may also necessitate reordering weight values in the subsequent layer of the neural network.

After reassigning the filters (or after verifying that all of the filter slices for the selected filter do not need to be split), the process 4700 determines (at 4760) whether additional filters remain in the layer. In some embodiments, as mentioned, all of the filter slices for a particular filter are split if any of the slices necessitates splitting. In other embodiments, if each filter slice is verified separately, then the process would proceed to operation 4740 from operation 4755, and only proceed to operation 4760 once all of the filter slices were verified. If additional filters remain, the process returns to 4720 to select the next filter.

Finally, once all of the filters have been verified and reassigned as needed, the process generates (at 4765) instructions (i) for loading weights to the neural network computation circuit and (ii) for the circuit to execute the network. These instructions, in some embodiments, specify the order of the weights and to which core they are assigned (so that they will be loaded into the correct filter slice buffers in the correct order). In addition, the instructions identify the active cores for the layer, the mapping of input values to multiplexers for each node, any use of secondary dot product inputs for post-processing units, etc.

While the examples shown for filter splitting are dot products with (i) less than the maximum number of components for computation in a single cycle and (ii) small enough input values for computation in a cycle (e.g., 4-bit input values in the examples shown above), it should be understood that some embodiments also apply filter splitting to dot products that do not meet these requirements. In these cases, at least the secondary activation window buffer is already in use (if not also the secondary filter slice buffers), so some such embodiments split the filter into a second dot product index and combine the dot products at the post-processing unit (as in FIG. 44 above). For such split filters, the adder 1315 will combine the primary and secondary inputs in both clock cycles, and the adder 1325 will add together these combined dot products from the first and second clock cycles (with the bit shifting operating as normal for large-input dot products).

As discussed in detail above, the neural network computation circuit of some embodiments is designed to execute neural networks with ternary weight values (that is, with weight values that for each layer can be scaled to 0, 1, and −1). Some embodiments use techniques similar to filter splitting to enable larger numbers of possible weight values while using this same hardware designed for ternary weights. To illustrate these techniques, the example of quinary weights (e.g., the weights in each layer scale to −2, −1, 0, 1, 2) will be used. However, it should be understood that the techniques described can also be extended in some embodiments to larger numbers of discrete weights per layer. Some embodiments use multiple different techniques to enable quinary weights, while other embodiments always use one or the other of the solutions described below.

Figure 48:
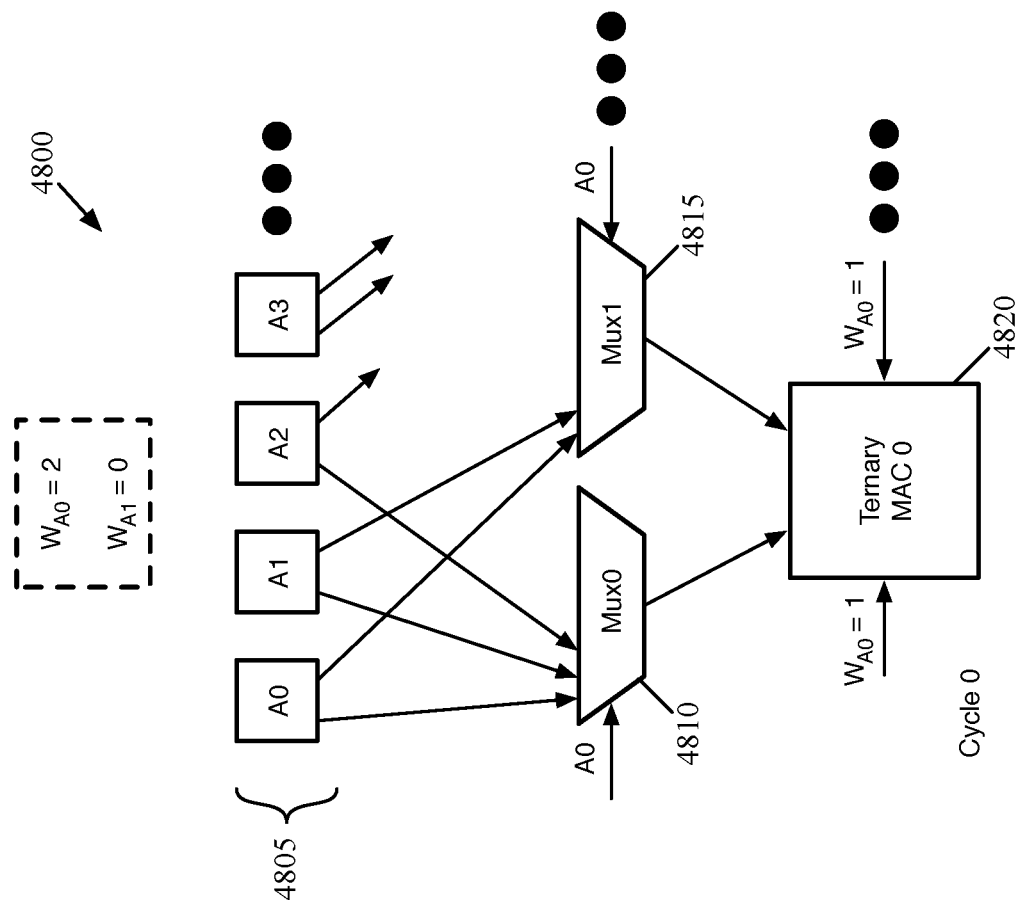
FIG. 48 conceptually illustrates an example of a solution that does not incur any extra latency cycles or use any extra dot product indices for a filter with quinary weights for a partial dot product computation circuit of some embodiments.

If a particular filter with quinary weights is sparse enough (i.e., has a large percentage of 0 values), then the dot product can be computed without incurring any extra latency cycles or using any extra dot product indices (as opposed to the filter splitting solutions shown above). FIG. 48 conceptually illustrates an example of this solution for a partial dot product computation circuit 4800, similar to those shown in FIGS. 16 and 17. This figure shows input values 4805 (including the wiring for values A0 and A1), two of the input multiplexers 4810 and 4815, and one of the ternary MAC circuits 4820. In addition, the figure indicates that the weight value corresponding to input A0 is 2 and the weight value corresponding to input A1 is 0.

As described above, each of the input values 4805 in the input value buffer is wired to at least two different multiplexers (in some embodiments, some of the input values are wired to three multiplexers). In this example, both of the multiplexers 4810 and 4815 that receive input value A0 (which has a weight value of 2) select this input, whereas for a network with ternary weight values two multiplexers would not normally be configured to both select the same input value (especially an input value with a nonzero weight).

The ternary MAC circuit 4820 thus receives A0 as both of its inputs, although in many cases the input value with a +2 or −2 weight value would be wired to two multiplexers that are further apart and do not provide inputs to the same ternary MAC circuit (e.g., if A2 had a corresponding weight value of +2 or −2). As shown, the ternary MAC circuit 4820 also receives weight values of +1 for both of its inputs, such that this circuit will output A0+A0=2×A0, thus correctly applying the +2 weight to the input value A0. Similarly, if an input value has a corresponding weight value of −2, then that input value will be selected by two multiplexers to which it is wired, and the corresponding weight values provided to the ternary MAC circuit or circuits that receive these input values will be −1.

While the solution shown in FIG. 48 is an optimal one for handling filters with quinary weight values, if the number of +2/−2 weight values is large or the sparsity is not much above 75%, then such a solution will likely not be possible. In such cases, both multiplexers that receive each of the input values with +2/−2 weights will not always be free to select these input values (e.g., assuming exactly two wires per input value, if any multiplexer receives two different inputs with +2 or −2 corresponding weight values, then no solution is possible).

In these cases, however, the compiler can use filter splitting techniques to enable the use of quinary weights. Rather than move half of the input values to a different input value buffer (either the secondary buffer or a buffer with a different index), the entire filter is duplicated. Weight values of +2/−2 are represented by +1/−1 in both filters, while weight values of +1/−1 are represented by +1/−1 in the first filter and 0 in the second filter.

Figure 49:
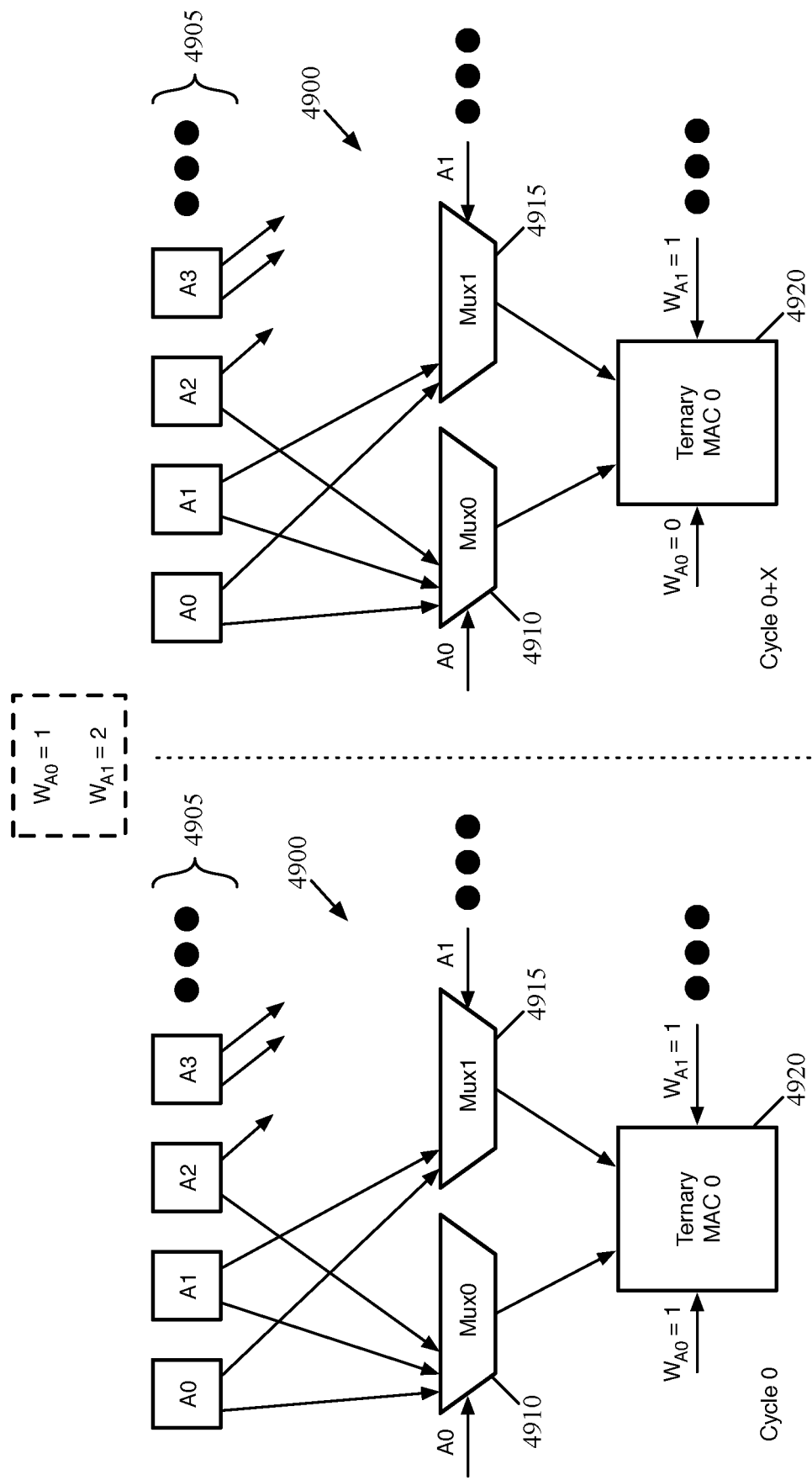
FIG. 49 conceptually illustrates an example of a solution for quinary weights that uses a single partial dot product computation circuit while incurring additional latency.

FIG. 49 conceptually illustrates an example of a first solution for quinary weights that uses a single partial dot product computation circuit 4900 (i.e., a single adder tree index) while incurring additional latency (similar to the filter splitting shown in FIG. 44). This figure shows input values 4905 (including the wiring for input values A0 and A1), two of the input multiplexers 4910 and 4915, and one of the ternary MAC circuits 4920. In addition, the figure indicates that the weight value corresponding to input value A0 is 1 and the weight value corresponding to input A2 is 2.

In the first clock cycle, the first multiplexer 4910 is configured to select input value A0 and the second multiplexer 4915 is configured to select input value A1, so that the ternary MAC circuit 4920 receives A0 and A1 as its inputs. This ternary MAC circuit 4920 receives the values +1 for both weight values, and therefore outputs the value A0+A1 to the remainder of the adder tree circuit.

In the second clock cycle, the first multiplexer 4910 is again configured to select input value A0 and the second multiplexer 4915 is configured to select input value A1, such that the ternary MAC circuit 4920 again receives A0 and A1 as its inputs. However, the ternary MAC circuit 4920 receives the value 0 as the weight for input A0 and +1 as the weight for input A1. Thus, the circuit outputs the value A1 in the second clock cycle, and the total contribution to the dot product from these inputs is A0+(2×A1). For both the first and second clock cycles, the same input values from the primary activation buffer are used. However, in the first clock cycle, weight values from the primary weight value buffer are used and, in the second clock cycle, weight values from the secondary weight value buffer are used. Weight values of +1 are loaded into the primary weight value buffer for weights that are +1 or +2, while weight values of +1 are only loaded into the secondary weight value buffer for weights that are +2 (with the equivalent negative values used for weights of −1 and −2).

As noted above, filter splitting can be accomplished by dividing a filter over time (using multiple clock cycles) or by dividing a filter over space (using multiple dot product indices in a single clock cycle). The same applies to the use of quinary weights; as an alternative to duplicating the +2/−2 values of a filter into a second clock cycle (using the secondary weight value buffer), some embodiments duplicate these values into a second filter index and configure the post-processing unit to add the results of both dot product indices.

Figure 50:
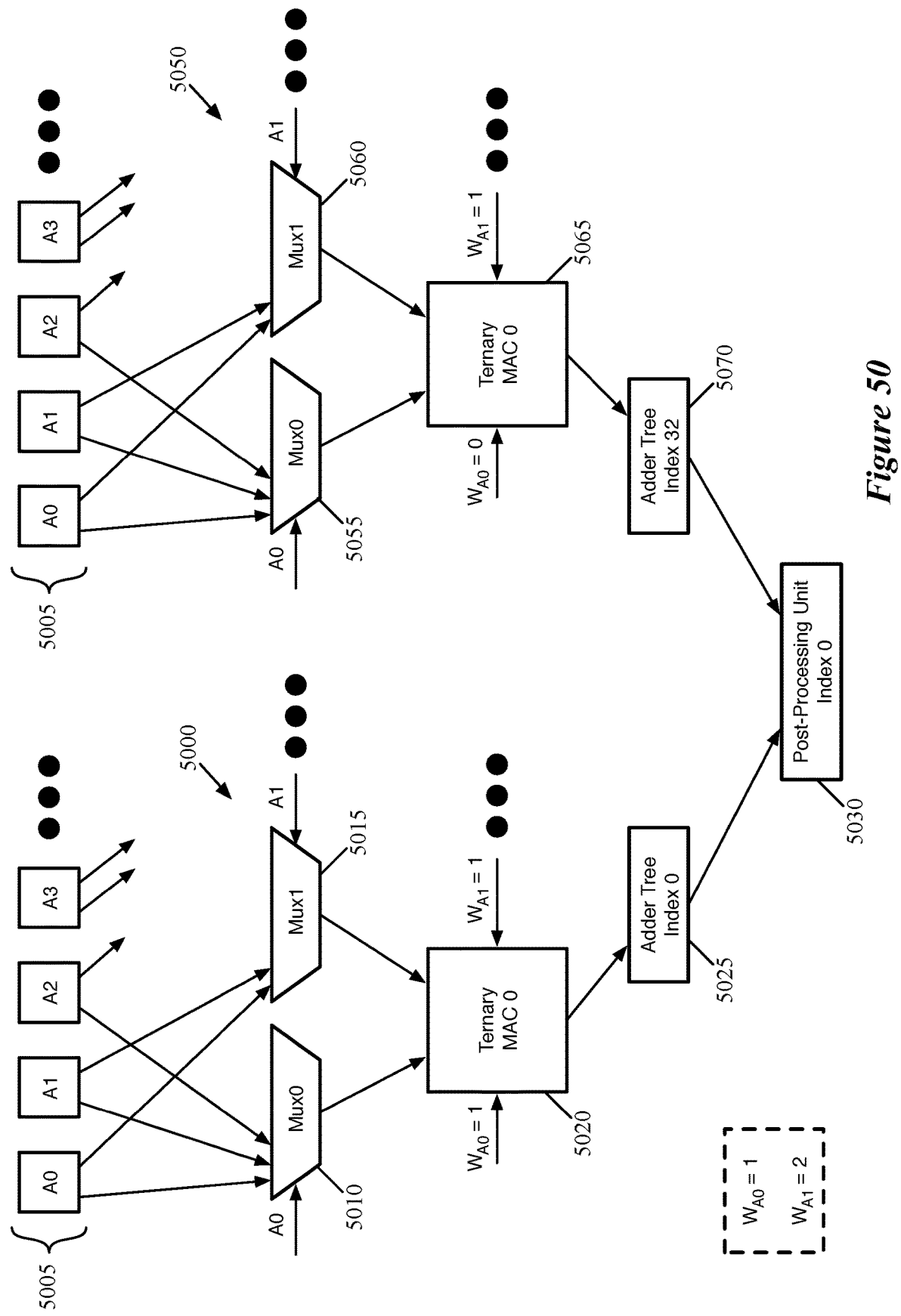
FIG. 50 conceptually illustrates an example of a solution for quinary weights that avoids extra latency for the dot product by using a second adder tree index.

FIG. 50 conceptually illustrates an example of this solution for quinary weights that avoids extra latency for the dot product by using a second adder tree index (similar to the filter splitting shown in FIG. 45). This figure shows input values 5005 as well as two partial dot product computation circuits 5000 and 5050 in the same core that receive these input values. In addition, the figure indicates that the weight value corresponding to input value A0 is 1 and the weight value corresponding to input value A1 is 2.

The input values 5005 are shown twice, as the activation window buffer in the core is wired to both of these partial dot product computation circuits 5000 and 5050 (as well as to all of the other such circuits in the core). The first partial dot product computation circuit 5000 has index 0 and the second partial dot product computation circuit has index 32, such that the post-processing unit 5030 with index 0 receives the output of both of these circuits (as aggregated by the respective dot product bus lanes, which are not shown in the figure).

The two separate groups of multiplexers receive the same configuration and thus select the same input values in both partial dot product computation circuits 5000 and 5050. As shown, multiplexers 5010 and 5055 both select A0, while multiplexers 5015 and 5060 both select A1. As such, both of the ternary MAC circuits 5020 and 5065 receive A0 and A1 as their input values. However, where these two computations differ is that the ternary MAC circuit 5020 receives the values +1 for both of its weight values, whereas the ternary MAC circuit 5065 receives the value 0 as the weight value for A0 and the value 1 as the weight value for A1. Thus, the ternary MAC circuit 5020 outputs the value A0+A1 to the adder tree 5025 with index 0 while the ternary MAC circuit 5065 outputs the value A1 to the adder tree 5070 with index 32. These adder trees 5025 and 5070 receive the outputs of their respective additional ternary MAC circuits and provide their outputs to different dot product bus lanes, which are added together at the post-processing unit 5030 with index 0 (i.e., this post-processing unit in one of the channel segments). As in the previous example, the total contribution to the dot product from these two inputs is A0+(2×A1). Using this technique, the neural network computation fabric can simultaneously compute the dot products for a network layer with up to 32 filters having quinary weights.

In some embodiments, the compiler uses both of these filter splitting techniques to handle filters with quinary weights (i.e., either using the secondary weight value buffer and incurring a latency penalty or moving the second half of the filter to a weight value buffer with a different index), depending on the requirements of the network. For example, if the number of filters is large and all of the filters use quinary weights, then using the secondary weight value buffers and incurring the latency penalty may be preferred. On the other hand, if the filters have a large number of weights (such that the dot products have more components than can be computed in a single cycle), then the compiler of some embodiments duplicates the filters into multiple dot product indices, as the secondary buffers are already needed.

Figure 51:
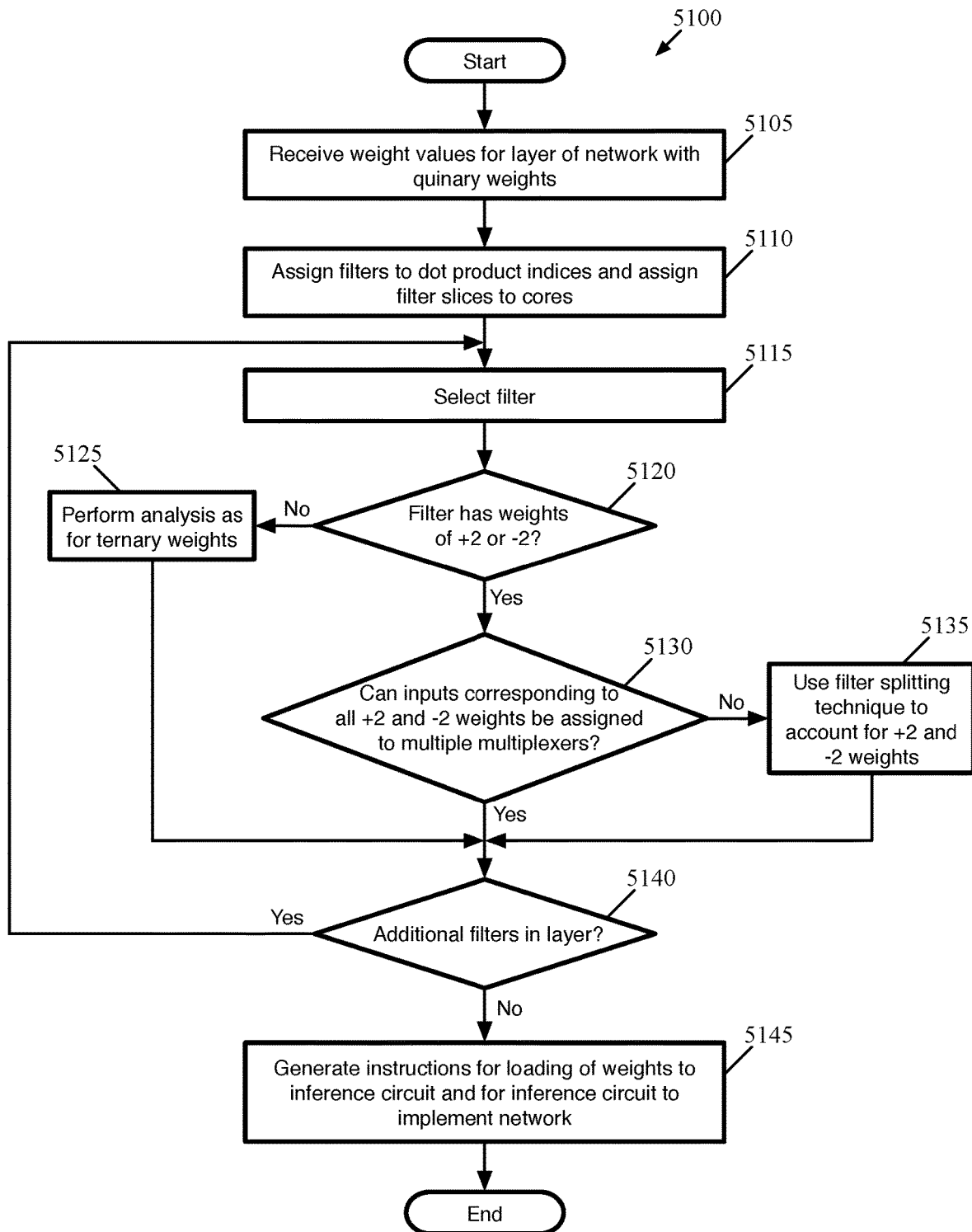
FIG. 51 conceptually illustrates a process of some embodiments for generating program instructions for a layer of a neural network that uses quinary weights.

In addition, the compiler of some embodiments attempts to avoid duplicating filters with quinary weights when possible (i.e., as shown in FIG. 48). FIG. 51 conceptually illustrates a process 5100 of some embodiments for generating program instructions for a layer of a neural network that uses quinary weights. The process 5100 is performed by a compiler of some embodiments in order to generate neural network program instructions that can be executed by the neural network computation fabric. As mentioned, the compiler receives a neural network definition (e.g., definitions for each layer, including layer type, filter dimensions, and parameter values, including weights). The process 5100 relates specifically to a process performed by the compiler to assign the filters of a convolutional layer to different filter slice buffers and generate instructions that define the configuration data for the input multiplexers of the partial dot product computation circuits specifying which input values to select and for the post-processing units specifying which inputs to enable and disable. It should be understood that other operations will also be performed by the compiler in some embodiments (e.g., assigning the active cores for the particular layer, assigning the channel segment to perform post-processing for each post-processing unit, etc.).

As shown, the process 5100 begins by receiving (at 5105) weight values for the filters of a network layer that uses quinary weights. In some embodiments, the filter dimensions are defined by a kernel size (e.g., 3×3, 5×5, etc.) as well as the number of channels (which is based on the output values of the previous layer). Based on the training of the neural network, the compiler receives the weight values for each filter. In some embodiments, each of these weight values is in the set $\{0, \alpha, -\alpha, 2\alpha, -2\alpha\}$, with a varying for each layer. In some such embodiments, the compiler receives these weights normalized to $\{0, 1, -1, 2, -2\}$ along with a as a scaling value. As discussed, in some embodiments, ideally at least 75% of the weight values of each filter are 0; however, in some cases, even if the overall sparsity of the network is greater than 75%, a single filter may not meet this threshold.

Next, the process assigns (at 5110) each of the filters to a dot product index, divides the filters into filter slices, and assigns these filters to cores of the neural network computation circuit. These operations of some embodiments are described above by reference to FIG. 47. In some embodiments, for the initial assignment, each filter is assigned to a single dot product index, even if the filter has weight values of +2 and/or −2. For networks with quinary weights, some embodiments restrict the number of filters that may be assigned to 32, because of the potential need to use secondary dot product indices for many of the filters. In some such embodiments, layers with more than 32 filters are divided across two sets of computations. That is, the first group of filters would be loaded and used for all of their nodes (with successively different sets of input values), then another group of filters would be loaded (such that all of the input values would have to be loaded multiple times).

The process 5100 then selects (at 5115) a filter. Some embodiments start at the filter assigned to dot product index 0 and proceed from that point. The process 5100 determines (at 5120) whether the filter has at least one weight value of +2 or −2 (i.e., does the selected filter include quinary weights). If the selected filter does not include any such weight values (i.e., all of the weight values are in the set {0, 1, −1}, then the process performs (at 5125) analysis on the filter as for ternary weights. In some embodiments, this involves verifying whether each filter slice needs to be split, and splitting the filter if necessary, as shown in operations 4725-4755 of FIG. 47.

On the other hand, if the filter does have at least one weight value of +2 or −2, the process determines (at 5130) whether all of the input values with corresponding weights of +2 and −2 can be assigned to multiple multiplexers, as in FIG. 48. As previously noted, this will usually require either very few such weight values or a very sparse filter (e.g., ~90% zeros). If, for example, there are more than 18 (or 20, if the redundant circuits shown in FIG. 17 are used) weight values of +2 or −2 in a filter slice of 144 weight values, then the input values corresponding to these cannot all be mapped to multiple multiplexers. In addition, if the number of weight values of +2 or −2 in a filter slice multiplied by two, plus the number of weight values of +1 or −1, is greater than 36 (or 40 for redundant circuits), then the input values corresponding to these weight values cannot all be mapped to separate multiplexers as needed.

If all of the input values with weights corresponding to +2 or −2 can be mapped to multiple multiplexers successfully, then the compiler uses these mappings for each of these filter slices. However, when this is not the case, the process uses (at 5135) a filter splitting technique to account for the +2 and −2 weight values. Some embodiments always use the time-multiplexing technique (i.e., using the secondary weight value buffers and a second clock cycle as shown in FIG. 49), while other embodiments always use a second dot product index as shown in FIG. 50. Still other embodiments use one or the other of these solutions depending on the other characteristics of the network layer (i.e., whether the secondary buffers are already needed for large dot products or large input values, the number of filters in the layer, etc.). Some embodiments perform operations 5130 and 5135 separately for each filter slice, only using the filter splitting technique for filter slices where it is required. Other embodiments, however, duplicate all of the filter slices into either the secondary buffer or a second dot product index (while changing the +1 and −1 weight values to 0) if the input values for any of the filter slices cannot be mapped successfully.

The process 5100 then determines (at 5140) whether the layer includes additional filters. If additional filters remain, the process returns to 5115 to select the next filter. Once all of the filters have been verified and reassigned as needed, the process generates (at 5145) instructions (i) for loading weights to the neural network computation circuit and (ii) for the circuit to execute the network. These instructions, in some embodiments, specify the order of the weights and to which core they are assigned (so that they will be loaded into the correct filter slice buffers in the correct order), and account for the duplication of filters with quinary weights. In addition, the instructions identify the active cores for the layer, the mapping of input values to multiplexers for each node, any use of secondary dot product inputs for post-processing units, etc.

The integrated circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the IC to be executed by the IC on the device. These devices can include mobile devices, desktop computers, Internet of Things (IoT devices), etc.

Figure 52:
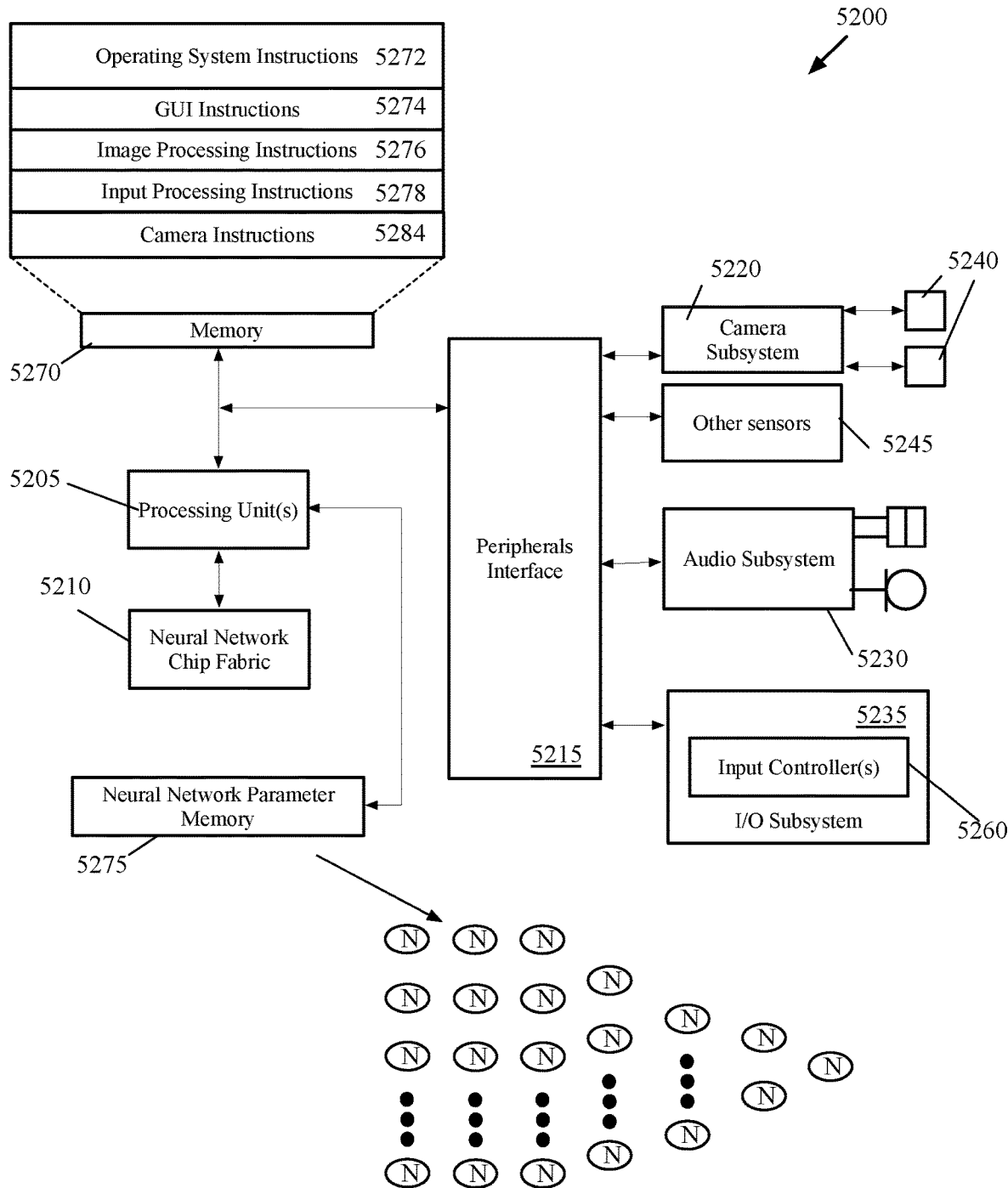
FIG. 52 is an example of an architecture of an electronic device that includes the neural network integrated circuit of some embodiments.

FIG. 52 is an example of an architecture 5200 of an electronic device that includes the neural network integrated circuit of some embodiments. The electronic device may be a mobile computing device such as a smartphone, tablet, laptop, etc., or may be another type of device (e.g., an IoT device, a personal home assistant). As shown, the device 5200 includes one or more general-purpose processing units 5205, a neural network chip fabric 5210, and a peripherals interface 5215.

The peripherals interface 5215 is coupled to various sensors and subsystems, including a camera subsystem 5220, an audio subsystem 5230, an I/O subsystem 5235, and other sensors 5245 (e.g., motion/acceleration sensors), etc. The peripherals interface 5215 enables communication between the processing units 5205 and various peripherals. For example, an orientation sensor (e.g., a gyroscope) and an acceleration sensor (e.g., an accelerometer) can be coupled to the peripherals interface 5215 to facilitate orientation and acceleration functions. The camera subsystem 5220 is coupled to one or more optical sensors 5240 (e.g., charged coupled device (CCD) optical sensors, complementary metal-oxide-semiconductor (CMOS) optical sensors, etc.). The camera subsystem 5220 and the optical sensors 5240 facilitate camera functions, such as image and/or video data capturing.

The audio subsystem 5230 couples with a speaker to output audio (e.g., to output voice navigation instructions). Additionally, the audio subsystem 5230 is coupled to a microphone to facilitate voice-enabled functions, such as voice recognition, digital recording, etc. The I/O subsystem 5235 involves the transfer between input/output peripheral devices, such as a display, a touch screen, etc., and the data bus of the processing units 5205 through the peripherals interface 5215. The I/O subsystem 5235 various input controllers 5260 to facilitate the transfer between input/output peripheral devices and the data bus of the processing units 5205. These input controllers 5260 couple to various input/control devices, such as one or more buttons, a touch-screen, etc.

In some embodiments, the device includes a wireless communication subsystem (not shown in FIG. 52) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 52, a memory 5270 (or set of various physical storages) stores an operating system (OS)

5272. The OS 5272 includes instructions for handling basic system services and for performing hardware dependent tasks. The memory 5270 also stores various sets of instructions, including (1) graphical user interface instructions 5274 to facilitate graphic user interface processing; (2) image processing instructions 5276 to facilitate image-related processing and functions; (3) input processing instructions 5278 to facilitate input-related (e.g., touch input) processes and functions; and (4) camera instructions 5284 to facilitate camera-related processes and functions. The processing units 5210 execute the instructions stored in the memory 5270 in some embodiments.

The memory 5270 may represent multiple different storages available on the device 5200. In some embodiments, the memory 5270 includes volatile memory (e.g., high-speed random access memory), non-volatile memory (e.g., flash memory), a combination of volatile and non-volatile memory, and/or any other type of memory.

The instructions described above are merely exemplary and the memory 5270 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 5275 stores the weight values, bias parameters, etc. for implementing one or more machine-trained networks by the neural network chip fabric 5210. As mentioned above, different clusters of cores of the fabric 5210 can implement different machine-trained networks in parallel in some embodiments. In different embodiments, these neural network parameters are stored on-chip (i.e., in memory that is part of the neural network chip fabric 5210) or loaded onto the IC 5210 from the neural network parameter memory 5275 via the processing unit(s) 5205.

While the components illustrated in FIG. 52 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 5205 and the neural network IC 5210, which enables the processing units 5205 to provide inputs to the neural network IC 5210 and receive the outputs of the network from the IC 5210. Also, while many of the functions have been described as being performed by one component, one of ordinary skill in the art will realize that the functions described with respect to FIG. 52 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs.

Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 53:
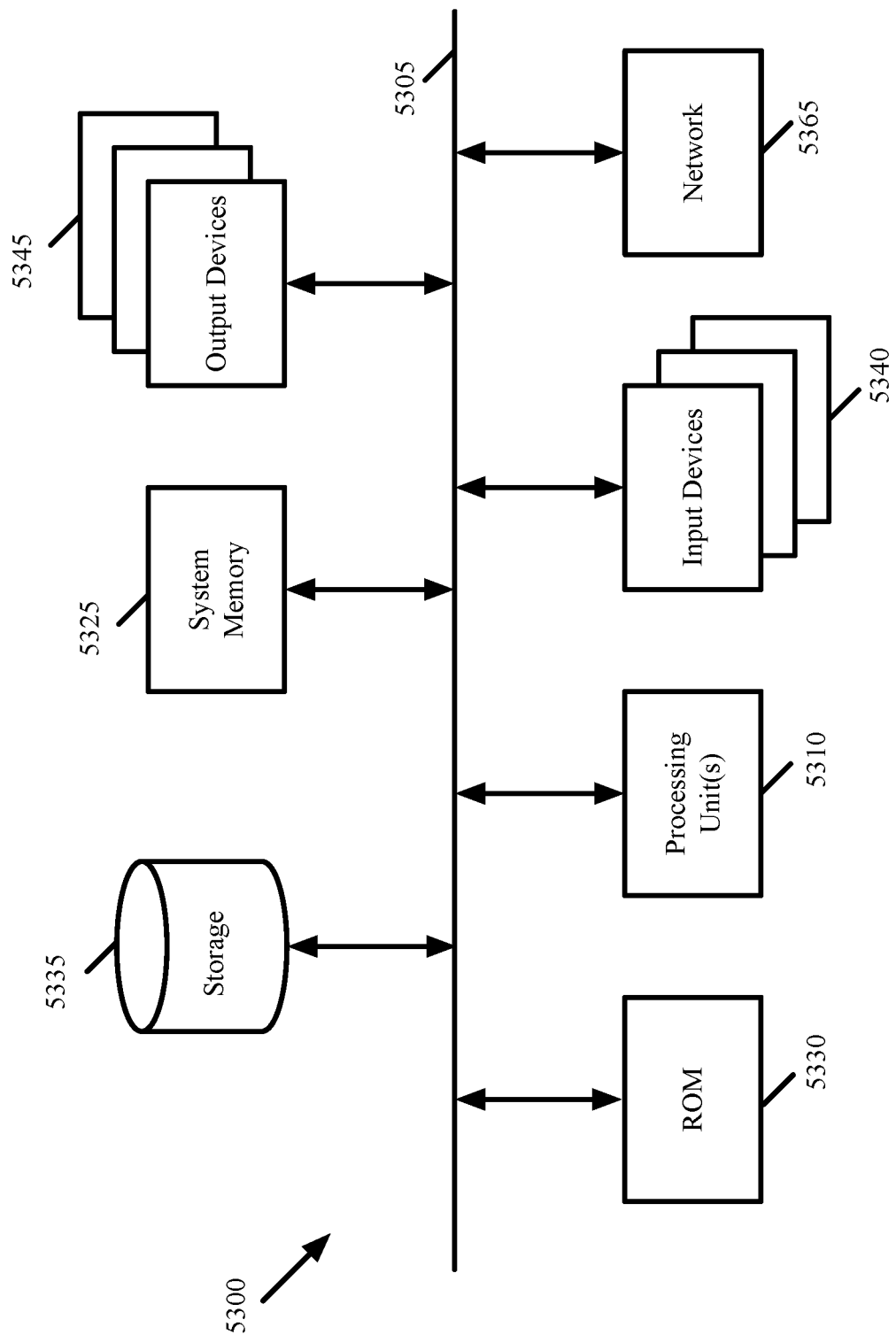
FIG. 53 conceptually illustrates an electronic system with which some embodiments of the invention are implemented.

FIG. 53 conceptually illustrates an electronic system 5300 with which some embodiments of the invention are implemented. The electronic system 5300 can be used to execute any of the control and/or compiler systems described above in some embodiments. The electronic system 5300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 5300 includes a bus 5305, processing unit(s) 5310, a system memory 5325, a read-only memory 5330, a permanent storage device 5335, input devices 5340, and output devices 5345.

The bus 5305 collectively represents all system, peripheral, and chipset buses that communicatively connect the numerous internal devices of the electronic system 5300. For instance, the bus 5305 communicatively connects the processing unit(s) 5310 with the read-only memory 5330, the system memory 5325, and the permanent storage device 5335.

From these various memory units, the processing unit(s) 5310 retrieves instructions to execute and data to process in order to execute the processes of the invention. The processing unit(s) may be a single processor or a multi-core processor in different embodiments.

The read-only-memory (ROM) 5330 stores static data and instructions that are needed by the processing unit(s) 5310 and other modules of the electronic system. The permanent storage device 5335, on the other hand, is a read-and-write memory device. This device is a non-volatile memory unit that stores instructions and data even when the electronic system 5300 is off. Some embodiments of the invention use a mass-storage device (such as a magnetic or optical disk and its corresponding disk drive) as the permanent storage device 5335.

Other embodiments use a removable storage device (such as a floppy disk, flash drive, etc.) as the permanent storage device. Like the permanent storage device 5335, the system memory 5325 is a read-and-write memory device. However, unlike storage device 5335, the system memory is a volatile read-and-write memory, such a random-access memory. The system memory stores some of the instructions and data that the processor needs at runtime. In some embodiments, the invention's processes are stored in the system memory 5325, the permanent storage device 5335, and/or the read-only memory 5330. From these various memory units, the processing unit(s) 5310 retrieves instructions to execute and data to process in order to execute the processes of some embodiments.

The bus 5305 also connects to the input and output devices 5340 and 5345. The input devices enable the user to communicate information and select commands to the electronic system. The input devices 5340 include alphanumeric keyboards and pointing devices (also called "cursor control devices"). The output devices 5345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 53, bus 5305 also couples electronic system 5300 to a network 5365 through a network adapter (not shown). In this manner, the computer can be a part of a network of computers (such as a local area network ("LAN"), a wide area network ("WAN"), or an Intranet, or a network of networks, such as the Internet. Any or all components of electronic system 5300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 7, 18, 25, 33, 39, 40, 42, 47, and 51) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A neural network inference circuit for executing a neural network that comprises a plurality of computation nodes at a plurality of layers, each of a set of the computation nodes comprising a dot product of input values and weight values, the neural network inference circuit comprising:
    a first set of memory units allocated to storing input values during execution of the neural network;
    a second set of memory units storing encoded weight value data, wherein the weight value data is encoded such that less than one bit of memory is used per weight value of the neural network; and
    a plurality of dot product computation circuits, wherein the weight value data is decoded and used to configure the dot product computation circuits.

2. The neural network inference circuit of claim 1, wherein at least a plurality of the weight values of the neural network are organized in filters, wherein each particular computation node of the set of computation nodes comprises a dot product of a particular set of input values and the weight values of a particular filter.

3. The neural network inference circuit of claim 1, wherein a particular block of weight value data used to configure a particular dot product computation circuit comprises an index specifying the particular dot product computation circuit.

4. The neural network inference circuit of 1, wherein each dot product computation circuit comprises (i) a plurality of multiplexers and (ii) a plurality of computation circuits, wherein the plurality of multiplexers reduces a number of input values provided to the plurality of computation circuits.

5. The neural network inference circuit of claim 4, wherein the encoded weight value data indicates which of the multiplexers output input values with non-zero corresponding weight values.

6. The neural network inference circuit of claim 5, wherein the encoded weight value data stores select bits for each multiplexer that receives an input with a non-zero corresponding weight value.

7. The neural network inference circuit of claim 6, wherein select bits for multiplexers that do not receive inputs with non-zero corresponding weight values are generated by weight data decoder circuitry of the neural network inference circuit.

8. The neural network inference circuit of claim 5, wherein the encoded weight value data stores data indicating whether each of the non-zero weight values are positive or negative.

9. The neural network inference circuit of claim 8, wherein, for each layer of the neural network, each of the weight values is one of (i) zero, (ii) a positive value, or (iii) a negation of the positive value.

10. The neural network inference circuit of claim 9, wherein the dot product computation circuits operate as though each of the weight values is one of the set $\{0, 1, -1\}$, wherein post-processing circuits multiply each dot product of the layer by the positive value.

11. A neural network inference circuit for executing a neural network that comprises a plurality of computation nodes at a plurality of layers, each of a set of the computation nodes comprising a dot product of input values and weight values, the neural network inference circuit comprising:

a first set of memory units allocated to storing input values during execution of the neural network; and a second set of memory units storing encoded weight value data, wherein the weight value data is encoded such that less than one bit of memory is used per weight value of the neural network, wherein at least a plurality of the weight values of the neural network are organized in filters, wherein each particular computation node of the set of the computation nodes comprises a dot product of a particular set of input values and the weight values of a particular filter, wherein each of a plurality of the layers comprises a plurality of groups of computation nodes, each group of computation nodes associated with a different filter, each computation node in a particular group of computation nodes comprising a dot product of a different set of input values and the weight values of the filter associated with the group of computation nodes.

12. The neural network inference circuit of claim 11 further comprising a plurality of cores, each of at least a subset of the cores comprising a portion of the first set of memory units and a portion of the second set of memory units.

13. The neural network inference circuit of claim 12, wherein the weight value data of a specific filter is divided across the memory units of at least two of the cores.

14. The neural network inference circuit of claim 13, wherein the weight value data of the specific filter stored in a particular core is stored in a contiguous block of the memory units of the particular core.

15. A neural network inference circuit for executing a neural network that comprises a plurality of computation nodes at a plurality of layers, wherein a plurality of weight values of the neural network are organized in filters and each particular computation node of a set of computation nodes comprises a dot product of a particular set of input values and the weight values of a particular filter, the neural network inference circuit comprising:

a first set of memory units allocated to storing input values during execution of the neural network;

a second set of memory units storing encoded weight value data, wherein the weight value data is encoded such that less than one bit of memory is used per weight value of the neural network; and a plurality of cores, each of at least a subset of the cores comprising a portion of the first set of memory units and a portion of the second set of memory units, wherein the weight value data for a specific filter is divided across the memory units of at least two of the cores, wherein the weight value data of the specific filter stored in a particular core is stored in a contiguous block of the memory units of the particular core, wherein the contiguous block of weight value data comprises a fixed width portion and a variable width portion.

16. The neural network inference circuit of claim 15, wherein a size of the variable width portion depends on the weight value data of the fixed width portion.

17. The neural network inference circuit of claim 15, wherein a size of the variable width portion depends on a number of non-zero weight values encoded in the contiguous block of weight value data.

18. A neural network inference circuit for executing a neural network that comprises a plurality of computation nodes at a plurality of layers, each of a set of the computation nodes comprising a dot product of input values and weight values, the neural network inference circuit comprising:

a first set of memory units allocated to storing input values during execution of the neural network; and a second set of memory units storing encoded weight value data, wherein the weight value data is encoded such that less than one bit of memory is used per weight value of the neural network, wherein the encoded weight data is stored in the second set of memory units at bootup of the neural network inference circuit.

19. The neural network inference circuit of claim 18, wherein the input values in the first set of memory units are overwritten during execution of the neural network.

20. The neural network inference circuit of claim 18, wherein at least a plurality of the weight values of the neural network are organized in filters, wherein each particular computation node of the set of computation nodes comprises a dot product of a particular set of input values and the weight values of a particular filter.

* * * * *